United States Patent
Howell et al.

(10) Patent No.: US 12,242,138 B1
(45) Date of Patent: *Mar. 4, 2025

(54) WIRELESS HEADSET SUPPORTING MESSAGES AND HEARING ENHANCEMENT

(71) Applicant: IngenioSpec, LLC, San Jose, CA (US)

(72) Inventors: Thomas A. Howell, San Jose, CA (US); David Chao, Saratoga, CA (US); C. Douglass Thomas, Saratoga, CA (US); Peter P. Tong, Mountain View, CA (US)

(73) Assignee: IngenioSpec, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,367

(22) Filed: Dec. 15, 2023

Related U.S. Application Data

(63) Continuation of application No. 17/942,347, filed on Sep. 12, 2022, now Pat. No. 11,852,901, which is a
(Continued)

(51) Int. Cl.
*H04R 25/00* (2006.01)
*G02C 5/00* (2006.01)
(Continued)

(52) U.S. Cl.
CPC .............. *G02C 11/06* (2013.01); *G02C 5/008* (2013.01); *G02C 11/10* (2013.01); *H04R 1/083* (2013.01);
(Continued)

(58) Field of Classification Search
CPC ........ G02C 5/008; G02C 11/06; G02C 11/10; H04R 1/083; H04R 25/554;
(Continued)

(56) References Cited

U.S. PATENT DOCUMENTS 320,558 A  6/1885 Hull
669,949 A  3/1901 Underwood
(Continued)

FOREIGN PATENT DOCUMENTS

CA  2233047 C  3/1998
CA  2316473 A1  7/2000
(Continued)

OTHER PUBLICATIONS

US 11,988,897 B2, 05/2024, Howell et al. (withdrawn)
(Continued)

*Primary Examiner* — Md S Elahee

(57) ABSTRACT

In one embodiment, an eyeglass frame includes a lens holder, a first temple with a first end close to the lens holder and a second end, a second temple, an electrical connector and a printed circuit board. The printed circuit board with at least one electrical component can be in the first temple. The connector can be close to the first end of the first temple, facing downward, and electrically connected to the at least one electrical component. In an embodiment, a pair of glasses can perform hearing enhanced functions to enhance audio signals for the user to hear. One embodiment is configured to be a headset. One embodiment has audio and/or textual output capabilities for a user to communicate in different ways depending on configuration, user preferences, prior history, etc. In one embodiment, the communication between users is achieved by short audio or textual messages.

22 Claims, 72 Drawing Sheets

Related U.S. Application Data continuation of application No. 16/429,181, filed on Jun. 3, 2019, now Pat. No. 11,513,371, which is a continuation of application No. 13/831,445, filed on Mar. 14, 2013, now Pat. No. 10,310,296, which is a continuation of application No. 12/803,732, filed on Jul. 1, 2010, now Pat. No. 8,434,863, which is a continuation of application No. 11/546,685, filed on Oct. 11, 2006, now Pat. No. 7,806,525, which is a continuation-in-part of application No. 11/183,256, filed on Jul. 15, 2005, now Pat. No. 7,500,747.

(60) Provisional application No. 60/846,150, filed on Sep. 20, 2006, provisional application No. 60/787,850, filed on Apr. 1, 2006, provisional application No. 60/725,999, filed on Oct. 11, 2005, provisional application No. 60/725,896, filed on Oct. 11, 2005, provisional application No. 60/647,826, filed on Jan. 31, 2005, provisional application No. 60/647,836, filed on Jan. 31, 2005, provisional application No. 60/620,238, filed on Oct. 18, 2004, provisional application No. 60/618,107, filed on Oct. 12, 2004.

(51) Int. Cl.
  *G02C 11/00* (2006.01)
  *G02C 11/06* (2006.01)
  *H04R 1/08* (2006.01)

(52) U.S. Cl.
  CPC ....... *H04R 25/554* (2013.01); *H04R 2225/41* (2013.01); *H04R 2410/01* (2013.01); *H04R 2420/07* (2013.01)

(58) Field of Classification Search
  CPC ............ H04R 2225/41; H04R 2410/01; H04R 2420/07; H04R 1/10; H04R 25/453; H04R 5/04; H04M 1/05; H04M 1/6066; H04M 2250/02; H04M 1/6058; G06F 1/163; G06F 3/165; G10L 15/26; H04S 1/00
  USPC ....................................................... 381/327
  See application file for complete search history.

(56) References Cited

U.S. PATENT DOCUMENTS

| | | |
|---|---|---|
| 1,255,265 A | 2/1918 | Zachara |
| 1,917,745 A | 7/1933 | Weiss |
| 2,249,572 A | 7/1941 | Lieber |
| 2,638,532 A | 5/1953 | Brady |
| 2,725,462 A | 11/1955 | Vorgang |
| 2,794,085 A | 5/1957 | De Angelis |
| 2,818,511 A | 12/1957 | Ullery et al. |
| 2,830,132 A | 4/1958 | Borg |
| 2,874,230 A | 2/1959 | Carlson |
| 2,904,670 A | 9/1959 | Calmes |
| 3,060,308 A | 10/1962 | Fortuna |
| 3,104,290 A | 9/1963 | Rosemond et al. |
| 3,119,903 A | 1/1964 | Rosemond et al. |
| 3,597,054 A | 8/1971 | Winter |
| 3,710,115 A | 1/1973 | Jubb |
| 3,858,001 A | 12/1974 | Bonne |
| 3,883,701 A | 5/1975 | Delorenzo |
| 4,165,487 A | 8/1979 | Corderman |
| 4,254,451 A | 3/1981 | Cochran, Jr. |
| 4,283,127 A | 8/1981 | Rosenwinkel et al. |
| 4,322,585 A | 3/1982 | Liautaud |
| 4,348,664 A | 9/1982 | Boschetti et al. |
| 4,389,217 A | 6/1983 | Baughman et al. |
| 4,526,473 A | 7/1985 | Zahn, III |
| 4,535,244 A | 8/1985 | Burnham |
| 4,608,492 A | 8/1986 | Burnham |
| 4,683,587 A | 7/1987 | Silverman |
| 4,751,691 A | 6/1988 | Perera |
| 4,757,714 A | 7/1988 | Purdy et al. |
| 4,773,095 A | 9/1988 | Zwicker et al. |
| 4,806,011 A | 2/1989 | Bettinger |
| 4,822,160 A | 4/1989 | Tsai |
| 4,822,161 A | 4/1989 | Jimmy |
| 4,851,686 A | 7/1989 | Pearson |
| 4,852,988 A | 8/1989 | Velez et al. |
| 4,856,086 A | 8/1989 | McCullough |
| 4,859,047 A | 8/1989 | Badewitz |
| 4,882,598 A | 11/1989 | Wulf |
| 4,882,769 A | 11/1989 | Gallimore |
| 4,902,120 A | 2/1990 | Weyer |
| 4,904,078 A | 2/1990 | Gorike |
| 4,942,629 A | 7/1990 | Stadlmann |
| 4,962,469 A | 10/1990 | Ono et al. |
| 4,967,268 A | 10/1990 | Lipton et al. |
| 4,975,584 A | 12/1990 | Benjamin et al. |
| 4,985,632 A | 1/1991 | Bianco et al. |
| 5,008,548 A | 4/1991 | Gat |
| 5,015,086 A | 5/1991 | Okaue et al. |
| 5,020,150 A | 5/1991 | Shannon |
| 5,026,151 A | 6/1991 | Waltuck et al. |
| 5,036,311 A | 7/1991 | Moran et al. |
| 5,050,150 A | 9/1991 | Ikeda |
| 5,064,410 A | 11/1991 | Frenkel et al. |
| 5,093,576 A | 3/1992 | Edmond et al. |
| 5,106,179 A | 4/1992 | Kamaya et al. |
| 5,144,344 A | 9/1992 | Takahashi et al. |
| 5,148,023 A | 9/1992 | Hayashi et al. |
| 5,151,600 A | 9/1992 | Black |
| 5,161,250 A | 11/1992 | Lanna et al. |
| 5,172,256 A | 12/1992 | Sethofer et al. |
| 5,184,156 A | 2/1993 | Black et al. |
| 5,264,877 A | 11/1993 | Hussey |
| 5,306,917 A | 4/1994 | Black et al. |
| 5,353,378 A | 10/1994 | Hoffman et al. |
| 5,359,370 A | 10/1994 | Mugnier |
| 5,359,444 A | 10/1994 | Piosenka et al. |
| 5,367,345 A | 11/1994 | da Silva |
| 5,379,464 A | 1/1995 | Schleger et al. |
| 5,382,986 A | 1/1995 | Black et al. |
| 5,394,005 A | 2/1995 | Brown et al. |
| 5,452,026 A | 9/1995 | Marcy, III |
| 5,452,480 A | 9/1995 | Ryden |
| 5,455,637 A | 10/1995 | Kallman et al. |
| 5,455,638 A | 10/1995 | Kallman et al. |
| 5,455,640 A | 10/1995 | Gertsikov |
| 5,457,751 A | 10/1995 | Such |
| 5,463,428 A | 10/1995 | Lipton et al. |
| 5,475,798 A | 12/1995 | Handlos |
| 5,495,576 A | 2/1996 | Ritchey |
| 5,500,532 A | 3/1996 | Kozicki |
| D369,167 S | 4/1996 | Hanson et al. |
| 5,510,961 A | 4/1996 | Peng |
| 5,513,384 A | 4/1996 | Brennan et al. |
| 5,519,781 A | 5/1996 | Kurkurudza |
| 5,533,130 A | 7/1996 | Staton |
| 5,541,641 A | 7/1996 | Shimada |
| 5,581,090 A | 12/1996 | Goudjil |
| 5,583,795 A | 12/1996 | Smyth |
| 5,585,871 A | 12/1996 | Linden |
| 5,589,398 A | 12/1996 | Krause et al. |
| 5,590,417 A | 12/1996 | Rydbeck |
| 5,606,743 A | 2/1997 | Vogt et al. |
| 5,608,808 A | 3/1997 | da Silva |
| 5,632,002 A * | 5/1997 | Hashimoto ............. G06F 3/165 704/231 |
| 5,634,201 A | 5/1997 | Mooring |
| 5,671,035 A | 9/1997 | Barnes |
| 5,686,727 A | 11/1997 | Reenstra et al. |
| 5,694,475 A | 12/1997 | Boyden |
| 5,715,323 A | 2/1998 | Walker |
| 5,729,604 A | 3/1998 | Van Schyndel |
| 5,737,436 A | 4/1998 | Boyden et al. |
| 5,777,715 A | 7/1998 | Kruegle et al. |
| 5,790,311 A | 8/1998 | Togino |

(56) References Cited

U.S. PATENT DOCUMENTS

| | | |
|---|---|---|
| 5,818,381 A | 10/1998 | Williams |
| 5,819,183 A | 10/1998 | Voroba et al. |
| 5,835,185 A | 11/1998 | Kallman et al. |
| 5,841,507 A | 11/1998 | Barnes |
| 5,900,720 A | 5/1999 | Kallman et al. |
| 5,903,395 A | 5/1999 | Rallison et al. |
| 5,923,398 A | 7/1999 | Goldman |
| 5,941,837 A | 8/1999 | Amano et al. |
| 5,946,071 A | 8/1999 | Feldman |
| 5,949,516 A | 9/1999 | McCurdy |
| 5,966,680 A | 10/1999 | Butnaru |
| 5,966,746 A | 10/1999 | Reedy et al. |
| 5,980,037 A | 11/1999 | Conway |
| 5,988,812 A | 11/1999 | Wingate |
| 5,991,085 A | 11/1999 | Rallison et al. |
| 5,992,996 A | 11/1999 | Sawyer |
| 5,995,592 A | 11/1999 | Shirai et al. |
| 6,010,216 A * | 1/2000 | Jesiek ............... H04R 1/10 351/158 |
| 6,013,919 A | 1/2000 | Schneider et al. |
| 6,028,627 A | 2/2000 | Helmsderfer |
| 6,046,455 A | 4/2000 | Ribi et al. |
| 6,060,321 A | 5/2000 | Hovorka |
| 6,061,580 A | 5/2000 | Altschul et al. |
| 6,091,546 A | 7/2000 | Spitzer |
| 6,091,832 A | 7/2000 | Shurman et al. |
| 6,099,124 A | 8/2000 | Hidaji |
| 6,115,177 A | 9/2000 | Vossler |
| 6,132,681 A | 10/2000 | Faran et al. |
| 6,145,983 A | 11/2000 | Schiffer |
| 6,154,552 A | 11/2000 | Koroljow et al. |
| 6,163,281 A | 12/2000 | Torch |
| 6,176,576 B1 | 1/2001 | Green et al. |
| 6,181,304 B1 | 1/2001 | Robinson et al. |
| 6,225,897 B1 | 5/2001 | Doyle et al. |
| 6,231,181 B1 | 5/2001 | Swab |
| 6,236,969 B1 | 5/2001 | Ruppert et al. |
| 6,243,578 B1 | 6/2001 | Koike |
| 6,244,703 B1 | 6/2001 | Resnikoff et al. |
| 6,259,367 B1 | 7/2001 | Klein |
| 6,270,466 B1 | 8/2001 | Weinstein et al. |
| 6,292,213 B1 | 9/2001 | Jones |
| 6,292,685 B1 | 9/2001 | Pompei |
| 6,301,050 B1 | 10/2001 | DeLeon |
| 6,301,367 B1 | 10/2001 | Boyden et al. |
| 6,307,526 B1 | 10/2001 | Mann |
| 6,311,155 B1 | 10/2001 | Vaudrey et al. |
| 6,343,858 B1 | 2/2002 | Zelman |
| 6,346,929 B1 | 2/2002 | Fukushima et al. |
| 6,349,001 B1 | 2/2002 | Spitzer |
| 6,349,422 B1 | 2/2002 | Schleger et al. |
| 6,409,335 B1 | 6/2002 | Lipawsky |
| 6,409,338 B1 | 6/2002 | Jewell |
| 6,426,719 B1 | 7/2002 | Nagareda et al. |
| 6,431,705 B1 | 8/2002 | Linden |
| 6,433,760 B1 | 8/2002 | Vaissie et al. |
| 6,474,816 B2 | 11/2002 | Butler et al. |
| 6,478,736 B1 | 11/2002 | Mault |
| 6,491,391 B1 | 12/2002 | Blum et al. |
| 6,506,142 B2 | 1/2003 | Itoh et al. |
| 6,511,175 B2 | 1/2003 | Hay et al. |
| 6,513,532 B2 | 2/2003 | Mault et al. |
| 6,517,203 B1 | 2/2003 | Blum et al. |
| 6,539,336 B1 | 3/2003 | Vock et al. |
| 6,542,081 B2 | 4/2003 | Torch |
| 6,546,101 B1 | 4/2003 | Murray et al. |
| 6,554,763 B1 | 4/2003 | Amano et al. |
| 6,563,532 B1 | 5/2003 | Strub et al. |
| 6,582,075 B1 | 6/2003 | Swab et al. |
| 6,619,799 B1 | 9/2003 | Blum et al. |
| 6,629,076 B1 | 9/2003 | Haken |
| 6,678,381 B1 | 1/2004 | Manabe |
| 6,717,737 B1 | 4/2004 | Haglund |
| 6,729,726 B2 | 5/2004 | Miller et al. |
| 6,736,759 B1 | 5/2004 | Stubbs et al. |
| 6,764,194 B1 | 7/2004 | Cooper |
| 6,769,767 B2 | 8/2004 | Swab et al. |
| 6,771,294 B1 | 8/2004 | Pulli et al. |
| 6,771,423 B2 | 8/2004 | Geist |
| 6,788,309 B1 | 9/2004 | Swan et al. |
| 6,792,401 B1 | 9/2004 | Nigro et al. |
| 6,816,314 B2 | 11/2004 | Shimizu et al. |
| 6,824,265 B1 | 11/2004 | Harper |
| 6,847,336 B1 | 1/2005 | Lemelson et al. |
| 6,857,741 B2 | 2/2005 | Blum et al. |
| 6,871,951 B2 | 3/2005 | Blum et al. |
| 6,879,930 B2 | 4/2005 | Sinclair et al. |
| 6,912,386 B1 | 6/2005 | Himberg et al. |
| 6,929,365 B2 | 8/2005 | Swab et al. |
| 6,932,090 B1 | 8/2005 | Reschke et al. |
| 6,943,754 B2 | 9/2005 | Aughey et al. |
| 6,947,219 B1 | 9/2005 | Ou |
| 6,977,776 B2 | 12/2005 | Volkenandt et al. |
| 7,004,582 B2 | 2/2006 | Jannard et al. |
| 7,013,009 B2 | 3/2006 | Warren |
| 7,023,594 B2 | 4/2006 | Blum et al. |
| 7,030,902 B2 | 4/2006 | Jacobs |
| 7,031,667 B2 | 4/2006 | Horiguchi |
| 7,033,025 B2 | 4/2006 | Winterbotham |
| 7,059,717 B2 | 6/2006 | Bloch |
| 7,073,905 B2 | 7/2006 | Da Pra' |
| 7,079,876 B2 | 7/2006 | Levy |
| 7,123,215 B2 | 10/2006 | Nakada |
| 7,148,489 B2 | 12/2006 | Yagi |
| 7,150,526 B2 | 12/2006 | Jannard et al. |
| 7,181,297 B1 * | 2/2007 | Pluvinage ............. H04R 5/04 381/60 |
| 7,192,136 B2 | 3/2007 | Howell et al. |
| 7,255,437 B2 | 8/2007 | Howell et al. |
| 7,265,358 B2 | 9/2007 | Fontaine |
| 7,274,292 B2 | 9/2007 | Velhal et al. |
| 7,278,734 B2 | 10/2007 | Jannard et al. |
| 7,289,767 B2 | 10/2007 | Lai |
| 7,312,699 B2 | 12/2007 | Chornenky |
| 7,331,666 B2 | 2/2008 | Swab et al. |
| 7,347,551 B2 | 3/2008 | Fergason et al. |
| 7,376,238 B1 | 5/2008 | Rivas et al. |
| 7,380,936 B2 | 6/2008 | Howell et al. |
| 7,401,918 B2 | 7/2008 | Howell et al. |
| 7,405,801 B2 | 7/2008 | Jacobs |
| 7,429,965 B2 | 9/2008 | Weiner |
| 7,430,299 B2 | 9/2008 | Armstrong et al. |
| 7,438,409 B2 | 10/2008 | Jordan |
| 7,438,410 B1 | 10/2008 | Howell et al. |
| 7,445,332 B2 | 11/2008 | Jannard et al. |
| 7,481,531 B2 | 1/2009 | Howell et al. |
| 7,488,294 B2 | 2/2009 | Torch |
| 7,500,746 B1 | 3/2009 | Howell et al. |
| 7,500,747 B2 | 3/2009 | Howell et al. |
| 7,512,414 B2 | 3/2009 | Jannard et al. |
| 7,517,083 B2 | 4/2009 | Blum et al. |
| 7,527,374 B2 | 5/2009 | Chou |
| 7,543,934 B2 | 6/2009 | Howell et al. |
| 7,581,833 B2 | 9/2009 | Howell et al. |
| 7,621,634 B2 | 11/2009 | Howell et al. |
| 7,648,236 B1 | 1/2010 | Dobson |
| 7,651,220 B1 | 1/2010 | Pattikonda |
| 7,677,723 B2 | 3/2010 | Howell et al. |
| 7,760,898 B2 | 7/2010 | Howell et al. |
| 7,771,046 B2 | 8/2010 | Howell et al. |
| 7,787,647 B2 | 8/2010 | Hagen et al. |
| 7,792,552 B2 | 9/2010 | Thomas et al. |
| 7,801,570 B2 | 9/2010 | Cheung et al. |
| 7,806,525 B2 | 10/2010 | Howell et al. |
| 7,922,321 B2 | 4/2011 | Howell et al. |
| 7,976,159 B2 | 7/2011 | Jacobs et al. |
| 8,009,849 B2 | 8/2011 | Enzmann |
| 8,109,629 B2 | 2/2012 | Howell et al. |
| 8,142,015 B2 | 3/2012 | Paolino |
| 8,174,569 B2 | 5/2012 | Tanijiri et al. |
| 8,175,886 B2 | 5/2012 | Odinak |
| 8,251,875 B2 | 8/2012 | Ellis et al. |
| 8,337,013 B2 | 12/2012 | Howell et al. |
| 8,408,699 B2 | 4/2013 | Blum et al. |

(56) References Cited

U.S. PATENT DOCUMENTS

| | | |
|---|---|---|
| 8,430,507 B2 | 4/2013 | Howell et al. |
| 8,434,863 B2 | 5/2013 | Howell et al. |
| 8,465,151 B2 | 6/2013 | Howell et al. |
| 8,485,661 B2 | 7/2013 | Yoo et al. |
| 8,500,271 B2 | 8/2013 | Howell et al. |
| 8,571,241 B2 | 10/2013 | Larsen |
| 8,582,789 B2 | 11/2013 | Cheung et al. |
| 8,620,208 B2 | 12/2013 | Slotznick |
| 8,626,246 B2 | 1/2014 | Shostak |
| 8,770,742 B2 | 7/2014 | Howell et al. |
| 8,849,185 B2 | 9/2014 | Cheung et al. |
| 8,905,542 B2 | 12/2014 | Howell et al. |
| 8,931,896 B2 | 1/2015 | Blum et al. |
| 9,033,493 B2 | 5/2015 | Howell et al. |
| 9,183,351 B2 | 11/2015 | Shusterman |
| 9,244,292 B2 | 1/2016 | Swab et al. |
| 9,369,814 B2 | 6/2016 | Victorian et al. |
| 9,400,390 B2 | 7/2016 | Osterhout et al. |
| 9,405,135 B2 | 8/2016 | Sweis et al. |
| 9,488,520 B2 | 11/2016 | Howell et al. |
| 9,547,184 B2 | 1/2017 | Howell et al. |
| 9,690,121 B2 | 6/2017 | Howell et al. |
| 9,922,236 B2 | 3/2018 | Moore et al. |
| 10,042,186 B2 | 8/2018 | Chao et al. |
| 10,060,790 B2 | 8/2018 | Howell et al. |
| 10,061,144 B2 | 8/2018 | Howell et al. |
| 10,310,296 B2 | 6/2019 | Howell et al. |
| 10,345,625 B2 | 7/2019 | Howell et al. |
| 10,359,311 B2 | 7/2019 | Howell et al. |
| 10,515,623 B1 | 12/2019 | Grizzel |
| 10,539,459 B2 | 1/2020 | Howell et al. |
| 10,571,715 B2 | 2/2020 | Rizzo, III et al. |
| 10,624,790 B2 | 4/2020 | Chao et al. |
| 10,777,048 B2 | 9/2020 | Howell et al. |
| 10,802,582 B1 | 10/2020 | Clements |
| 10,964,190 B2 | 3/2021 | Peyrard |
| 11,042,045 B2 | 6/2021 | Chao et al. |
| 11,069,358 B1 | 7/2021 | Harper |
| 11,086,147 B2 | 8/2021 | Howell et al. |
| 11,204,512 B2 | 12/2021 | Howell et al. |
| 11,243,416 B2 | 2/2022 | Howell et al. |
| 11,326,941 B2 | 5/2022 | Howell et al. |
| 11,480,802 B1 | 10/2022 | Tombelli |
| 11,513,371 B2 | 11/2022 | Howell et al. |
| 11,536,988 B2 | 12/2022 | Howell et al. |
| 11,630,331 B2 | 4/2023 | Howell et al. |
| 11,644,361 B2 | 5/2023 | Howell et al. |
| 11,644,693 B2 | 5/2023 | Howell et al. |
| 11,721,183 B2 | 8/2023 | Howell et al. |
| 11,733,549 B2 | 8/2023 | Howell et al. |
| 11,762,224 B2 | 9/2023 | Howell et al. |
| 11,803,069 B2 | 10/2023 | Howell et al. |
| 11,829,518 B1 | 11/2023 | Howell et al. |
| 12,001,599 B2 | 6/2024 | Howell et al. |
| 12,025,855 B2 | 7/2024 | Howell et al. |
| 12,044,901 B2 | 7/2024 | Howell et al. |
| 12,078,870 B2 | 9/2024 | Howell et al. |
| 2001/0005230 A1 | 6/2001 | Ishikawa |
| 2001/0028309 A1 | 10/2001 | Torch |
| 2001/0043266 A1 | 11/2001 | Robinson et al. |
| 2001/0050754 A1 | 12/2001 | Hay et al. |
| 2002/0017997 A1 | 2/2002 | Felkowitz |
| 2002/0021407 A1 | 2/2002 | Elliott |
| 2002/0081982 A1 | 6/2002 | Schwartz et al. |
| 2002/0084990 A1 | 7/2002 | Peterson, III |
| 2002/0089469 A1 | 7/2002 | Cone et al. |
| 2002/0089639 A1 | 7/2002 | Starner et al. |
| 2002/0090103 A1 | 7/2002 | Calisto, Jr. |
| 2002/0098877 A1 | 7/2002 | Glezerman |
| 2002/0101510 A1 | 8/2002 | Basson et al. |
| 2002/0101568 A1 | 8/2002 | Eberl et al. |
| 2002/0109600 A1 | 8/2002 | Mault et al. |
| 2002/0136414 A1 | 9/2002 | Jordan et al. |
| 2002/0140899 A1 | 10/2002 | Blum et al. |
| 2002/0146097 A1 | 10/2002 | Vuori |
| 2002/0159023 A1 | 10/2002 | Swab |
| 2002/0197961 A1 | 12/2002 | Warren |
| 2003/0018274 A1 | 1/2003 | Takahashi et al. |
| 2003/0022690 A1 | 1/2003 | Beyda et al. |
| 2003/0030597 A1 | 2/2003 | Geist |
| 2003/0032449 A1 | 2/2003 | Giobbi |
| 2003/0045283 A1 | 3/2003 | Hagedoorn |
| 2003/0062046 A1 | 4/2003 | Wiesmann et al. |
| 2003/0063763 A1 | 4/2003 | Allred et al. |
| 2003/0064746 A1 | 4/2003 | Rader et al. |
| 2003/0065257 A1 | 4/2003 | Mault et al. |
| 2003/0067585 A1 | 4/2003 | Miller et al. |
| 2003/0068057 A1 | 4/2003 | Miller et al. |
| 2003/0083591 A1 | 5/2003 | Edwards et al. |
| 2003/0091200 A1 | 5/2003 | Pompei |
| 2003/0214630 A1 | 11/2003 | Winterbotham |
| 2003/0226978 A1 | 12/2003 | Ribi et al. |
| 2003/0231293 A1 | 12/2003 | Blum et al. |
| 2004/0000733 A1 | 1/2004 | Swab et al. |
| 2004/0005069 A1 | 1/2004 | Buck |
| 2004/0013280 A1* | 1/2004 | Niederdrank ........ H04R 25/453 381/314 |
| 2004/0029582 A1 | 2/2004 | Swab et al. |
| 2004/0040948 A1 | 3/2004 | Mandell et al. |
| 2004/0059212 A1 | 3/2004 | Abreu |
| 2004/0063378 A1 | 4/2004 | Nelson |
| 2004/0096078 A1 | 5/2004 | Lin |
| 2004/0100384 A1 | 5/2004 | Chen et al. |
| 2004/0101178 A1 | 5/2004 | Fedorovskaya et al. |
| 2004/0104864 A1 | 6/2004 | Nakada |
| 2004/0114770 A1 | 6/2004 | Pompei |
| 2004/0128737 A1 | 7/2004 | Gesten |
| 2004/0150986 A1 | 8/2004 | Chang |
| 2004/0156012 A1 | 8/2004 | Jannard et al. |
| 2004/0157649 A1 | 8/2004 | Jannard et al. |
| 2004/0160571 A1 | 8/2004 | Jannard |
| 2004/0160572 A1 | 8/2004 | Jannard |
| 2004/0160573 A1 | 8/2004 | Jannard et al. |
| 2004/0178970 A1 | 9/2004 | El Sayed et al. |
| 2004/0197002 A1 | 10/2004 | Atsumi et al. |
| 2004/0227219 A1 | 11/2004 | Su |
| 2005/0036103 A1 | 2/2005 | Bloch |
| 2005/0052537 A1 | 3/2005 | Mizusawa |
| 2005/0067580 A1 | 3/2005 | Fontaine |
| 2005/0078274 A1 | 4/2005 | Howell et al. |
| 2005/0088365 A1 | 4/2005 | Yamazaki et al. |
| 2005/0090295 A1 | 4/2005 | Ali et al. |
| 2005/0201585 A1 | 9/2005 | Jannard et al. |
| 2005/0213026 A1 | 9/2005 | Da Pra' |
| 2005/0230596 A1 | 10/2005 | Howell et al. |
| 2005/0238194 A1 | 10/2005 | Chornenky |
| 2005/0239502 A1 | 10/2005 | Swab et al. |
| 2005/0248717 A1 | 11/2005 | Howell et al. |
| 2005/0248718 A1 | 11/2005 | Howell et al. |
| 2005/0248719 A1 | 11/2005 | Howell et al. |
| 2005/0264752 A1 | 12/2005 | Howell et al. |
| 2005/0275714 A1 | 12/2005 | Ishikawa et al. |
| 2005/0278446 A1 | 12/2005 | Bryant |
| 2005/0281440 A1 | 12/2005 | Pemer |
| 2006/0001827 A1 | 1/2006 | Howell et al. |
| 2006/0003803 A1 | 1/2006 | Thomas et al. |
| 2006/0023158 A1 | 2/2006 | Howell et al. |
| 2006/0034478 A1 | 2/2006 | Davenport |
| 2006/0107822 A1 | 5/2006 | Bowen |
| 2006/0115130 A1 | 6/2006 | Kozlay |
| 2006/0132382 A1 | 6/2006 | Jannard |
| 2006/0155389 A1 | 7/2006 | Pessolano et al. |
| 2006/0203183 A1 | 9/2006 | Jannard et al. |
| 2006/0291667 A1 | 12/2006 | Watanabe et al. |
| 2007/0030442 A1 | 2/2007 | Howell et al. |
| 2007/0035830 A1 | 2/2007 | Matveev et al. |
| 2007/0046887 A1 | 3/2007 | Howell et al. |
| 2007/0049103 A1 | 3/2007 | Kashi et al. |
| 2007/0055888 A1 | 3/2007 | Miller et al. |
| 2007/0081123 A1 | 4/2007 | Lewis |
| 2007/0098192 A1 | 5/2007 | Sipkema |
| 2007/0109491 A1 | 5/2007 | Howell et al. |
| 2007/0182812 A1 | 8/2007 | Ritchey |
| 2007/0186330 A1 | 8/2007 | Howell et al. |

(56) References Cited

U.S. PATENT DOCUMENTS

| | | |
|---|---|---|
| 2007/0189548 A1 | 8/2007 | Croft, III |
| 2007/0200927 A1 | 8/2007 | Krenik |
| 2007/0208531 A1 | 9/2007 | Darley et al. |
| 2007/0211574 A1 | 9/2007 | Croft, III |
| 2007/0248238 A1 | 10/2007 | Abreu et al. |
| 2007/0270663 A1 | 11/2007 | Ng et al. |
| 2007/0271065 A1 | 11/2007 | Gupta et al. |
| 2007/0271116 A1 | 11/2007 | Wysocki et al. |
| 2007/0271387 A1 | 11/2007 | Lydon et al. |
| 2007/0279584 A1 | 12/2007 | Howell et al. |
| 2008/0024594 A1 | 1/2008 | Ritchey |
| 2008/0062338 A1 | 3/2008 | Herzog et al. |
| 2008/0068559 A1 | 3/2008 | Howell et al. |
| 2008/0089545 A1 | 4/2008 | Jannard et al. |
| 2008/0100792 A1 | 5/2008 | Blum et al. |
| 2008/0144854 A1 | 6/2008 | Abreu |
| 2008/0151175 A1 | 6/2008 | Gross |
| 2008/0151179 A1 | 6/2008 | Howell et al. |
| 2008/0158506 A1 | 7/2008 | Fuziak |
| 2008/0211921 A1 | 9/2008 | Sako et al. |
| 2008/0218684 A1 | 9/2008 | Howell et al. |
| 2008/0262392 A1 | 10/2008 | Ananny et al. |
| 2008/0278678 A1 | 11/2008 | Howell et al. |
| 2009/0059159 A1 | 3/2009 | Howell et al. |
| 2009/0059381 A1 | 3/2009 | Jannard |
| 2009/0073375 A1 | 3/2009 | Nakada |
| 2009/0141233 A1 | 6/2009 | Howell et al. |
| 2009/0147215 A1 | 6/2009 | Howell et al. |
| 2009/0156128 A1 | 6/2009 | Franson et al. |
| 2009/0251660 A1 | 10/2009 | Figler et al. |
| 2009/0251661 A1 | 10/2009 | Fuziak, Jr. |
| 2009/0296044 A1 | 12/2009 | Howell et al. |
| 2010/0022283 A1* | 1/2010 | Terlizzi ............... H04M 1/6058 455/570 |
| 2010/0045928 A1 | 2/2010 | Levy |
| 2010/0061579 A1 | 3/2010 | Rickards et al. |
| 2010/0079356 A1 | 4/2010 | Hoellwarth |
| 2010/0105445 A1 | 4/2010 | Brunton et al. |
| 2010/0110368 A1 | 5/2010 | Chaum |
| 2010/0245754 A1 | 9/2010 | Matsumoto et al. |
| 2010/0296045 A1 | 11/2010 | Agnoli et al. |
| 2010/0309426 A1 | 12/2010 | Howell et al. |
| 2011/0102734 A1 | 5/2011 | Howell et al. |
| 2011/0164122 A1 | 7/2011 | Hardacker |
| 2011/0187990 A1 | 8/2011 | Howell et al. |
| 2011/0241976 A1 | 10/2011 | Boger et al. |
| 2011/0273365 A1 | 11/2011 | West et al. |
| 2011/0292333 A1 | 12/2011 | Kozaki et al. |
| 2012/0033061 A1 | 2/2012 | Ko et al. |
| 2012/0050668 A1 | 3/2012 | Howell et al. |
| 2012/0062357 A1 | 3/2012 | Slamka |
| 2012/0101411 A1 | 4/2012 | Hausdorff et al. |
| 2012/0133885 A1 | 5/2012 | Howell et al. |
| 2012/0176580 A1 | 7/2012 | Sonsino |
| 2012/0283894 A1 | 11/2012 | Naboulsi |
| 2013/0072828 A1 | 3/2013 | Sweis et al. |
| 2013/0077175 A1 | 3/2013 | Hotta et al. |
| 2013/0143519 A1 | 6/2013 | Doezema |
| 2013/0172691 A1 | 7/2013 | Tran |
| 2013/0201440 A1 | 8/2013 | Howell et al. |
| 2013/0308089 A1 | 11/2013 | Howell et al. |
| 2014/0049831 A1 | 2/2014 | Takeda et al. |
| 2014/0132913 A1 | 5/2014 | Sweis et al. |
| 2014/0176902 A1 | 6/2014 | Sweis et al. |
| 2014/0198293 A1 | 7/2014 | Sweis et al. |
| 2014/0226838 A1 | 8/2014 | Wingate et al. |
| 2014/0268008 A1 | 9/2014 | Howell et al. |
| 2014/0268013 A1 | 9/2014 | Howell et al. |
| 2014/0268017 A1 | 9/2014 | Sweis et al. |
| 2014/0361185 A1 | 12/2014 | Howell et al. |
| 2015/0070251 A1* | 3/2015 | Kim ............... G06F 3/165 345/8 |
| 2015/0085245 A1 | 3/2015 | Howell et al. |
| 2015/0230988 A1 | 8/2015 | Chao et al. |
| 2015/0253590 A1 | 9/2015 | Howell et al. |
| 2015/0277123 A1 | 10/2015 | Chaum et al. |
| 2015/0338677 A1 | 11/2015 | Block |
| 2016/0098874 A1 | 4/2016 | Handville et al. |
| 2016/0246075 A9 | 8/2016 | Howell et al. |
| 2016/0302992 A1 | 10/2016 | Sweis et al. |
| 2017/0068117 A9 | 3/2017 | Howell et al. |
| 2017/0074721 A1 | 3/2017 | Howell et al. |
| 2017/0090219 A1 | 3/2017 | Howell et al. |
| 2017/0131575 A1 | 5/2017 | Howell et al. |
| 2017/0146829 A1 | 5/2017 | Howell et al. |
| 2017/0289323 A1 | 10/2017 | Gelvin et al. |
| 2017/0303187 A1 | 10/2017 | Crouthamel et al. |
| 2018/0122208 A1 | 5/2018 | Peyrard |
| 2018/0314079 A1 | 11/2018 | Chao et al. |
| 2018/0335650 A1 | 11/2018 | Howell et al. |
| 2018/0348050 A1 | 12/2018 | Howell et al. |
| 2019/0004325 A1 | 1/2019 | Connor |
| 2019/0033622 A1 | 1/2019 | Olgun et al. |
| 2019/0033623 A1 | 1/2019 | Howell et al. |
| 2019/0117121 A1 | 4/2019 | Kutina et al. |
| 2019/0187492 A1 | 6/2019 | Howell et al. |
| 2019/0272800 A1 | 9/2019 | Tao et al. |
| 2019/0278110 A1 | 9/2019 | Howell et al. |
| 2019/0285913 A1 | 9/2019 | Howell et al. |
| 2019/0310132 A1 | 10/2019 | Howell et al. |
| 2019/0318589 A1 | 10/2019 | Howell et al. |
| 2019/0369402 A1 | 12/2019 | Woodman et al. |
| 2019/0378493 A1 | 12/2019 | Kim et al. |
| 2019/0387351 A1 | 12/2019 | Lyren et al. |
| 2020/0012127 A1 | 1/2020 | Howell et al. |
| 2020/0174558 A1 | 6/2020 | Gui et al. |
| 2020/0218094 A1 | 7/2020 | Howell et al. |
| 2020/0363835 A1 | 11/2020 | Blum et al. |
| 2020/0364992 A1 | 11/2020 | Howell et al. |
| 2021/0000347 A1 | 1/2021 | Stump |
| 2021/0026146 A1 | 1/2021 | Harder et al. |
| 2021/0271116 A1 | 9/2021 | Chao et al. |
| 2021/0364827 A9 | 11/2021 | Howell et al. |
| 2021/0364828 A1 | 11/2021 | Howell et al. |
| 2021/0373595 A1 | 12/2021 | Castaneda et al. |
| 2021/0379425 A1 | 12/2021 | Tran |
| 2021/0399691 A1 | 12/2021 | Saminathan et al. |
| 2022/0008763 A1 | 1/2022 | Saleh et al. |
| 2022/0011603 A1 | 1/2022 | Howell et al. |
| 2022/0034542 A1 | 2/2022 | Peters et al. |
| 2022/0054092 A1 | 2/2022 | Howell et al. |
| 2022/0178743 A1 | 6/2022 | Howell et al. |
| 2022/0260859 A1 | 8/2022 | Howell et al. |
| 2022/0335792 A1 | 10/2022 | Howell et al. |
| 2022/0357599 A1 | 11/2022 | Howell et al. |
| 2022/0415338 A1 | 12/2022 | Cheung et al. |
| 2023/0017635 A1 | 1/2023 | Howell et al. |
| 2023/0033660 A1 | 2/2023 | Howell et al. |
| 2023/0057654 A1 | 2/2023 | Howell et al. |
| 2023/0236444 A1 | 7/2023 | Howell et al. |
| 2023/0273464 A1 | 8/2023 | Howell et al. |
| 2023/0359266 A1 | 11/2023 | Howell et al. |
| 2023/0393422 A1 | 12/2023 | Moubedi et al. |
| 2023/0408850 A1 | 12/2023 | Howell et al. |
| 2024/0036361 A1 | 2/2024 | Howell et al. |
| 2024/0094800 A1 | 3/2024 | Howell et al. |
| 2024/0298921 A1 | 9/2024 | Howell et al. |

FOREIGN PATENT DOCUMENTS

| | | | |
|---|---|---|---|
| CA | 2362895 A1 | 12/2002 | |
| CA | 2 487 391 | 12/2003 | |
| CA | 2388766 A1 | 12/2003 | |
| CA | 2435873 C | 3/2004 | |
| CN | 88203065 | 11/1988 | |
| CN | 89214222.7 | 3/1990 | |
| CN | 90208199.3 | 11/1990 | |
| CN | 2145478 Y | 11/1993 | |
| CN | 1234895 A * | 11/1999 | ........... G10K 11/178 |
| CN | 2365848 Y | 2/2000 | |
| DE | 20009219 U1 | 12/2000 | |
| DE | 10123226 A1 | 11/2002 | |
| EP | 0 403 701 A1 | 12/1990 | |
| EP | 0441791 B1 | 8/1991 | |

(56) References Cited

FOREIGN PATENT DOCUMENTS

| | | |
|---|---|---|
| EP | 1134491 A2 | 9/2001 |
| EP | 1027626 B1 | 3/2016 |
| EP | 2290433 B1 | 4/2016 |
| FR | 2530039 A1 | 1/1984 |
| GB | 1467982 | 3/1977 |
| GB | 2343263 A | 5/2000 |
| GB | 2405049 | 2/2005 |
| GB | 2411009 A | 8/2005 |
| JP | 58-113912 | 7/1983 |
| JP | 58-113914 | 7/1983 |
| JP | 63-153218 | 10/1988 |
| JP | H02-159272 A | 6/1990 |
| JP | 02-181722 | 7/1990 |
| JP | H02-102521 U | 8/1990 |
| JP | 09-017204 | 1/1997 |
| JP | 10-161072 | 6/1998 |
| JP | 2000-039595 | 2/2000 |
| JP | 2000197173 A | 7/2000 |
| JP | 3077384 U | 5/2001 |
| JP | 2002-02511706 A | 4/2002 |
| JP | 2002 341059 A | 11/2002 |
| JP | 2005-151292 | 6/2005 |
| JP | 2005-167902 | 6/2005 |
| JP | 2006-209144 A | 8/2006 |
| JP | 6275987 | 2/2024 |
| KR | 200221392 YA | 4/2001 |
| KR | 2002-0044416 A | 6/2002 |
| TW | 484711 | 6/2001 |
| WO | WO 86/05891 | 10/1986 |
| WO | WO 97/12205 A1 | 4/1997 |
| WO | WO 99/50706 A1 | 10/1999 |
| WO | WO 01/06298 A1 | 1/2001 |
| WO | WO 01/24576 A1 | 4/2001 |
| WO | WO 01/84095 A1 | 11/2001 |
| WO | WO 02/06881 A2 | 1/2002 |
| WO | WO 03/062906 A1 | 7/2003 |
| WO | WO 03/069394 A1 | 8/2003 |
| WO | WO 03/100368 A1 | 12/2003 |
| WO | WO 03/100503 A2 | 12/2003 |
| WO | WO 04/001373 A2 | 12/2003 |
| WO | WO 04/012477 A2 | 2/2004 |
| WO | WO 04/025554 A1 | 3/2004 |
| WO | WO 05/036110 A1 | 4/2005 |
| WO | WO 02/086599 A1 | 10/2020 |

OTHER PUBLICATIONS

U.S. Appl. No. 60/460,154, filed Apr. 3, 2003, to Jannard.
Respondent's Disclosure of Invalidity Contentions with Exhibits A1-A13, Exhibits B1-B5, and Exhibits C1-C6, International Trade Commission Investigation No. 337-TA-1383, filed Feb. 29, 2024, pp. 1-1516.
Hollerer, T. and Feiner, S., "Mobile augmented reality." *Telegeoinformatics: Location-based computing and services* 21 (2004), pp. 1-39.
Mann, Steve and S. Mann. *Intelligent image processing*. IEEE, 2002, 121 pgs. [Part 1 of 3].
Mann, Steve and S. Mann. *Intelligent image processing*. IEEE, 2002, 130 pgs. [Part 2 of 3].
Mann, Steve and S. Mann. *Intelligent image processing*. IEEE, 2002, 110 pgs. [Part 3 of 3].
Milgram, Paul, and Fumio Kishino. "A taxonomy of mixed reality visual displays." *IEICE Transactions on Information and Systems* 77.12 (1994), pp. 1-15.
Devaul et al. MIThril Project Overview. https://www.media.mit.edu/wearables/mithril/overview.html, downloaded Mar. 2, 2022, pp. 1-5.
Rolland, Jannick P., and Hong Hua. "Head-mounted display systems." *Encyclopedia of optical engineering* 2 (2005), pp. 1-14.
Rolland, Jannick P., et al. "High-resolution inset head-mounted display." *Applied optics* 37.19 (1998), pp. 1-11.
Yoshida, Akitoshi, Jannick P. Rolland, and John H. Reif. "Design and Applications of a High Resolution Insert Head Mounted Display." (1994), pp. 1-13.

Notice of Allowance for U.S. Appl. No. 17/949,029, dated Oct. 30, 2023.
Office Action for U.S. Appl. No. 17/949,029, dated Feb. 29, 2024.
Office Action for U.S. Appl. No. 17/873,104, dated Nov. 4, 2022.
Office Action for U.S. Appl. No. 18/144,557, dated Aug. 23, 2023.
Office Action for U.S. Appl. No. 18/144,557, dated Nov. 24, 2023.
Notice of Allowance for U.S. Appl. No. 18/144,557, dated Jan. 11, 2024.
Notice of Allowance for U.S. Appl. No. 18/238,467, dated Nov. 21, 2023.
Notice of Allowance for U.S. Appl. No. 18/238,467, dated Apr. 1, 2024.
Notice of Allowance for U.S. Appl. No. 16/182,969, dated Oct. 25, 2023.
Election of Species Requirement for U.S. Appl. No. 18/375,893, dated Nov. 14, 2023.
Office Action for U.S. Appl. No. 18/375,893, dated Dec. 14, 2023.
Notice of Allowance for U.S. Appl. No. 18/224,793, dated Oct. 2, 2023.
Office Action for U.S. Appl. No. 18/519,802, dated Jan. 25, 2024.
Notice of Allowance for U.S. Appl. No. 18/519,802, dated Mar. 4, 2024.
Notice of Allowance for U.S. Appl. No. 18/519,802, dated Apr. 8, 2024.
Notice of Allowance for U.S. Appl. No. 17/484,080, dated Jun. 18, 2024.
Office Action for U.S. Appl. No. 18/594,662, dated May 21, 2024.
Office Action for U.S. Appl. No. 18/594,662, dated Jul. 3, 2024.
Notice of Allowance for U.S. Appl. No. 16/182,969, dated Jul. 1, 2024.
Office Action for U.S. Appl. No. 18/597,874, dated Jun. 4, 2024.
Notice of Allowance for U.S. Appl. No. 11/183,269, dated Dec. 10, 2010.
Office Action for U.S. Appl. No. 11/183,269, dated May 25, 2010.
Final Office Action for U.S. Appl. No. 11/183,269, dated Feb. 17, 2010.
Office Action for U.S. Appl. No. 11/183,269, dated Jun. 23, 2009.
Office Action for U.S. Appl. No. 11/183,269, dated Dec. 4, 2008.
Final Office Action for U.S. Appl. No. 11/183,269, dated Jun. 5, 2008.
Office Action for U.S. Appl. No. 11/183,269, dated Oct. 18, 2007.
Restriction Requirement for U.S. Appl. No. 11/183,269, dated Jun. 25, 2007.
Office Action for U.S. Appl. No. 13/085,402, dated Apr. 19, 2012.
Notice of Allowance for U.S. Appl. No. 13/085,402, dated Aug. 2, 2012.
Notice of Allowance for U.S. Appl. No. 13/085,402, dated Nov. 13, 2012.
Notice of Allowance for U.S. Appl. No. 13/085,402, dated Feb. 20, 2013.
Notice of Allowance for U.S. Appl. No. 13/085,402, dated Jun. 14, 2013.
Office Action for U.S. Appl. No. 13/955,336, dated Dec. 5, 2013.
Notice of Allowance for U.S. Appl. No. 13/955,336, dated Apr. 28, 2014.
Notice of Allowance for U.S. Appl. No. 13/955,336, dated Aug. 18, 2014.
Notice of Allowance for U.S. Appl. No. 13/955,336, dated Oct. 7, 2014.
Notice of Allowance for U.S. Appl. No. 13/955,336, dated Nov. 3, 2014.
Office Action for U.S. Appl. No. 14/557,409, dated Jun. 11, 2015.
Notice of Allowance for U.S. Appl. No. 14/557,409, dated Jan. 14, 2016.
Notice of Allowance for U.S. Appl. No. 14/557,409, dated Apr. 28, 2016.
Notice of Allowance for U.S. Appl. No. 14/557,409, dated Aug. 8, 2016.
Notice of Allowance for U.S. Appl. No. 14/557,409, dated Nov. 4, 2016.
Corrected Notice of Allowance for U.S. Appl. No. 14/557,409, dated Dec. 12, 2016.
Office Action for U.S. Appl. No. 15/375,423, dated Mar. 27, 2017.

(56) References Cited

OTHER PUBLICATIONS

Notice of Allowance for U.S. Appl. No. 15/375,423, dated Jul. 5, 2017.
Notice of Allowance for U.S. Appl. No. 15/375,423, dated Oct. 31, 2017.
Notice of Allowance for U.S. Appl. No. 15/375,423, dated Mar. 23, 2018.
Notice of Allowance for U.S. Appl. No. 15/375,423, dated Jul. 13, 2018.
Office Action for U.S. Appl. No. 16/049,120, dated Feb. 28, 2020.
Notice of Allowance for U.S. Appl. No. 16/049,120, dated Jun. 3, 2020.
Notice of Allowance for U.S. Appl. No. 16/049,120, dated Sep. 21, 2020.
Notice of Allowance for U.S. Appl. No. 16/049,120, dated Feb. 23, 2021.
Notice of Allowance for U.S. Appl. No. 16/049,120, dated Jun. 3, 2021.
Notice of Allowance for U.S. Appl. No. 16/049,120, dated Sep. 20, 2021.
Notice of Allowance for U.S. Appl. No. 16/574,254, dated Apr. 16, 2021.
Notice of Allowance for U.S. Appl. No. 16/574,254, dated Aug. 9, 2021.
Office Action for U.S. Appl. No. 16/821,810, dated Feb. 2, 2022.
Notice of Allowance for U.S. Appl. No. 16/821,810, dated Apr. 6, 2022.
Notice of Allowance for U.S. Appl. No. 16/821,810, dated Oct. 19, 2022.
Office Action for U.S. Appl. No. 17/484,080, dated Jan. 21, 2022.
Notice of Allowance for U.S. Appl. No. 17/484,080, dated May 31, 2022.
Notice of Allowance for U.S. Appl. No. 17/484,080, dated Sep. 13, 2022.
Notice of Allowance for U.S. Appl. No. 17/484,080, dated Jan. 31, 2023.
Notice of Allowance for U.S. Appl. No. 17/484,080, dated Jun. 1, 2023.
Office Action for U.S. Appl. No. 17/949,029, dated Nov. 23, 2022.
Notice of Allowance for U.S. Appl. No. 17/949,029, dated Mar. 1, 2023.
Notice of Allowance for U.S. Appl. No. 17/949,029, dated Jul. 3, 2023.
Office Action for U.S. Appl. No. 17/873,104, dated Oct. 6, 2022.
Notice of Allowance for U.S. Appl. No. 17/873,104, dated Dec. 16, 2022.
Notice of Allowance for U.S. Appl. No. 17/873,104, dated Mar. 22, 2023.
Restriction Requirement for U.S. Appl. No. 11/580,222, dated Jun. 18, 2008.
Office Action for U.S. Appl. No. 11/580,222, dated Sep. 12, 2008.
Office Action for U.S. Appl. No. 11/580,222, dated Jan. 28, 2009.
Notice of Allowance for U.S. Appl. No. 11/580,222, dated Apr. 20, 2009.
U.S. Appl. No. 12/462,286, filed Jul. 31, 2009.
Restriction Requirement for U.S. Appl. No. 12/462,286, dated Sep. 17, 2010.
Office Action for U.S. Appl. No. 12/462,286, dated Jan. 13, 2011.
Notice of Allowance for U.S. Appl. No. 12/462,286, dated Jun. 24, 2011.
Notice of Allowance for U.S. Appl. No. 12/462,286, dated Nov. 22, 2011.
Office Action for U.S. Appl. No. 13/367,346, dated May 15, 2013.
Notice of Allowance for U.S. Appl. No. 13/367,346, dated Oct. 10, 2013.
Office Action for U.S. Appl. No. 13/367,346, dated Jan. 28, 2014.
Notice of Allowance for U.S. Appl. No. 13/367,346, dated Aug. 15, 2014.
Notice of Allowance for U.S. Appl. No. 13/367,346, dated Mar. 19, 2015.
Office Action for U.S. Appl. No. 14/715,501, dated Sep. 23, 2015.
Office Action for U.S. Appl. No. 14/715,501, dated Mar. 25, 2016.
Office Action for U.S. Appl. No. 14/715,501, dated Oct. 17, 2016.
Office Action for U.S. Appl. No. 14/715,501, dated Jul. 20, 2017.
Office Action for U.S. Appl. No. 14/715,501, dated Jan. 8, 2018.
Notice of Allowance for U.S. Appl. No. 14/715,501, dated May 9, 2018.
Notice of Allowance for U.S. Appl. No. 14/715,501, dated Sep. 11, 2018.
Office Action for U.S. Appl. No. 16/127,957, dated Jun. 4, 2020.
Office Action for U.S. Appl. No. 16/127,957, dated Sep. 30, 2020.
Notice of Allowance for U.S. Appl. No. 16/127,957, dated Dec. 21, 2020.
Notice of Allowance for U.S. Appl. No. 17/395,509, dated May 6, 2022.
Notice of Allowance for U.S. Appl. No. 17/395,509, dated Sep. 9, 2022.
Notice of Allowance for U.S. Appl. No. 17/395,509, dated Dec. 19, 2022.
Notice of Allowance for U.S. Appl. No. 17/395,509, dated Apr. 26, 2023.
Notice of Allowance for U.S. Appl. No. 17/737,866, dated Sep. 16, 2022.
Notice of Allowance for U.S. Appl. No. 17/737,866, dated Jan. 17, 2023.
Notice of Allowance for U.S. Appl. No. 17/737,866, dated May 15, 2023.
Notice of Allowance for U.S. Appl. No. 16/182,969, dated Jan. 28, 2022.
Office Action for U.S. Appl. No. 16/182,969, dated Jun. 24, 2020.
Notice of Allowance for U.S. Appl. No. 16/182,969, dated Oct. 14, 2020.
Notice of Allowance for U.S. Appl. No. 16/182,969, dated Sep. 1, 2021.
Office Action for U.S. Appl. No. 16/182,969, dated Jan. 24, 2023.
Notice of Allowance for U.S. Appl. No. 16/182,969, dated Jun. 30, 2023.
U.S. Appl. No. 12/806,312, filed Aug. 10, 2010.
Office Action for U.S. Appl. No. 12/806,312, dated Apr. 20, 2012.
Office Action for U.S. Appl. No. 12/806,312, dated Sep. 25, 2012.
Notice of Allowance for U.S. Appl. No. 12/806,312, dated Dec. 14, 2012.
Notice of Allowance for U.S. Appl. No. 12/806,312, dated Mar. 29, 2013.
U.S. Appl. No. 13/831,512, filed Mar. 14, 2013.
Office Action for U.S. Appl. No. 13/831,512, dated Jun. 4, 2013.
Office Action for U.S. Appl. No. 13/831,512, dated Feb. 24, 2014.
Office Action for U.S. Appl. No. 13/831,512, dated Jul. 2, 2014.
Office Action for U.S. Appl. No. 13/831,512, dated Jan. 21, 2015.
Office Action for U.S. Appl. No. 13/831,512, dated May 29, 2015.
Office Action for U.S. Appl. No. 13/831,512, dated Feb. 24, 2016.
Notice of Allowance for U.S. Appl. No. 13/831,512, dated Aug. 1, 2016.
Notice of Allowance for U.S. Appl. No. 13/831,512, dated Oct. 25, 2016.
Notice of Allowance for U.S. Appl. No. 13/831,512, dated Jan. 30, 2017.
Notice of Allowance for U.S. Appl. No. 13/831,512, dated Feb. 21, 2017.
Office Action for U.S. Appl. No. 15/396,428, dated Feb. 16, 2018.
Office Action for U.S. Appl. No. 15/396,428, dated Jun. 21, 2018.
Office Action for U.S. Appl. No. 15/409,723, dated Apr. 23, 2018.
Office Action for U.S. Appl. No. 15/409,723, dated Oct. 31, 2018.
Notice of Allowance for U.S. Appl. No. 11/183,256, dated Jan. 13, 2009.
Office Action for U.S. Appl. No. 11/183,256, dated Sep. 12, 2008.
Notice of Allowance for U.S. Appl. No. 11/183,256, dated Jul. 8, 2008.
Office Action for U.S. Appl. No. 11/183,256, dated Jan. 25, 2008.
Restriction Requirement for U.S. Appl. No. 11/183,256, dated Oct. 17, 2007.

(56) References Cited

OTHER PUBLICATIONS

Restriction Requirement for U.S. Appl. No. 11/183,256, dated Jun. 28, 2007.
Notice of Allowance for U.S. Appl. No. 11/546,685, dated Feb. 17, 2010.
Notice of Allowance for U.S. Appl. No. 11/546,685, dated Sep. 18, 2009.
Office Action for U.S. Appl. No. 11/546,685, dated Mar. 5, 2009.
Restriction Requirement for U.S. Appl. No. 11/546,685, dated Jan. 27, 2009.
U.S. Appl. No. 12/803,732, filed Jul. 1, 2010.
Notice of Allowance for U.S. Appl. No. 12/803,732, dated Sep. 1, 2011.
Notice of Allowance for U.S. Appl. No. 12/803,732, dated Nov. 15, 2011.
Notice of Allowance for U.S. Appl. No. 12/803,732, dated Jan. 30, 2012.
Notice of Allowance for U.S. Appl. No. 12/803,732, dated Apr. 17, 2012.
Notice of Allowance for U.S. Appl. No. 12/803,732, dated Jul. 5, 2012.
Notice of Allowance for U.S. Appl. No. 12/803,732, dated Oct. 19, 2012.
Notice of Allowance for U.S. Appl. No. 12/803,732, dated Feb. 13, 2013.
Office Action for U.S. Appl. No. 13/291,020, dated Jun. 4, 2012.
Office Action for U.S. Appl. No. 13/291,020, dated Apr. 23, 2012.
Notice of Allowance for U.S. Appl. No. 13/291,020, dated Aug. 2, 2012.
Notice of Allowance for U.S. Appl. No. 13/291,020, dated Nov. 2, 2012.
Notice of Allowance for U.S. Appl. No. 13/291,020, dated Feb. 11, 2013.
U.S. Appl. No. 13/831,419, filed Mar. 14, 2013.
Office Action for U.S. Appl. No. 13/831,419, dated Apr. 27, 2015.
Office Action for U.S. Appl. No. 13/831,419, dated Aug. 12, 2015.
Notice of Allowance for U.S. Appl. No. 13/831,419, dated Jan. 28, 2016.
Office Action for U.S. Appl. No. 13/831,419, dated Apr. 28, 2016.
Office Action for U.S. Appl. No. 13/831,419, dated Nov. 17, 2016.
Office Action for U.S. Appl. No. 13/831,419, dated Feb. 1, 2017.
Notice of Allowance for U.S. Appl. No. 13/831,419, dated Jun. 6, 2017.
Office Action for U.S. Appl. No. 13/831,419, dated Oct. 20, 2017.
Office Action for U.S. Appl. No. 13/831,419, dated Jun. 8, 2018.
U.S. Appl. No. 13/831,445, filed Mar. 14, 2013.
Office Action for U.S. Appl. No. 13/831,445, dated Feb. 20, 2015.
Notice of Allowance for U.S. Appl. No. 13/831,445, dated Oct. 21, 2016.
Notice of Allowance for U.S. Appl. No. 13/831,445, dated Jan. 9, 2017.
Corrected Notice of Allowance for U.S. Appl. No. 13/831,445, dated Jan. 23, 2017.
Notice of Allowance for U.S. Appl. No. 13/831,445, dated Apr. 25, 2017.
Office Action for U.S. Appl. No. 13/831,445, dated Feb. 6, 2018.
Notice of Allowance for U.S. Appl. No. 13/831,445, dated Aug. 8, 2018.
Office Action for U.S. Appl. No. 16/429,181, dated Sep. 30, 2020.
Notice of Allowance for U.S. Appl. No. 16/429,181, dated Feb. 1, 2021.
Notice of Allowance for U.S. Appl. No. 16/429,181, dated Jun. 17, 2021.
Notice of Allowance for U.S. Appl. No. 16/429,181, dated Aug. 19, 2021.
Notice of Allowance for U.S. Appl. No. 16/429,181, dated Oct. 4, 2021.
Office Action for U.S. Appl. No. 16/429,181, dated Feb. 9, 2022.
Notice of Allowance for U.S. Appl. No. 16/429,181, dated Aug. 10, 2022.
Office Action for U.S. Appl. No. 16/424,018, dated Jun. 10, 2020.
Notice of Allowance for U.S. Appl. No. 16/424,018, dated Oct. 20, 2020.
Notice of Allowance for U.S. Appl. No. 16/424,018, dated Mar. 8, 2021.
Office Action for U.S. Appl. No. 16/424,018, dated May 13, 2021.
Office Action for U.S. Appl. No. 16/424,018, dated Sep. 3, 2021.
Notice of Allowance for U.S. Appl. No. 16/424,018, dated Nov. 2, 2021.
Office Action for U.S. Appl. No. 16/424,018, dated Jan. 24, 2022.
Notice of Allowance for U.S. Appl. No. 16/424,018, dated Jun. 10, 2022.
Office Action for U.S. Appl. No. 16/424,018, dated Sep. 6, 2022.
Office Action for U.S. Appl. No. 16/424,018, dated Nov. 25, 2022.
Notice of Allowance for U.S. Appl. No. 16/424,018, dated Feb. 21, 2023.
Notice of Allowance for U.S. Appl. No. 17/942,347, dated Apr. 19, 2023.
Notice of Allowance for U.S. Appl. No. 17/942,347, dated Jul. 3, 2023.
Notice of Allowance for U.S. Appl. No. 17/942,347, dated Aug. 14, 2023.
Notice of Allowance for U.S. Appl. No. 17/964,853, dated Mar. 8, 2023.
Office Action for U.S. Appl. No. 17/964,853, dated Sep. 15, 2023.
Office Action for U.S. Appl. No. 18/129,660, dated May 19, 2023.
Office Action for U.S. Appl. No. 18/129,660, dated Jul. 7, 2023.
Notice of Allowance for U.S. Appl. No. 18/129,660, dated Aug. 24, 2023.
Office Action for U.S. Appl. No. 18/224,793, dated Sep. 7, 2023.
"±1.5g Dual Axis Micromachined Accelerometer", Freescale Semiconductor, Inc., Motorola Semiconductor Technical Data, MMA6260Q, Jun. 2004, pp. 1-7.
"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Exclusive Media Event Marks Debut of Oakley Thump: World's First Digital Audio Eyewear", Oakley Investor Relations, Press Release, Nov. 15, 2004, pp. 1-2.
"Eyetop", Product-Features, eyetop eyewear, eyetop belt worn, http://www.eyetop.net/products/eyetop/features.asp., downloaded Nov. 6, 2003, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses-Cutting Edge RAZRWire Line Offers Consumers On-The-Go Connections", Motorola Mediacenter—Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.

(56) References Cited

OTHER PUBLICATIONS

"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Gripples?", Gripping Eyewear, Inc., http://www.grippingeyewear.com/whatare.html, downloaded Nov. 2, 2005.
"With Racing Heart", Skaloud et al., GPS World, Oct. 1, 2001, http://www.gpsworld.com/gpsworld/content/printContentPopup.jsp?id=1805, pp. 1-5.
Abrisa Product Information: Cold Mirrors, Abrisa, Jun. 2001, p. 1.
Abrisa Product Information: Commercial Hot Mirror, Abrisa, Jun. 2001, p. 1.
Alps Spectacle, Air Conduction Glass, Bone Conduction Glass, http://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Bone Conduction Headgear HG16 Series, "Voiceducer," http://www.temco-j.co.jp/html/English/HG16.html, downloaded Dec. 10, 2003, pp. 1-3.
Carnoy, David, "The Ultimate MP3 Player for Athletes? Could be.", CNET Reviews, May 14, 2004, pp. 1-4.
Clifford, Michelle A., "Accelerometers Jump into the Consumer Goods Market", Sensors Online, http://www.sensorsmag.com, Aug. 2004.
Comfees.com, Adjustable Sports Band Style No. 1243, http://shop.store.yahoo.com/comfees/adsportbansty.html, downloaded Apr. 18, 2003, pp. 1-2.
Cool Last Minute Gift Ideas!, UltimateFatBurner Reviews and Articles, http://www.ultimatefatburner.com/gift-ideas.html, downloaded May 10, 2005, pp. 1-3.
Dickie et al. "Eye Contact Sensing Glasses for Attention-Sensitive Wearable Video Blogging," Human Media Lab, Queen's University, Kingston, ON K7L 3N6, Canada, est. Apr. 2004, pp. 1-2.
Dixen, Brian, "ear-catching", Supertesten, Mobil, Apr. 2003 (estimated), pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, PhysiCal, http://www.gophysical.com/, downloaded Jan. 27, 2004, 5 pages.
Monitoring Athletes Performance—2002 Winter Olympic News from KSL, Jan. 23, 2002, http://2002.ksl.com/news-3885i, pp. 1-3.
Niwa, "UV Index Information", http://www.niwa.cri.nz/services/uvozone/uvi-info, downloaded Jul. 15, 2004, pp. 1-2.
NuVision 60GX Steroscopic Wireless Glasses, Product Information, NuVision by MacNaughton, c. 1997, MacNaughton, Inc., pp. 1-2.
Pärkkä, Juha, et al., "A Wireless Wellness Monitor for Personal Weight Management", VTT Information Technology, Tampere, Finland, Nov. 2000, p. 1.
Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.

PNY Technologies, "Executive Attaché" http://www.pny.com/products/flash/execattache.asp downloaded Nov. 16, 2005.
Polar WM41 and 42 weight management monitor, http://www.simplysports/polar/weight_management/wm41-42.htm, downloaded Jan. 28, 2004, pp. 1-3.
Questions Answers, Pedometer.com, http://www.pedometer.com, downloaded May 5, 2005.
RazrWire, copyright Motorola, Inc., Jul. 2005, 1 page.
SafeSun Personal UV Meter, Scientific Data, Optix Tech Inc., http://www.safesun.com/scientific.html, downloaded May 1, 2004, pp. 1-3.
SafeSun Sensor, User's Manual, Optix Tech Inc., Jun. 1998, 2 pages.
SafeSun, Personal UV Meter, "Technical Specifications", Optix Tech Inc., http://www.safesun.com/technical.html, downloaded Jul. 12, 2004, pp. 1-2.
SafeSun, Personal UV Meter, Experiments, Optix Tech Inc., http://www.safesun.com/experiments.html, downloaded Feb. 5, 2004, pp. 1-2.
Shades of Fun, Blinking Light Glasses, http://www.shadesoffun.com/Nov/Novpgs-14.html, downloaded Jul. 9, 2005, pp. 1-4.
SportLine Fitness Pedometer-Model 360, UltimateFatBurner Superstore, http://www.ultimatefatburner-store.com/ac_004.html, downloaded May 10, 2005, pp. 1-2.
Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.
Stevens, Kathy, "Should I Use a Pedometer When I Walk?", Healtheon/WebMD, Apr. 14, 2000.
Sundgot, Jørgen "2nd-gen Motorola Bluetooth headset", InfoSync World, Mar. 1, 2003, http://www.infosync.no/news/2002/n/2841.html, pp. 1-2.
SunSensors, Segan Industries, Inc., http://www.segan-ind.com/sunsensor.htm, downloaded Feb. 5, 2004, pp. 1-3.
SunUV™, Personal UV Monitor User's Guide, APA Optics, Inc., 2003 pp. 1-52.
SunUV™, Personal UV Monitor, APA Optics, Inc., http://www.apaoptics.com/sunuv/models.html, downloaded Dec. 20, 2003.
Talking Pedometer, Sportline, Inc., Jun. 2001 (Possibly earlier), 1 page.
The unofficial ELSA 3D Revelator page, Dec. 30, 1999, pp. 1-15.
Top Silicon PIN Photodiode, PD93-21C, Technical Data Sheet, Everlight Electronics Co., Ltd., 2004, pp. 1-9.
UV Light Meter, UVA and UVB measurement, UV-340, Instruction Manual, Lutron, Jun. 2003 (estimated), pp. 1-5.
UV-Smart, UVA/B Monitor, Model EC-960-PW, Instruction Manual, Tanita Corporation of America, Inc., downloaded Nov. 16, 2001.
Vitaminder Personal Carb Counter, http://www.auravita.com/products/AURA/ORBU11420.asp. Downloaded Nov. 15, 2005, pp. 1-4.
Yamada et al. "Development of an eye-movement analyser possessing functions for wireless transmission and autocalibration," Med. Biol. Eng. Comput., No. 28, v.4, Jul. 28, 1990, http://link.springer.com/article/10.1007%2FBF02446149?LI=true, pp. 1-2.
Mann, S., & Fung, J. "Videoorbits on EyeTap devices for deliberately diminished reality or altering the visual perception of rigid planar patches of a real world scene." *Eye*, 3, (2001) https://citeseerx.ist.psu.edu/document?repid=rep1&type=pdf&doi=2decfe3529700d625ead6b066acf2eb501bf93cc, pp. 1-8.
Nortel 922, Mobile Phone Museum, https://www.mobilephonemuseum.com/phone-detail/922, downloaded Aug. 19, 2024, 2 pgs.
Advisory Action for U.S. Appl. No. 18/594,662, dated Jul. 31, 2024.
Notice of Allowance for U.S. Appl. No. 18/238,467, dated Aug. 7, 2024.
Notice of Allowance for U.S. Appl. No. 18/597,874, dated Sep. 11, 2024.
Office Action for U.S. Appl. No. 18/680,434, dated Aug. 14, 2024.
Spitzer, Paul M. Zavracky, Tom Holzel, Noa M. Rensing, Angela Hyatt Hockmann, P. D. Aquillo, Robert W. McClelland, J. Zardeskas, "Eyewear-based displays for personal electronics." Proc. SPIE 4021, Helmet- and Head-Mounted Displays V, (Jun. 23, 2000), pp. 27-32; http://doi.org/10.1117/12.389166.

(56) References Cited

OTHER PUBLICATIONS

Falaheem, M., Latham, K., Geelhoed, E. (2000). Saftey and Comfort of Eyeglass in: Thomas, P., Gellersen, HW. (eds) Handheld and Ubiquitous Computingm HUC 2000, pp. 236-247. Lecture Notes in Computer Science, vol. 1927. Spinger, Berlin, Heidelberg. https://doi.org/10.1007-540-39959-3_18.

Tse, Mimi My, Jacobus KF Ng, Joanne WY Chung, and Thomas KS Wong. "The effect of visual stimlation via the eyeglass display and the perception of pain." *CyberPsychology & Behavior 5*, No. 1 (2002): 65-75. https://doi.org/10.1089/109493102753685890.

\* cited by examiner

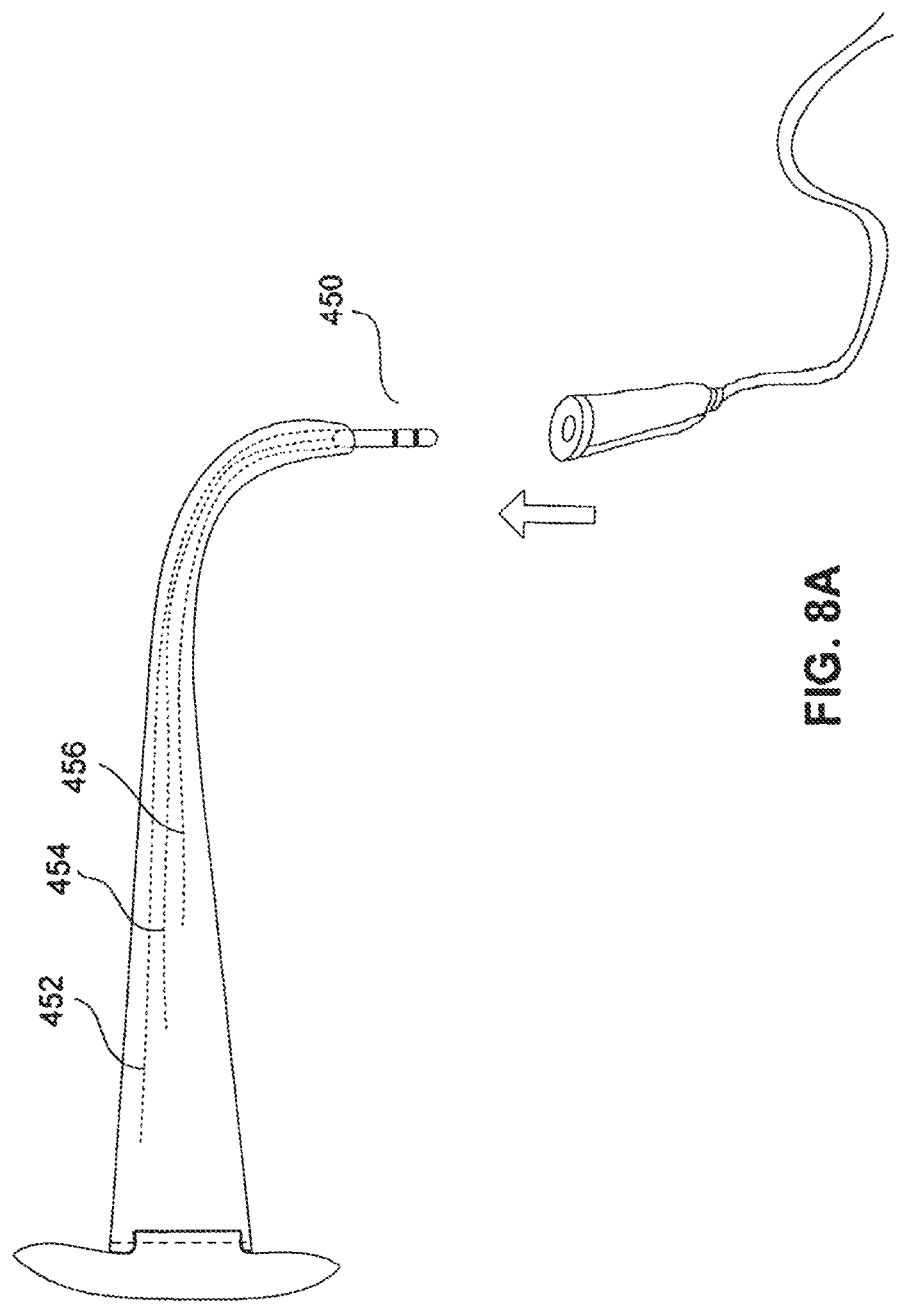

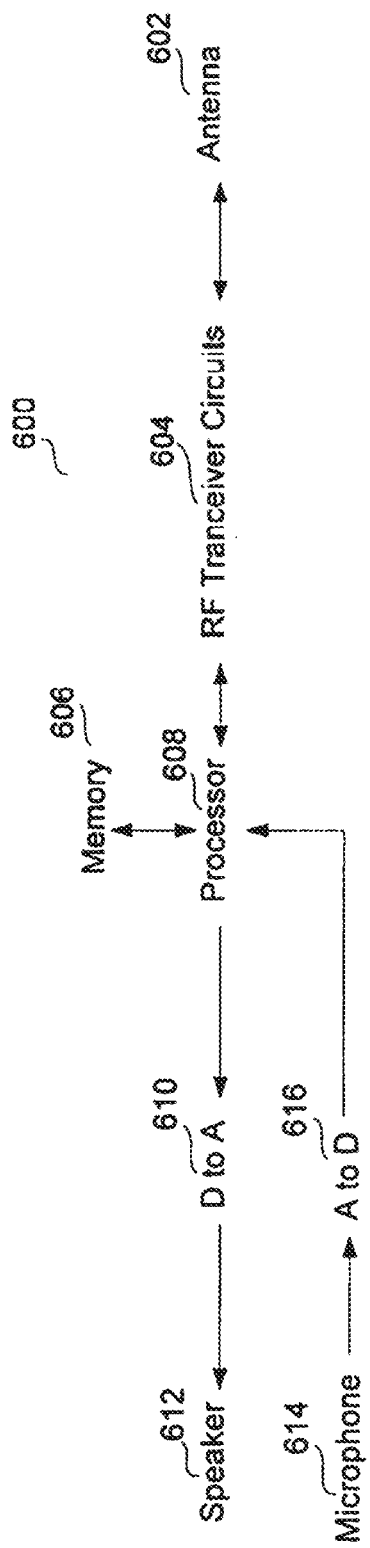
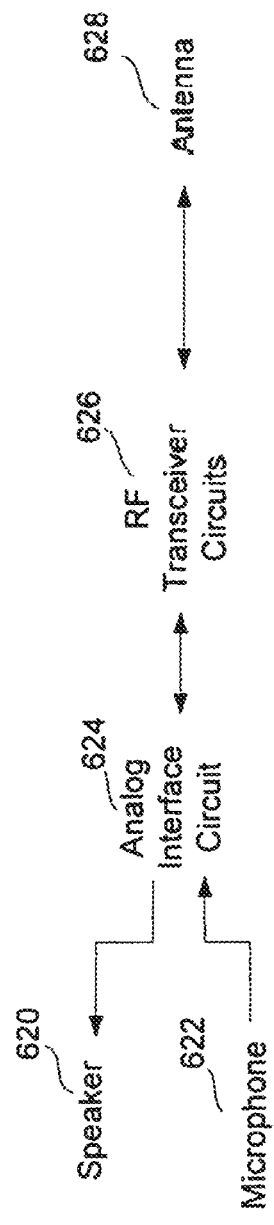
FIG. 11A
FIG. 11B

WIRELESS HEADSET SUPPORTING MESSAGES AND HEARING ENHANCEMENT

CROSS-REFERENCE TO RELATED APPLICATIONS

This application is a continuation of U.S. patent application Ser. No. 17/942,347, filed Sep. 12, 2022, now U.S. Pat. No. 11,852,901, and entitled "WIRELESS HEADSET SUPPORTING MESSAGES AND HEARING ENHANCEMENT," which is hereby incorporated herein by reference, which in turn is a continuation of U.S. patent application Ser. No. 16/429,181, filed Jun. 3, 2019, now U.S. Pat. No. 11,513,371, and entitled "EYEWEAR WITH PRINTED CIRCUIT BOARD SUPPORTING MESSAGES," which is hereby incorporated herein by reference, which in turn is a continuation of U.S. patent application Ser. No. 13/831,445, filed Mar. 14, 2013, now U.S. Pat. No. 10,310,296, and entitled "EYEWEAR WITH PRINTED CIRCUIT BOARD," which is hereby incorporated herein by reference, and which in turn is a continuation of U.S. patent application Ser. No. 12/803,732, filed Jul. 1, 2010, now U.S. Pat. No. 8,434,863, and entitled "EYEGLASSES WITH A PRINTED CIRCUIT BOARD," which is hereby incorporated herein by reference, which in turn is a continuation of U.S. patent application Ser. No. 11/546,685, filed Oct. 11, 2006, now U.S. Pat. No. 7,806,525, and entitled "EYEGLASSES HAVING A CAMERA" which is hereby incorporated herein by reference, which in turn is a continuation-in-part of U.S. patent application Ser. No. 11/183,256, filed Jul. 15, 2005, now U.S. Pat. No. 7,500,747, and entitled "EYEGLASSES WITH ELECTRICAL COMPONENTS," which is hereby incorporated herein by reference.

This application is related to U.S. patent application Ser. No. 10/964,011, filed Oct. 12, 2004, now U.S. Pat. No. 7,192,136, and entitled "TETHERED ELECTRICAL COMPONENTS FOR EYEGLASSES," which is hereby incorporated herein by reference; which in turn is related to each of: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference; (v) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (vi) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference.

U.S. patent application Ser. No. 11/183,256 also claims priority to each of: (i) U.S. Provisional Patent Application No. 60/618,107, filed Oct. 12, 2004, and entitled "TETHERED ELECTRICAL COMPONENTS FOR EYEGLASSES," which is hereby incorporated herein by reference; (ii) U.S. Provisional Patent Application No. 60/620,238, filed Oct. 18, 2004, entitled "EYEGLASSES WITH HEARING ENHANCED AND OTHER AUDIO SIGNAL-GENERATING CAPABILITIES," and which is hereby incorporated herein by reference; (iii) U.S. Provisional Patent Application No. 60/647,836, filed Jan. 31, 2005, and entitled "EYEGLASSES WITH HEART RATE MONITOR," which is hereby incorporated herein by reference; and (iv) U.S. Provisional Patent Application No. 60/647,826, filed Jan. 31, 2005, and entitled "EYEWEAR WITH ELECTRICAL COMPONENTS," which is hereby incorporated herein by reference.

U.S. patent application Ser. No. 11/546,685 also claims priority to each of: (i) U.S. Provisional Patent Application No. 60/725,896, filed Oct. 11, 2005, and entitled "EYEGLASSES WITH ELECTRICAL COMPONENTS," which is hereby incorporated herein by reference; (ii) U.S. Provisional Patent Application No. 60/725,999, filed Oct. 11, 2005, and entitled "EYEWEAR SUPPORTING AFTER-MARKET ELECTRICAL COMPONENTS," which is hereby incorporated herein by reference; (iii) U.S. Provisional Patent Application No. 60/787,850, filed Apr. 1, 2006, and entitled "EYEGLASSES WITH A HEART RATE MONITOR," which is hereby incorporated herein by reference; and (iv) U.S. Provisional Patent Application No. 60/846,150, filed Sep. 20, 2006, and entitled "EYEGLASSES WITH ACTIVITY MONITORING," which is hereby incorporated herein by reference.

In addition, this application is related to each of: (i) U.S. patent application Ser. No. 10/822,218, filed Apr. 12, 2004, and entitled "EYEGLASSES FOR WIRELESS COMMUNICATIONS," which is hereby incorporated herein by reference; (ii) U.S. patent application Ser. No. 10/964,011, filed Oct. 12, 2004 now U.S. Pat. No. 7,192,136, and entitled "TETHERED ELECTRICAL COMPONENTS FOR EYEGLASSES," which is hereby incorporated herein by reference; (iii) U.S. patent application Ser. No. 11/006,343, filed Dec. 7, 2004 now U.S. Pat. No. 7,116,976, and entitled "ADAPTABLE COMMUNICATION TECHNIQUES FOR ELECTRONIC DEVICES," which is hereby incorporated herein by reference; (iv) U.S. patent application Ser. No. 11/078,855, filed Mar. 11, 2005 now U.S. Pat. No. 7,500,746, and entitled "EYEWEAR WITH RADIATION DETECTION SYSTEM," which is hereby incorporated herein by reference; (v) U.S. patent application Ser. No. 11/078,857, filed Mar. 11, 2005, and entitled "RADIATION MONITORING SYSTEM," which is hereby incorporated herein by reference; (vi) U.S. patent application Ser. No. 11/183,269, filed Jul. 15, 2005 now U.S. Pat. No. 7,380,936, and entitled "EYEWEAR SUPPORTING AFTER-MARKET ELECTRICAL COMPONENTS," which is hereby incorporated herein by reference; (vii) U.S. patent application Ser. No. 11/183,283, filed Jul. 15, 2005, and entitled "EVENT EYEGLASSES," which is hereby incorporated herein by reference; (viii) U.S. patent application Ser. No. 11/183,262, filed Jul. 15, 2005, and entitled "EYEGLASSES WITH HEARING ENHANCED AND OTHER AUDIO SIGNAL-GENERATING CAPABILITIES," which is hereby incorporated herein by reference; (ix) U.S. patent application Ser. No. 11/183,263, filed Jul. 15, 2005 now U.S. Pat. No. 7,380,936, and entitled "EYEGLASSES WITH A CLOCK OR OTHER ELECTRICAL COMPONENT," which is hereby incorporated herein by reference; (x) U.S. patent application Ser. No. 11/183,276, filed Jul. 15, 2005 now U.S. Pat. No. 7,255,437, and entitled "EYEGLASSES WITH ACTIVITY MONITORING," which is hereby incorporated herein by reference; and (xi) U.S. Pat. No. 11,580, 222, filed Oct. 11, 2006 now U.S. Pat. No. 7,581,833, and entitled "EYEGLASSES SUPPORTING AFTER MARKET ELECTRICAL COMPONENTS", which is hereby incorporated herein by reference.

BACKGROUND OF THE INVENTION

Many of us have experienced the inconvenience of trying to listen to a piece of music from a portable device in an outdoor environment, particularly in cold weather. First, we remove the device from inside our jacket. Then, we take off our gloves to find the right song, connect the device to a headset, and put on the headset. After we have finished listening, we go through the process again to put the device back into our jacket. To a certain degree, we are somewhat used to such procedures. However, to look at this objectively, going through the multi-step process just to listen to a piece of music is cumbersome. Such inconvenient procedures are not limited to hearing music. For example, it may not be much easier for us to use the cell phones or cameras and the like.

It should be apparent from the foregoing that there is still a need to increase the ease of handling electronic devices.

Also, typically, to participate in wireless communications, a user holds a mobile phone (e.g., wireless or a cellular phone) against his ear to hear an audio communication received in a wireless manner. The user usually also speaks towards a microphone embedded in the mobile phone to participate in the audio communication, again in a wireless manner. More recently, to facilitate hands-free operation of mobile phones, head-sets have been produced and utilized. Typically, a headset clips over or into an ear of the user to provide a speaker and a microphone in proximity to the ear and the mouth, respectively, of the user. Traditionally, the head-set was connected to the mobile phone by a cord (i.e., wire). In recent times, head-sets have been developed to operate in a wireless manner, without the need of a cord connected to the mobile phone. For example, one popular type of wireless head-set uses Bluetooth wireless transmissions to communicate between the head-set and the corresponding mobile phone.

Mobile phones often support both voice calls and text messaging. When the user does not make use of a head-set, the user often holds the mobile phone against their ear when participating in a voice call. One problem this presents is that the user is not able to see the screen of the mobile phone. As a result, the user has difficultly interacting with the keypad or screen of the mobile phone when the mobile phone is held against the user's head. Alternatively, when the user of a mobile phone makes use of a head-set, the user can receive and participate in voice calls in a hands-free manner. Unfortunately, however, the user would need to view a screen of the mobile phone to participate in text messaging.

Accordingly, there is a need for improved wireless communication techniques for users of mobile communication devices.

SUMMARY OF THE INVENTION

In one embodiment, an eyeglass frame includes a lens holder, a first temple with a first end close to the lens holder and a second end further away, a second temple, an electrical connector and a printed circuit board. The printed circuit board with at least one electrical component attached thereon can be provided in the first temple. The connector can be provided close to the first end of the first temple, facing downward, and configured to be electrically connected to the at least one electrical component.

In another embodiment, an eyeglass frame includes a first printed circuit board with at least one electrical component. The first printed circuit board can be connected to an electrical component at the frame via a second printed circuit board.

Different embodiments of glasses can be applied to multiple functions. With a user wearing such a pair of glasses, it would be more difficult for a third party to know the specific function or reason the user is wearing the glasses for. Regarding the locations of the electrical components for the multiple functions, different embodiments range from all of the components in the glasses to the glasses primarily functioning as a headset.

In one embodiment, a pair of glasses can be provided with hearing enhancement and other signal generating capabilities. Most people today do not desire to wear hearing aids or hearing enhancement devices. One major reason could be that they do not want to be perceived as being old. In this embodiment, a pair of glasses, with speakers, has hearing enhancement capabilities. With the speakers in the glasses, the speakers can be positioned in close proximity to the ears of the users. In addition to having hearing enhancement capabilities, the glasses also include at least one electrical component to generate other audio signals. For example, the glasses can play music. Such a hearing-enhanced device can remove the associated stigma of conventional hearing aids. A third party may not be able to tell whether the user is wearing the glasses to hear music or whether the user is wearing the glasses to have his hearing enhanced.

In one embodiment, a pair of glasses can include at least one speaker and typically two. Each speaker is in one of the temples of the glasses, closer to the corresponding hinge of that temple than the other end (the free end) of the temple. There can also be a tube extending from the speaker to guide sound generated by the speaker to the corresponding ear of the user. The tube can be rotated, such as from behind the temple to being downward at an angle towards the ear of the user. The two speakers can also be electrically connected by a conductor, with the conductor linking the speakers through the lens holders of the glasses. The glasses can include a microphone, which can be located close to one of the hinges of the glasses. In another embodiment, there can be two microphones. The one or more microphones can be directional for receiving signals in specific directions.

In another embodiment, to reduce the weight of the glasses and to enhance the ease of aesthetic design of the glasses, some of the hearing enhanced electronics are not in the glasses. Instead they are in a portable device carried by the user. The portable device is electronically coupled to the glasses wirelessly or through a wired connection.

In another embodiment, the glasses can include a wireless transceiver. In this embodiment, the microphone does not have to be at the glasses. The microphone can also be wirelessly coupled to the glasses and/or the portable device.

In another embodiment, the glasses can include a connector for at least one wire to be connected to the glasses. The connector can be at the free end of one of the temples of the glasses, or the connector can be at another location at the glasses. Different types of standard or non-standard connectors can be used.

In the wired embodiment, the microphone also does not have to be at the glasses. The microphone can be mounted on the wire that connects the glasses to the portable device.

The glasses can have a number of hearing enhancing capabilities. In one embodiment, the hearing enhancement is for those with mild or medium hearing loss. In another embodiment, the hearing enhancement is for those with severe hearing loss.

One hearing enhancement functionality is frequency-dependent amplification. For example, higher frequencies are amplified more than lower frequencies; certain frequency bands are not amplified; or the frequencies to be amplified are tailored to the user.

To tailor the amplification to a user, hearing enhancement capabilities can be calibrated against the user. The calibration can be done by the user or by a third party. The calibration can be performed through a website, which guides the user through the process. The calibrated frequency hearing profile of the user can be stored. Such calibration can be performed periodically, such as once a year.

The glasses may also include at least one electrical component for power management. Hearing enhancement does not have to be fully functional at all times. In one embodiment, the hearing enhancement function is on demand. The enhancement can go into a sleep mode when there is no audio fluctuation beyond a certain threshold in the ambient environment. The amplification can also depend on the ambient noise level.

In other embodiments, the glasses can also have at least one electrical component to generate other audio signals. These other audio signals do not originate from signals captured by the microphone(s) in the glasses. These signals can originate from relatively private sources or public sources.

In one example of signals originating from private sources, the glasses can include the electrical components to operate as a phone. The glasses can pick up signals from a caller, and the speaker(s) in the glasses re-generate the audio signals of the caller. Again some of the electrical components of the phone can be in a portable device wired or wirelessly coupled to the glasses. There can be an indicator indicating an incoming call. The indicator could be a signal light.

Regarding processing an incoming call, in one embodiment, if the user wants to pick up the incoming call, the hearing enhancement mode can be deactivated. In another embodiment, one or more functionalities of the hearing enhancement mode can operate on the incoming call. There can also be noise cancellation functionalities, such as through two directional microphones, one pointing at the user's mouth, and the other pointing away.

In another example of signals originating from private sources, the glasses can include the electrical components to operate as a player. Again some of the electrical components of the player can be in a portable device wired or wirelessly coupled to the glasses. The player can be a MP3 or other multimedia asset player. The player can be a radio. The radio can be personalized to the user, for example, by being aware of the songs the user prefers. In one embodiment, when the user starts the player, the hearing enhancement mode can be deactivated. In another embodiment, different capabilities of the hearing enhancement mode operate on the signals from the player.

In yet another embodiment, the other audio signals are from public sources. For example, the glasses can be coupled to a conference microphone or a theater speaker wirelessly, and thus be capable of capturing and enhancing the signals from those sources. Again, the coupling can be through a portable device wired or wirelessly coupled to the glasses.

There can be one or more control knobs or switches at the glasses or at a portable device coupled to the glasses. Different types of switches are applicable for different applications.

Regarding power sources for the electrical components in the glasses, in one embodiment, the power sources, such as batteries, are in the glasses. In another embodiment, the power sources are located outside the glasses, but connected to the glasses through an adapter. In yet another embodiment, the power sources are in a portable device electrically connected to the glasses, and the power sources can be rechargeable.

A number of embodiments have been described with glasses having hearing enhanced and/or other audio signal generation capabilities. In one embodiment, the glasses function as a headset and are adaptable for different applications, such as hearing enhancement, communication (e.g. phone operation) and listening to audio signals (e.g. MP3 operation). When a person is using the headset, a third party again may not be able to tell whether the person is having his hearing enhanced, or listening to other audio signals generated.

Additional benefits of having glasses as headsets are that eyeglasses frames tend to be very compact and lightweight and thus have little space for electrical components. With at least a portion of the electrical components for a system, such as a hearing enhancement system, outside the glasses, additional weights required for the system on the glasses are reduced. Further, eyeglass frames are often fashionable items whose designs are important. By reducing the amount of electrical components, and in turn, space required in the glasses, design tradeoffs required due to having electrical components in the eyeglass frames are reduced.

In a first example of glasses functioning as a headset, the glasses can include a connector and two speakers, one at each temple, both speakers electrically connected through the glasses. The connector can be located at the free end of one of the temples. The connector can be used to receive stereo signals, such as from an MP3 player. Based on a headset-to-phone cord, the speakers in the headset can also be used to receive a phone call.

In a second example of the glasses functioning as a headset, the glasses can include two connectors. Each connector can be at one of the temple tips of the glasses, and each connector can be connected to the speaker at that temple. To send audio signals to the speakers, the two connectors can be tethered and connected together through a connector external to the glasses. The external connector can then operate as the connector in the first example. Regarding other embodiments, the speakers can be in the temples, such as closer to their corresponding lens holders than the free end of the temples. In another example, the speakers can be in the region of the temple tips. The speakers can be embedded in the glasses or can be external to the glasses on stubs or extensions. For speakers that are embedded in the glasses, each speaker can have a tube extending towards an ear to guide audio signals. At the end of each tube, there can be an ear bud for inserting into the ear. The tubes can be permanently attached to the glasses, or each can be attachable to the glasses. The tubes or the stubs can also be retractable and extendable, and the position of the tubes or the stubs can be adjustable.

One embodiment provides improved approaches for users of electronic devices to communicate with one another. The electronic devices have audio and/or textual output capabilities. The improved approaches can enable users to communicate in different ways depending on device configuration, user preferences, prior history, etc. In one embodiment, the communication between users is achieved by short audio or textual messages.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIGS. 8A-8E shows different embodiments of standard connectors located at different positions on the temple of a pair of glasses according to the invention.

FIGS. 11A-11B show different embodiments of the present invention illustrating some of the electrical components for wireless connections to a pair of glasses.

Figure 1:
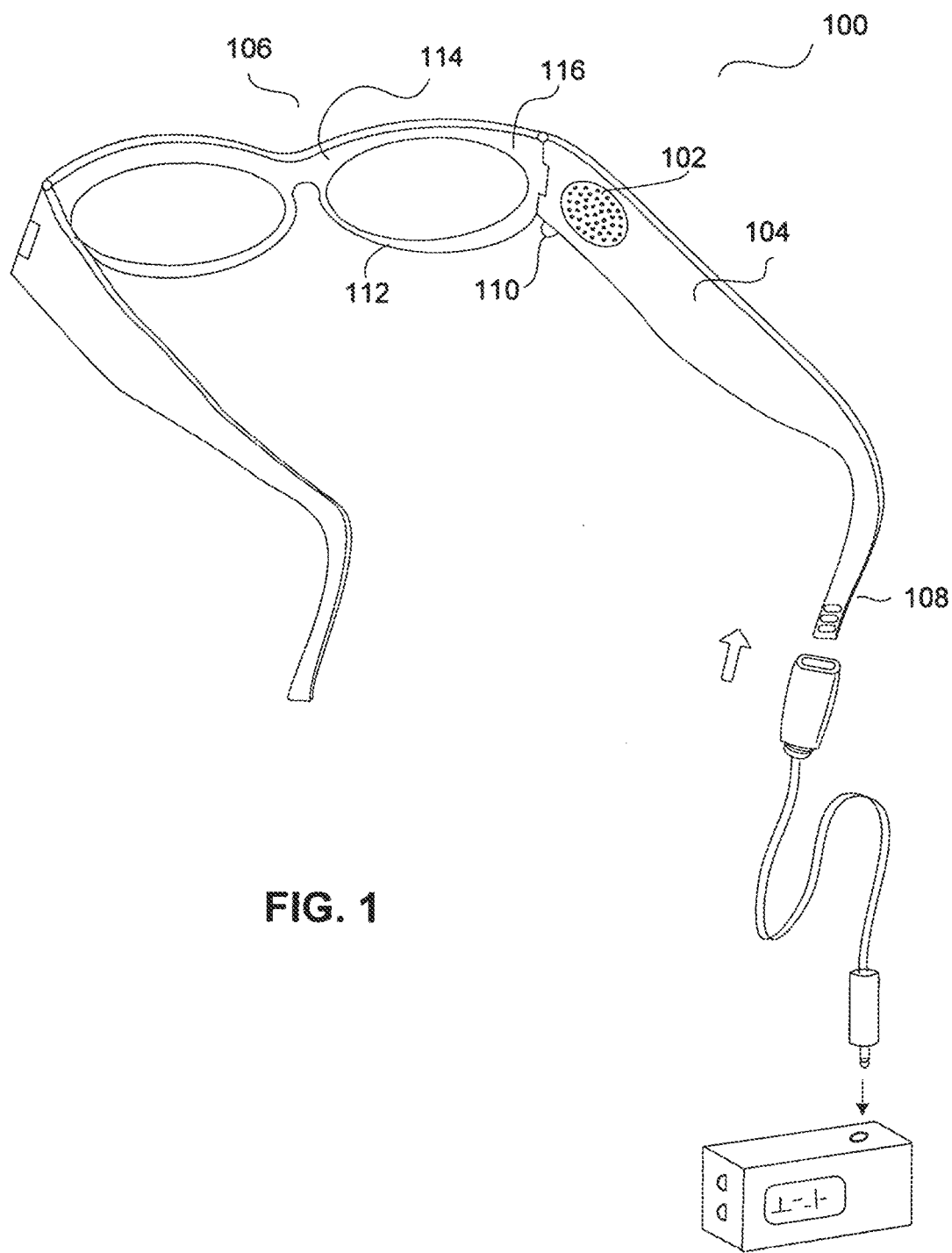
FIG. 1 shows one embodiment of the invention with a speaker in one of the temples of the glasses.
Figure 61:
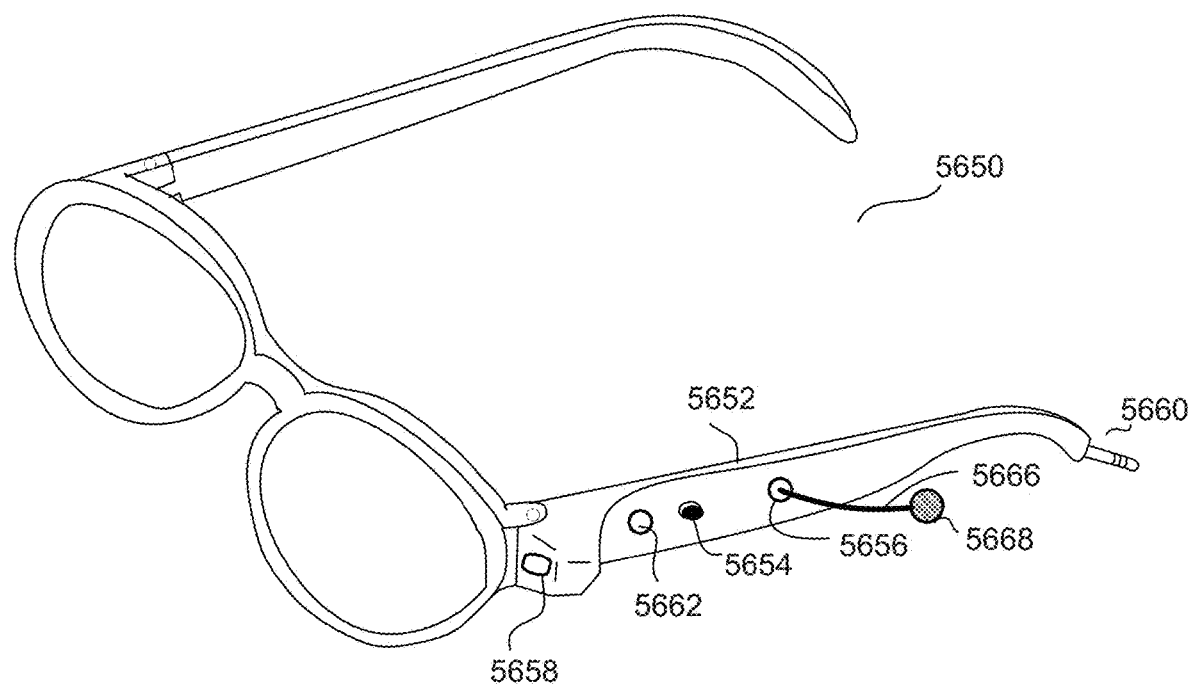
FIG. 61 shows an embodiment of the invention with a pair of eyeglasses functioning as a headset that has a camera, a microphone and a speaker.

Same numerals in FIGS. 1-61 are assigned to similar elements in all the figures. Embodiments of the invention are discussed below with reference to FIGS. 1-61. However, those skilled in the art will readily appreciate that the detailed description given herein with respect to these figures is for explanatory purposes as the invention extends beyond these limited embodiments.

DETAILED DESCRIPTION OF THE INVENTION

A number of embodiments according to the present invention regarding glasses with one or more electrical components attached, partially embedded or fully embedded are described. Many of them are applicable to different types of glasses, such as sunglasses, auxiliary frames, fit-over glasses, prescription glasses, safety glasses, swim masks, and goggles, such as ski goggles. In a number of embodiments, the frames of the glasses have more surface area than frames with minimal structure. For example, the temple regions of the glasses can have a tapered profile. They are wider or broader when they are closer to the lens holders. Then they get narrower. In one embodiment, a wider or broader temple implies that the temple spans across a wider or broader area longitudinally down from the top of the head of the user. FIG. 1 shows an example of such an embodiment.

FIG. 1 shows one embodiment 100 of the invention where there is a speaker 102 at least partially embedded in one of the temples 104 of the glasses 106. The speaker 102 is closer to one end of the temple 104 than the other end. The end of the temple that the speaker 102 is closer to is the end that is in the vicinity of the lens holder or the hinge of the glasses 106, instead of the end 108 that is free. The speaker can be partially embedded in the glasses. For example, the mouth of the speaker, where sometimes there can be small holes on a cover, can be exposed.

In the embodiment shown in FIG. 1, the speaker 102 outputs audio signals in the direction towards the user. In another embodiment, the speaker 102 outputs audio signals in the direction away from the user. For example, the mouth of the speaker 102 can be facing outwards away from the user.

There are different approaches to embed an electrical component into a pair of glasses. For example, the glasses can be made of plastic (e.g., plastic frames). One way to produce such frames is to first assemble electrical components onto a circuit board. The circuit board can be shaped to fit, for example, the temple of the glasses. The circuit board is placed into a mold. Then, hot, molten plastic is injected around the circuit board to form the temple piece of the glasses. To reduce weight, the wall of the glasses can be made relatively thin through injection molding techniques.

In another embodiment, the glasses have metallic frames. For example, the frames can be made of Titanium, which is a relatively light metal. Also, Titanium is relatively non-conductive and strong, and is quite immune to corrosion. Further, Titanium can be anodized or heat colored.

For glasses with metallic frames, to prevent circuits from being shorted or to reduce leakage current, one embodiment provides an insulating layer between the electrical components or circuit board and the metallic frames. One example of an insulting layer is a tape to encapsulate the electrical components. The tape is non-conducting so as to provide insulation and, to a certain degree, can also provide mechanical stiffness. One way to make such temples is to have two sheets of the metal die-stamped to form the two halves, or the two faces of the temple piece. A circuit board is made to fit into the space between the faces. Then, two die-cut pieces of insulator material (e.g., dielectric tape) can cover the top and the bottom surfaces of the circuit board. The board is then sandwiched between the faces to form the temple. In one example, the dielectric tape can be double-sided sticky tape, with one side sticking to the circuit board, and the other side sticking to the temple. An adhesive can be used to glue the two faces of the temple piece together.

In yet another embodiment, the frames are made of hard rubber. The frames can be manufactured in an approach similar to injection molding techniques, with circuit boards inserted into the mold along with the rubber at the time of molding.

Different types of speakers can be used, such as, standard, fixed-magnet/moving coil speakers; speakers with fixed-coil and a steel diaphragm; piezoelectric speakers; and electrostatic speakers.

Figure 2:
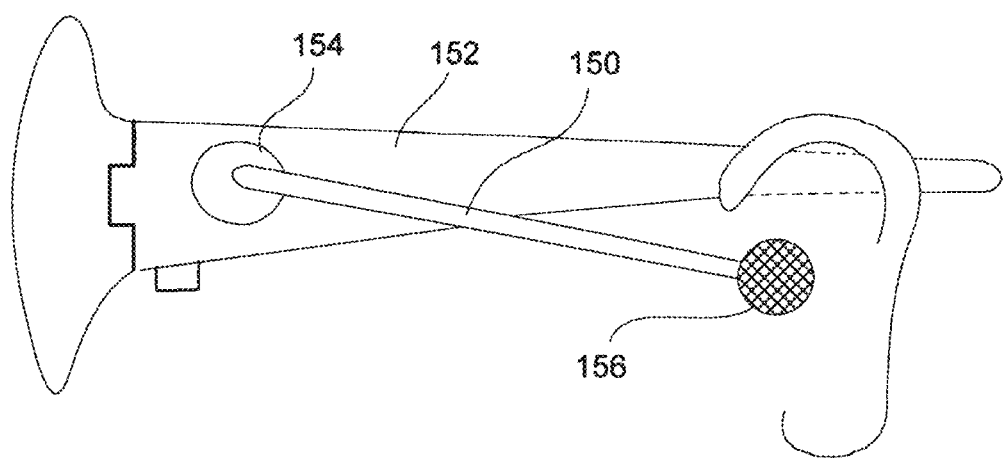
FIG. 2 shows a tube extending from a speaker at a temple of the glasses to guide sound to one of the ears of the user according to one embodiment of the invention.

In one embodiment, the glasses further include a tube, such as a plastic tube, extending from a speaker. The tube serves to guide sound generated by the speaker to one of the ears of the user. FIG. 2 shows an embodiment where a tube 150 is located on the outside of a temple 152. In another embodiment, the tube can be on the inside of a temple.

In one embodiment, the tube 150 can be rotated, such as from behind the temple 152 (if the tube is on the inside of the temple) to being downward at an angle towards one of the ears of the user, such as the position shown in FIG. 2. To increase flexibility, the tube can be attached to a rotating disk 154, which allows rotation about the speaker.

In another embodiment, the tube is malleable. This allows the tube to be placed in different positions.

Figure 3:
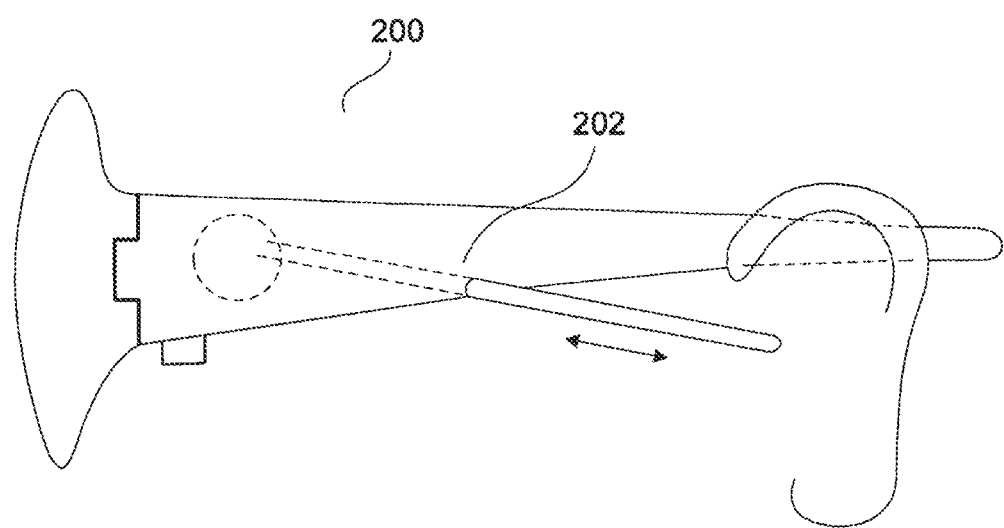
FIG. 3 shows a retractable tube extending from a speaker at a temple of the glasses according to one embodiment of the invention.

In one embodiment, the length of the tube is adjustable. FIG. 3 shows such an embodiment 200 of a pair of glasses with a retractable tube 202. In the figure, the tube is shown to be in its extended position.

To further enhance sound coupling, in one approach, there is a plug 156 at the end of the tube for inserting into an ear of the user. The plug can be an ear bud. The plug can provide a cushion, foam rubber or other materials. Such materials give comfort and/or enhance sound coupling to the ear canal.

Figure 4:
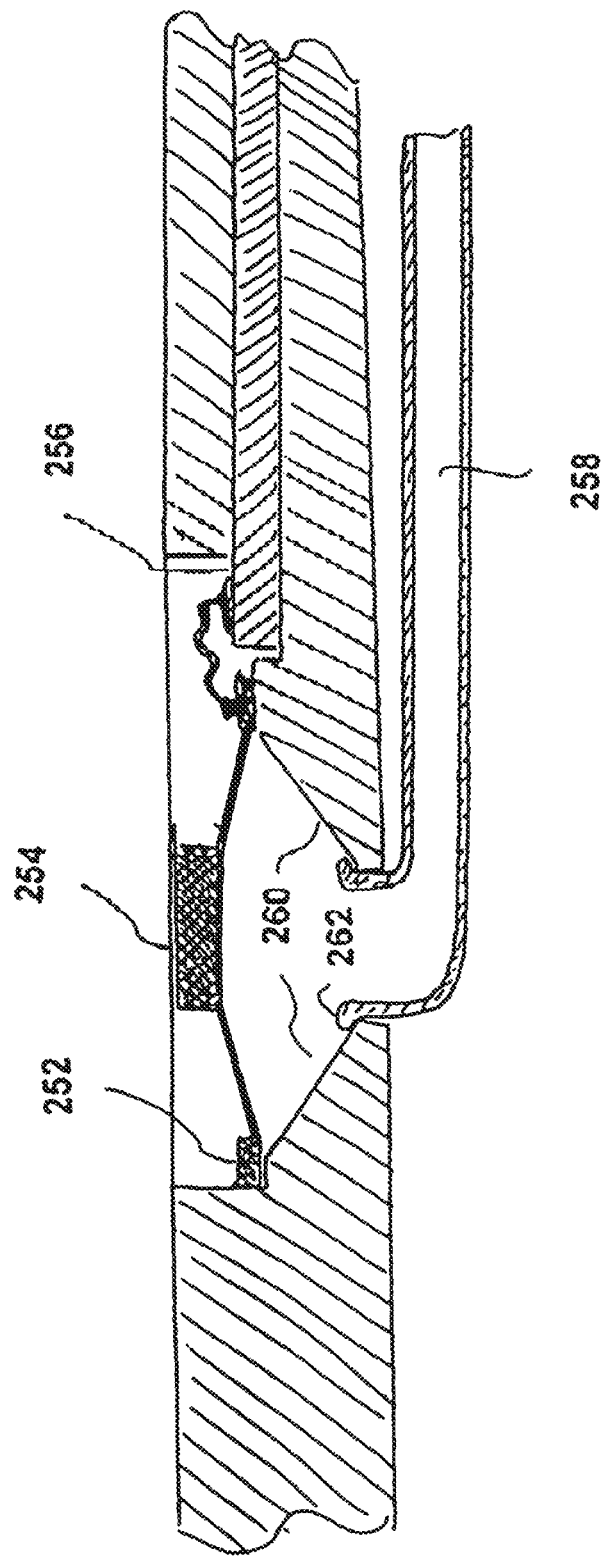
FIG. 4 shows a funnel at the output of a speaker in the glasses according to one embodiment of the invention.

In another approach, there is a funnel at the output of the speaker. FIG. 4 shows the cross section of such a funnel from a speaker at a temple region of the glasses. As shown in FIG. 4, the speaker 254 sits on a speaker frame 252, and the speaker 254 is electrically connected to a circuit board 256. As sound is generated from the speaker 254, the sound propagates to a tube 258 through a structure 260 in the shape of a funnel. Such a structure helps guide the sound to the tube (i.e., improved sound coupling). Also, FIG. 4 shows the tube, which can be the tube 150 shown in FIG. 2, mounted onto the temple region of the glasses with a circular lip 262. Such a lip 262 allows the tube 258 to rotate relative to the glasses. In the embodiment shown in FIG. 4, the speaker 254 is fully embedded in the glasses.

As an alternative to or in conjunction with the tube, the glasses can include a channel to likewise guide sound generated by the speaker to one of the ears of the user. For example, the channel can be formed within a temple. The temple also has an opening to output the sound towards the user's ear.

FIG. 1 shows one speaker at one of the temples. There can be more than one speaker at each temple. In one embodiment, there can also be at least one speaker at each temple. The two speakers can generate stereo effects.

In another embodiment, the glasses can provide four or more speakers to give a high fidelity sound or a surround sound effect. For example, each temple can include one speaker in front of the user's ear, and one speaker behind the user's ear. The different speakers can generate different portions or sections of the sound. Further, if a base (discussed below) or portable electronic device is coupled to the glasses, the base or portable electronic device can contain another speaker, such as a base or woofer speaker. Such embodiments enable the glasses to provide a personal high-fidelity sound or a surround-sound environment.

Electrical signals can be coupled to an electrical component, such as a speaker, in a pair of glasses through a number of mechanisms. In one embodiment, there is an electrical connector at least partially embedded in the glasses. In other words, at least a portion of the connector is inside the glasses. The connector is electrically coupled to the speaker (or other electrical component) by, for example, a conductor. The conductor can be on a printed-circuit board. In one embodiment, the conductor is also embedded in the glasses.

Figure 5:
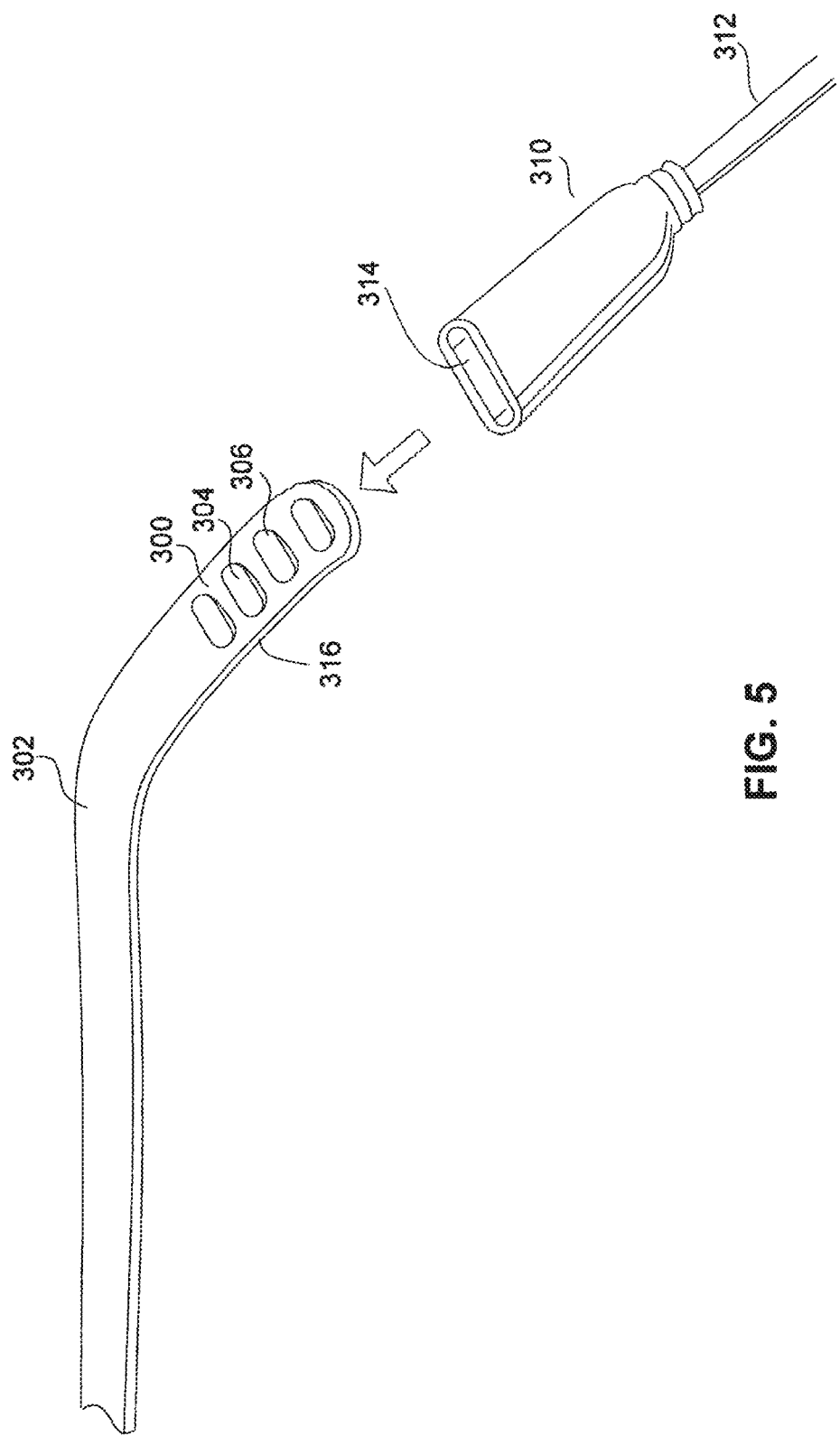
FIG. 5 shows a male connector at the end of a temple according to one embodiment of the invention.

Regarding connectors, FIG. 5 shows one embodiment where the connector is not a standard connector. The end 108 of the temple 104 of the glasses 106 shown in FIG. 1 has a similar connector. In FIG. 5, the connector is a male plug or a male connector 300 at the end of a temple 302 of a pair of glasses. The connector 300 is connected to the speaker through, for example, one or more wires embedded in the temple. Electrical signals external to the glasses can then be coupled to the speaker (or other electrical component) through the plug.

As shown in FIG. 5, the free end of the temple 302 can have a relatively flat cross section. There can be one or more electrically-conductive contacts, such as 304 and 306, on one or both of the flat surfaces of the temple. In FIG. 5, four contacts are shown on one surface of the temple. The contacts, 304 and 306, can be metal pads or bumps.

In one embodiment, a non-standard connector can be made using printed-circuit board technologies. First, a printed-circuit board with printed conductors connected to metal contact bumps is produced. Then plastic is overmolded around the printed-circuit board, with the mold designed to shut off around the bumps or pads. The overmolded plastic can serve as the temple, and the pads would be left exposed. Thus, portions of the printed circuit board are covered by plastic, and areas with the bumps or pads are exposed for connection. These pads serve as the connectors for the glasses.

Regarding printed-circuit boards, there can be one or more circuit boards in the glasses. For example, there can be a circuit board in one of the temples of the glasses. Or, the circuits can be divided into two circuit boards, one in each temple of the glasses. The circuit boards can carry additional electrical components to be described below.

In one embodiment, the circuit boards are rigid. In another embodiment, the circuit boards are made of flexible materials, such as a polyimide sheet, like Kapton®. In one embodiment, the circuit board is configured or adapts to the shape of the temple in which it resides.

As shown in FIG. 5, the end of the temple 302 serves as a male connector (plug) 300. The non-standard male connector 300 can be received by a non-standard female connector (plug) 310. Typically, the female connector 310 makes electrical and physical connection through grabbing around the male plug. The female connector 310 can be connected to a cable 312.

Figure 6A:
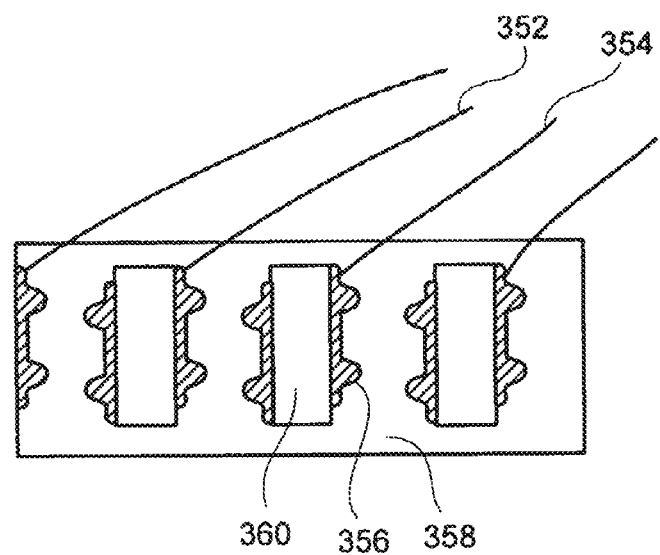
FIGS. 6A-6B illustrate a process to make a non-standard female plug couple to a male connector at a pair of glasses according to one embodiment of the invention.
Figure 6B:
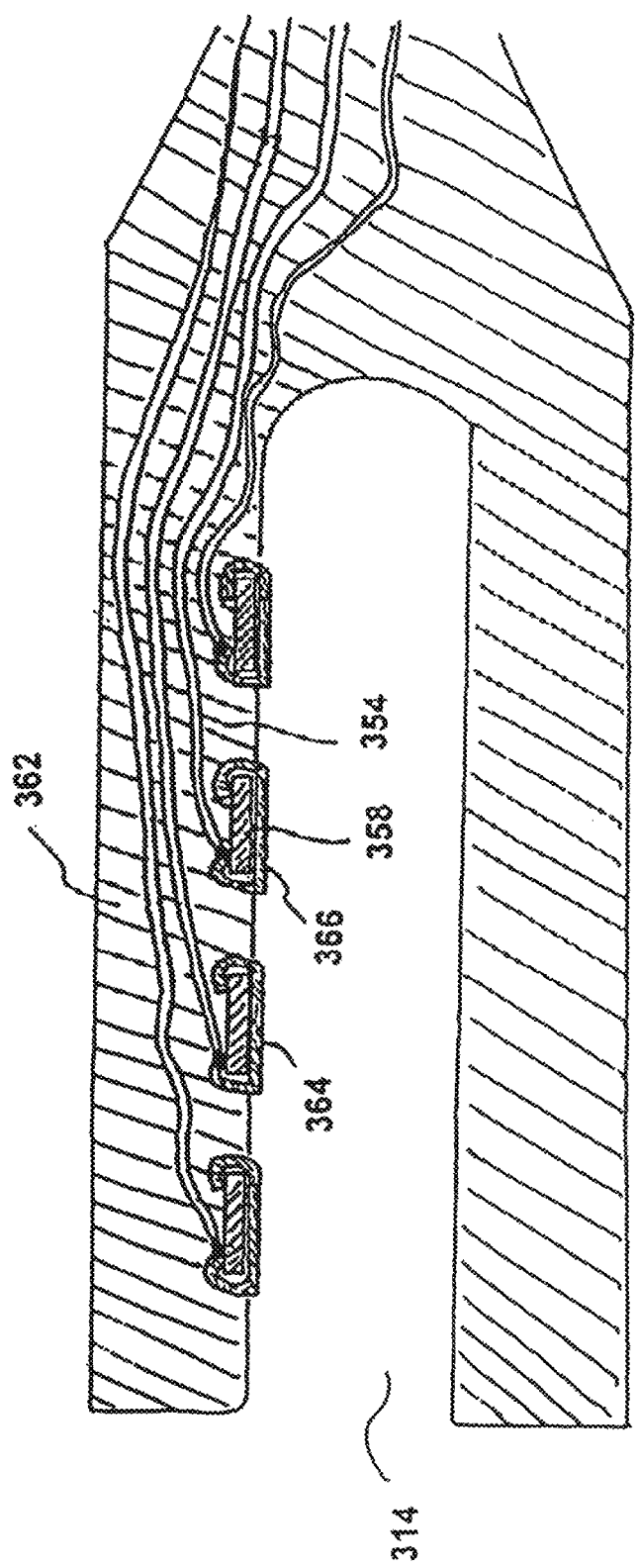

FIGS. 6A-6B illustrate a process to make the non-standard female plug 310. First, an electrical wire 354 is attached to a small sheet or piece of metal 356. FIG. 6A shows a number of such wires, with a number of the metal sheets or pieces crimped to a hard PVC 358. The figure shows the back side of the crimped board with the wires and with a number of holes, such as 360. Then the frame is overmolded with a soft PVC. FIG. 6B shows a cross section of the overmolded frame 362 with the soft PVC. As shown in the figure, a number of the metal sheets, such as 364 and 366, are exposed. They are the metal contacts in the female connector 310. Instead of the above approach, alternatively, a wire can be attached to a sheet of metal by putting the wire between the metal and the plastic as the metal is crimped onto a plastic. When the temple (i.e., male connector 300) is inserted into the female plug, the soft PVC material stretches slightly, providing a spring-force to keep the contacts connected.

The hard PVC can have a hardness of over 80 durometer, while the soft PVC can have a hardness of less than 50 durometer. The hard PVC can be replaced by other materials, such as Polypropylene or cloth. The soft PVC can be replaced by Silicone, or a thermo-plastic elastomer, such as Kraton®.

Referring to both FIG. 5 and FIG. 6B, when the male connector 300 is inserted into the slot 314 of the female connector 310, the metal pads, 304 and 306, will get in contact, or mate, with the metal sheets, 364 and 366.

In one embodiment, as long as the male connector 300 is pushed all the way into the female connector 310, the pads are aligned correctly to the sheets for electrical connections. In another embodiment, there is an alignment mechanism to guide the position of the temple relative to the female connector so as to ensure the conductive sheets to be in contact with the conductive pads. For example, there can be a registration location to indicate that the male connector is at the appropriate position relative to the female connector. There can be an alignment extension, which can be a partial sphere, close to the end of the temple 302, such as between the pads 304 and 306, at 316. And, there can be a corresponding alignment notch at the female connector 310. When the extension is received or caught by the notch, the male connector 300 is in the appropriate position relative to the female connector 310. In other words, the alignment is proper, and the pads and the sheets are in contact.

Figure 7:
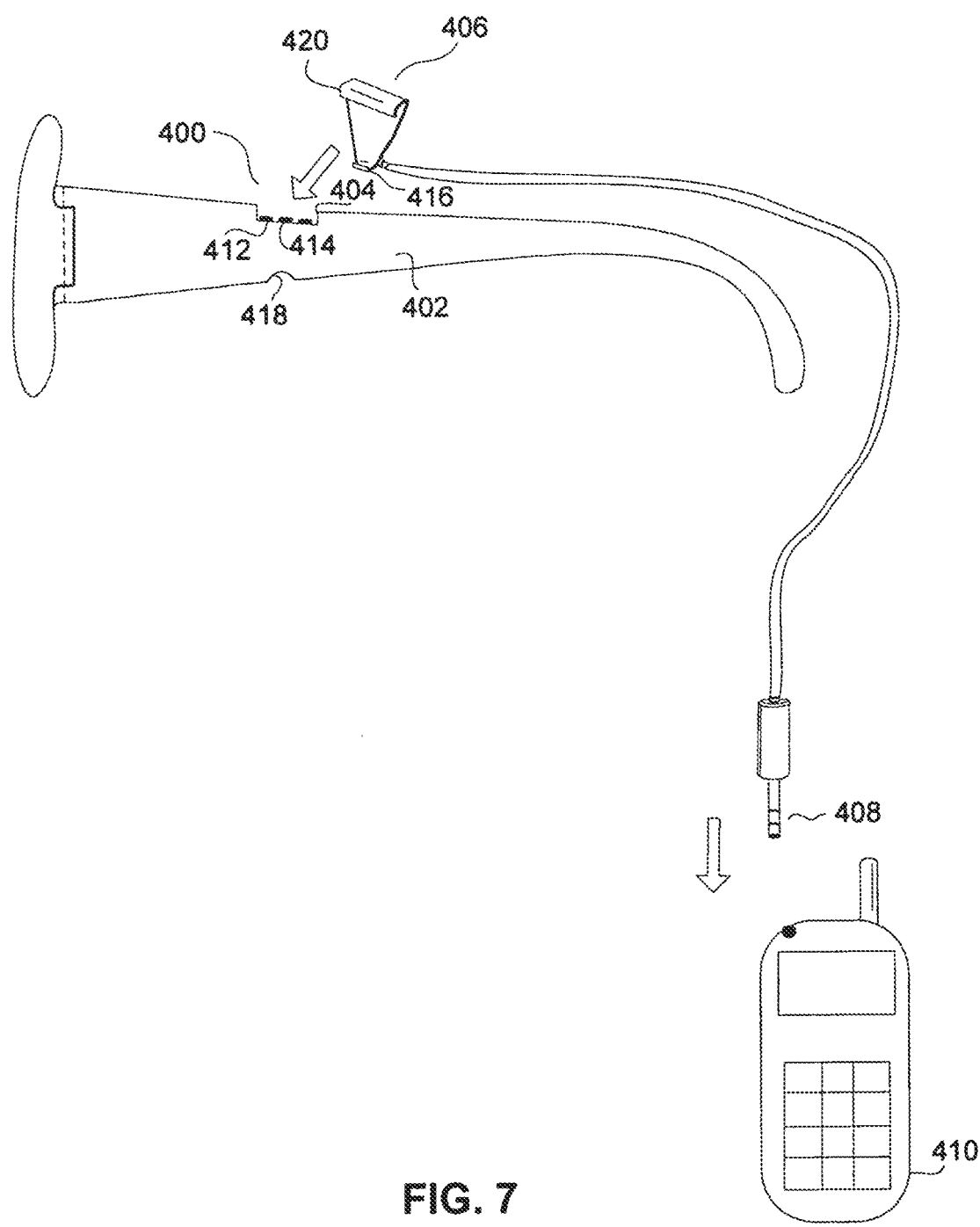
FIG. 7 illustrates another non-standard connector, applicable to clamp onto a temple of a pair of glasses according to an embodiment of the invention.

FIG. 5 shows the non-standard male connector 300 at one end of a temple of a pair of glasses. In yet another embodiment, a non-standard connector can be at another location. FIG. 7 shows another example of a non-standard connector 400. The connector 400 includes one or more conductive pads, 412 and 414, on the top side of a temple 402. The connector 400 is designed to receive another connector 406 that grabs onto the side of the temple 402. There can be an indentation 404 on the temple 402 to receive the other connector 406. The other connector 406 can include a top 420 and a bottom 416 clip. There are a number of conductive pads or sheets inside the other connector 406. The indentation 404 provides an alignment to indicate where the top clip 420 of the other connector 406 should grab onto the temple 402 for connection. At that position, the conductive pads at the temple will be in contact with the conductive pads or sheets at the other connector 406. There can also be another indentation 418 at the temple 402 to receive the bottom clip 416. This can further enhance the alignment process and to secure the connection.

In FIG. 7, the other connector 406 is coupled to one end of a cord and a plug 408, which can be inserted into a portable device 410, can be connected to another end of the cord. The portable device, for example, can be a cell phone. This type of non-standard clip-type connector could be easily applied to the temple with one hand, for example, while the user is driving a car.

A number of non-standard connectors have been described. In another embodiment, the contacts are based on standard connectors, which can be off-the-shelf connectors. FIGS. 8A-8E show a number of examples of such connectors.

In one embodiment, the standard connector is a standard cylindrical plug located at the end of a temple. From a different perspective, the temple molds around the end of the plug. FIG. 8A shows one such embodiment. The plug 450 can be a standard audio connector or a 3-wire or three terminal plug, such as a 3.5 mm male stereo mini-phone plug. The 3 wires for such a plug are typically one for ground, the other two applicable for two signals, such as for creating stereo effects. FIG. 8A also shows the three wires, 452, 454 and 456, inside the temple, extended from the plug 450. These wires are for connection to electrical components of the glasses.

In one embodiment, the cylindrical plug 450 shown in FIG. 8A can be protected, encapsulated or shrouded. Or, at least a portion of the plug is protected, encapsulated or shrouded. Such protection can, for example, be for aesthetic reasons, or to prevent the plug from scratching the face of the user when the user is putting on the pair of glasses. In FIG. 8A, the plug 450 is partially embedded in a temple.

Instead of a three terminal plug, other types of standard cylindrical plugs applicable to different embodiments of the present invention include a serial connector with 3 pins, typically one for ground, one for transmitting data (Tx) and the third for receiving data (Rx); or (b) a 2-wire connector, one served as ground, the other for carrying, such as power and modulated signals.

In yet another embodiment, instead of a cylindrical plug, the standard connector at the end of a temple of a pair of glasses is a USB or a FIREWIRE connector.

A number of embodiments have been described where the standard connector(s) at the glasses are male connectors. In yet another embodiment, the standard connector(s) in the glasses are female connectors. For example, there can be a 3.5 mm female stereo mini-phone plug at the end of a temple of a pair of glasses. At least a portion of the female connector can be protected, encapsulated or shrouded. For example, the female connector can be recessed within the end of a temple.

Figure 8B:
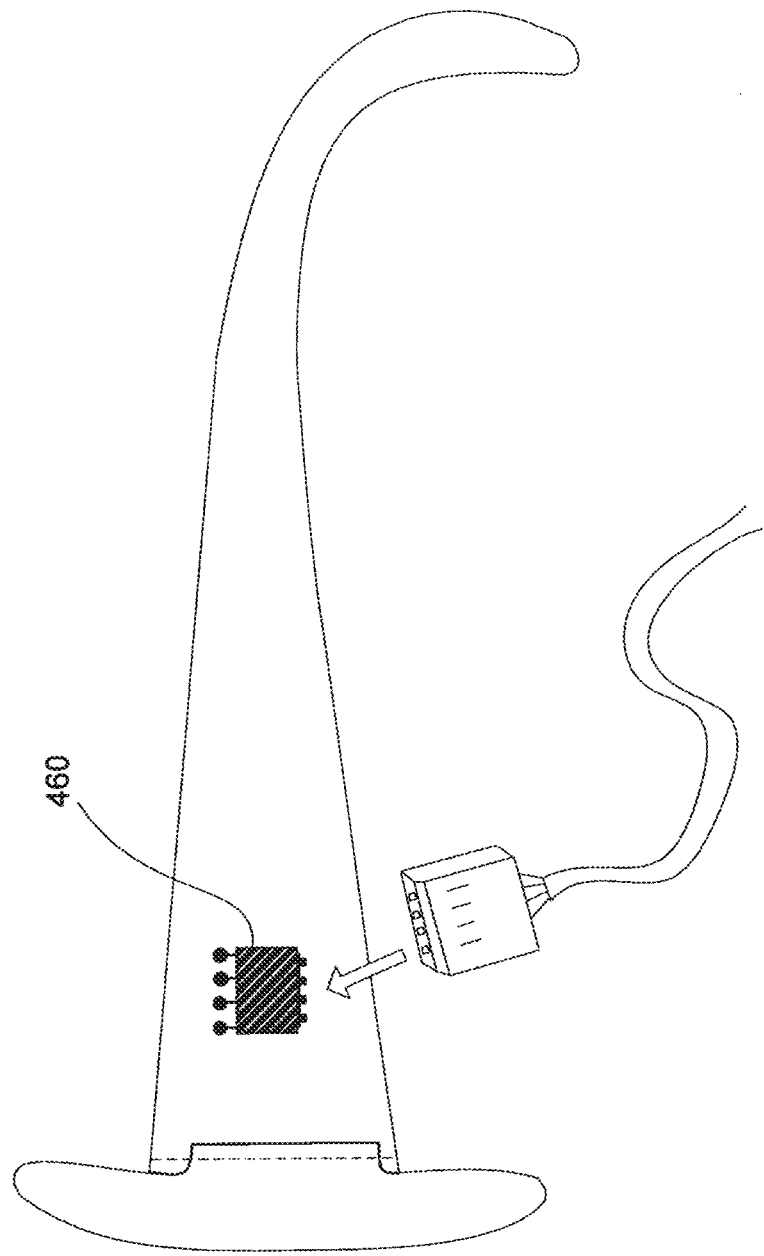
Figure 8C:
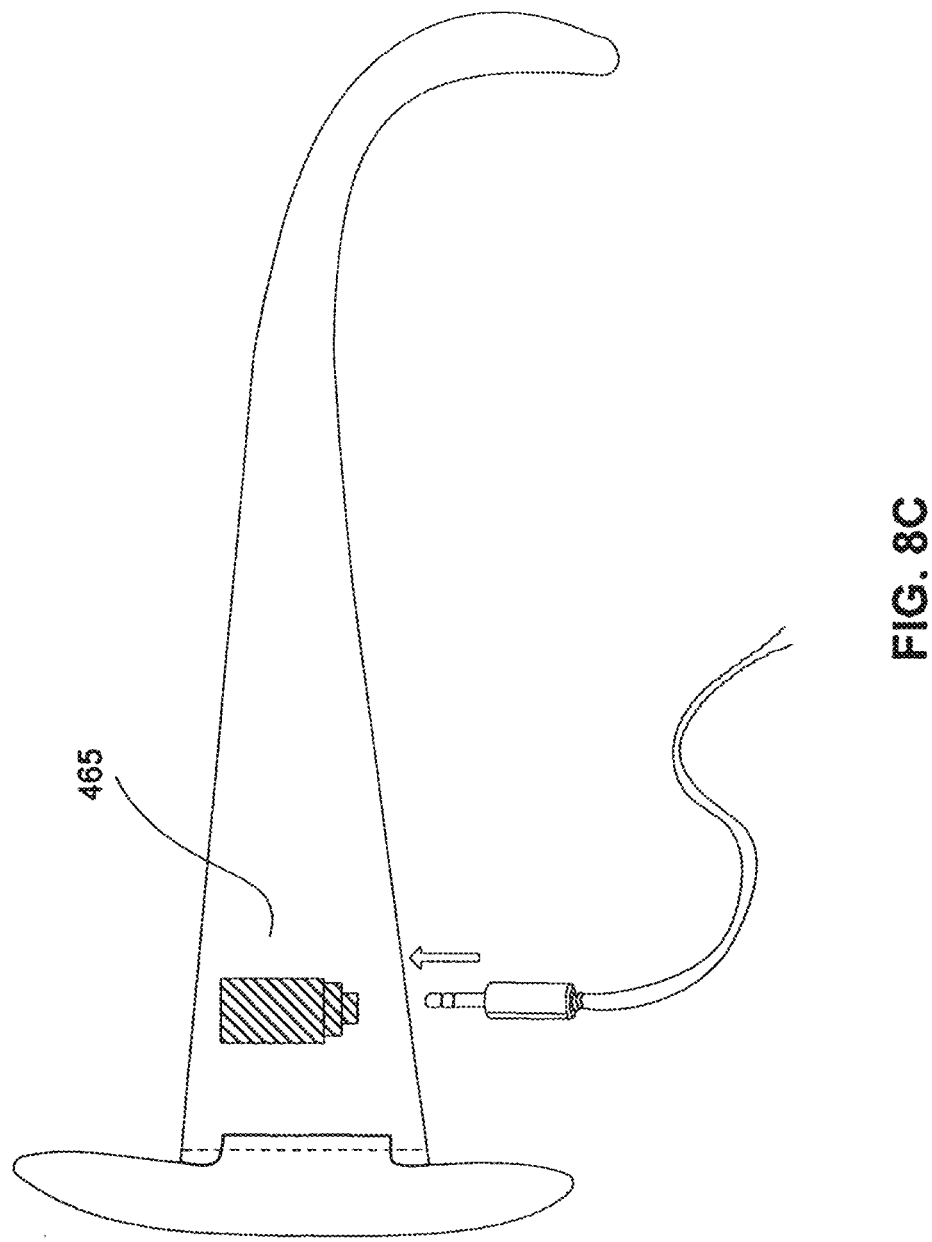
Figure 8D:
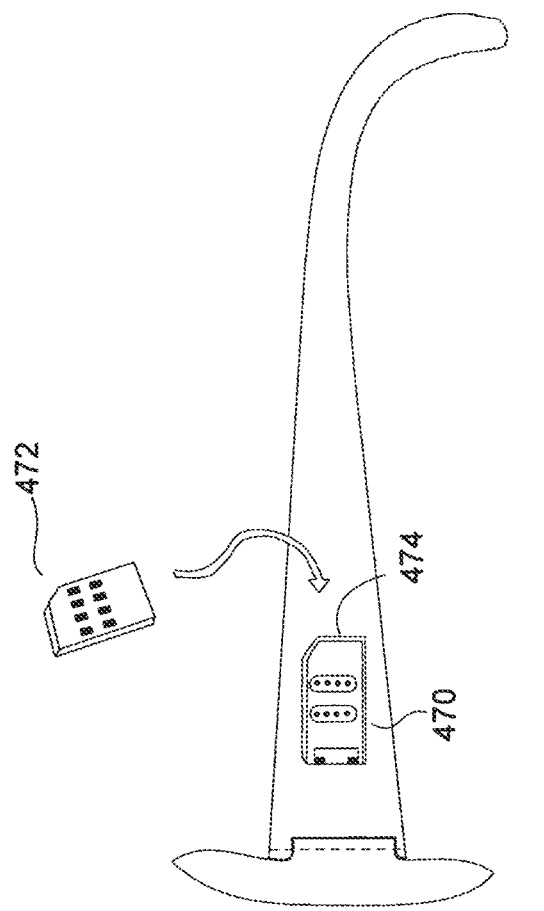
Figure 8E:
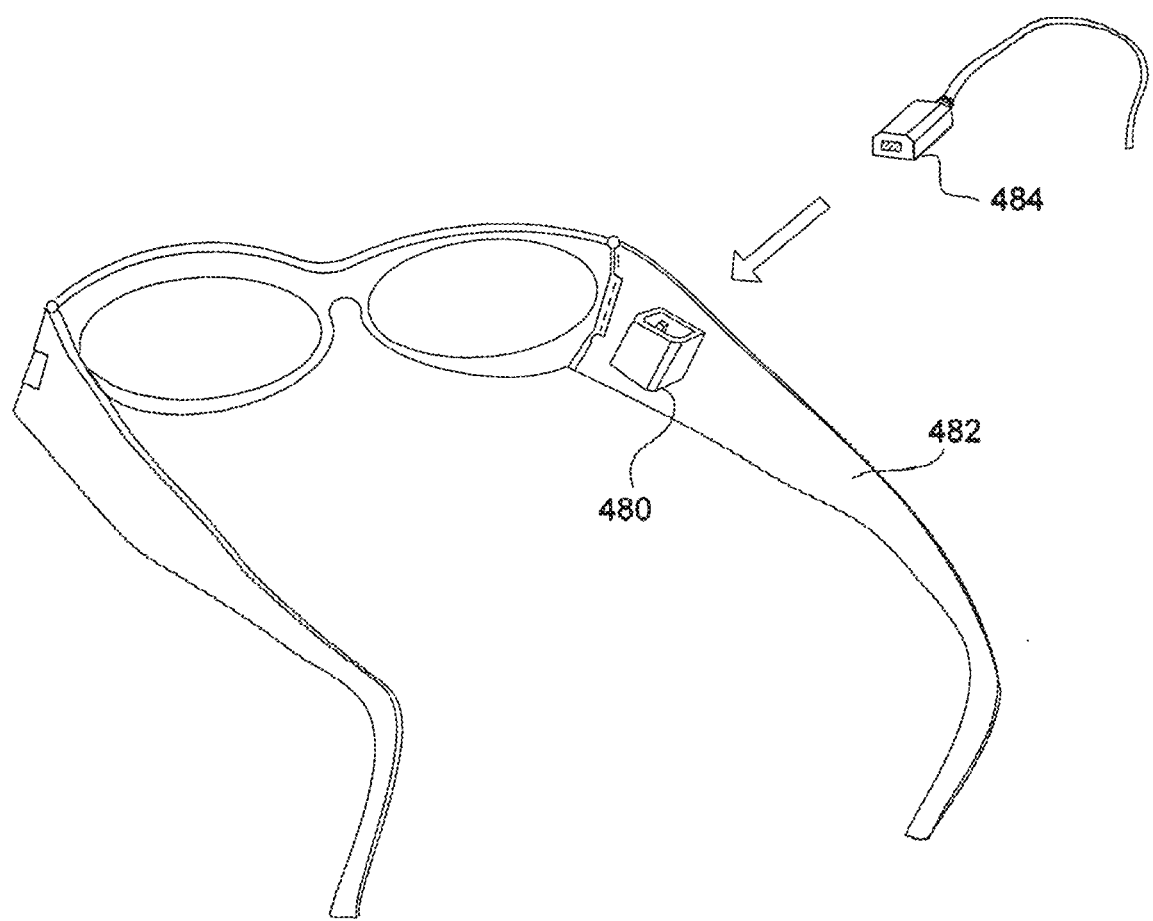

FIGS. 8B-8E show different examples of standard connectors located or partially embedded not at the end of a temple of a pair of glasses, but, for example, on the side of the temple, such as on the inside surface or the outside surface of a temple. FIG. 8B shows a 0.10" header plug 460, commonly known as a MOLEX connector, on such a surface. FIG. 8C shows a female mini-phone plug 465 on such a surface. FIG. 8D shows a card connector 470 to receive a card 472, such as a removable media card (e.g., memory card). There can be a cover 474 to secure and/or protect the media card 472 in place after it is inserted into the card connector 470. FIG. 8E shows a female USB connector 480 on the inside surface of a temple 482 to receive a male USB connector 484.

Figure 8F:
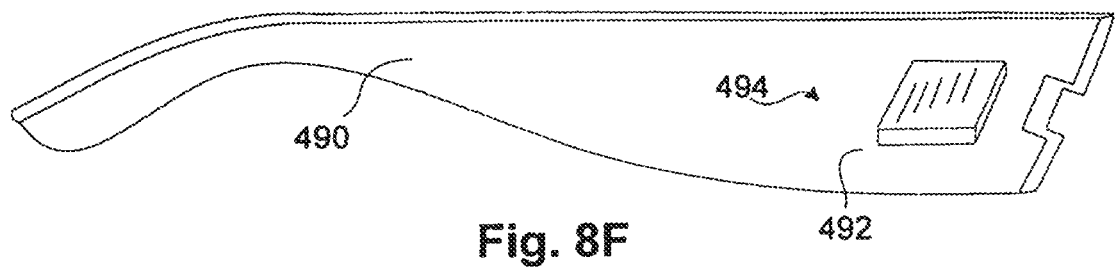
FIGS. 8F-8H are diagrams pertaining to providing a removable electronic device with an eyeglass frame according to one embodiment of the invention.
Figure 8G:
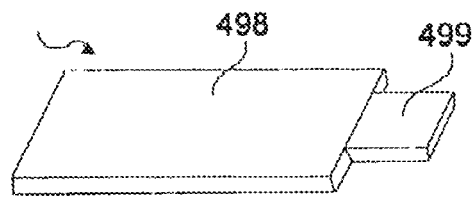
Figure 8H:
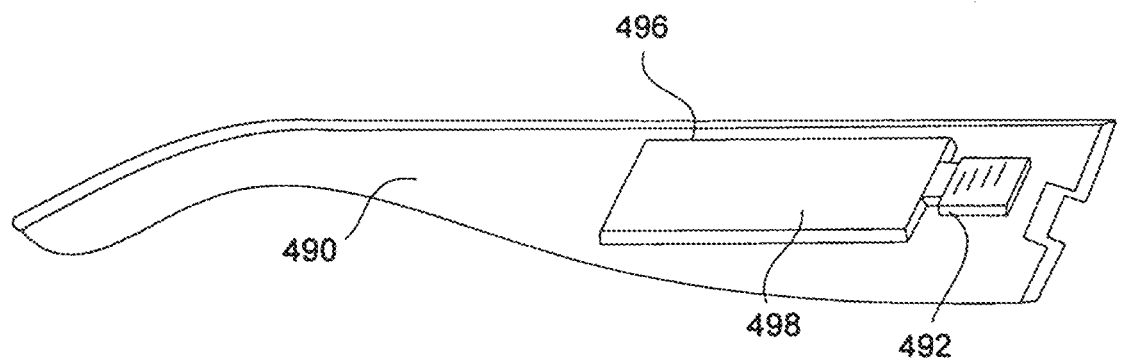

FIGS. 8F-8H are diagrams pertaining to providing a removable electronic device with an eyeglass frame according to one embodiment of the invention. FIG. 8F illustrates a temple 490 that includes a connector 492. The connector 492 includes an opening 494. A removable electronic device can be coupled to the temple 490 using the connector 492. More particularly, FIG. 8G illustrates a removable electronic device 496 that includes an electronic device housing 498 and a connector 499. As an example, the removable electronic device 496 can be a memory storage device, sometimes referred to as a memory card. FIG. 8H illustrates the removable electronic device 496 coupled to the temple 490. The removable electronic device 496 is coupled to one side of the temple 490, such side can be either an inside or outside surface of the eyeglass frame. When the removable electronic device 496 is coupled to the temple 490, the connector 499 of the removable electronic device 496 is inserted into the opening 494 of the connector 492. Physical forces between the connector 499 and the connector 492 operate to secure the removable electronic device 496 to the temple 490, yet permit the removable electronic device 496 to be removable therefrom.

In one embodiment, the connector 492 is not electrically connected to any electronic circuitry within the temple 490 or other parts of the eyeglass frame. In other words, the connector 492 provides a convenient means by which removable electronic devices can be coupled to the eyeglass frame. In another embodiment, the connector 492 can be coupled to electrical circuitry within the temple 490 or elsewhere within the eyeglass frame. Such an embodiment allows the electronic components within the removable electronic device 496 to be utilized with the electrical circuitry within the temple 490 or elsewhere within the eyeglass frame. For example, the removable electronic device 496 can provide data storage and/or other software modules to be utilized by or to utilize the other electrical circuitry within the temple 490 or elsewhere within the eyeglass frame. In any case, by attaching the removable electronic device 496 to the temple 490 (and thus the eyeglass frame), the removable electronic device 496 is able to be conveniently carried by the user of the eyeglass frame. In one implementation, the eyeglass frame, which includes the connector 492, becomes a docking station for the removable electronic device 496. As such, a variety of different removable electronic devices can be interconnected with the eyeglass frame, as desired. For example, the eyeglass frame can thus support different function or operations depending on the removable electronic device that is attached. For example, the eyeglass frame might operate as a camera, data storage device, FM radio, MP3 player, mobile telephone, pedometer, hearing enhancer, sun sensor, time piece, etc.

In one embodiment, the removable electronic device 496 can align itself with the orientation of the temple 490, such as shown in FIG. 8H. In FIG. 8G, the electronic device housing 498 can be said to have an elongated housing. The configuration (e.g., shape) and/or color of the removable electronic device 496 can also be designed to conform or complement the design of the temple 490. In one embodiment, the temple 490 might also have a recessed region to allow the portable electronic device to be less visually perceptible when attached to the temple 490 or to provide a more consistent contour of the temple 490.

In one embodiment, the connector 499 is a male connector, and the connector 492 is a female connector or a similarly sized structure. In one implementation the connector 499 is a peripheral bus connector, such as a Universal Serial Bus (USB) connector. In such cases, the connector 492 can also be a peripheral bus connector (either electrically functional or non-functional as noted above).

Although the embodiment illustrated in FIGS. 8F-8H utilize connectors, namely, electrical connectors, the removable electronic device 496 could be attached to the temple in other ways. For example, other means to provide physical forces to hold the removable electronic device 496 in place can be used.

Figure 8I:
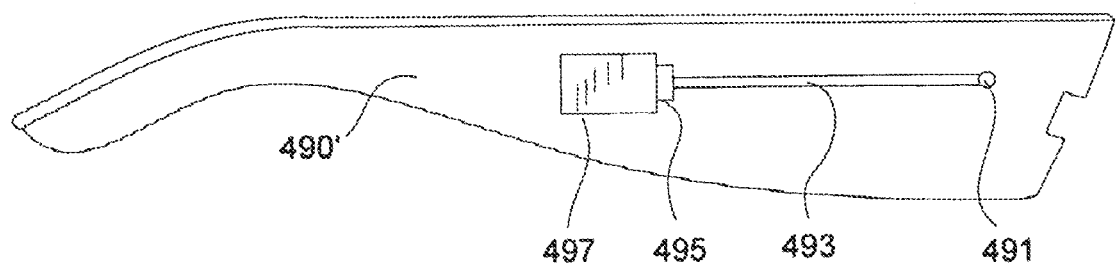
FIG. 8I is a diagram of a temple of an eyeglass frame according to another embodiment of the invention.

FIG. 8I is a diagram of a temple of an eyeglass frame according to another embodiment of the invention. In this embodiment, the temple 490' includes an opening 491 through which a cable 493 extends outward. The cable 493 has an electrical connector 495 connected at its end. The electrical connector 495 is electrically connected to electrical circuits within the temple 490' or elsewhere within the eyeglass frame such as by way of one or more wires contained within the cable 493. In one implementation, the length of the cable 493 is about one to four inches. The temple 490' shown in FIG. 8I also includes a receptacle 497. The receptacle 497 is affixed to or integral with the temple 490 to receive the electrical connector 495. Typically, the receptacle 497 provides a holding mechanism for the electrical connector 495 when not been utilized. When the electrical connector 495 is being utilized, the electrical connector 495 is removed from the receptacle 497 and coupled to a corresponding counterpart connector of another electrical device. The cord 493 can provide ease-of-use so that the electrical connector 495 can be maneuvered to couple to the counterpart connector. In one embodiment, the temple 490' can provide a recess for receiving the entire cable 493, with the outer surface of the receptacle 497 being substantially flush to the surface of the temple 490. So when the connector 495 is not in use, the connector 495 can be in the receptacle 497, with the cable 493 in the recess. In one embodiment, when the cable 493 is in the recess and the connector 495 inside the receptacle 497, the cable 493 has substantially no slack. Also, in another embodiment, the cable 493 can be retractable into the opening 491. In the embodiment shown in FIG. 8I, the electrical connector 495 is a male connector, and the receptacle 497 is a female connector or a similarly sized structure.

A number of standard and non-standard connectors have been described. Other types of connectors can also be used. In one embodiment, there is a connector adapter, which serves to transform such other type of connectors to a different interface. For example, an adapter can be a cord with one type of connector at one end and a different type of connector at the other end.

In one or more of the above embodiments, the glasses can access audio signals from another device through a connector at the glasses. The another device can be a multimedia asset players or a radio.

In one embodiment of the invention, the glasses have a storage medium (i.e., memory). The memory can be on a printed-circuit board and, for example, store 256 MBs or more. The memory can be a built-in or removable flash memory. The memory can be coupled to a device external to the glasses through one or more connectors at the glasses. As an example, a 256 MB flash memory is in one of the temples of a pair of glasses, and there is a USB connector at the free end of that temple to couple to an external device.

With the embedded storage medium, the glasses can upload information in the memory to or download information into the memory from an external device, such as a computer. A user can plug the glasses into the computer through a connector, either directly, or indirectly, with, for example, an intermediate wire in between. The user can store files in the glasses. Such an embodiment should reduce the chances of the user losing the files because the user has to lose the glasses as well.

Figure 9:
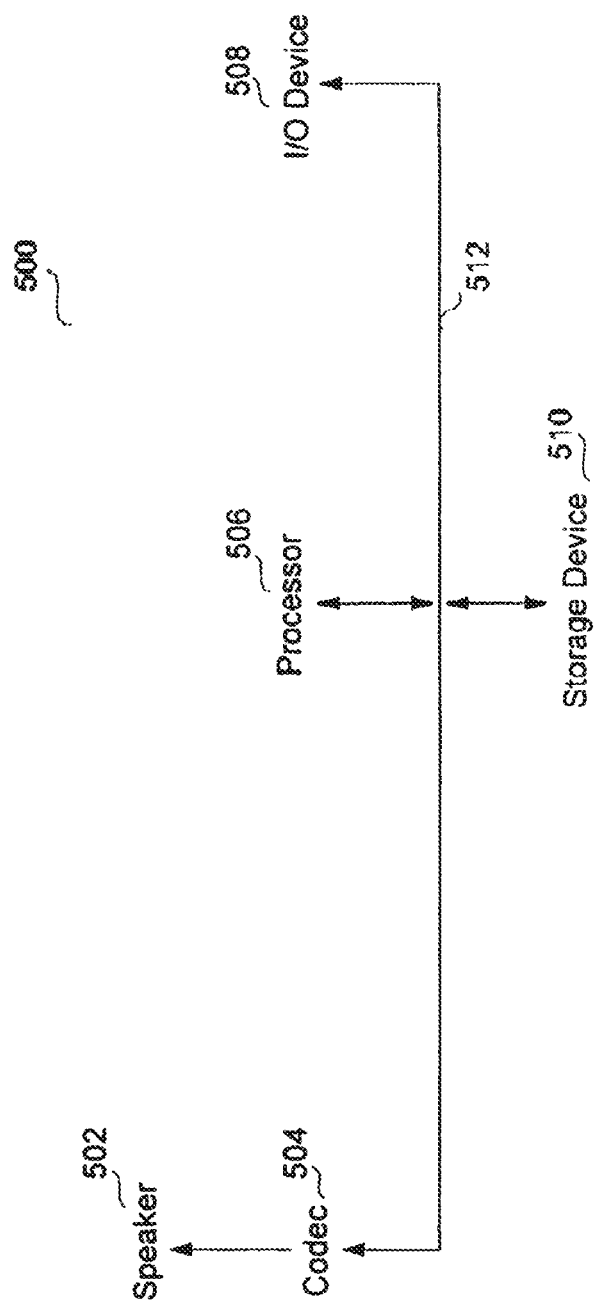
FIG. 9 shows some of the electrical components for a MP3 player according to an embodiment of the invention.

In yet another embodiment of the invention, a pair of glasses includes a multimedia asset player, such as a MP3 player. FIG. 9 shows some of the electrical components for a MP3 player 500 according to an embodiment of the invention. The player 500 includes a speaker 502 and a data bus 512, which facilitates data transfer among, for example, a processor 506, a storage device 510, and a coder/decoder (CODEC) 504. The processor 506, which can be a microprocessor or controller, controls the operation of the player 500. The storage device 510 stores the multimedia assets, such as MP3 files, or other types of media data that are appropriately formatted. In one example, the MP3 files are digitally encoded songs or other types of audio signals. The storage device 510 can include a number of separate storage elements. For example, the device 510 can be a flash memory device, or a minidisk device, and a cache, which can improve the access time and reduce power consumption of the storage device. The storage device 510 typically also includes a Read-Only Memory (ROM), which stores programs, utilities or processes to be executed in a non-volatile manner. The player 500 can also include a RAM, such as for the cache.

Once a media asset, such as a song, is selected to be played, the processor 506 would supply the asset to the CODEC 504, which decompresses the asset and produces analog output signals for the speaker 502. In one embodiment, the bus 512 is also coupled to an input/output device 508, which would allow a user to upload songs in the glasses to an external instrument, such as a computer, or download songs from the instrument to the glasses.

There are different approaches to select a song. In one embodiment, the songs or the media assets can be categorized in the MP3 player, and the categorization can be hierarchical, with multiple levels in the hierarchy. To illustrate, assume that there are three levels. The top level can be the name of the singer; the second level can be the time period when the asset was produced, and the third level can be the names of the songs. The entries, such as the name of the singer, can be abbreviated. There can be a small display and a control knob to allow a user to scroll down entries in a level. By pushing the knob, the user selects an entry, which can lead the user to a lower level. There can be an entry for moving up a level also. In another embodiment, the display is a touch-screen display, allowing entries to be entered directly on the display. In yet another embodiment, entries can be selected based on voice recognition.

A number of embodiments have been described with the glasses having a connector. In one embodiment, the glasses can have more than one connector. For example, a pair of glasses with two connectors also has a speaker. One connector is, for example, at a broad side of a temple, as in FIG. 8D. The connector can be for coupling to multimedia assets of a MP3 player. Another connector is, for example, at the end of a temple, as in FIG. 8A. That connector can couple power to the glasses. The speaker can play the multimedia assets accessed from one connector, based on power from another connector.

As described, power (e.g., external power source) can be coupled to the glasses through a connector. In one embodiment, the power source is embedded inside or inserted into the glasses. Different types of power sources are applicable. For example, the power source can be a battery, a fuel cell, a solar cell, or a re-chargeable battery. The rechargeable battery can be charged through a connector at the glasses.

In an earlier application, namely, U.S. Provisional Patent Application No. 60/509,631, filed Oct. 9, 2003, and entitled "TETHERED ELECTRICAL COMPONENTS FOR EYEGLASSES," which has been incorporated herein by reference, there can be a base connected to the glasses through a cord. The cord can be just a piece of flexible conductor encapsulated by a flexible insulator. Typically, a cord includes a number of electrical wires or conductors. There can be one or more electrical components in the base, and there can also be one or more electrical components in the cord. The different types of connectors previously described can be located in the base. In one embodiment, a power source is an electrical component in the base tethered to a pair of glasses. In another embodiment, the glasses are tethered to a base that has a connector. The connector is connected to and draws power from an external electronic device. In this embodiment, electrical components in the glasses draw power from the external electronic devices.

Figure 10:
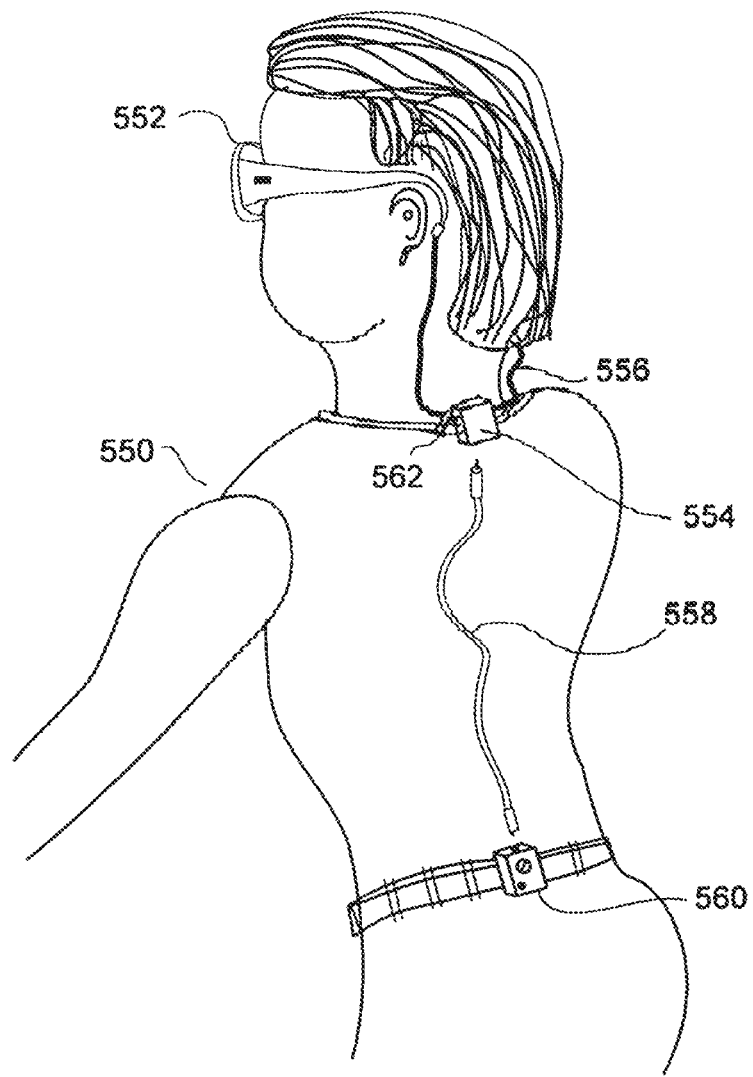
FIG. 10 shows an embodiment of the invention where a user is wearing a pair of glasses with electrical components, tethered to a base, which is connected to a portable device.

FIG. 10 shows an embodiment where a user 550 is wearing a pair of glasses 552, which include electrical components. There are also tethered electrical components in a base 554, which is connected to the glasses 552 through a cord 556. In addition, there is a wire 558 connected to a connector at the base 554 to a portable electronic device 560. The portable device 560 can be (a) a multimedia device, such as a MP3 player/recorder or a minidisk players, (b) a wireless communication device, such as a cell phone, or (c) a personal digital assistant, or other types of portable devices with computing and/or entertaining and/or communication capabilities.

Note that instead of connecting to the portable electronic device 560 through the base 554, in another embodiment, the glasses 552 directly connect to the portable device 560 through a cord.

In one embodiment, there is an attachment device 562, such as a pin or clip. The attachment device attaches at least a part of the glasses to the user's clothing. The attachment device 562 can serve to attach the cord 556 and/or the wire 558 and/or the base 554 to the user's clothing. The attachment can also be through other mechanisms, such as Velcro.

In a number of embodiments, the speaker described is assumed to emit audio signals. In one embodiment, the speaker emits ultrasonic signals. The glasses can be used, for example, as an insect repellant by transmitting ultrasound to repel insects, such as mosquitoes. In this embodiment, the one or more speakers broadcast the ultrasonic signals away from the user. In other words, the speakers face outwards, not inwards towards the user. In this embodiment, the glasses, which can include a base, also has a power source to provide power to the speaker. There can also be a control knob to turn the one or more speakers on/off on the glasses. There will be additional discussions on the control knob below.

In another embodiment, the glasses generating ultrasonic signals can be used to produce audio signals that are more directional. For example, two ultrasonic signals are generated by a speaker in the glasses, with their difference frequencies being the audio signals. The audio signals generated based on mixing the two ultrasonic signals can be much more directional than audio signals directly generated from the speaker.

Referring back to FIG. 1, in one embodiment, the glasses include a microphone 110. The microphone 110 can be at the end of a temple 104 close to a lens holder 112. Or, the microphone 110 can be in the lens holder 112, located directly adjacent to the temple 104. In yet another embodiment, there can be a small protrusion extending down from the temple to house the microphone.

With glasses having a microphone, one can use the glasses to record voices into, for example, a storage medium. The storage medium can be in the glasses, or can be in a base or a portable device attached to the glasses.

Different types of microphones can be used. For example, they can be electret microphones, crystal microphones, resistance microphones, piezoelectric microphones or moving-coil microphones.

In one embodiment, the glasses with a microphone also include a speaker that can generate directional sound. A user can speak into the microphone and his message can be transmitted from the glasses in a more directional manner.

In another embodiment, the glasses also include a notification electrical component to provide a notification to the user wearing the glasses. The notification can be to notify, alert or display information to the user. There can be a display located at the inside 114 of the lens holder, or at the vicinity of the junction 116 or the hinge of a lens holder and its corresponding temple facing the user. Or, there can be a display at the inside surface of a temple, or at other locations on the glasses. The display can be one or more light emitting diodes. To alert the user, one or more diodes can blink. The blinking can be of a specific sequence. Instead of diodes, the display can be a liquid crystal display. The display can provide indications or information to the user. For example, a number or a variable-height bar can be shown. Other than visual indications, the notification or alert can be audio, like a beeper.

In one embodiment, the notification electrical component is for selecting a multimedia asset in a multimedia asset player in a pair of glasses for the multimedia to play. The multimedia asset player can be a MP3 player.

A number of embodiments of the present invention have been described where electrical signals are transmitted to or from a pair of glasses through a physical connection. In one embodiment, electrical signals are wirelessly coupled to a pair of glasses. The coupling can be short range or long range. The coupling can be directly to the glasses, or to a base connected to a pair of glasses. The glasses with wireless coupling capabilities can be used to couple to a Bluetooth network, the Internet, a WiFi network, a WiMax network, a cell-phone network or other types of networks. The coupling can also be through a point-to-point link, such as an infrared link. In different embodiments, the glasses provide wireless communication capability for its user. In this regard, the glasses contain wireless communications circuitry that enables the eyeglasses to communicate in a wireless manner, to, for example, a wireless communication device (e.g. mobile telephone), a portable computing device (e.g. Personal Digital Assistant (PDA), handheld computer or wearable computer), or an entertainment device (e.g., stereo system, television, media player (portable or stationary)).

FIGS. 11A-11B show examples of some of the electrical components in or tethered to a pair of glasses for wireless connections, according to embodiments of the present invention. In FIG. 11A, a high frequency or RF antenna 602 wirelessly captures high frequency or RF signals for RF transceiver circuits 604. If the transceiver circuits are for a conventional superheterodyne system, the transceiver circuits 604 mix the RF signals down to IF signals. Then the IF signals are processed by baseband circuits. Digital outputs from the baseband circuits are coupled to a processor 608 for analysis and synthesis.

Outputs from the processor 608 are fed to a D-to-A converter 610 to generate audio signals for a speaker 612. Similarly, audio analog signals from a microphone 614 can be fed to an A-to-D converter 616 to generate digital low frequency signals for the processor 608 and then to the RF transceiver circuits 604. The low frequency signals are up-converted by the RF transceiver circuits 604 and wirelessly transmitted by the antenna 602.

In another embodiment, digital conversion is moved closer to the antenna. For example, instead of mixing RF into IF signals, the RF transceiver circuits 604 directly perform digital conversion from the RF signals.

Typically, high frequency filters are used at the front end of the RF transceiver circuits 604 for the RF signals. In one embodiment, to save space, FBAR (film bulk acoustic resonator) duplexer is employed. A set of piezoelectric filters can be used to separate incoming and outgoing signals. For cell phone operation, such filters can enable a user to hear and speak simultaneously. A number of these electronic devices can be on a circuit board in the glasses. Or, some of the devices are in the glasses, while other in the base tethered to the glasses.

FIG. 11B shows another example of some of the electrical components in or tethered to a pair of glasses for wireless connections according to the present invention. In this embodiment, there does not need to have digital data. A speaker 620 and a microphone 622 are connected to an analog interface circuit 624, which is coupled to a RF transceiver circuit 626 and an antenna 628. For the speaker application, the transceiver circuit 626 mixes the RF signals down into IF signals, which are converted by the analog interface circuit 624 into analog signals for the speaker 620.

Similarly, for the microphone application, its analog signals are converted into the IF signals by the analog interface circuit 624 to be up converted by the transceiver circuit 626 into RF signals for the antenna 628. These types of circuitry are suitable for, such as, simple radios, analog cell phones, CB radios, walkee-talkees, police radios or intercom systems.

In one embodiment, most of the electrical components are not in the glasses. The pair of glasses includes an antenna to capture the wireless signals, and a connector. The wireless signals captured are transmitted through the connector to electrical circuits external to the glasses.

A number of processors have been described. The processors can use different types of operating systems. In one embodiment, Symbian Operating Systems are used. In another embodiment, operating systems, such as TinyOS, are used. The operating system could be programmed in C++ and then compiled into machine codes.

For privacy protection, signals can be encrypted before transmission. Encryption can take significant computation power, and may generate a fair amount of heat. In one embodiment, encryption capabilities are located in a base tethered to the glasses. There can be a fan inside the base. The fan can be turned on during encryption. In another embodiment, the fan is activated during other high capacity uses for heat dissipation purposes.

In yet another embodiment, there is a fan in the glasses. The fan is located at a temple of the glasses, in the region close to its lens holder. The fan is used to cool the wearer of the glasses.

In one embodiment, a pair of glasses has access to voice recognition software. The software can be embedded in (a) the glasses, (b) a base tethered to the glasses, (c) a portable device wired or wirelessly coupled to the glasses or to the base, or (d) a computing system wired or wirelessly coupled to the glasses. Or, the software or firmware can be in more than one of the above devices.

Glasses that can couple to signals wirelessly can be used in different applications. For example, the glasses can be a cell phone wireless head set, such as a Bluetooth cordless headset. Such short-distance wireless technologies allow the headset to connect to the user's cell phone without a wire. This would allow the user to drive, eat or perform other functions without getting tangled in a pesky wire.

In one embodiment, the cell phone is a VOIP (voice over Internet protocol) phone.

In one embodiment, for the glasses operating as a cell phone head set, the head set includes active noise cancellation mechanism. For example, the glasses include two microphones. One microphone is for capturing the voice of the user. But the microphone captures ambient noise also. It can be embedded in a protrusion extending from the end of the temple close to a lens holder, towards the mouth of the user, as the microphone 110 in FIG. 1. Another microphone can be located at the top of one of the lens holders pointing away from the mouth of the user. This microphone is for capturing ambient noise. As a first order approximation, outputs from the two microphones could be subtracted from each other to provide voice signals with noise reduced.

In yet another embodiment, the glasses with wireless coupling capabilities also have a multimedia asset player, such as a MP3 player. The glasses can be used to receive music directly in digital format over, for example, a data-capable network of a mobile operator. The music can be received, for example, at a speed of 16 Kbits per second, providing sound quality close to compact disc. If the music is transmitted in a compressed manner, such as in a MP3 format, then the music data can be received at a much lower speed. In one embodiment, the glasses also have a microphone and can serve as a cellular phone or a wireless headset of a cellular phone.

In yet another embodiment, the glasses can serve as a radio, again through electrical components in or tethered to the glasses. In this embodiment, the glasses can include a tuner with one or more control knobs. The knobs can be used to select channels and to set the volume.

In one embodiment, a pair of glasses allows personalization by including a preference indicator. The indicator allows a user to provide his preference, such as on whatever is being output by the glasses. In one example, the glasses also has a radio having a speaker and with electrical components for wireless connection. In this example, the indicator can be used by the user to provide his preference regarding whatever is being played by the radio at that time. This preference can be wirelessly transmitted from the glasses to a third party. To illustrate, when the user is listening to a piece of music, the user can indicate he likes the piece of music by pressing a control knob on the glasses. This piece of preference information is then transmitted and received by a service provider, which is then informed of the user's preference. Instead of a control knob, in another embodiment, the preference indicator is a system with a microphone and voice recognition software. The user can indicate his preference vocally.

In another example regarding the personalization process, the glasses can serve as a multimedia asset player, such as a MP3 player. The song that the user has shown preference can be stored in a storage device, which can be in the glasses.

Figure 12:
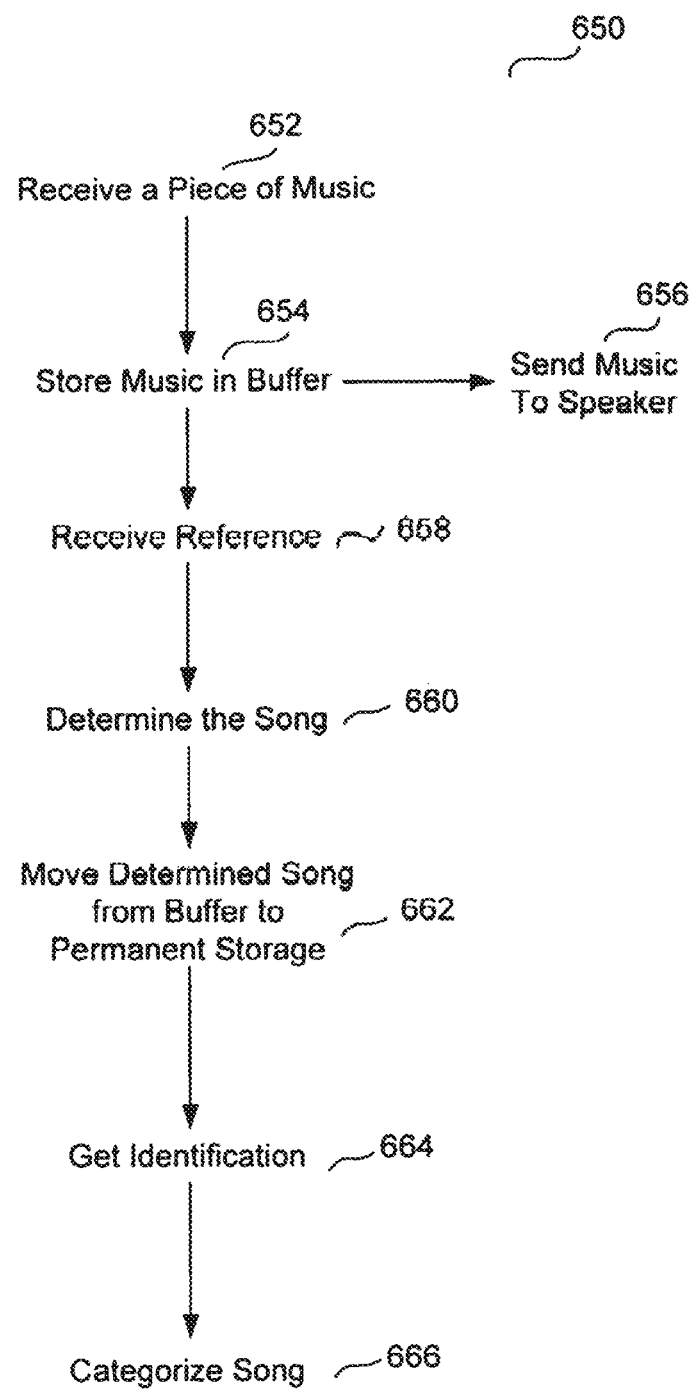
FIG. 12 shows a process for a personalized radio according to one embodiment of the present invention.

FIG. 12 shows a process 650 according to one embodiment of the present invention for a personalized radio.

Initially, a pair of glasses according to the present invention receives 652 a piece of music from a radio station. That piece of music is stored 654 in a buffer or a temporary storage area. This temporary storage area can be in the glasses or tethered to the glasses. The piece of music is also sent 656 to a speaker in the glasses.

Assume that the user likes the music. Based on the preference indicator, the user shows his preference. After the glasses receive 658 an indication of the user's preference, the glasses determine 660 the song corresponding to the indication. That piece of music can then be moved 662 from the buffer to a permanent storage area, such as into a flash memory. This would then allow the user to subsequently access the piece of music.

There are different ways to determine 660 the song or the content being played by the radio corresponding to the indication. For example, one rule is that when the user pushes the preference button or voices his preference, the song (or media asset or media file) that is being played is the one the user likes. Since the operating system knows what song is being played at what time, based on the rule, the song of preference is determined. Another rule is that when the user shows his preference, and there is no song being played at that instance, the song immediately preceding the break is the song of preference.

In another embodiment, the glasses can get 664 an identification for the song of preference. For example, the glasses can ask the user to provide an identification for the piece of music. This identification can be the type of music, the singer, the name of the music or other identification. In another embodiment, there can be meta data embedded, such as in the beginning part of the music (or media asset). Having such meta data embedded is not uncommon for music in digital format. The meta data can include identifications for the music. The glasses can get 664 such identification. Based on the identification, the song is categorized 666 accordingly, such as grouped with other songs having the same identification. Such categorization process would enhance the ease of accessing the song by the user at a later time.

Figure 13:
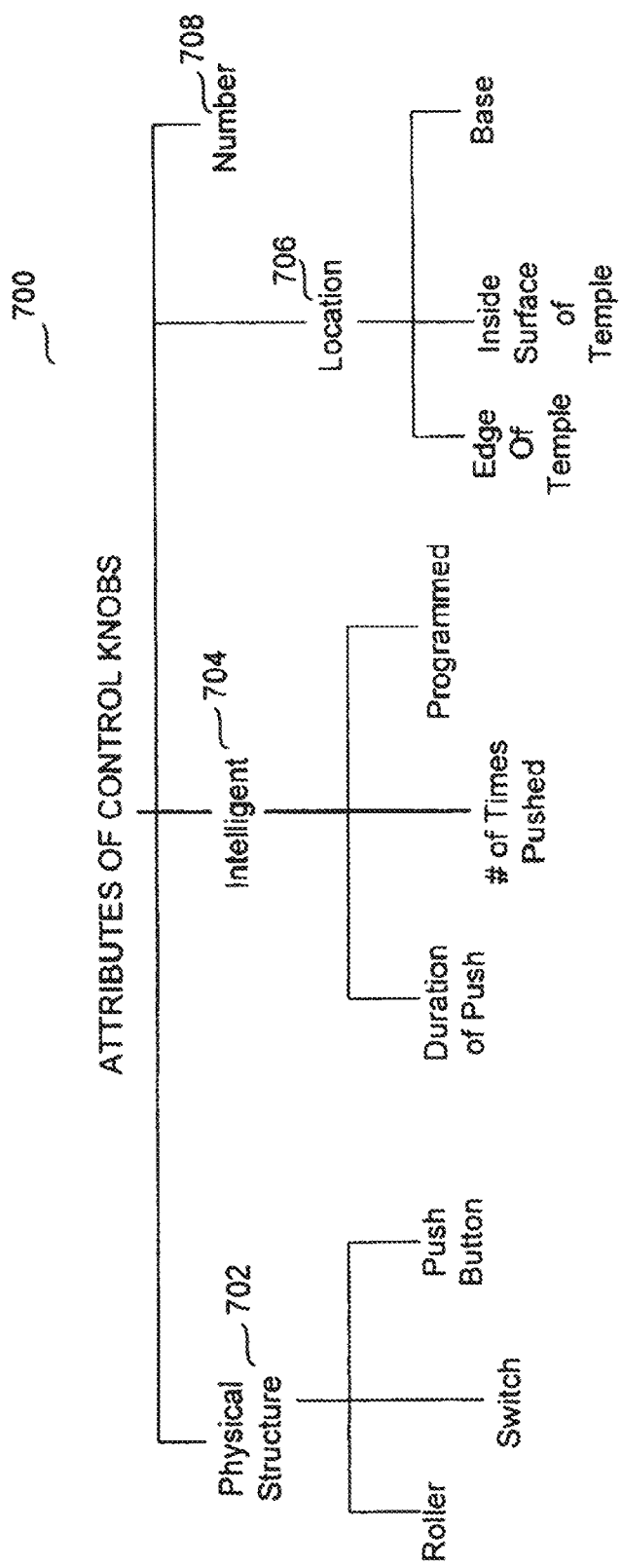
FIG. 13 shows a number of attributes of control knobs according to different embodiments of the present invention.

A number of control knobs have been described. FIG. 13 shows a number of attributes 700 regarding control knobs according to the present invention. The knobs can be of different physical structure 702. For example, a control knob can be a roller, a switch or a push-button. A control knob serving as an up/down controller can use two buttons, or a roller.

A control knob can be more intelligent 704. For example, a push-button control knob can serve different purposes depending on the duration the knob is being pushed. If a user pushes it for more than three seconds, the knob serves as an on-off toggle switch. In another example, a knob can serve multiple purposes, and the specific purpose depends on the number of times the knob is pushed.

A knob can also be programmed. A user can connect the glasses to a computer and program the knob accordingly. For example, one can program a knob such that if the knob is pushed more than three seconds, the knob would serve as an on/off switch for the glasses. As another example, a knob can provide reset to delete certain information previously captured by a process and to allow re-starting the process.

The location 706 of a control knob can vary for different applications. A control knob can be located on the glasses. A control knob can be on the top, the side or the bottom of the temple. A control knob can be located at the inside of a temple facing the user. Assume that there are a number of control knobs and all of them are on the edges of a temple, except one. By being at a position different from other control knobs, this knob can serve a specific purpose. For example, it can be an on/off control knob. In yet another embodiment, a control knob can be located in a base tethered to the glasses.

The number 708 of control knobs can vary depending on operations. For example, there is an on/off control knob and a volume up/down control knob. If the glasses are used for cell phone headset application, in one embodiment, there is also an answer/hang-up control knob. If the glasses serve as a radio, in one embodiment, there is also a tuning control knob, which can be two push buttons. If the glasses serve as a CD player, in one embodiment, there is a play control knob, a stop control knob, and a skip forward/backward control knob. If the glasses serve as a multimedia asset player, such as a MP3 player, in one embodiment, there is a save-this-song control knob, a skip-forward/backward-song control knob and a select-song-to-play control knob.

A number of embodiments of the present invention have been described regarding audio signals. In one embodiment, the glasses further serve as a camera.

Figure 14:
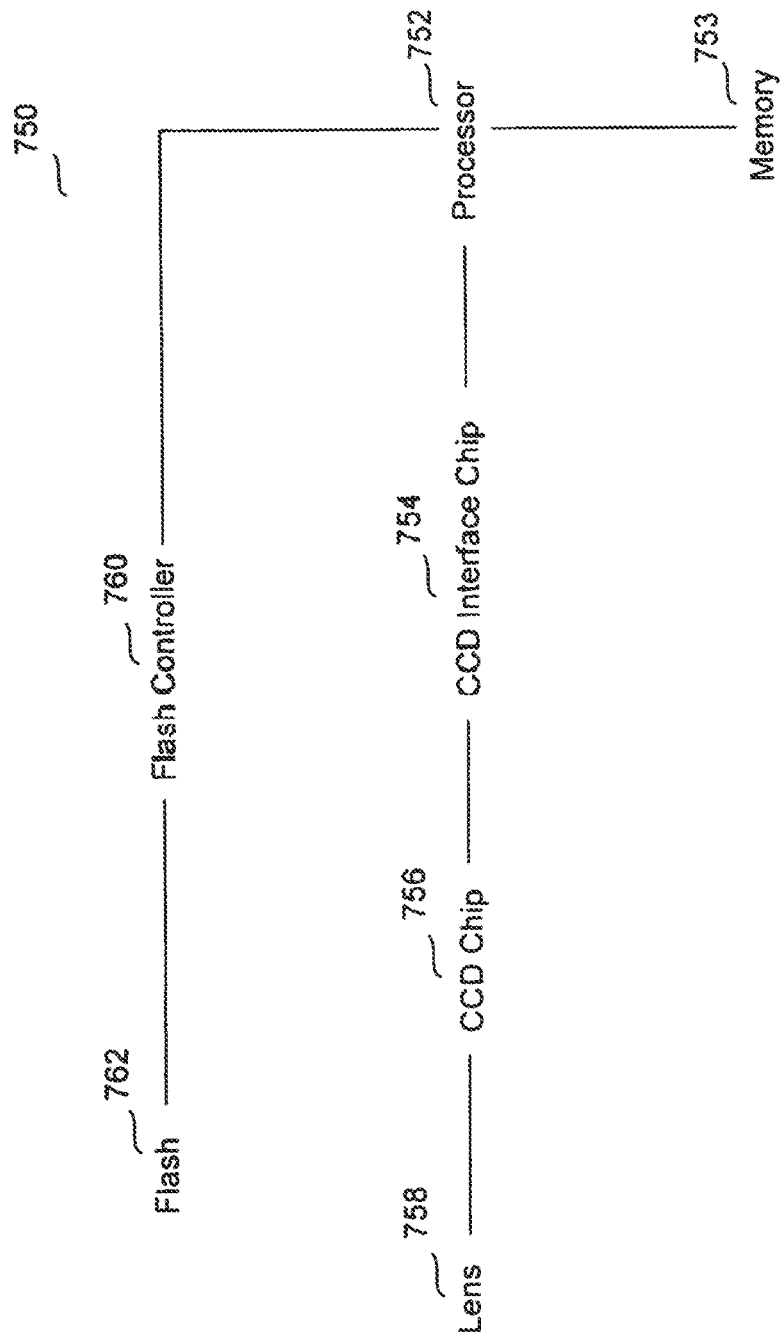
FIG. 14 shows some of the electrical components for capturing images with a pair of glasses according to an embodiment of the present invention.

FIG. 14 shows one embodiment of electrical components in a pair of glasses with image capturing capabilities. A processor 752 is coupled to a CCD interface chip 754 and then to a CCD chip 756. Images focused by a lens 758 are captured and collected by the CCD chip. In another embodiment, there is also be a flash controller 760 connected to the processor 752 to control a flash 762.

In one embodiment, a number of pixels of the CCD chip 756 are used as light sensors. The pixels can be used to adjust the sensitivity of the CCD chip 756 based on the amount of ambient light. For example, if the outside environment is dim, it would take a longer period of time to collect enough charges by the CCD chip 756 to re-create the image. This implies that the integration time of the CCD chip 756 should increase.

In yet another embodiment, the camera can pertain to a video camera. The capacity of the memory 753 increases so as to store the video images.

In one embodiment, the glasses do not offer adjustment on the image distance. The CCD chip 756 can be located, for example, at the focal point of the lens 758. In another embodiment, there is an image distance control knob. For example, a mechanical lever can be pre-programmed or pre-set to move the lens to one or more different positions. One position can be for close-up shots, such as objects from 2 to 4 ft, and another for scenic or vista images, such as objects greater than 6 ft.

Depending on the embodiment, electrical components of a camera can be in a pair of glasses, and/or a base tethered to the glasses, and/or a portable device tethered to the glasses or to the base. For example, the memory 753 can be in the base tethered to the glasses.

The location of the lens 758 can vary depending on the embodiment. In one embodiment, referring to FIG. 1, one location is at the bridge of the glasses, with the lens of the camera facing forward. In this situation, what the user sees is substantially what the captured image would be. In other words, in a general sense, what the user sees is what the user gets. With such an embodiment, it is relatively easy for a user to take pictures, hands-free. In another embodiment, another location for the lens 758 are at a side portion adjacent to a lens holder, before the joint of the corresponding temple, such as at 116 in FIG. 1. Again, the lens of the camera faces forward. Some of the electrical components of the camera can be in that location, and other components in the temple 104. These components are electrically connected through one of the joints, such as with a flexible pc board. In yet another embodiment, the lens 758 can face sideways and outwards in a temple of a pair of glasses, towards the left or right side of the user.

Regarding storing the images, in one embodiment, the images are stored locally. One approach to determine which image to store is the first-in-first-out approach. Once the camera is turned on, the camera takes pictures continually in an automatic mode, such as once every few seconds. When the memory becomes full or under other pre-set or pre-programmed condition, the first picture stored will be deleted when the next picture comes in. In another embodiment, the digital content in one picture is compared to the digital content in, for example, the fifth picture further down. If the difference between the two is not more than a pre-set threshold, the four pictures in between will be deleted. One approach to determine the difference is by comparing the total charges collected by the CCD chip for the two images. If the two sets of charges do not differ by more than a certain threshold, the images in between would be deleted.

The images captured can also be stored at a remote site. For example, the glasses can upload the images to a computer, wirelessly or through a wired connection from a connector at the glasses.

Figure 15:
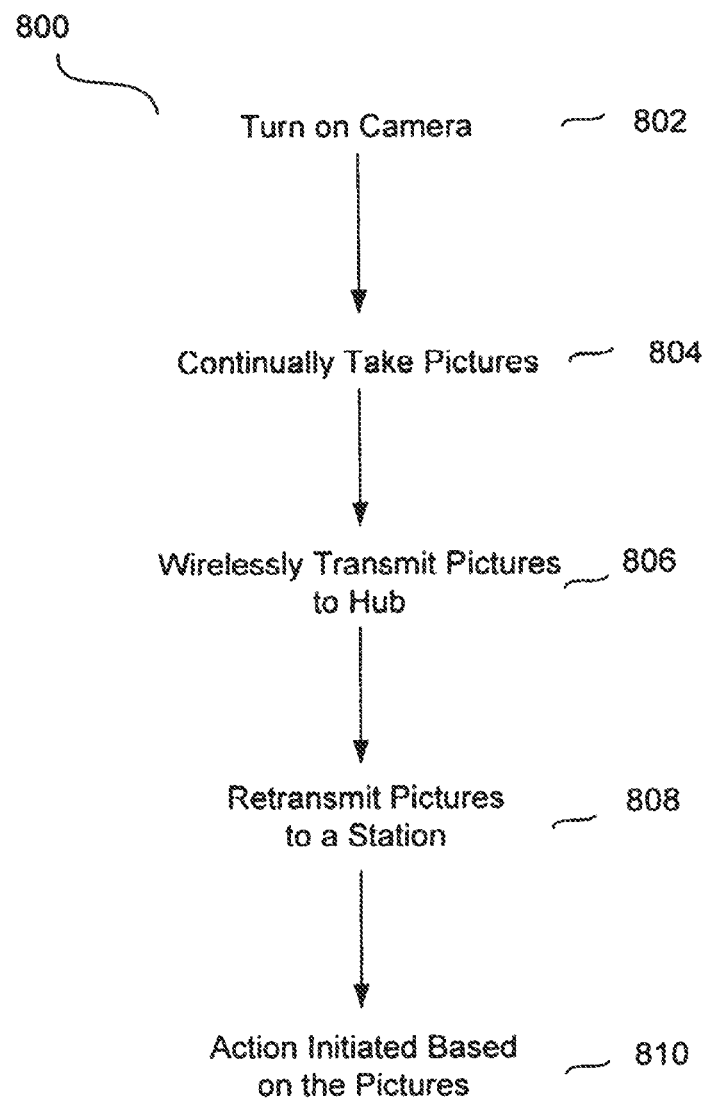
FIG. 15 shows an operation of taking actions based on images captured with a pair of glasses with wireless transceiver capability according to one embodiment of the invention.

FIG. 15 shows an operation 800 of taking certain actions based on images captured by a pair of glasses with a wireless transceiver, according to one embodiment of the invention. This operation can be used by a police officer on patrol. Before the officer gets out of his patrol vehicle to confront a suspect, the officer can inform the station. At that point, the camera is turned on 802.

There can be different approaches to turn on the camera. In one embodiment, an operator at the station can remind the officer to turn on the camera. Or, the operator can remotely turn on the camera. In yet another embodiment, the camera can be automatically turned on under certain condition. One such condition is that if the camera is out of the patrol vehicle, the camera is automatically turned on. With the glasses having the capability to wirelessly communicate with the patrol vehicle, one method to detect if the glasses are out of the patrol vehicle is based on the wireless signal strength of the glasses. The patrol vehicle can detect the signal strength of the wireless signals, which depends on the distance between glasses and the vehicle. A threshold can be set. If the signal strength is below the preset threshold, the glasses would be assumed to be out of the car, and the camera would be automatically turned on.

After the camera is turned on 802, the glasses start to continually take 804 pictures, such as once every few seconds. The pictures taken are automatically transmitted back 806 to the patrol vehicle in a wireless manner. In this situation, the patrol vehicle serves as a hub, which stores the pictures. Then, the hub re-transmits 808 the pictures back to the station. Note that the pictures can be compressed by standard algorithms before they are transmitted. This compression mechanism can be performed by a computer in the patrol vehicle. When the station gets the pictures, they are de-compressed before being viewed, such as by the operator. The pictures enable the operator at the station to see what the officer is confronting. This effectively allows the operator at the station to perform real-time monitoring of or for the officer. If it is a high risk situation, the operator can quickly react 810, such as by dispatching additional support for the officer. In one embodiment, the glasses can include not only a camera but also a microphone for audio pickup, such as sounds from the officer, suspect, witness or environmental sounds (such as door opening, gun shot, etc.).

Regarding ownership of the glasses, the user can own the glasses. In one embodiment, the user leases the glasses from a provider. For example, the user leases a ski goggle with a camera. After the user turns on the camera, as the user skis, the goggle automatically takes pictures. Later, the user can return the goggle to the provider or a kiosk, where the pictures can be retrieved and/or stored. Alternatively, the goggle can include a wireless transceiver and the images could be uploaded continually or automatically to the provider or the kiosk via a wireless network. The provider or the kiosk can transmit the images to a website, such as a website associated with the user. In another embodiment, the user picks up hardcopies of the images, e.g., a CD with the images or a DVD with the video, from the provider or the kiosk.

In one embodiment, the glasses allow the user to enter his identification. This can be done, for example, through a control knob at the glasses. Such identification is then linked to the images. Based on the identification, the user can return to the provider or kiosk at a subsequent time to pick up the images previously left behind.

Figure 16:
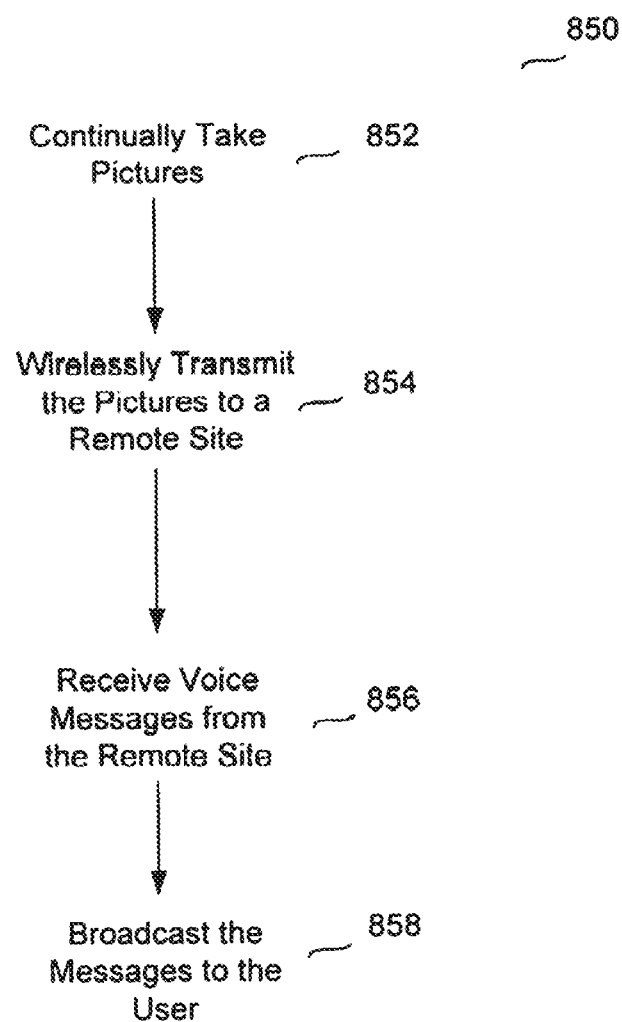
FIG. 16 shows an operation to provide messages to a user based on images captured by a pair of glasses according to an embodiment of the present invention.

In yet another embodiment, the pair of glasses with a camera also has a speaker and a wireless transceiver. It can be used to remotely control or direct the user wearing the glasses. FIG. 16 shows one such operation 850 according to one embodiment.

To illustrate the operation 850, assume that the user is a paramedic helping a patient. The glasses continually take pictures 852 of objects directly in front of the paramedic, such as images around four feet away from the eyes of the paramedic. The pictures are wirelessly transmitted 854 to a remote site, such as a hospital, to be viewed by a doctor. Again, this transmission can be a two-step process. For example, pictures can be transmitted to the paramedic's ambulance, which can then re-transmit to the remote site. The first transmission from the glasses to the ambulance can be through a low-power, short-range, broadband, wireless transmission protocol. The second transmission from the ambulance to the hospital can be through a much longer-range, higher power, broadband, wireless transmission protocol. Again, compression and de-compression techniques can be used to enhance the rate of transmission by reducing the amount of data to be transmitted.

Based on the images, the doctor sends out voice messages to the paramedic. These messages are wirelessly transmitted to and received 856 by the glasses. The speaker in the glasses outputs 858 the messages to the paramedic.

In another embodiment, the glasses also have a microphone, which allows the paramedic to communicate directly with the doctor also.

In one embodiment, the glasses can take pictures and can be a multimedia asset player. Pictures and the multimedia assets can share the same memory storage device. In this situation, the capacity for the multimedia assets and pictures can be interrelated. For example, a user can take more pictures if there are less multimedia assets, such as fewer songs in the storage device.

A number of embodiments have been described regarding electrical components in the temples of glasses. The locations selected are for illustration purposes. In other embodiments, some of the components are embedded fully or partially in other areas of the glasses, such as the lens holders or the bridges of the glasses. For example, there are glasses where there are shields at the edges of the lens holders of the glasses. These shields can wrap around, or better conform to the profile of, the face of the wearer. There can be transparent or translucent windows on these shields also. The shields are not limited to be in primary frames. They can be in, for example, fit-over glasses, auxiliary frames or safety glasses. To illustrate, in fit-over glasses, such shields can go over or cover at least a portion of the primary frames. One or more electrical components can be in such shields. In still another embodiment, one or more electrical components can be in a strap tied to the corresponding eyewear, such as a sports strap tied to the corresponding sports eyewear. For example, the one or more electrical components can be at least partially embedded in or attached to a strap. As one particular example, an audio player or wireless communication module can be at least partially embedded in or attached to the strap. The strap may also provide electrical conductors (that are attached or internal to the strap). Such electrical conductors can be coupled to a speaker to produce audio output to the speaker, or can be coupled to a microphone to receive audio input from the microphone. The speaker and/or microphone can also be attached to or integral with the strap.

Note that in one embodiment, a pair of glasses does not have to include lenses. Also, a number of embodiments have been described with a pair of glasses tethered to a base. In one embodiment, a pair of glasses includes a base and a cord connecting the base to the glasses.

Figure 17A:
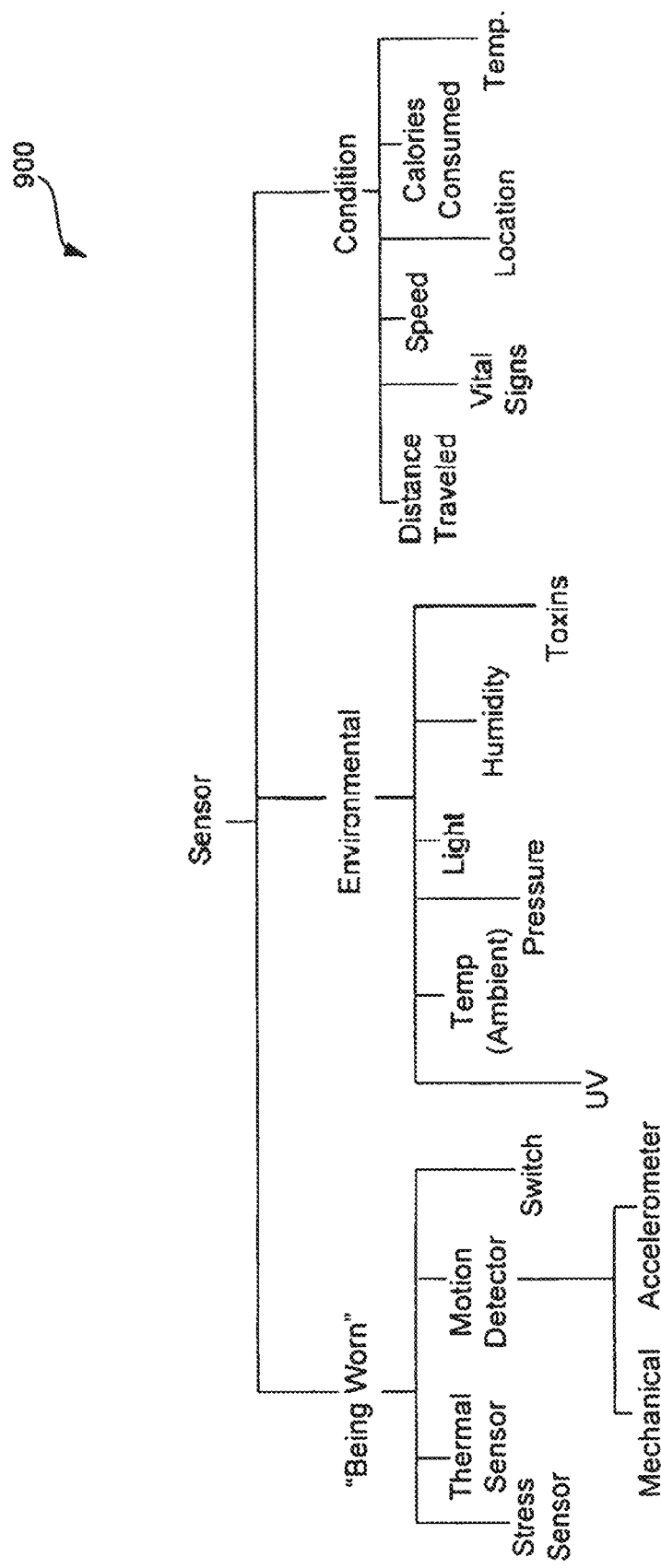
FIG. 17A is a chart that depicts examples of sensors in a pair of glasses according to different embodiments of the present invention.

In yet another embodiment, a pair of glasses also includes a sensor. FIG. 17A is a chart 900 that depicts examples of sensors in the glasses.

In one embodiment, the sensor is a "being worn" sensor. The "being worn" sensor indicates whether the glasses are being worn by its user. The "being worn" operation can be performed using, for example, a thermal sensor, a motion detector, a stress sensor or a switch.

In one embodiment, a motion detector is used as a "being worn" sensor. A threshold can be set, such that if the amount of motion exceeds the threshold, the eyewear is assumed to be worn. The motion detector can, for example, be achieved by a mechanical means or an accelerometer.

In another embodiment, the "being worn" sensor includes two thermal sensors. One sensor can be at approximately the middle of a temple, such as in a region that touches the head of the user wearing the glasses. The other sensor can be at the end of the temple, close to its hinge. If the temperature differential between the two sensors is beyond a certain preset value, the eyewear would be assumed to be worn. The differential is presumed to be caused by a person wearing the pair of glasses.

In yet another embodiment, the "being worn" sensor includes a stress sensor at the hinge of the temple. The assumption is that when the eyewear is worn, the hinge is typically slightly stretched because typically, the width of the head of the user is slightly wider than the width between the temples when the two temples are in the extended positions. If the value of the stress sensor is beyond a certain preset value, the glasses would be assumed to be worn.

In a further embodiment, the "being worn" sensor can be a switch. For example, at the hinge between a temple and its corresponding lens holder, there is a switch. When that temple is fully extended outwards, the switch is turned on. The switch can be a pin. When the temple is fully extended outwards, the pin is pressed. When both temples are fully extended outwards, in one embodiment, the glasses would be assumed to be worn by the user.

In one embodiment, another type of sensor is an environmental sensor. The environmental sensor can sense environmental conditions, such as one or more of ultraviolet radiation, temperature (e.g., ambient temperature), pressure, light, humidity and toxins (e.g., chemicals, radiation, etc.).

In another embodiment, another type of sensor is a condition sensor. The condition sensor can sense the conditions of the user of the glasses. Examples of condition sensors include sensing one or more of distance traveled, location, speed, calories consumed, temperature and vital signs associated with the user of the glasses. The distance traveled could represent the horizontal distance traveled or the vertical distance (i.e. elevation) traveled. The speed can be the rate of movement along the horizontal distance traveled and/or the vertical distance. In yet another embodiment, the condition sensor can sense the emotional conditions of the user of the glasses. In one embodiment, a condition sensor can sense whether at least one of the user's eyes is open or not. The condition sensor can sense if the user is crying. The condition sensor can sense the direction the user is looking.

The sensors can be provided in a redundant or fault-tolerant manner. For example, sensors can come in pairs in the glasses. When one malfunctions, the other one will take over its operation. In another embodiment, the sensor information can be processed in a differential manner to examine changes to the sensor information. The sensors can by powered by a battery, solar energy, or kinetic energy. For reduced power consumption, the sensors can remain in a low-power state unless data is being acquired by the sensors. In yet another embodiment, two or more of the auxiliary sensors can communicate with one another (wired or wirelessly) to exchange data or control information.

A number of embodiments have been described regarding one or more electrical components at least partially embedded in a pair of glasses. In one embodiment, one or more electrical components are at least partially embedded in a temple tip of a pair of glasses. Temple tips are particularly common for wire or metal frames. The pair of glasses has a first and a second lens holders for receiving lenses. Each of the lens holders has a first side and a second side. The pair of glasses has a bridge element that couples the first side of the first lens holder to the second side of the second lens holder. The pair of glasses also includes a first temple and a second temple. The first temple is pivotally secured to the second side of the first lens holder through a joint, while the second temple is pivotally secured to the first side of the second lens holder through another joint. A temple typically has two ends, a first end and a second end. The first end can be the end that is pivotally secured to a lens holder through a joint, and the second end can be the other end of the temple. It is not uncommon that a temple includes a main body and an enclosure that grabs onto the main body of the temple. The second end is typically where the enclosure grabs onto the main body. The enclosure can be made of a different material than the main body of the temple. In one embodiment, such an enclosure is a temple tip, and there is an electrical component, partially or fully, embedded in the tip. There can also be a connector, such as the connector 300 shown in FIG. 5, at the temple tip. In another embodiment, the temple tip can include a female connector, which can be similar to the female connector 310 shown in FIG. 6B. As the temple tip grabs onto the main body of the temple, the female connector can make electrical contact with a male connector at the main body of the temple. Typically, particularly before a pair of glasses has been extensively worn, the temple tip can be removed and re-inserted back on to the main body of the temple without a lot of difficulties. Such a temple tip can be an after-market component, with different temple tips having different electrical components to serve different functions.

Figure 17B:
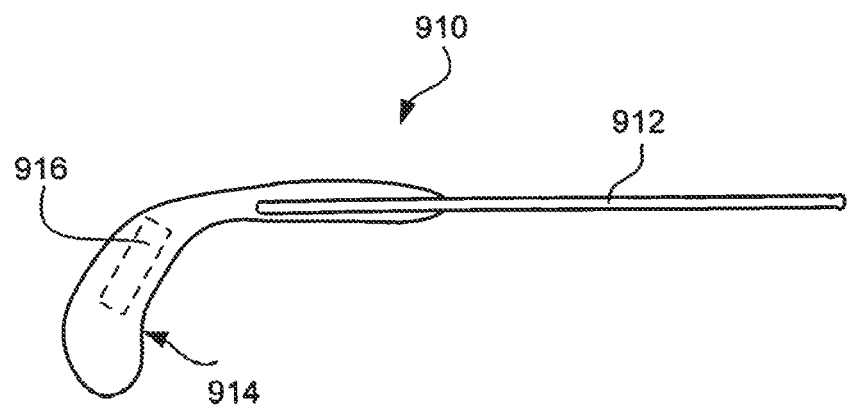
FIG. 17B is a diagram of a temple arrangement according to one embodiment of the invention.

FIG. 17B is a diagram of a temple arrangement 910 according to one embodiment of the invention. In this arrangement, a temple tip is not considered as a part of the temple. The temple arrangement 910 includes a temple 912 that is associated with a pair of eyeglasses. Over the end of the temple 912 that is opposite the associated lens holder, a temple tip 914 is provided. The temple tip 914 can be held to the temple 912 by frictional forces and/or adhesive. The temple tip 914 includes at least one electrical component 916 that is at least partially embedded therein. The temple tip 914 can be manufactured and delivered to resellers or retailers as such. Alternatively, the temple tip 914 can be separately provided as an optional replacement temple tip for an existing temple tip. Hence, as after manufacture, upgrade to the eyewear can be had through replacing the existing temple tip with the replacement temple tip. The colors and shapes of the temple tip 914 can vary widely. In the after manufacturing environment, the reseller or retailer can be provided with a range of different colors and shapes so that a user can receive a replacement tip that reasonably matches the color and shape of the temple or that provides an altered appearance as desired by the user.

Figures 17C, 17D:
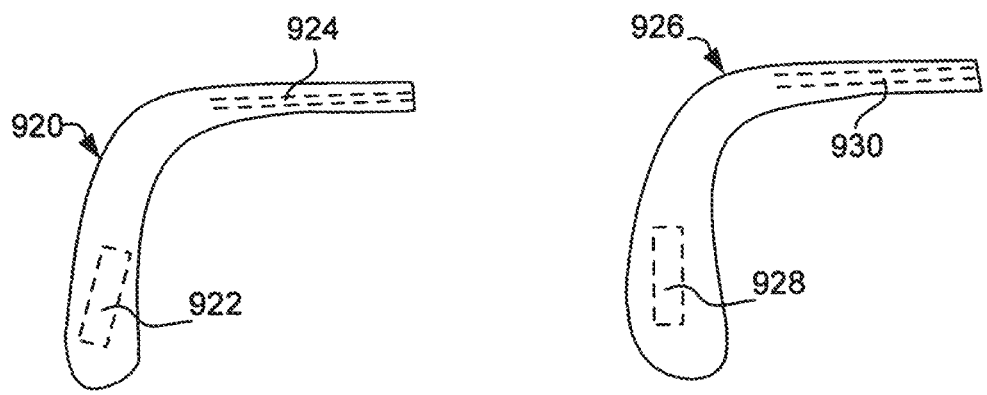
FIG. 17C is a diagram of a cover that at least partially covers a temple according to one embodiment of the invention.
FIG. 17D is a diagram of a fit-over temple that at least partially fits over a temple according to one embodiment of the invention.

Besides a replacement temple tip such as illustrated in FIG. 17B, a temple tip can also be effectively modified by a fit-over temple or temple cover. FIG. 17C is a diagram of a temple cover 920 that at least partially covers a temple (e.g., temple 912) according to one embodiment of the invention. As another example, the temple cover 920 can be a fabric or other material, such as a sock or sleeve, that slides over and at least partially covers a temple tip. The temple cover 920 can include at one electrical component 922 that is either attached thereto or at least partially embedded therein. The temple cover 920 can also include an opening 924 so as to received a temple or a temple tip. The temple cover 920 can be held to a temple by frictional forces and/or adhesive. FIG. 17D is a diagram of a fit-over temple 926 that at least partially fits over a temple according to one embodiment of the invention. For example, the fit-over temple 926 can at least partial fit-over a temple tip. The fit-over temple 926 includes at one electrical component 928 that is either attached thereto or at least partially embedded therein. The fit-over temple 926 can also include an opening 930 so as to receive a temple. The fit-over temple 926 can be held to a temple by frictional forces and/or adhesive. As an example, the fit-over temple 926 can be plastic or other material. The colors and shapes of the fit-over temple 926 can vary widely. In the after manufacturing environment, the reseller or retailer can be provided with a range of different colors and shapes so that a user can receive a replacement temple cover or fit-over temple that reasonably matches the color and shape of the temple or that provides an altered appearance as desired by the user.

In one embodiment, a fit-over temple or temple cover according to the invention can further include a connector or cable to facilitate electrical connection with the at least one electrical component that is either attached to a temple or a temple tip or at least partially embedded therein.

In one embodiment, an electrical component is a component of an electrical circuit, and the electrical circuit is for performing at least a desired, intended or predetermined function.

A number of embodiments have been described above for an eyeglass frame, i.e., primary frame, are also applicable to an auxiliary frame. An auxiliary frame can attach to a primary frame through different techniques, such as using clips. Another technique to attach an auxiliary frame to a primary frame is by way of magnets. Examples of using magnets as an attachment technique can be found, for example, in U.S. Pat. No. 6,012,811, entitled, "EYEGLASS FRAMES WITH MAGNETS AT BRIDGES FOR ATTACHMENT."

A number of embodiments have been described where one or more electrical components are at least partially embedded in a pair of glasses. In yet another embodiment, the one or more electrical components are at least partially embedded in an eye mask.

Figure 18:
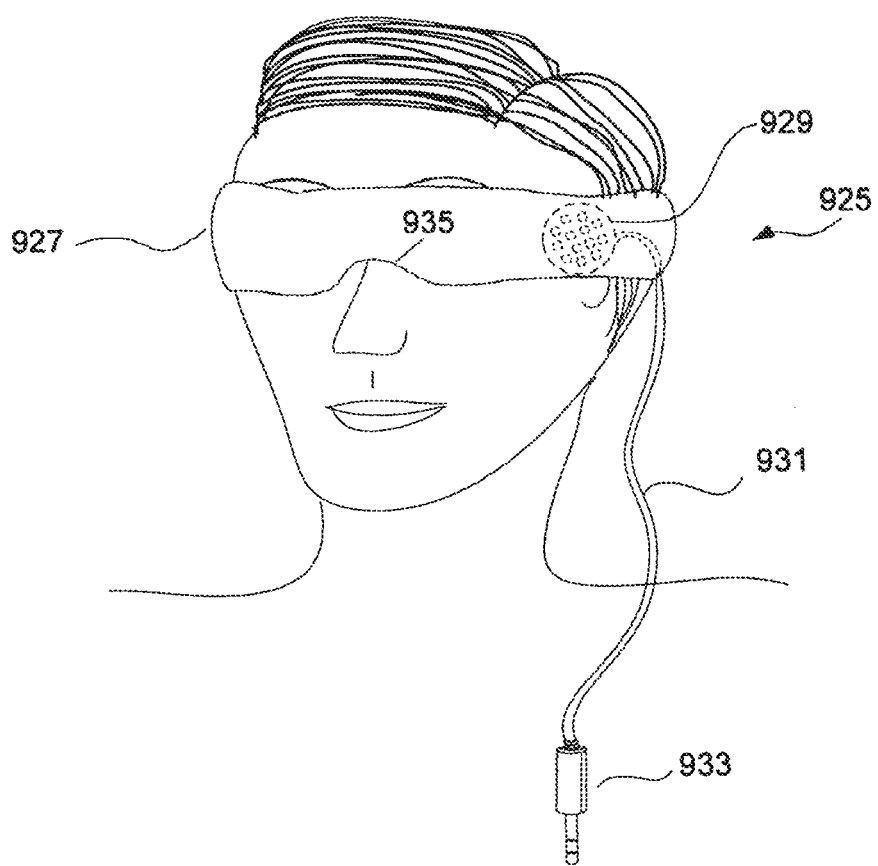
FIG. 18 shows an embodiment including an eye mask according to the invention.

FIG. 18 shows one embodiment 925 where one or more electrical components are at least partially embedded in an eye mask 927. The eye mask 927 includes a piece of fabric that is opaque so that when the mask is worn, the mask wraps around the eyes to block light from entering into the eyes of the user.

The embodiment 925 includes a wrapping mechanism to hold the fabric onto the head of a user so that when the mask is worn by the user, the mechanism allows the fabric to have a relatively tight and comfortable fit over the face of the user. In one approach the wrapping mechanism is achieved with the fabric in the shape of a band and having a certain degree of elasticity. When the mask is worn by the user, the elasticity of the fabric allows the mask to establish a relatively tight fit over the face of the user. In another example, the fabric is a long piece of material. The wrapping mechanism includes a clip or Velcro at the two ends of the piece of material to tie the two ends together. In another example, the wrapping mechanism includes two elastic pieces of elastic materials at the two ends of the fabric. To wear the mask, each elastic piece of material goes over one of the ears of the user so that the fabric establishes a relatively tight fit over the face of the user. In yet another embodiment, the mask 927 includes a notch 935 to accommodate the nose of the user. In another embodiment, there can be additional padding in the vicinity of the one or more electrical components so that if an electrical component is pressed against the user, the padding serves as a buffer or cushion.

In one embodiment, a speaker 929 can be at least partially embedded in the mask 927, and can be positioned close to and facing one of the ears of the user. The speaker 929, through an electrical connector, is electrically connected to a cable 931. The cable 931 can also have a connector 933 at its distal end. The connector 933 can be plugged into another device, such as a MP3 player or a CD player. After putting on the mask, with the connector 933 plugged into the another device, the user would be able to hear, for example, audio sounds such as music. The eyemask 925 can be applied to different areas. For example, the user can be on a plane, and would like to rest. The user can put on the eyemask 925, and plug the connector 933 into a media outlet at an armrest of her seat in the plane. Thus, the user can enjoy music while taking a rest. The embodiment 925 could also include a plurality of speakers, such as one for each of the user's ears.

In another embodiment, the eyemask 927 includes the speaker 929 and a battery that is electrically connected to the speaker 929. The battery can be in a pocket on the eyemask and can be replaceable. The battery can also be a rechargeable battery, such as a lithium-ion battery, and there is a connector at least partially embedded in the eyemask. The connector can be used to recharge the battery.

Figure 19:
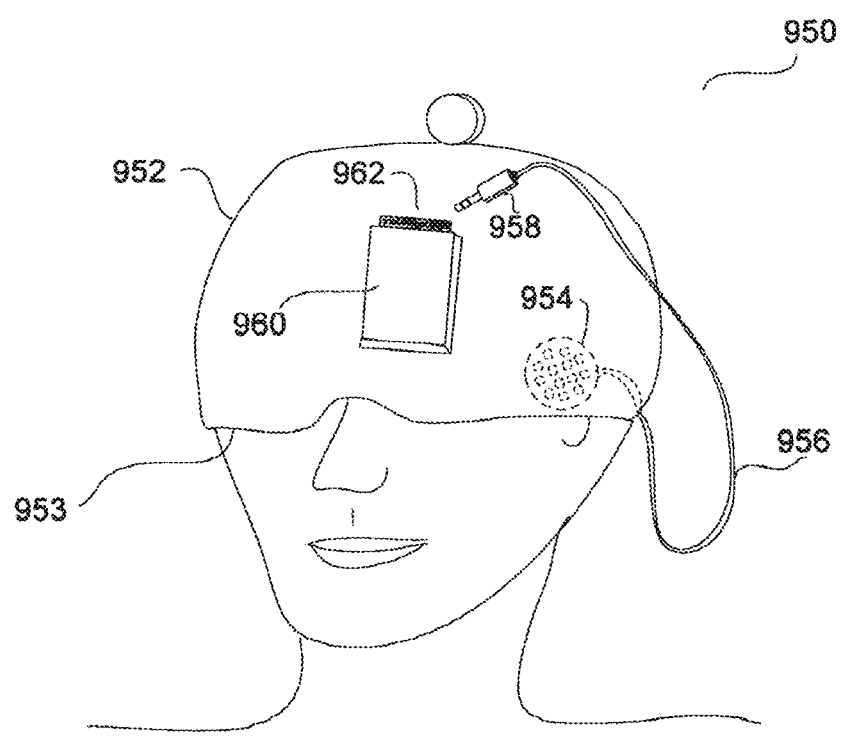
FIG. 19 shows an embodiment including a night cap according to the invention.

FIG. 19 shows another embodiment 950 where one or more electrical components are at least partially embedded in a night cap 952. In one embodiment, the cap 952 is at least partially made of fabric. In another embodiment, the cap 952 is entirely made of fabric. The cap includes a wrapping mechanism. When the cap is worn, the wrapping mechanism holds the cap onto the head of the user, and allows the cap to have a relatively tight and comfortable fit over the head of the user. Again the wrapping mechanism can be an elastic band at the base 963 of the cap 952. Or, the wrapping mechanism can include clips or Velcro as previously described.

The cap can include at least one speaker 954, which is at least partially embedded in the cap 952. When the cap 952 is worn by a user, the speaker 954 is positioned close to and facing one of the ears of the user. The speaker 954 can, for example, be electrically connected through a connector to a device 962 in a pocket 960 on the cap 952. The electrical connection can be through a cable 956 external to the cap 952. The cable 956 also can have a connector 958 to be plugged into the device 962. In another embodiment, the cable 956 is embedded in the cap. The device 962 can be an asset player, such as a MP3 player, with a battery. Through the connector 958, audio signals from the device 962 can be received by the speaker 954 and heard by the user. There can be one or more additional pockets on the night cap for one or more additional electrical components. When worn, the night cap does not have to cover the eyes of the user. In yet another embodiment, when worn, the night cap further covers the eyes of the user, as shown in FIG. 19. In one embodiment, the embodiment 950 further includes padding in the vicinity of an electrical component to serve as a buffer or cushion between the user and the electrical component.

A number of embodiments have been described involving a speaker in an eyemask or a night cap. In one embodiment, the audio output from the speaker can serve to cancel the environmental sounds in the vicinity of the user. For example, if the user is on an airplane, the surrounding environmental sound has a relatively high level of white noise. This white noise can be detected by a pickup device and cancelled by noise cancellation circuitry provided within the eyemask or night cap. Namely, the audio output from the speaker serves to cancel the white noise of the user's environment. In another embodiment, the electrical component embedded or partially embedded is not a speaker, but can be a sensor, which can sense a physiological function of the user.

Figure 20A:
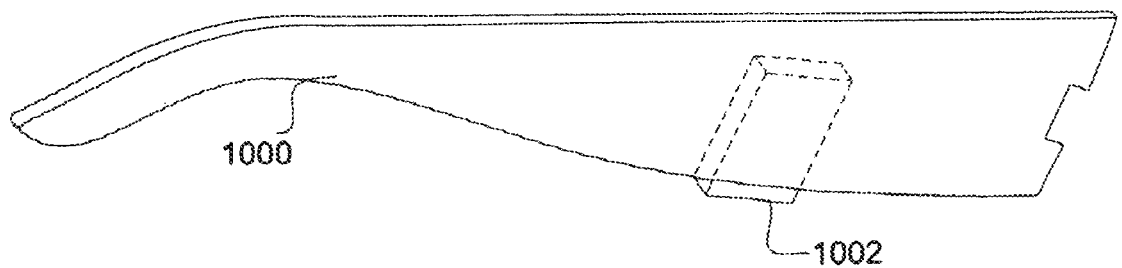
FIG. 20A is a diagram illustrating a temple having a slot for receiving a removable electronic device according to one embodiment of the invention
Figure 20B:
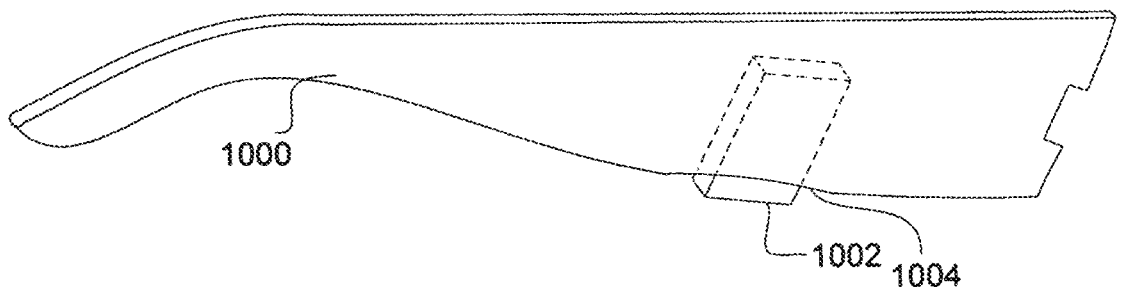
FIG. 20B is a diagram illustrating the temple having a recessed lower portion according to another embodiment of the invention.

FIG. 20A is a diagram illustrating a temple 1000 having a slot for receiving a removable electronic device 1002 according to one embodiment of the invention. In one example, the removable electronic device 1002 can be a memory storage device, sometimes referred to as a memory card. As shown in FIG. 20A, the removable electronic device 1002 is inserted into the slot. Although the slot could be electrically non-functional, typically the slot provides an avenue for the removable electronic device 1002 to be physically and electrically connected to electrical circuitry within the temple 1000 or elsewhere within the eyeglass frame. FIG. 20B is a diagram illustrating the temple 1000 having a recessed lower portion 1004 according to another embodiment of the invention. The recessed lower portion 1004 facilitates the insertion and removal of the removable electronic device 1002. In either embodiment, the removable electronic device can be manually inserted and removed or can use more complicated mechanical mechanisms to assist with the insertion and removal (e.g., spring-based push and release structure).

Figure 21A:
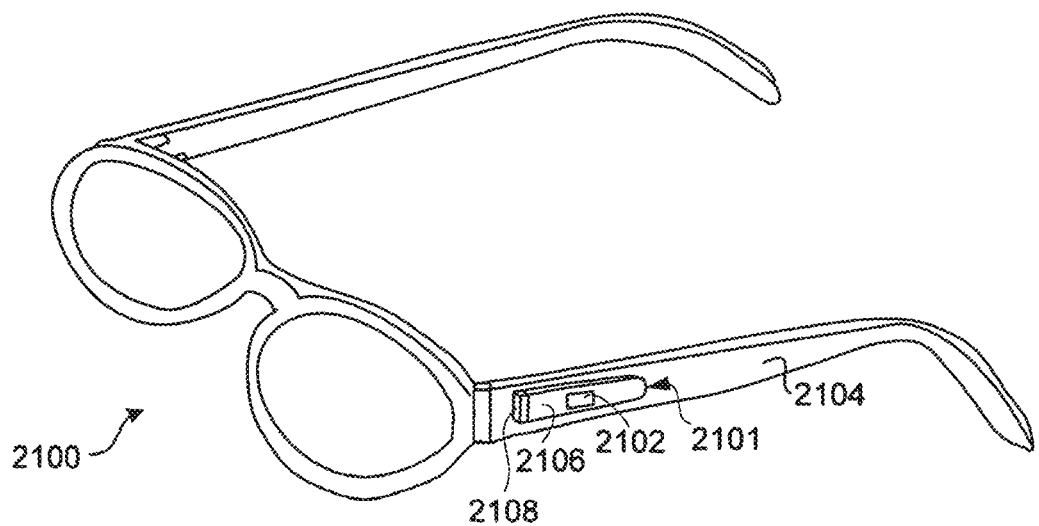
FIGS. 21A and 21B are diagrams illustrating a pair of glasses having a camera coupled thereto, according to one embodiment.
Figure 21B:
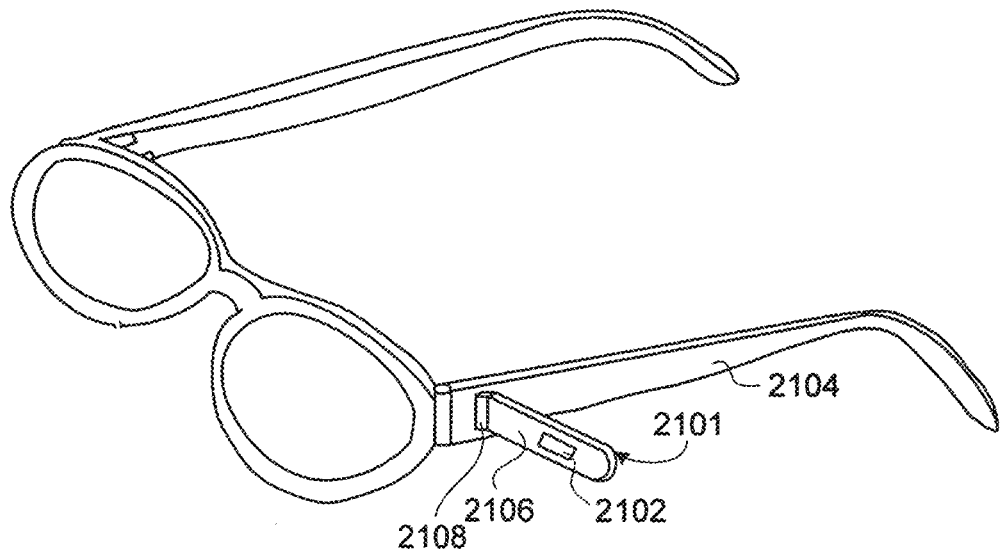

FIGS. 21A and 21B are diagrams illustrating a pair of glasses 2100 having a camera 2101 coupled thereto, according to one embodiment. The camera includes an image sensor 2102 and a camera housing 2106 (also referred to as a camera support arm). In this embodiment, the camera 2101 is rotatably coupled to an exterior surface of a temple 2104 of the pair of glasses 2100. The camera support arm 2106 is attached to the temple 2104. The camera support arm 2106 can couple to the temple 2104 using a hinge 2108. In one implementation, the hinge 2108 can use a spring or cam mechanism so that the camera support arm 2106 is held either against the temple 2104 when not in use or held in an open or extended position when in use. FIG. 21A illustrates one position of the camera support arm 2106 when the camera 2101 is not in use. FIG. 21B illustrates one position of the camera support arm 2106 when the camera 2101 is in use. The presence of the camera 2101 with the pair of eyeglasses 2100 enables a wearer of the pair of eyeglasses 2100 to take pictures of what the wearer is looking at. It should be noted that other supporting circuitry such as data storage for pictures, switches, battery, and electronics for the camera 2101 can be in the temple 2104, in the camera support arm 2106, elsewhere in the pair of glasses 2100, or even tethered thereto. However, in one implementation, the camera 2101 is completely self-contained in the camera housing 2106. In one embodiment, the hinge 2108 can also serve as a switch to turn the image sensor 2102 on or off.

In one implementation, to improve overall appearance of the pair of glasses 2100, the temple 2100 can provide a recess for receiving the camera support arm 2106 when the camera is not being utilized. Such may improve the aesthetic appearance of the pair of glasses 2100.

In another implementation, the pair of glasses 2100 can further provide a viewfinder. The viewfinder can assist the user in directing the image sensor 2102 towards whenever the user desired to photograph. The viewfinder can be a separate apparatus that is extended by user action or can be a viewfinder that is visually present or presented on one of the lenses. In one example, the viewfinder can be an extendable viewer through which the user can look through to determine the field of reference of the image sensor 2102. The viewfinder can be extendible from either of the temples, such as in a telescoping, sliding or flipping action. Additionally, when the camera support arm 2106 is extended, a viewfinder can be automatically initiated. For example, indicators on one of the lens can be visually presented, such as through optical projection from one or more light sources. In another embodiment, the viewfinder can be always present, such as with indicators on one of the lens of the pair of glasses 2100. The indicators can be a few faint dots to define an area (e.g., a square) on the lens.

In one embodiment, the camera support arm (camera housing) 2106 is removably coupled to the hinge 2108. As such, the camera 2101 can be removed from or attached to the pair of glasses 2100. Indeed, the camera support arm (camera housing) 2106 can be a camera body that houses electronics for the camera 2101. In such case, the camera 2101 can operate as a camera apart from the pair of glasses 2100.

In one implementation, the camera support arm 2106 has a connector and the hinge 2108 has a counterpart connector. In one example, the connectors are peripheral bus connectors, such as USB connectors. In such case, the camera support arm 2106 can be attached and removed from the pair of glasses 2100. Such a connection via the connectors can be electrically functional or non-functional. If functional, electrical components in the pair of glasses 2100 can be electrically connected to electrical components in the camera 2101.

Still further, in one embodiment, the connector at the end of the hinge 2108 enables connection of a variety of different peripheral devices to the pair of glasses 2100. For example, the different peripheral devices (portable electronic devices) can be the camera, a memory card, or a media player. In one embodiment, electrical components integral with the pair of glasses 2100 can be shared by the different peripheral components. The hinge 2108 is not necessary in other embodiments, see FIGS. 8F-8H, where a connector is attached or integral with a temple of a pair of glasses. If desired, the camera 2101 or other peripheral devices can include in its structure a hinge or other mechanism to permit positioning the camera or other peripheral devices.

In still another embodiment, an angled or hinged adapter can be inserted between a connector attached to the pair of glasses 2100 and a connector of the camera 2101 or other peripheral devices. The adapter can be electrically functional or non-functional.

Figure 22:
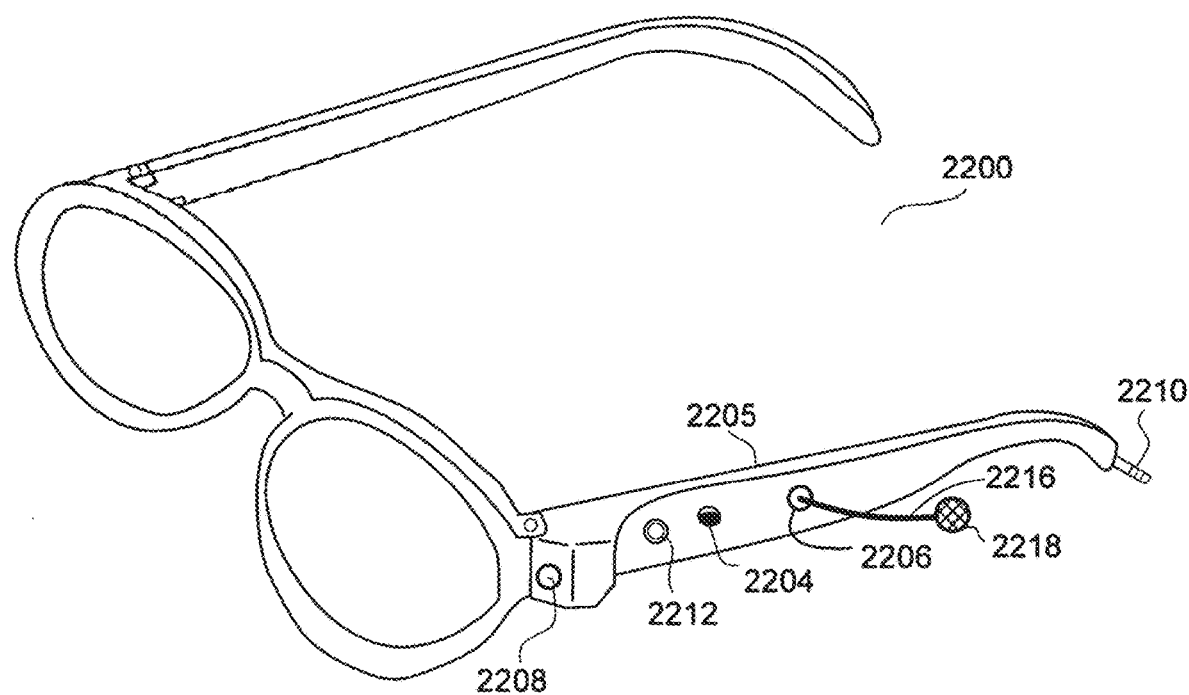
FIG. 22 is a diagram of a pair of glasses having a camera according to one embodiment of the invention.

In yet in another embodiment, a pair of glasses functioning as a headset with a speaker and a microphone further includes a camera. FIG. 22 is a diagram of a pair of glasses 2200 having a camera according to one embodiment of the invention. The glasses 2200 include a temple 2205 that has a microphone 2204, a speaker 2206 and a camera 2208 with a connector 2210. The connector 2210 is for connecting, for example, to another electronic device that provides at least one of data or information transfer capabilities or a power source for the glasses.

In one embodiment, the camera 2208 is a digital camera with an on/off switch 2212. For example, the camera 2208 is a CCD camera including a CCD controller coupled to a CCD chip to capture images, a CCD memory device and a lens.

In one embodiment, with the connector 2210 connected to another electronic device (e.g., a portable electronic device), when the switch 2212 is pushed on, the CCD chip takes a picture. The charges in the CCD chip are digitized and transmitted through the connector 2210 to the other electronic device, under the management of the controller. At least some of the charges can be temporarily stored in the CCD memory device, for example, to accommodate the differences in speed in taking pictures and sending the pictures to the portable device through the connector. In this embodiment, images can be stored at the other electronic device. In another embodiment, the glasses can include sufficient data storage capabilities to store the pictures, at least until transferred to another electronic device.

In one embodiment, the glasses do not offer focusing capability. The CCD chip can be located, for example, at the focal point of the lens. In another embodiment, there is an image distance control knob. For example, a mechanical lever can be pre-programmed or pre-set to move the lens to one or more different positions. In one implementation, there can be just two positions. One position can be for close-up shots and another for distance shots, such as close-up being about 2 ft from the lens and the distant being about 6 ft away; or close-up being about 8 inches away and distant being about 2 ft away.

FIG. 22 shows one embodiment regarding the location of the camera 2208 at the end of the temple or arm 2205 of the glasses 2200 next to the hinge. The lens of the camera faces forward. In this situation, what the user sees is substantially what the captured image would be. In other words, in a general sense, what the user sees through the glasses is what the user gets, without the need for an additional view finder. With such an embodiment, it is relatively easy for a user to take pictures, hands-free, without the need for an additional strap for holding the camera.

The connector 2210 at the end of the glasses 2200 can be, for example, a 4-terminal connector, one for ground, one for power and the other two for transmit and receive signals. In another embodiment, the connector 2210 can be a 3-terminal connector, with the power line and one of the signal lines sharing one terminal.

Regarding the embodiment shown in FIG. 22, the speaker 2206 can be in the glasses, with a tube 2216 and an ear bud 2218, to help bring audio signals to the user. In one embodiment, the tube 2216 can be rotated at its end where it connects to the glasses. In another embodiment, the speaker 2206 can be provided at the ear bud 2218.

In one embodiment, the CCD chip with the CCD memory device and the CCD controller are on the same integrated circuit.

The embodiment shown in FIG. 22 also includes a microphone 2204. In one embodiment, the CCD memory device also stores audio signals from the microphone 2204. For example, the memory device stores a duration of time, such as the last 15 seconds, of audio signals. When the user takes a picture, a duration of time before taking the picture, such as the previous 15 seconds, audio signals can be coupled to the picture. Another duration of time after taking the picture, such as the next 10 seconds, of audio signals can also be coupled to the picture. In one embodiment, the audio picked up can include environmental sounds present at that time. The audio signals or the digitized version of the audio signals can also be transmitted to the other electronic device with the corresponding picture. In the future, if the user wants to view the picture, the audio signals can be played with the picture at the same time. As another example, the user can provide an auditory annotation to the pictures being taken. Here, the user can leave a specific audio message to be associated with the picture. For example, the user might take a picture of his childhood home and record an audio annotation, "This is where I grew up".

In one embodiment, a pair of glasses functions as a headset with a speaker, a microphone and a camera. The pair of glasses can be coupled to another electronic device through a connector of the glasses. Additional electrical components, such as those in the other electronic device, like a portable device, for the glasses can be incorporated in the glasses. For example, the power source can also be in the glasses and the glasses do not have to include a connector. In one embodiment, the glasses include non-volatile memory to store at least a number of pictures. In another embodiment, the glasses further include a connector to receive a memory card, such as a flash memory device. The card can be a standard memory card with a USB connector. Pictures taken can be stored in the removable memory card.

In yet another embodiment for the glasses with a camera, the glasses do not include a speaker or a microphone. The glasses include a temple that has a CCD controller coupled to a CCD chip, a CCD memory device and a lens. The temple also includes an on/off switch with a connector. The connector is for connecting, for example, to a portable device that includes at least a power source for the camera.

In still another embodiment, an auditory feedback by a speaker is provided or coupled to a pair of glasses. For example, a clicking or "snapshot" sound can be output when a picture is taken (such as when a user initiates the picture taking).

Additional disclosure on camera in glasses can be found in U.S. Provisional Application No. 60/583,169, filed on Jun. 22, 2004, which is hereby incorporated by reference.

A number of electrical components have been described. They can be on circuit boards, which can be made of flexible materials. They can be on a substrate. They can also be integrated into one or more integrated circuits.

Figure 23A:
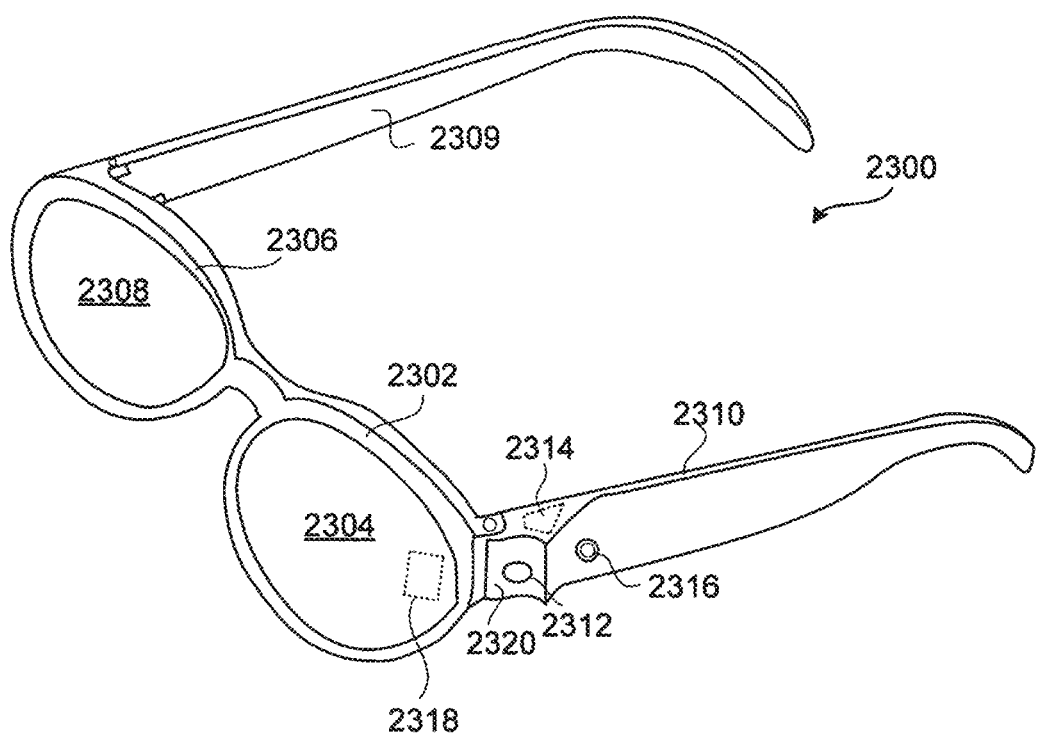
FIG. 23A is a diagram of a pair of glasses having a camera according to one embodiment of the invention.

FIG. 23A is a diagram of a pair of glasses (i.e., eyeglass frame) 2300 having a camera according to one embodiment of the invention. The eyeglass frame 2300 illustrated in FIG. 23A includes a lens holder 2302 holding a lens 2304 and a lens holder 2306 holding a lens 2308. The eyeglass frame 2300 also includes temples 2309 and 2310. In the embodiment shown in FIG. 23A, the temple 2310 includes a camera 2312, supporting electronics 2314 and a switch (e.g., button) 2316. In one embodiment, the camera 2312 includes a CCD chip. The camera 2312 can also include a lens and buffer memory. In one embodiment, the electronics 2314 illustrated in FIG. 23A can be embedded within the temple 2310. The electronics 2314 can include at least a microcontroller (e.g., an image processor), a memory, and a battery. These electronics 2314 can support the camera 2312. The eyeglass frame 2300 can further include various other electrical components. For example, the eyeglass frame 2300 can further include one or more of: a microphone, an earphone, a removable memory, a display, a clock, and a Global Positioning System (GPS). These electrical components can be used in conjunction with the camera 2312 or separately from the camera 2312. The button 2316 enables a wearer of the eyeglass frame 2300 to turn the camera 2312 on/off and/or to cause a picture to be taken (recorded). For example, by pushing the button 2316 for more than a few seconds, the camera will be turned off. However, by pushing and releasing the button 2316, the camera takes a picture.

Still further, in the embodiment of the eyeglass frame 2300 shown in FIG. 23A, the eyeglass frame 2300 further includes a view finder 2318 and an angled surface 2320. Other embodiments of eyeglass frames need not include such features. Nevertheless, the view finder 2318 can assist a wearer (i.e., user) of the eyeglass frame 2300 in understanding the frame of the image (picture) being captured by the camera 2312. In this example, the view finder 2318 is provided on the lens 2304 in a visible, yet non-distracting manner. As shown in FIG. 23A, the view finder 2318 can be positioned such the wearer can direct the image (picture) to be captured. For example, the wearer would orient their head (using the view finder 2318) to direct the camera 2312 towards the desired subject. Also, the angled surface 2320 allows mounting the camera 2312 in an angled manner. As a result, the direction of the camera 2312 is not straight forward but out towards the side. This facilitates the wearer in directing the camera 2312 using a single eye via the lens 2304, and more particularly via the view finder 2318 if provided. The outward angle from straight forward being utilized by the camera 2312 can vary with implementation. For example, the outward angle can be in the range of 10-70 degrees or more particularly in the range of 15-60 degrees, or more particularly in the range of 20-40 degrees from the perpendicular direction of the plane of a front surface of the eyeglass frame 2300. In one embodiment, with the camera positioned at an angle, the lens holder 2302 would not block the field of view of the camera even with the camera being positioned at a distance behind the lens holder 2302.

Although the camera 2312 is provided on the left side of the pair of glasses 2300 as shown in FIG. 23A, it should be understood that the camera could alternatively or additionally be provided on the right side of the glasses.

Figure 23B:
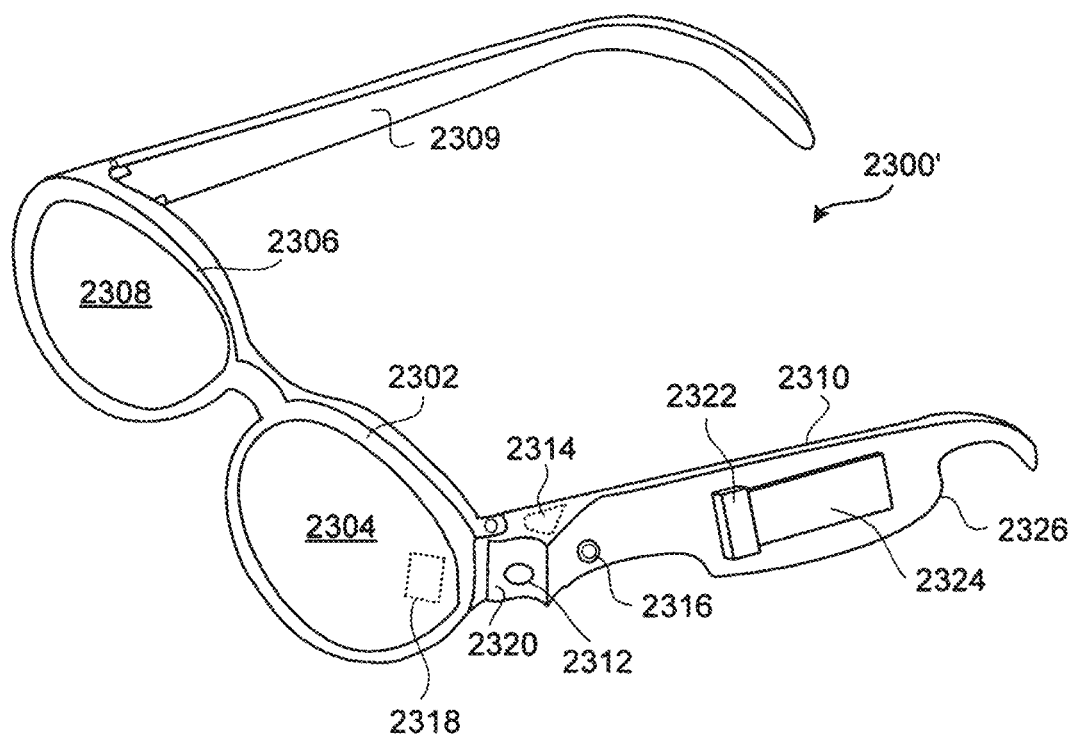
FIG. 23B is a diagram of the pair of glasses according to another embodiment.

FIG. 23B is a diagram of a pair of glasses (i.e., eyeglass frame) 2300' according to another embodiment. In this embodiment, the eyeglass frame 2300' is similar to the eyeglass frame 2300 illustrated in FIG. 23A. However, the eyeglass frame 2300' further includes a connector 2322 and a memory card 2324. More particularly, the temple 2310 includes a region 2326 larger than the temple region shown in FIG. 23A. The larger or enlarged region can provide additional space for the connector 2322 and the memory card 2324. The memory card 2324 can be operatively connected electrically to the electronics 2314 within the temple 2310 via the connector 2322. The connector 2322 also can serve to provide a physical connection of the memory card 2324 to the eyeglass frame 2300. In one embodiment, such physical connection is removable so that the memory card 2324 can be connected to or removed from the temple 2310. Accordingly, the memory card 2324 can facilitate porting of data or information (e.g., pictures) from the eyeglass frame 2300' to another electronic device (e.g., computer). As an example, the connector 2322 can be a USB connector or other peripheral type connector.

The eyeglass frame having a camera according to one embodiment of the invention can further include one or more sensors. For example, the one or more sensors can include one or more of a "being worn" sensor, a motion sensor, and a light sensor. These sensors can be used to influence operation of the camera provided with the eyeglass frame. For example, a "being worn" sensor can be used to determine whether the eyeglass frame is being worn by a user. If the eyeglass frame is not being worn, then the camera can be deactivated to prevent unnecessary battery consumption and/or to prevent pictures from being taken. As an example, if the camera is operated to automatically, periodically take a picture, then if the eyeglasses are not being worn, the automatic picture taking process could be stopped. In one embodiment, a motion sensor can be used in a variety of ways. A motion indication can indicate a rate of activity of the user. For example, the rate of activity could be used to avoid taking pictures during periods of high activity, such as rapid movements of the eyeglass frame (or the corresponding user), or to influence image processing, such as exposure rate. As another example, the rate of activity can be used to control the rate pictures are taken such as in the automatic picture taking example. In one embodiment, a light sensor can indicate the degree of light in the vicinity of the camera. The light indication can influence the image processing, such as exposure rate of the camera.

In one embodiment, in an automatic picture taking example, the location, time or device resources (e.g., available memory) can also be used to control the rate pictures are taken. Also, the ability of the eyeglass frame to know or acquire time and/or location information (such as the location of the eyeglass frame or the corresponding user) can enable pictures taken by the camera to be stored along with time and/or location indications.

The eyeglass frame having a camera according to one embodiment of the invention can further include a global positioning system (GPS). The information from the GPS can be used to alter configuration settings and/or influence operation of the camera. For example, the configuration settings can be different at night versus during daytime or can be different depending on time or location. As another example, the camera can take pictures depending on location. In one implementation, the camera can automatically take pictures dependent on a change in location. For example, after taking a picture, the camera can take a subsequent picture when the change in location exceeds a predetermined threshold.

In one embodiment, the camera utilized in the various embodiments is a digital camera, namely, a digital image capture device. The camera can be a still camera or a motion camera (i.e., video camera). The camera can be designed for manual focusing, auto-focusing, or predetermined fixed focusing. The camera can also support a wide angle or panoramic view.

Figure 24:
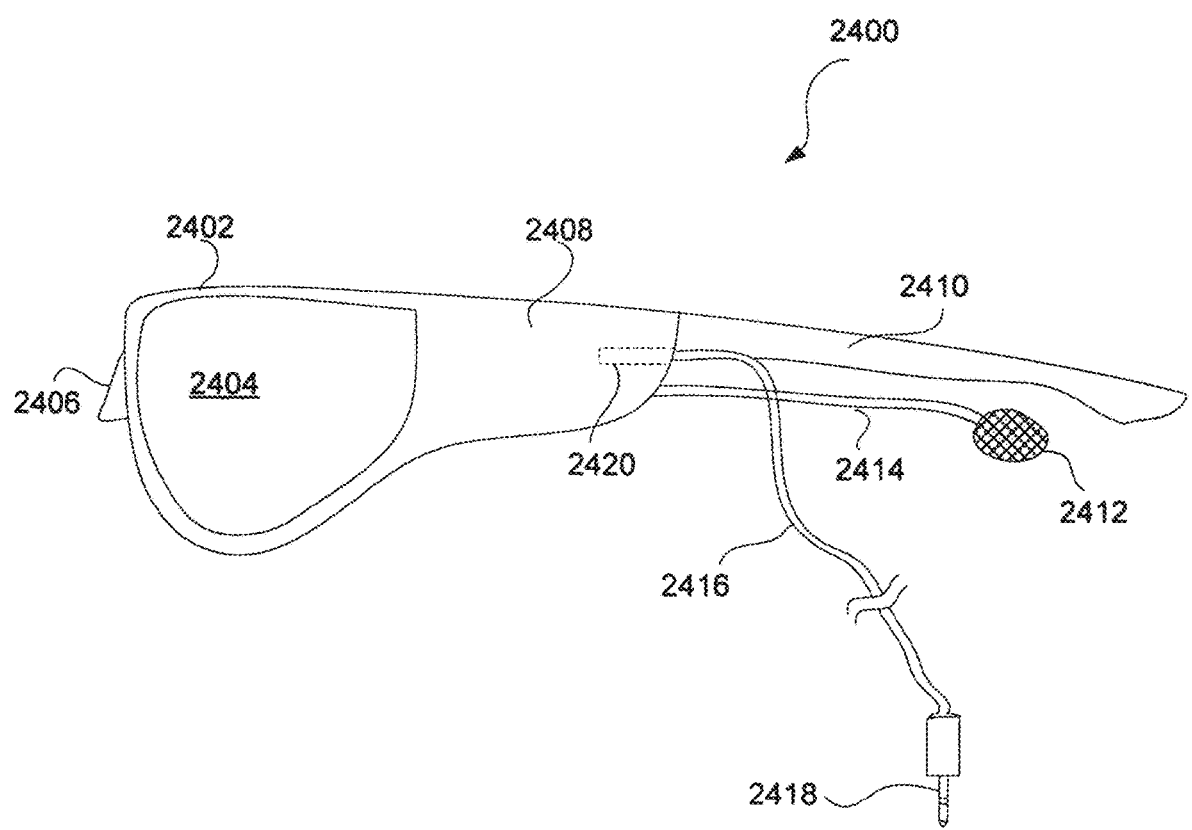
FIG. 24 is a side view of a pair of eyeglasses according to another embodiment of the invention.

FIG. 24 is a side view of a pair of eyeglasses (i.e., eyeglass frame) 2400 according to another embodiment of the invention. The eyeglasses 2400 include a lens holder 2402 for a lens 2404. The lens holder 2402 is for the left side of the eyeglasses 2400. A bridge 2406 couples the lens holder 2402 to another lens holder for the right side of the eyeglasses. In this embodiment, the lens 2404 and the lens holder 2402 extend substantially around the side and are sometimes referred to as "wrap-around" type frames. The eyeglasses 2400 include a temple having a forward temple portion 2408 and a rearward temple portion 2410. Typically, the lens holder 2402, the temple 2406, the forward temple portion 2408 and the rearward temple portion 2410 are integrally formed as a single structure. The eyeglasses 2400 also support audio output to a wearer of the eyeglasses 2400. To support audio, the eyeglasses 2400 include an ear bud 2412, which serves as a speaker, and an extension arm 2414. In this embodiment, the extension arm 2414 couples the ear bud 2412 to the forward temple portion 2408. The extension arm 2414 can be pliable so that the wearer can adjust the position of the ear bud 2412. In further support of audio, the eyeglasses 2400 couple to a cable 2416. The cable 2416 provides audio signals to the ear bud 2412 via at least one electrical conductor extending through the cable 2416 and the extension arm 2414 to the ear bud 2412. In one implementation, one end of the cable 2416 has a connector 2418 and the other end is integral with or connected to the forward temple portion 2408. The connector 2418 can connect to a media output device, such as a portable media player (e.g., radio, MP3 player, CD player, etc.). In another implementation, the cable 2416 can have a connector, such as a plug, that connects to a jack 2420 embedded in the forward temple portion 2408, thereby allowing the cable 2416 to detach from the eyeglasses 2400. Alternatively, the cable 2416 can directly connect to the media output device without the use of the connector 2418. Optionally, the eyeglasses 2400 can also support audio input by providing a microphone with the eyeglasses 2400. In one embodiment, with a microphone, the eyeglasses 2400 serve as a headset for a phone.

Regardless of the electrical components being utilized with the eyeglass frames, it may be desirable for the eyeglass frames to be substantially balanced in weight. In the event that electrical components are attached and/or at least partially embedded in one of the temples of the eyeglass frame, the other of the temples can include other electrical components or even a counter weight so that the eyeglass frame can be substantially balanced.

A number of embodiments have been described regarding electrical components in a temple of a pair of glasses. All of the electronic components can be self-contained inside the temple of the glasses. The components can be coupled to a printed circuit board. In other embodiments, some of the components are embedded fully or partially in other areas of the glasses, such as the lens holders or the bridge of the glasses. Or, one or more electrical components can be in a shield of the glasses. In one embodiment, one embedded electrical component can include a circuit board. The circuit board can be a rigid or a flexible circuit board. In a number of embodiments, electrical components have been described to be fully or partially embedded in a temple of glasses, or in a temple arrangement. In other embodiments, the component(s) can be in other parts of the glasses, such as the lens holders, the nose pads, the bridges or the shields.

Additional embodiments pertain to improved approaches for users of electronic devices to communicate with one another. The electronic devices have audio and/or textual output capabilities. The improved approaches can enable users to communicate in different ways depending on device configuration, user preferences, prior history, time or other criteria. In one embodiment, the communication between users is achieved by short audio or textual messages.

The electronic device can be any computing device having communication capabilities. Such computing devices can be referred to as communication devices. Examples of electronic devices include personal computers, personal digital assistants, pagers or mobile telephones.

Figure 25:
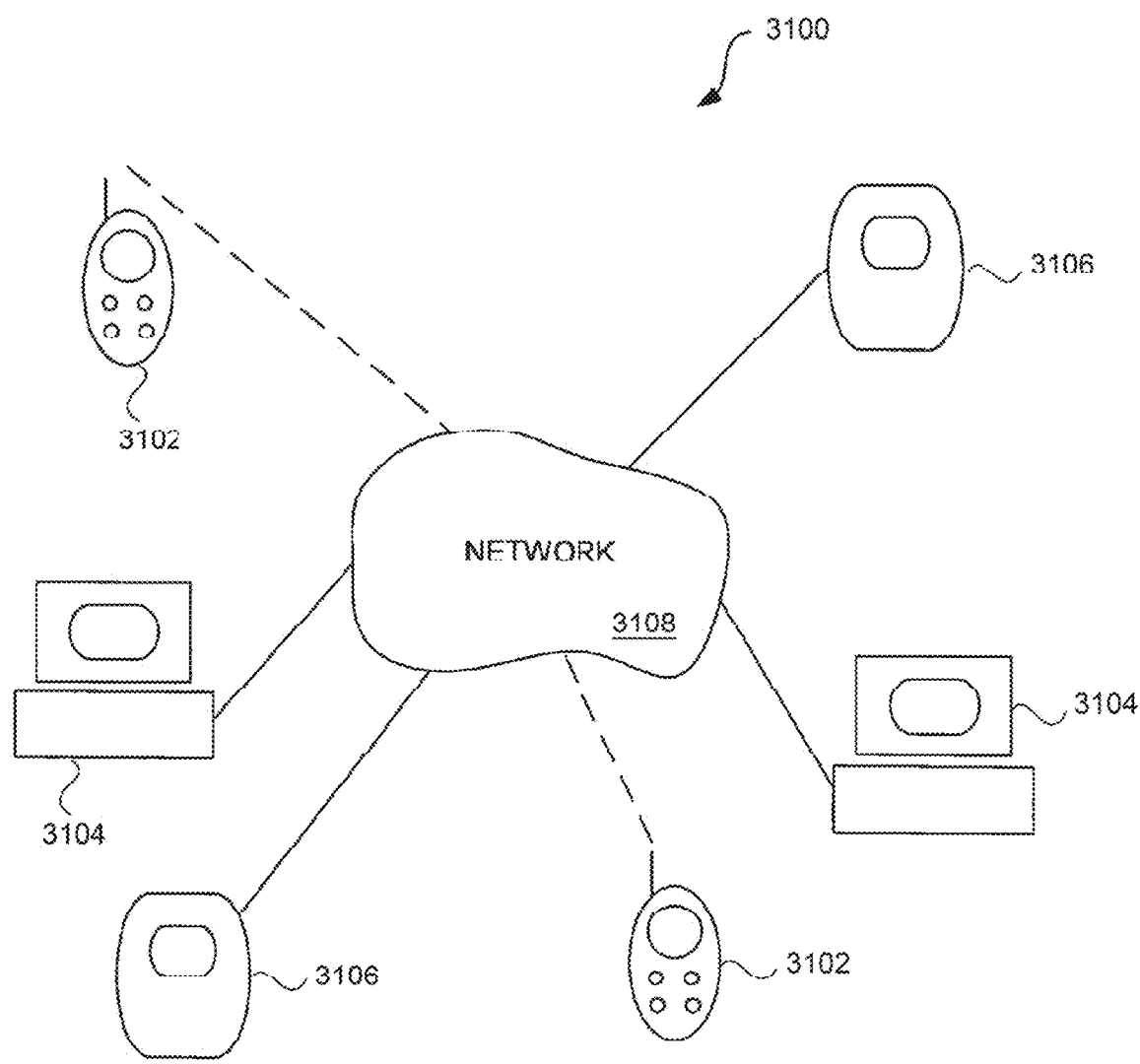
FIG. 25 is a communication system according to one embodiment of the invention.

FIG. 25 is a communication system 3100 according to one embodiment. The communication system 3100 can support different communication devices, including mobile telephones 3102, computers 3104 (e.g., personal computers) and/or wireless personal digital assistants (PDAs) 3106. Users of the communication devices 3102-3106 can communicate with like or different communication devices. Each communication device 3102-3106 offers one or both of audio or textual communication capabilities. These communication devices 3102-3106 can inter-communicate with one another through a network 3108. The network 3108 can include one or more of voice networks and data networks. For example, one network is a data network providing a slow speed data channel for transmission of Short Message Service (SMS) messages (which are typically limited to 160 text characters) to a Short Message Service Center (SMSC) and then forwarded on to the destination. Besides short messages (e.g., SMS messages), the network 3108 can also support other messaging protocols for sending and receiving enhanced messages (EMS), multimedia messages (MMS), email and fax messages. Other networks support faster data channels and voice channels, such as GPRS, UMTS, G4, GSM, CDMA and various protocols, such as UDP, TCP, WAP, PDP other protocols.

According to one embodiment of the invention, one of the communication devices 3102-3106 can send a short message to another of the communication devices 3102-3106. The short message can be text-based or audio-based. The sending communication device allows its user to create the short message as the user desires and/or as the device permits. For example, the user might interact with a keypad or keyboard to enter the short message, or the user might record audio inputs (e.g., speech) for the short message. The short message can then be sent to the receiving communication device. The sending of the short message may involve converting the short message from an audio message to a text message, or vice versa. Also, the receiving communication device can further convert the short message from audio-to-text or from text-to-audio. In any case, the short message is presented (e.g., displayed or played) to the user of the receiving communication device. The presentation can vary as the user desires or as the device permits.

A first aspect of the invention pertains to improved approaches to respond to incoming voice calls. The improved approaches enable a called party (i.e., a party being called) to provide some information to a calling party without directly engaging in a voice call with the calling party. The called party can choose not to take the voice call from the calling party. Instead, the called party can provide the calling party with some limited information. The limited information can be provided in an audio or textual format. In one embodiment, the limited information provides the calling party with feedback as to why the voice call was not taken.

Figure 26:
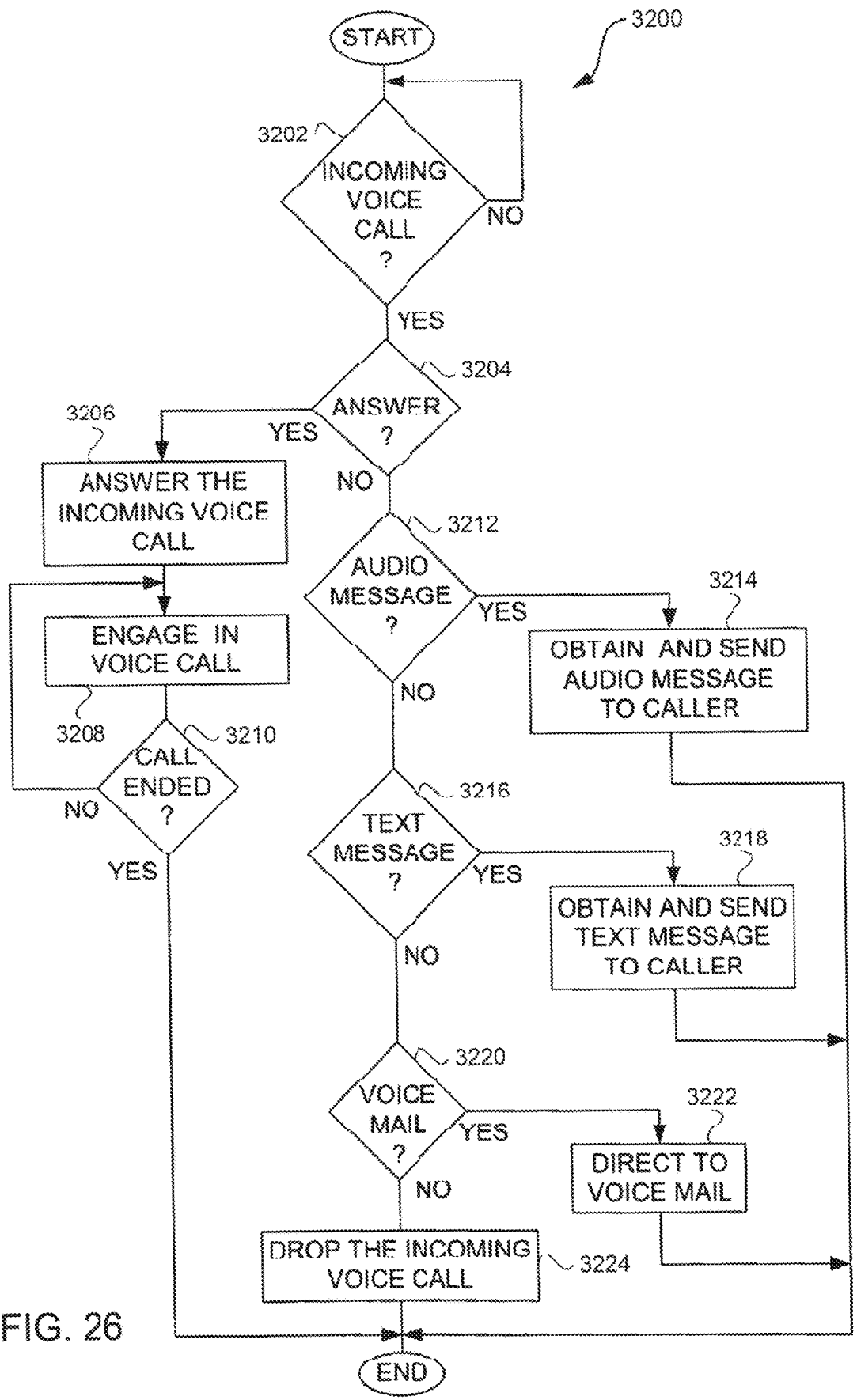
FIG. 26 is a flow diagram of a personal call response process according to one embodiment of the invention.

FIG. 26 is a flow diagram of a personal call response process 3200 according to one embodiment of the invention. The personal call response process 3200 is performed by an electronic device, such as a mobile communication device (e.g., mobile telephone). The personal call response process 3200 begins with a decision 3202 that determines whether there is an incoming voice call. When the decision 3202 determines that there is no incoming voice call, then the personal call response process 3200 awaits such a call. Once the decision 3202 determines that there is an incoming voice call, a decision 3204 determines whether the incoming voice call is to be answered. Typically, the user of the electronic device would signal the electronic device as to whether or not to answer the incoming voice call. Alternatively, the electronic device could automatically decide whether to answer the call.

When the decision 3204 determines that the user desires the incoming voice call to be answered, the incoming voice call is answered 3206 and the user engages 3208 in a voice call with the calling party. A decision 3210 then determines whether the call has ended. When the decision 3210 determines that the call has not yet ended, then the personal call response process 3200 can return to repeat the block 3208 while the voice call continues. Once the decision 3210 determines that the voice call has ended, then the personal call response process 3200 ends.

When the decision 3204 determines that the user does not desire to answer the incoming voice call, a decision 3212 determines whether the user desires to provide an audio message to the calling party. When the decision 3212 determines that the user does desire to provide an audio message to the calling party, an audio message is obtained and sent 3214 to the calling party (caller).

Alternatively, when the decision 3212 determines that the user does not desire to provide an audio message, a decision 3216 determines whether the user desires to provide a text message to the calling party. When the decision 3216 determines that the user desires to provide a text message to the calling party, a text message is obtained and sent 3218 to the calling party.

Still further, when the decision 3216 determines that the user does not desire to provide a text message to the calling party, a decision 3220 determines whether the incoming voice call is to be directed to voice mail. When the decision 3220 determines that the incoming voice call should be directed to voice mail, then the incoming voice call is directed 3222 to voice mail. On the other hand, when the decision 3220 determines that the incoming voice call is not to be directed to voice mail, the incoming voice call is dropped 3224. Following the blocks 3214, 3218, 3222 and 3224, the personal call response process 3200 is complete and ends.

In another embodiment, a personal call response process could announce the calling party to the called party (user). In announcing the calling party, the personal call response process would present the called party with information pertaining to the calling party (e.g., display or audio sound). Such information could, for example, help the called party to decide whether to answer the incoming voice call. The information can, for example, include one or more of name (individual or business), telephone number, or other caller identification. The information could also include status information of the calling party, such as position, health, mood, etc. As an example, the information could be presented to the user prior to the decision 3204 of the personal call response process 3200 shown in FIG. 26.

In still another embodiment, an automated decision process to decide whether to answer a call can be based on time (e.g., decision 3204). For example, the called party can previously set a rule, such as that from midnight to 6 am, the party does not want to answer voice calls. Then, during this time period, the electronic device can automatically decide not to answer incoming calls. In one implementation, when the electronic device decides not to answer incoming calls, no indication of incoming calls will be provided to the called party. For example, from midnight to 6 am, the device would not produce any ring tone. Additionally, if desired, the called party can also configure the electronic device to automatically provide an audio message or a text message to the calling party (e.g., I'm asleep call me tomorrow").

Figure 27:
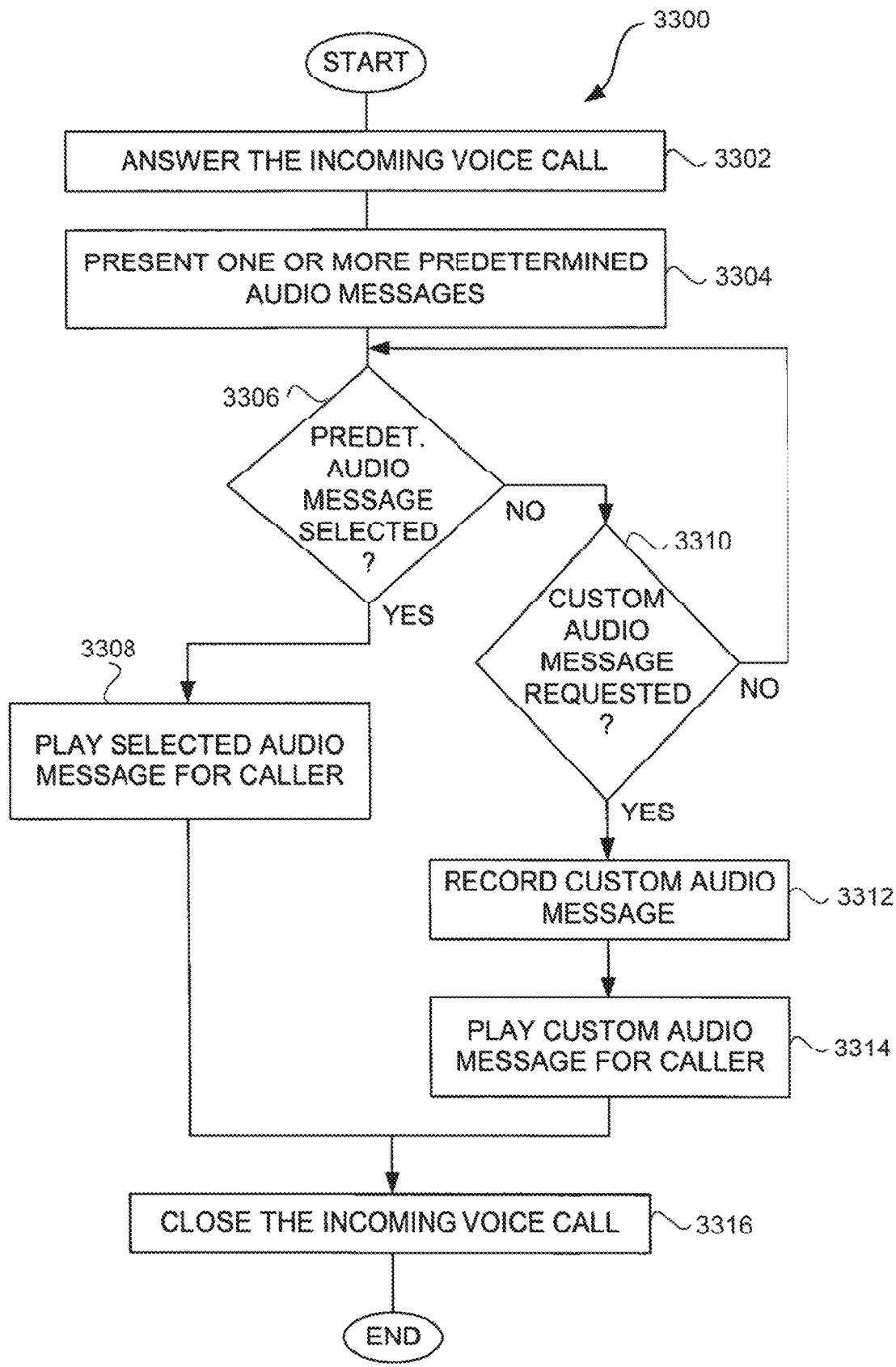
FIG. 27 is a flow diagram of an audio message response process according to one embodiment of the invention.

FIG. 27 is a flow diagram of an audio message response process 3300 according to one embodiment of the invention. The audio message response process 3300 is, for example, suitable for use as the processing carried out by block 3214 illustrated in FIG. 26.

The audio message response process 3300 initially answers 3302 the incoming voice call. In this operation, the incoming voice call is answered 3302 but not in a traditional way. Instead, the electronic circuitry associated with a mobile communication device (e.g., mobile telephone) that receives the incoming voice call operates to answer the incoming voice call for purposes of an audio message response. For example, a voice channel is established between the calling party and the mobile communication device, but the speaker and microphone of the mobile communication device are disabled. In effect, in such an embodiment, neither the called party nor the calling party perceives that the voice calling has been answered.

Next, one or more predetermined audio messages can be presented 3304 by the mobile communication device. The presentation 3304 of the one or more predetermined audio messages can, for example, be achieved by audio or visual means. For example, the predetermined audio messages can be audio output to a speaker associated with the mobile communication device for the called party or can be visual output (e.g., text) to a display of the mobile communication device for the called party (e.g., user of the mobile communication device).

A decision 3306 then determines whether a predetermined audio message has been selected. Here, the decision 3306 determines whether the user (i.e., called party) of the mobile communication device has selected one or more of the predetermined audio messages. When the decision 3306 determines that a predetermined audio message has been selected, then the selected audio message is played 3308 for the calling party. Here, the mobile communication device can output the selected audio message to the calling party over the voice channel. Typically, the mobile communication device of the called party would not produce an audible output at the mobile communication device, so that the called party would not be disturbed by the sending of the audio response. The predetermined audio messages are normally short messages (e.g., not more than 160 characters) so that the duration of time the voice channel is needed and/or the amount of network bandwidth consumed is minimal.

On the other hand, when the decision 3306 determines that none of the predetermined audio messages have been selected, then a decision 3310 determines whether a custom audio message is requested. A custom audio message is an audio message that is specifically provided for the calling party. When the decision 3310 determines that a custom audio message is not being requested, then the audio message response process 3300 returns to repeat the decision 3306 and subsequent operations. Alternatively, when the decision 3310 determines that a custom audio message is requested, then a custom audio message is recorded 3312. Thereafter, the custom audio message that has been recorded can be played 3314 for the calling party (caller). Here, typically, the custom audio message would be output by the mobile communication device of the called party over the voice channel to the calling party. Typically, the mobile communication device of the called party would not produce an audible output at the mobile communication device, so that the called party would not be disturbed by the sending of the audio response. The custom audio messages are also normally short messages (e.g., not more than 160 characters) so that the duration of time the voice channel is needed and/or the amount of network bandwidth consumed is minimal.

Following the operations 3308 and 3314, the incoming voice call is closed 3316. In other words, after the selected audio message or the custom audio message is played 3308, 3314, the incoming voice call can be closed 3316. Following the block 3316, the audio message response process 3300 is complete and ends.

The predetermined audio messages that are presented 3304 to a called party can be determined in a static or dynamic manner. A static determination would, for example, be when the called party has previously set or recorded an audio message to be utilized. Typically, with static determination, the list of audio messages remains the same (i.e., static) until changed (e.g., by the called party). A dynamic determination would allow the audio messages in the list (or the ordering of the audio messages in the list) to change without specific action by the user or the called party. For example, the list or ordering of the audio messages can depend on preference settings, configuration information, or prior usage. Prior usage can include biasing the list of audio messages such that those messages being most often selected appear higher in the list. The list or ordering of the audio messages can also depend on the calling party, type of calling party, location of calling party or called party, and the like. The list of audio messages can be represented by text and/or graphics (e.g., icons).

The audio message response process 3300 flexibly enables a user to either select one or more predetermined audio messages or provide a custom audio message to be used as an audio message response to a calling party. However, it should be recognized that, in other embodiments, an audio message response process can alternatively simply pertain to only providing a custom audio message, or only permitting selection of a predetermined audio message. Further, in still other embodiments, an audio message response process can first determine whether a custom audio message is to be provided before presenting predetermined audio messages. In yet other embodiments, an audio message response process can answer the incoming voice call later in the processing than operation 3302 as shown in FIG. 27 (e.g., before operations 3308 and 3314).

Figure 28:
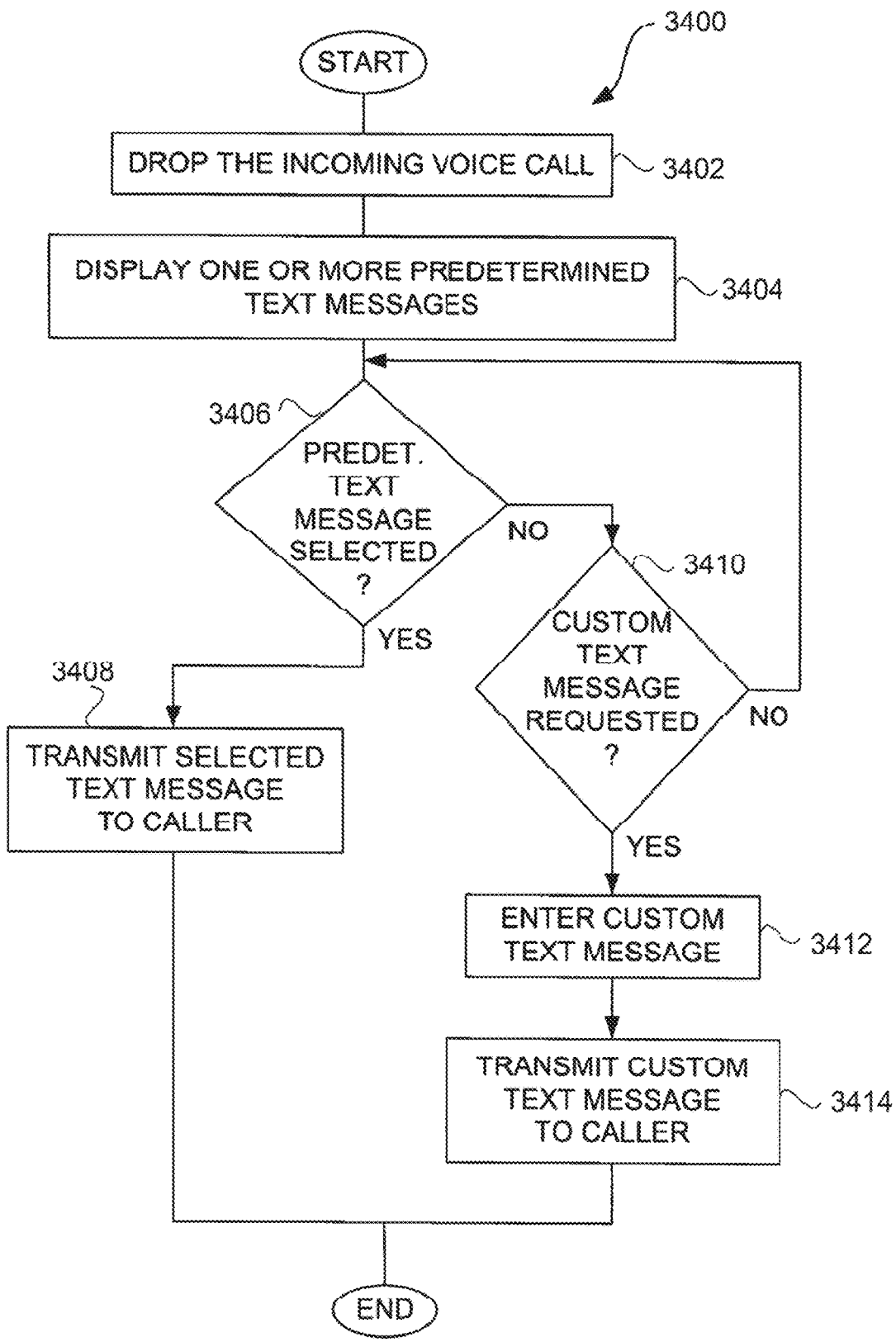
FIG. 28 is a flow diagram of a text message response process according to one embodiment of the invention.

FIG. 28 is a flow diagram of a text message response process 3400 according to one embodiment of the invention. The text message response process 3400 is, for example, processing performed by the block 3218 illustrated in FIG. 26.

The text message response process 3400 initially drops 3402 the incoming voice call. Here, the information to be supplied to the calling party is a short text message; therefore, there is no need for a voice channel.

Next, one or more predetermined text messages are displayed 3404. Here, the one or more predetermined text messages would normally be displayed on a display screen associated with the mobile communication device being utilized by the called party. A decision 3406 then determines whether one (or more) of the predetermined text messages has been selected. When the decision 3406 determines that a predetermined text message has been selected, then the selected text message is transmitted 3408 to the caller (i.e., the calling party).

On the other hand, when the decision 3406 determines that a predetermined text message has not been selected, then a decision 3410 determines whether a custom text message is requested. When the decision 3410 determines that a custom text message is not requested, then the text message response process 3400 returns to repeat the decision 3406 and subsequent operations. Alternatively, when the decision 3410 determines that a custom text message is requested, then the custom text message is entered 3412. Here, the called party interacts with the mobile communication device to enter the custom text message. Then, the custom text message is transmitted 3414 to the caller. In one embodiment, the transmission 3408, 3414 of the text message can be performed over a communication network, such as a network having a Short Message Service Center (SMSC) supporting Short Message Service (SMS) messages. Following the transmission 3408 of the selected text message or the transmission 3414 of the custom text message, the text message response process 3400 is complete and ends.

An alternative embodiment of a text message response process could operate to answer the incoming voice call and announce to the caller that a text message will be forthcoming. Then, the incoming voice call could be promptly dropped. This additional operation could, for example, be used with the text message response process 3400 by providing an additional operation prior to the block 3402 illustrated in FIG. 28.

The predetermined text messages being displayed 3404 to a called party can be determined in a static or dynamic manner. A static determination would, for example, be a text message the called party has previously set or entered. Typically, with static determination, the list of text messages remains the same (i.e., static) until changed (e.g., by the called party). A dynamic determination would allow the text messages in the list (or the ordering of the text messages in the list) to change automatically, and not by the user. For example, the list or ordering of the text messages can depend on preference settings, configuration information, or prior usage. To illustrate, prior usage can include biasing the list of text messages such that those messages being most often selected appear higher in the list. The list or ordering of the text messages can also depend on the calling party, type of calling party, location of calling party or called party, and the like. The list of text messages can identify each text message with text (e.g., at least a portion of the corresponding text message, or an abbreviation) and/or graphics (e.g., icons).

The text message response process 3400 flexibly enables a user to either select one or more predetermined text messages or provide a custom text message to be used as a text message response to a calling party. However, it should be recognized that, in other embodiments, a text message response process can alternatively simply pertain to only providing a custom text message, or only permitting selection of a predetermined text message. Further, in still other embodiments, a text message response process can first determine whether a custom text message is to be provided before presenting predetermined text messages.

Figure 29:
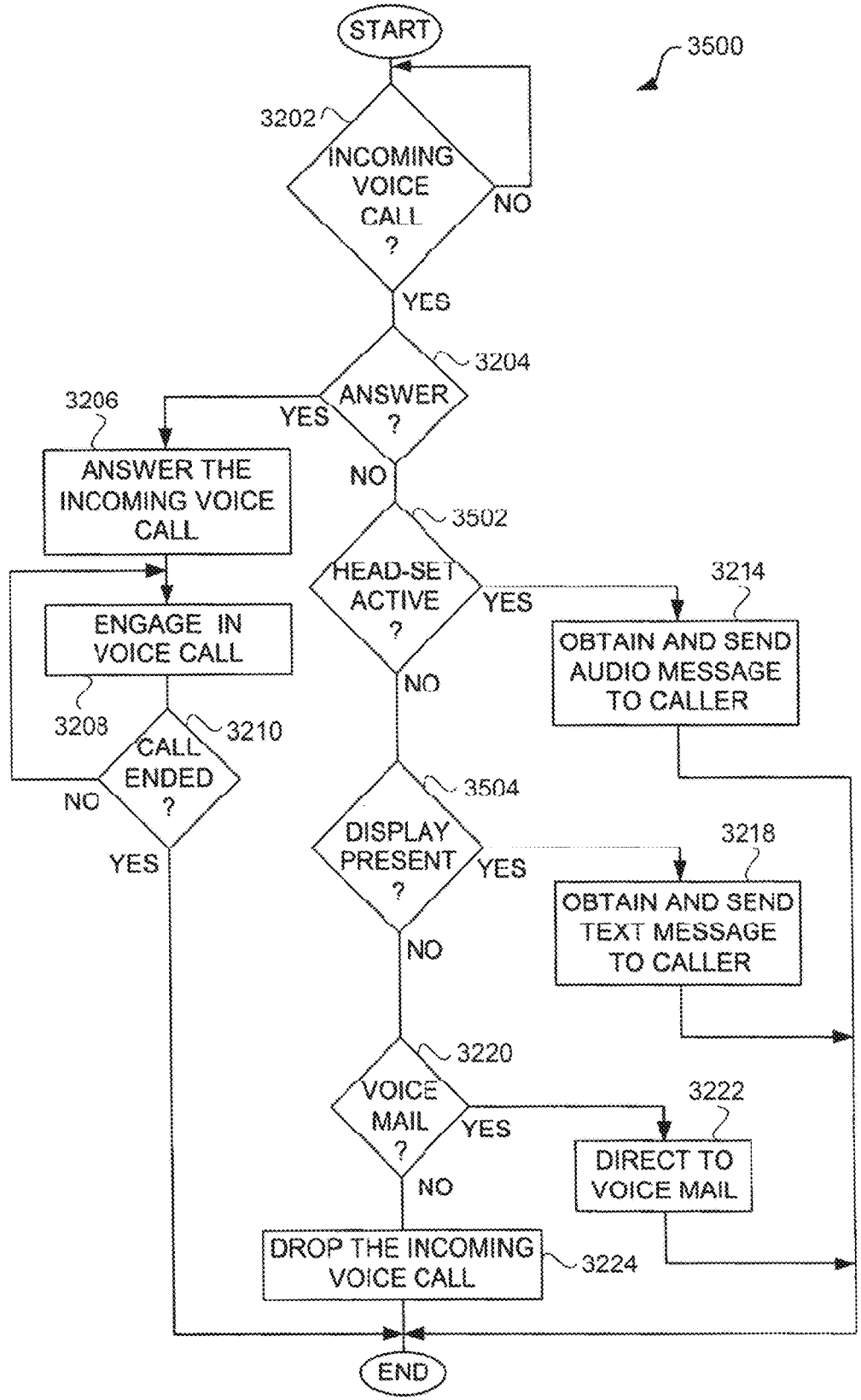
FIG. 29 is a flow diagram of an automated call response process according to one embodiment of the invention.

FIG. 29 is a flow diagram of an automated call response process 3500 according to one embodiment of the invention. The automatic call response process 3500 is substantially similar in many ways to the personal call response process 3200 illustrated in FIG. 2. However, the automated call response process 3500 operates to reduce user input at the mobile communication device by making use of stored data pertaining to its hardware components, configuration or preferences. In this regard, the automatic call response process 3500 includes a decision 3502 that determines whether a head-set is active. When the decision 3502 determines that a head-set is active, then the automatic call response process 3500 can prefer, suggest or require the user to obtain and send 3214 an audio message to the caller in response to an incoming voice call. Alternatively, when the decision 3502 determines that a head-set is not active, then a decision 3504 can determine whether a display is present. In other words, the decision 3504 can determine whether the mobile communication device has a display. When the decision 3504 determines that the mobile communication device does have a display, then the mobile communication device can operate to obtain and send 3218 a text message to the caller. Of course, this assumes that the caller can support text messages even though they initially called with a voice call. Hence, in another embodiment, the automatic call response process can operate to query or obtain information regarding the caller's communication device capabilities.

An exemplary scenario of how the previously described automatic call response process could work according to one implementation is as follows:

1. From his mobile phone, Bill calls Tom's mobile phone.
2. Tom is alerted by his mobile phone of an incoming call. Optionally, caller information (i.e., pertaining to Bill) can be displayed or announced to Tom.
3. Tom can choose to answer the incoming call or decline to answer the call.
4. In the event that Tom declines to answer the call, Tom can have the opportunity to provide the caller with a brief audio or text message.
5. If an audio message is to be provided, then Tom can either record a personalized message or select one of a plurality of predetermined audio messages. In this case, the incoming call is answered by Tom's mobile phone and then the audio message is played for the caller, thereafter the call is dropped. The audio messages are typically brief (i.e., short), and examples of audio messages are: (i) "Will call in 10 minutes," (ii) "Cannot talk now," (iii) "I'm in a meeting," or (iv) "Please don't call anymore."
6. On the other hand, if a text message is to be provided, then Tom can either enter a personalized text message or select from a plurality of predetermined text messages. In this case, the incoming call is dropped, and the entered text message or the selected one of the predetermined text messages is sent. Examples of text messages are: (i) "Will call in 10 minutes," (ii) "Cannot talk now," (iii) "I'm in a meeting," or (iv) "Please don't call anymore." The text messages can be English (or other language) words or phrases, or can be condensed text strings (e.g., such as slang or chat language). In one embodiment, the predetermined text messages presented to Tom can be dependent on some criteria (i.e., automatically selected). Alternatively, it is possible that Tom might want to edit the predetermined text message, such can be permitted. As yet another example, the text message can embed dynamic information, such as position, e.g., "I'm in [position] now, so I'll get back to you later." The position can be determined using a GPS receiver in the mobile phone or acquired by a remote computer and provided to the mobile phone. The position may also be further processed (locally or remotely) into a more user-friendly form, such as city, school, restaurant name, or street type addresses. The position could also be used above to assist the user in deciding whether to answer the incoming call or decline to answer the call.
7. If hardware components, configuration or preferences are taken into consideration, as illustrated in FIG. 29, the above scenario can be modified. For example, if Tom is using a head-set with his mobile phone, then an audio message may be most convenient, assuming that Tom wants to provide a particular (i.e., customized) message to Bill. The head-set allows Tom to record a brief audio message. Less conveniently, the head-set can be used to present a list of predetermined audio messages and allow Tom's selection therefrom by a button or voice-command.
8. If Tom is not using a head-set, then a text message response might be more suitable. This would typically require that Tom's mobile phone have a display and a keypad. Even so, without a head-set, Tom could still record an audio message, though such would likely be less convenient.
9. Tom can also not provide an audio message or a text message and simply let the incoming call roll-over into voice mail.

The exemplary scenario can also be used in a case where the called party is using one line but the mobile device has multi-line capabilities or call waiting. In such case, the mobile phone can enable the called party to provide a brief audio or text message to the calling party as noted above. Alternatively, the mobile phone can itself automatically (i.e., without user input) respond to the calling party via an audio or text message since the mobile phone is aware that the called party is on the other line.

In this aspect of the invention, the calling party and the called party often use mobile communication devices, such as mobile phones. However, the parties can alternatively use other electronic devices, such as a PDA, a computer, etc. Further, the option to provide a text response could be prevented if the caller's device is known to not support text messages.

The advantages of the previously described embodiments are numerous. Different embodiments or implementations may yield different advantages. One advantage is that communications for users of electronic devices can be flexibly provided. Another advantage is that communication mode changes can be performed at an electronic device to better suit the needs or condition of the electronic device or user preferences. In still another advantage, a user can provide feedback to a caller without answering a voice call from the caller.

Another aspect of the invention pertains to improved approaches to respond to an incoming text message. The improved approaches enable a recipient to provide a reply message to an initiator. The incoming text message can be presented to the recipient with an audio or textual presentation. Thereafter, a reply text message can be sent back to the initiator. The recipient can form the reply text message by recording a brief audio message or entering a text message. In the case in which a brief audio message is used, the audio message can be automatically converted to a text message before being transmitted to the initiator.

Figure 30:
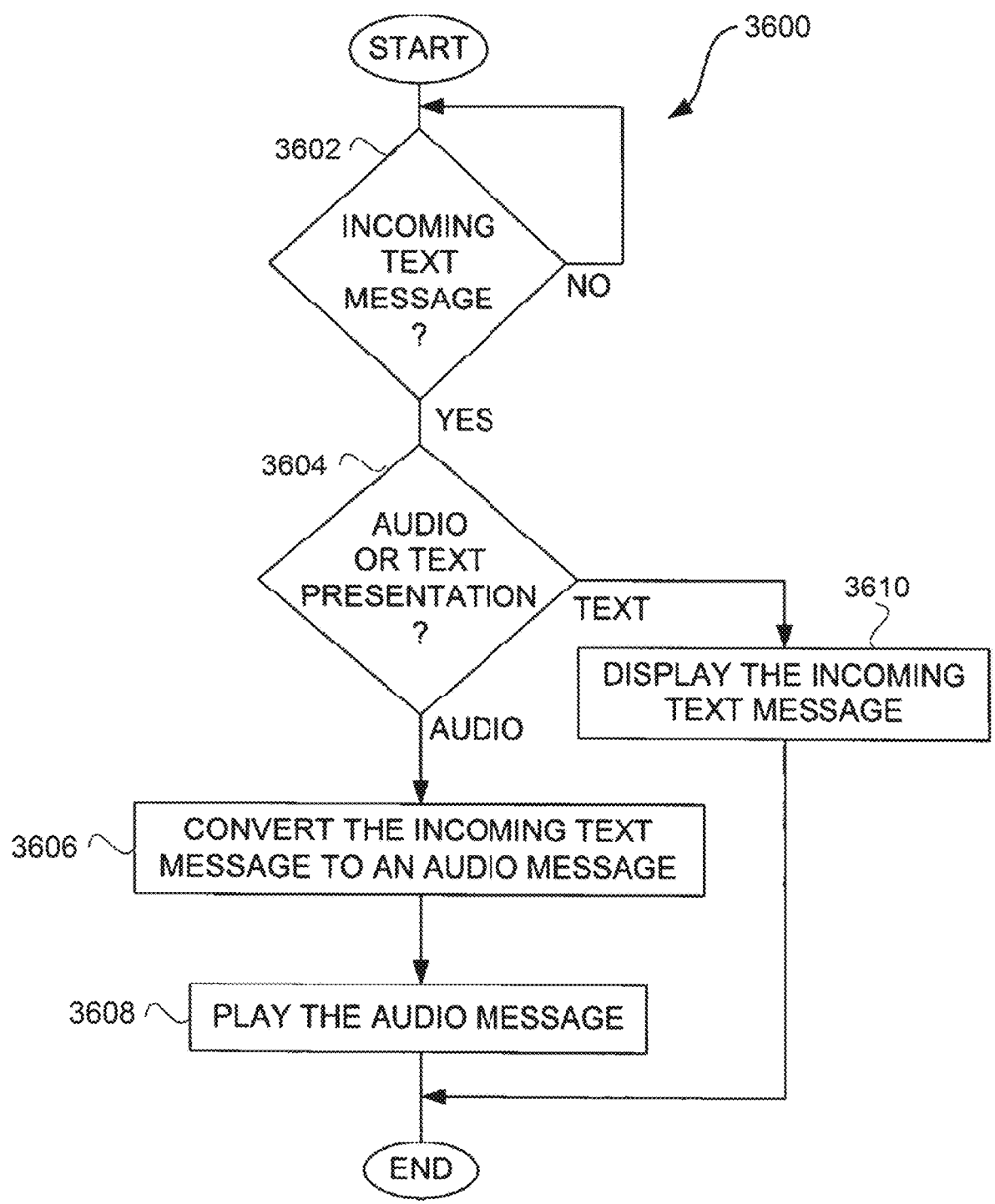
FIG. 30 is a flow diagram of a message presentation process according to one embodiment of the invention.

FIG. 30 is a flow diagram of a message presentation process 3600 according to one embodiment of the invention. The message presentation process 3600 is performed by an electronic device, such as a mobile communication device.

The message presentation process 600 begins with a decision 3602 that determines whether an incoming text message is present. Typically, the incoming text message would be transmitted to the mobile communication device from another communication device. When the decision 3602 determines that an incoming text message is not present, then the message presentation process 3600 awaits such message. Once the decision 3602 determines that an incoming text message has been received, a decision 3604 determines whether an audio or text presentation is to be utilized. The decision 3604 can be performed in a variety of different ways. For example, the determination of whether to utilize an audio or text presentation can be based on user input or can be automatically determined through a use of configuration or preference information or hardware components (e.g., display, speaker, head-set).

When the decision 3604 determines that an audio presentation is to be utilized, the incoming text message is converted 3606 to an audio message. For example, a text-to-speech conversion can be performed. In one embodiment, a user of the electronic device can be permitted to choose speech characteristics, such as a voice, tone, pace, accent, or mood, for the resulting speech. For example, a user could choose speech characteristics by preference settings. In another embodiment, the incoming text message can include or reference speech characteristics so that the initiator can control or influence speech characteristics. In still another embodiment, if the text to be converted contains condensed text (e.g., such as slang or chat language), the resulting speech can pertain to an uncondensed form of the text. The ability to convert from condensed text to resulting speech for uncondensed text can be facilitated by pattern matching. For example, in chat language "LOL" can be converted to an audio message for "lots of love." In one implementation, a table can store audio messages corresponding to chat terms or phrases. In another implementation, a first table would store uncompressed terms or phrases corresponding to chat terms or phrases, and a second table would store audio messages corresponding to the uncompressed terms or phrases.

After the incoming text message is converted to the audio message, the audio message is played 3608. Typically, the audio message is played 3608 by the mobile communication device for the user. For example, the audio message can be output to a speaker of the mobile communication device or a headset used therewith. As a result, the user of the mobile wireless communication device receives an audio message even though the incoming message was a text message.

On the other hand, when the decision 3604 determines that a text presentation is to be utilized, the incoming text message is displayed 3610. Here, the incoming text message would be displayed 3610 on a display associated with the mobile communication device. Following the blocks 3608 and 3610, the message presentation process 3600 ends.

As discussed above, text-to-speech conversion can be invoked and performed on an electronic device, which may be a mobile communication device. While text-to-speech conversion, particularly if high quality is desired, requires substantial processing capabilities, mobile electronic devices, such as mobile communication devices, given their small form factor and price competition, tend to have limited processing capability. Accordingly, in one embodiment, text-to-speech conversion can be off-loaded from the mobile device. For example, a remote server computer can be provided the text message and produce the resulting audio message, and then supply the audio message to the mobile device. The remote server computer can be a networked server coupled to the network 108. One example of a networked server is a gateway computer for a wireless electronic device, such as a mobile telephone.

Figure 31:
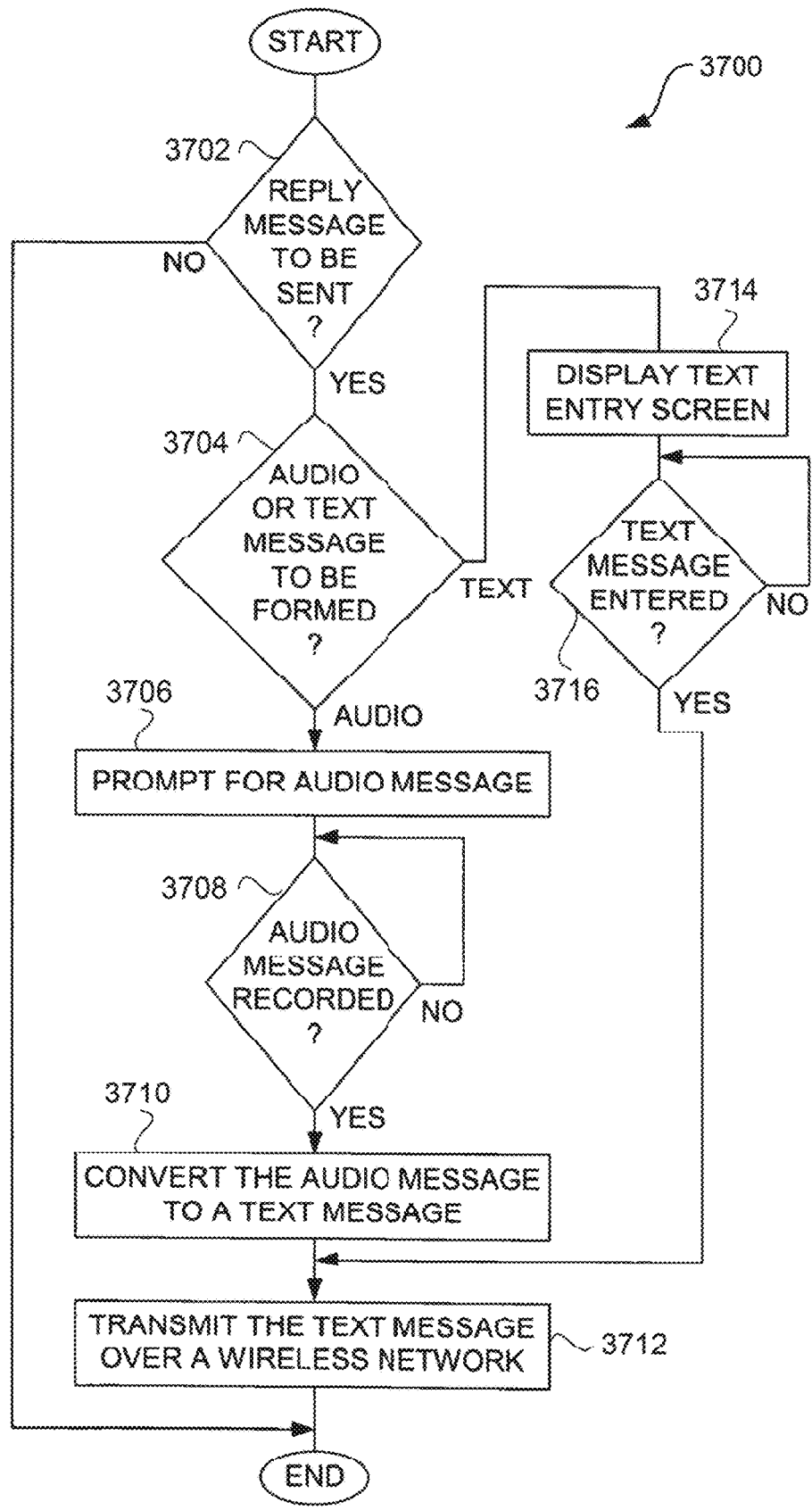
FIG. 31 is a flow diagram of a reply message process according to one embodiment of the invention.

FIG. 31 is a flow diagram of a reply message process 3700 according to one embodiment of the invention. The reply message process 3700 is performed by an electronic device, such as a mobile communication device.

The reply message process 3700 begins with a decision 3702 that determines whether a reply message is to be sent. Typically, the reply message process 3700 follows the presentation of an incoming text message to a user of a mobile communication device. Hence, the reply message to be sent is a reply to the incoming text message. However, in other embodiments, the reply message to be sent can be merely an initial message as opposed to a response to an earlier message.

In any case, when the decision 3702 determines that a reply message is not to be sent, then the reply message process 3700 ends or simply awaits the need to send a reply message. On the other hand, when the decision 3702 determines that a reply message is to be sent, then a decision 3704 determines whether an audio or text message is to be formed. The decision 3704 can be performed in a variety of different ways. For example, the determination of whether to send an audio or text message can be based on user input or can be automatically determined through a use of configuration or preference information or hardware components (e.g., display, speaker, head-set).

When the decision 3704 determines that an audio message is to be formed, then the reply message process 3700 prompts 3706 for an audio message. Here, the prompt 3706 can be directed to the user of the mobile communication device. The prompt can be an audio or textual indication. Next, a decision 3708 determines whether an audio message has been recorded. When the decision 3708 determines that the audio message has not been recorded, then the reply message process 3700 awaits the audio message. Once the decision 3708 determines that the audio message has been recorded, then the audio message is converted 3710 to a text message. In one embodiment, if the audio message recorded is greater than a maximum text message size (e.g., 150 or 160 characters), then the audio message can be shortened so that the resulting text message does not exceed the maximum text message size. One way to shorten the text message is to use abbreviations. For example, the words "For example" can be changed to "e.g.". Such conversion can be again be performed by matching entries in tables. Another way to shorten is to remove non-essential text. Still another way to shorten is to clip off or truncate the text message at the maximum text message size. In another embodiment, the resulting text message might provide an indication that it was converted from an audio message. Following the block 3710, the text message is transmitted 3712 over a wireless network.

Alternatively, when the decision 3704 determines that a text message is to be formed, then a text entry screen is displayed 3714. Next, a decision 3716 determines whether a text message has been entered. When the decision 3716 determines that a text message has not yet been entered, then the reply message process 3700 awaits entry of the text message. Once the text message has been entered, the text message is transmitted 3712 over the wireless network. Following the block 3712, the reply message process 3700 ends.

Although the reply message process 3700 provides for the user to enter a custom text or audio message, it should be understood that the reply message can alternatively be formed through use of semi-custom or predetermined reply messages from which the user of the mobile communication device can choose. The use of semi-custom or predetermined reply messages can be achieved as noted above in a number of embodiments, and can serve to simplify the conversion process.

An exemplary scenario of how message presentation and reply message processes could work according to one implementation of the second aspect is as follows:

1. From his mobile phone, Bill prepares and sends a text message to Tom's mobile phone.
2. Tom is alerted by his mobile phone of an incoming text message, such as by displaying at least a portion of the text message and/or otherwise notifying Tom of the text message.
3. Tom's mobile phone can decide whether to present the text message on a display screen of Tom's mobile phone, or to first convert the text message to an audio message and then present the audio message to Tom (e.g., play the audio message). Of course, Tom can interact with Tom's mobile phone to assist in making the determination on how to present the message.
4. Thereafter, if desired, Tom can prepare and send a reply message back to Bill. This reply message can be prepared initially as a text message or an audio message. Tom's mobile phone and/or Tom can determine whether the reply message is initially prepared as a text message or as an audio message. If an audio message is initially created, such audio message must be converted to a text message prior to transmission. Eventually, the reply message is sent to Bill as a text message. Tom's mobile phone can assist with the creation of the reply message through use of custom, semi-custom or predetermined reply message from which Tom and/or Tom's mobile phone can choose.
5. If Tom is using a head-set with his mobile phone, then an audio message may be more convenient, assuming that Tom wants to provide a particular (i.e., customized) message to Bill. The head-set allows Tom to easily record a brief audio message. Less conveniently, the head-set can be used to present a list of predetermined audio messages and allow Tom's selection therefrom by a button or voice-command.
6. If Tom is not using a head-set, then a text message response might be more suitable. This would typically require that Tom's mobile phone have a display and a keypad. Even so, without a head-set, Tom could still record an audio message, though such would likely be less convenient.
7. Tom can also not provide a reply message and simply not respond to the incoming text message. Alternatively, Tom can configure his mobile phone to automatically produce and send a reply message based on user settings or preferences, position, configuration, status, etc.

In this aspect of the invention, the calling party and the called party often use mobile communication devices, such as mobile phones. However, the parties can alternatively use other electronic devices, such as a PDA, a computer, etc.

The advantages of the different embodiments exemplified by FIGS. 30-31 are numerous. Different embodiments or implementations may yield different advantages. One advantage is that communications for users of electronic devices can be flexibly provided. Another advantage is that communication mode changes can be performed at an electronic device to better suit the needs or condition of the electronic device or user preferences. Still another advantage is that conversion of an audio message to a text message facilitates use a low cost network (such as the SMS network). Another advantage is reduced network bandwidth load. Yet still another advantage is that the sender can get back a message in the same format as they sent the original message, though the recipient may use the message in a different format or mode (e.g., recipient hears the text message as an audio message).

Moreover, it should be noted that with regards to any of the embodiments in which a voice call or a text message is incoming to an electronic device, not only can the user of the mobile device take an action (e.g., button press or voice-command) to decline the call/message but also the electronic device itself can automatically decline the call/message such that the user is not disturbed. For example, an electronic device can be configured through user settings (e.g., preferences) to decline calls/messages matching certain criteria. Also, an auto reply message can be configured to be automatically sent in response to the call/message. For a known, undesired marketing caller/message sender, the electronic device can automatically send a reply message demanding the sender not to call or send messages anymore, and to remove your information from their database.

Text messages received or sent can optionally embed indications of speech characteristics to be used, should the text message be converted to an audio format. The speech characteristics can pertain to voice, tone, pace, accent, and/or mood. The speech characteristics for the resulting speech can be set in preference or configuration information, set on a per message basis by users, or set by evaluation of monitored data pertaining to the user.

Additionally, the messages being transmitted can be encrypted for security purposes.

In one embodiment, an electronic device performing communications using audio and/or text messages according to the invention can further integrate (or have tethered thereto) one or more electrical components for enhancing the hearing of the user of the electronic device. The electronic device will normally include a microphone and a speaker. In any case, additional details on hearing enhancement are further described, for example, in U.S. Provisional Patent Application No. 60/620,238, filed Oct. 18, 2004, and entitled "EYEGLASSES WITH HEARING ENHANCED AND OTHER AUDIO SIGNAL-GENERATING CAPABILITIES," which is hereby incorporated herein by reference;

A number of embodiments described herein can be considered an automated secretary for a user of an electronic device. The automated secretary can completely or partially respond to an incoming call/message so as to reduce disturbances to the user. The user can personalize the automated secretary through user settings (e.g., preferences), or the automated secretary can learn over time how to handle different incoming calls/messages. Besides handling or assisting the user with incoming calls/messages, the automated secretary can also assist with other activities, such as making calendar entries (e.g., meetings) in a calendar or responding to incoming callers/messages with relevant information pertaining to the user's schedule as maintained by the calendar (though the user could restrict such access to certain information and/or inquiring parties). For example, if an incoming text message asks "available for lunch today?", the automated secretary can check the user's availability for lunch by way of the user's calendar, then if the user is not available the automated secretary can quickly informing the inquiring party of same or propose another date. On the other hand, if the lunch time period is available in the user's calendar, then the automated secretary can either directly respond to the inquiring party of acceptance or propose a response to the user for review, modification and/or transmission.

Furthermore, the embodiments implementations and features described in: (i) U.S. Provisional Patent Application 60/509,631, filed Oct. 9, 2003, and entitled "TETHERED ELECTRICAL COMPONENTS FOR EYEGLASSES," which is hereby incorporated herein by reference; and (ii) U.S. Provisional Patent Application 60/462,591, filed Apr. 15, 2003, and entitled "EYEGLASSES FOR WIRELESS COMMUNICATION," which is hereby incorporated herein by reference; (iii) U.S. patent application Ser. No. 10/964,011, filed Oct. 12, 2004, and entitled "TETHERED ELECTRICAL COMPONENTS FOR EYEGLASSES," which is hereby incorporated herein by reference; and (iv) U.S. patent application Ser. No. 10/822,218, filed Apr. 12, 2004, and entitled "EYEGLASSES FOR WIRELESS COMMUNICATIONS," which is hereby incorporated herein by reference, can be used with the various embodiments, implementations, features and aspects of the invention noted above. For example some or all of the processing noted above with respect to FIGS. 25-31 can be performed in electrical components integral or tethered to eyeglasses. However, the electrical components integral or tethered to eyeglasses can also interact and/or share processing tasks with an electrical device (e.g., mobile telephone, PDA, etc.) located proximate thereto.

It should be obvious to those skilled in the art that a number of embodiments performing communications using voice as well as audio and/or text messages can be implemented using voice over Internet Protocol technologies, with signals delivered over the Web. For example, a calling party's communication or mobile device can include an adapter to convert voice signals to data packets before sending them over the Internet. A service provider can convert the packets back into voice signals before sending the voice signals to the called party's communication device. Similarly, embodiments can be implemented using voice over wireless protocols, such as Wi-Fi or Wi-Max networks. Using such technologies, computing devices can become communication devices.

As explained, in a number of embodiments, the glasses include a switch, which typically is at least partially embedded in the glasses. For example, the switch can be used to turn the speaker on, or to tune the frequency of a radio. If the glasses have two speakers, such as one on each of the temples, there can be two switches, one on each temple to control the corresponding speaker. The two speakers can be for generating stereo audio signals for the user. There can also be one control switch for both speakers.

The switch in the glasses can have different attributes. It can be activated by different type of forces, including mechanical, radiation, magnetic, electrical, and temperature. The switch can also be activated remotely by a remote device. The switch can be based on one or more detectors. The switch can have different degrees or ranges of control, such as binary, multiple discrete steps or incremental control. The switch can be placed at different position on the glasses, such as on the side or top surface of a temple or at a joint. The control can take perception into consideration, such as based on texture, height and lateral position of multiple switches.

Figure 32:
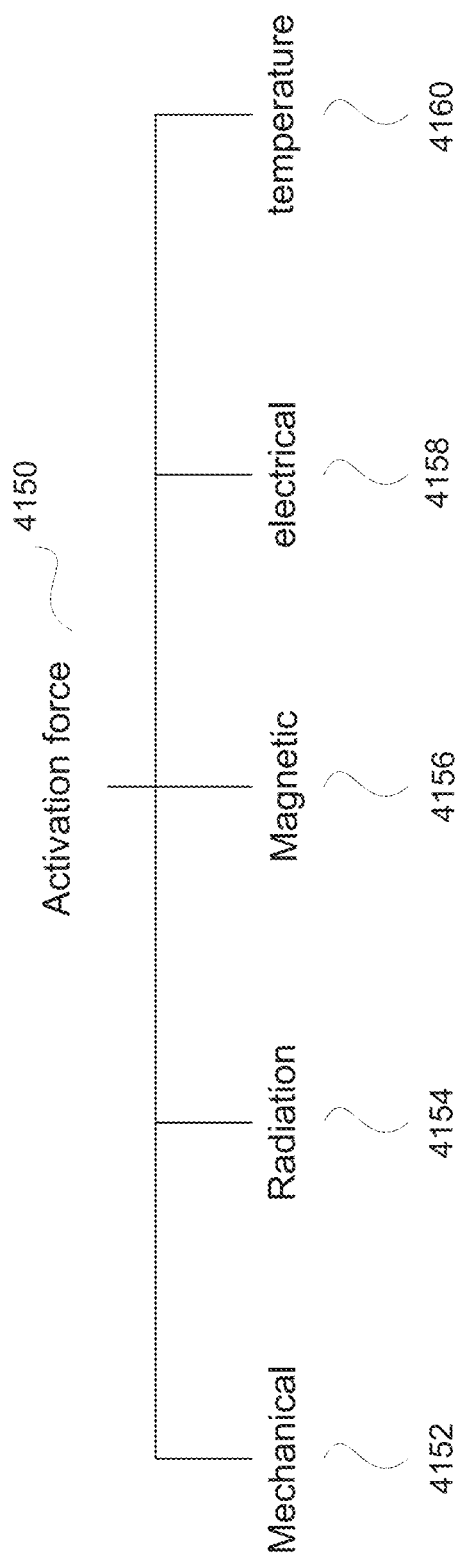
FIG. 32 illustrates a number of forces activating a switch according to a number of embodiments of the invention.

FIG. 32 illustrates a number of forces 4150 activating the switch according to different embodiments of the invention. They can be based on, for example, mechanical 4152, radiation 4154, magnetic 4156, electrical 4158, and temperature 4160.

Figure 33:
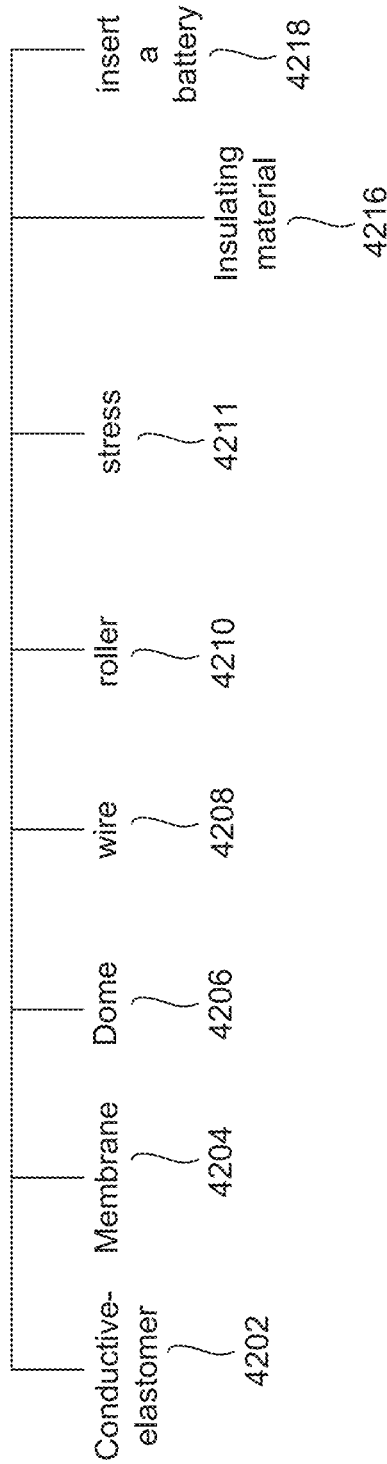
FIG. 33 illustrates a number of mechanical forces activating a switch according to a number of embodiments of the invention.

FIG. 33 illustrates a number of mechanical forces 4152 activating the switch according to different embodiments of the invention. The mechanical switch or sensor can be a conductive-elastomer switch 4202, a membrane switch 4204, a dome switch 4206, a relatively simple wire switch 4208, and a roller switch 4210, such as a switch including a wheel. Another type of mechanical force can be based on stress 4211, such as a switch based on piezoelectric force or a piezoelectric device.

In yet another embodiment, the mechanical switch is made so that the electrical circuitry in the glasses can be activated but not deactivated by the user. In other words, once activated, the switch is designed not to be deactivated by the user, and the circuit will remain on till the power source inside the glasses is depleted. One approach to implement such a switch is based on a piece of insulating material 4216 between a terminal of, for example, a battery and its contact with the circuit embedded in the glasses. When the battery is installed, at least one of its terminals is separated from its circuit contact. There can be a thin, flexible, insulating material, 4216, such as a ribbon, positioned between the terminal and the contact. Though the circuit is embedded in the glasses, the insulating material 4216 extends outwardly from inside the glasses through a hole, such as a small hole, in the side wall of, for example, a temple of the glasses. In one embodiment, the hole or slot is located above or below the terminal and the contact, or the hole is not directly inline with the terminal and the contact. By pulling the insulating material out from the glasses, the terminal will establish electrical connection with the contact, activating the circuit and turning the speaker on.

In another embodiment of a switch based on mechanical force 4152, the mechanical force is the force that is used to insert 4218 a battery into the glasses. Once the battery is inserted, the speaker in the glasses will be activated. The speaker will remain on until the battery is removed, or until the power in the battery is drained.

The switch can also be activated by radiation 4154, or energies in a type of radiation, according to a number of embodiments of the invention. The radiation 4154 can be in the optical, or infrared or ultraviolet range. For example, the switch includes a photodiode or photo sensor in the glasses, and there is an opening above the photodiode. In one embodiment, the diode is activated by light getting to the diode through the opening. In another embodiment, the circuit is activated if the opening is covered to prevent light from getting to the diode.

Figure 34:
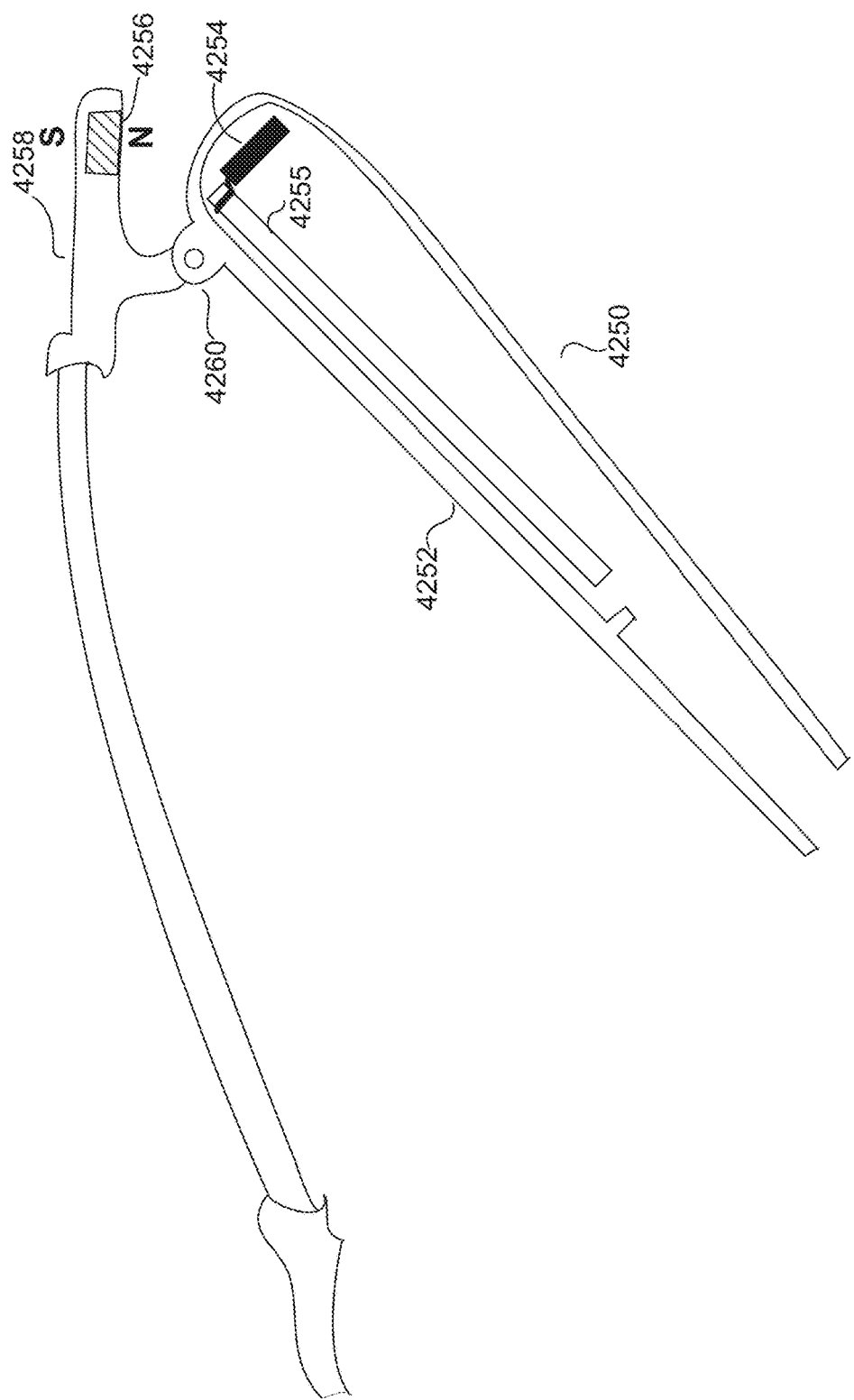
FIG. 34 shows a Hall-effect detector at a joint of a pair of glasses according to an embodiment of the invention.

The switch can be activated by magnetic forces 4156. For example, there can be a magnetic sensor or a Hall effect detector inside a temple proximate to a joint of a pair of glasses. FIG. 34 shows a section of a pair of glasses 4250 with such a detector 4254. The detector 4254 is electrically connected to a printed circuit board 4255. When the temple 4252 is in its extended position, as when the glasses 4250 are ready to be worn, the detector 4254 will be directly adjacent to a magnet 4256 inside a lens holder 4258 at the corresponding joint 4260. The magnet 4256 would activate the Hall effect detector 4254. In another embodiment, a magnetic switch is activated based on changing the inductance of a coil. For example, the switch includes a steel rod that can be positioned in or out of a coil. The switch's range of control is based on the position of the rod with respect to the coil.

The switch can be activated depending on electrical forces 4158. In one embodiment, the electrical force depends on capacitive effect. By changing the capacitance, the switch is turned on and off. For example, the capacitance is changed by placing one's finger over a metallic pad. In another example, by changing the amount of overlap between two metallic sheets that are not in contact, the capacitance between the two metallic sheets will change. This then changes the range of control of the switch.

In another embodiment, the electrical force 4158 is based on resistive effect. For example, the switch is made up of a slide or a rotary potentiometer. By changing the amount of coupling, the amount of resistance is changed to reflect the range of control of the switch.

In one embodiment, the switch's activation can depend on temperature 4160. For example, the switch includes a temperature sensor. When the temperature reaches a certain point, the switch is activated.

In yet another embodiment, the switch is controlled by a remote controller. For example, the glasses include an infrared detector. The remote controller can generate infrared radiation. By aiming the controller at the detector, the infrared radiation can activate the infrared detector and the switch is activated. Or, if the user moves into the vicinity of a corresponding infrared transmitter, circuits in the glasses would be activated.

The switch can include one or more previously-described sensor or detector of different types of forces. For example, the switch can use two photo sensors. One sensor is exposed to light on the outside surface of the temple and the other is exposed to light on the inside surface of the temple, such as close to the ear. Based on their differential output, the switch is activated. As another example, there are two temperature sensors in the glasses. One is located close to a joint and the other is at the temple close to the ear. Again, the switching action depends on their differential outputs. In yet another embodiment, the glasses include more than one type of switch. There can be one type of switch, such as a mechanical switch, acting as an on/off switch, and another, such as a switch using electrical forces, as an incremental switch to change frequency.

As described, in a number of embodiments, the switch can provide different degrees or ranges of control. In one embodiment, there are two degrees of control, such as in an on/off switch. In another embodiment, there can be multiple discrete degrees, steps or positions. For example, the switch is a roller with discrete notches to indicate different discrete positions. Or, there can be two mechanical switches, placed side-by-side. Pushing one switch will increment one step, and pushing the other will decrement one step.

Figure 35A:
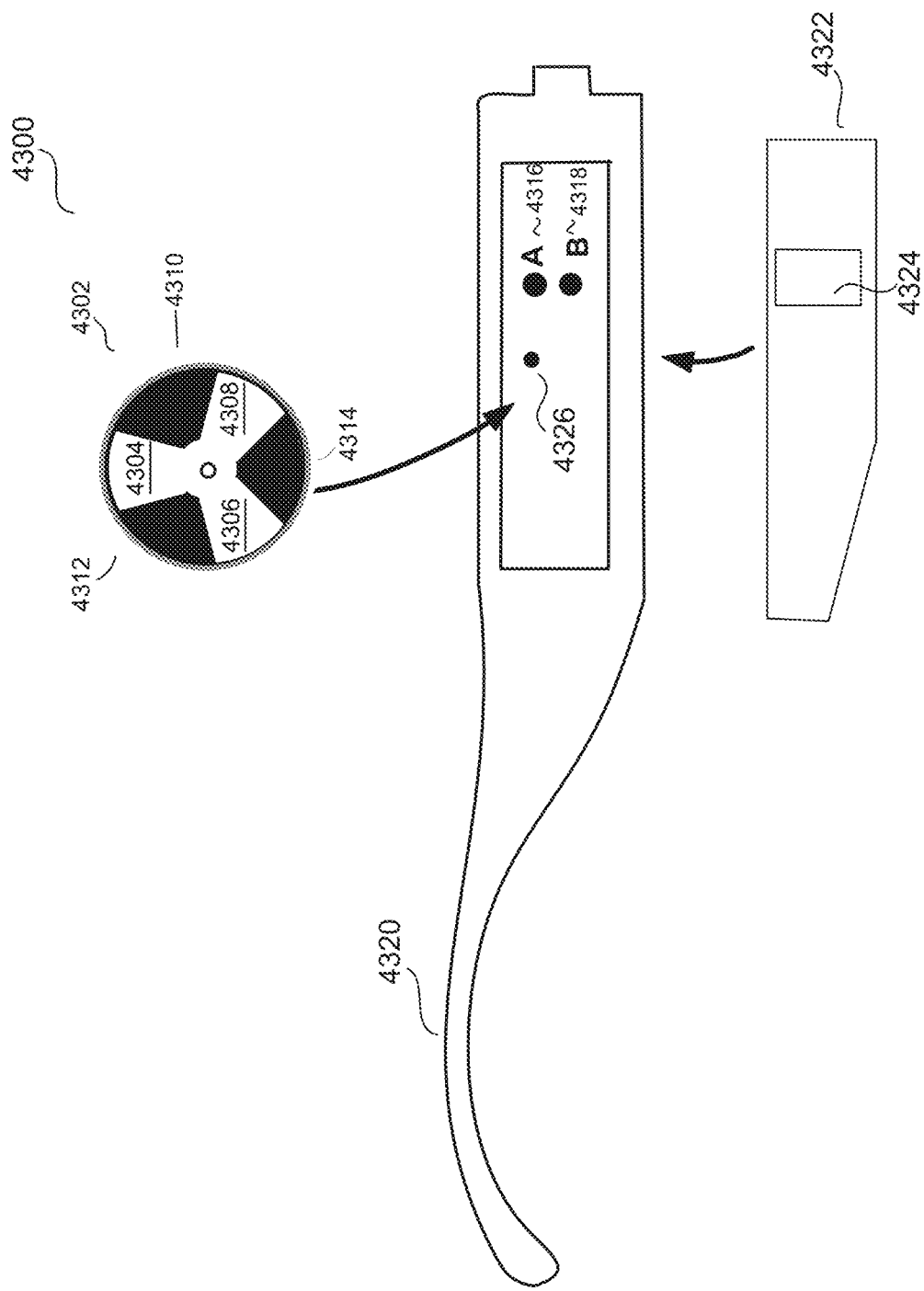
FIGS. 35A-35C illustrate different embodiments of a quadrature sensor according to the invention.
Figure 35B:
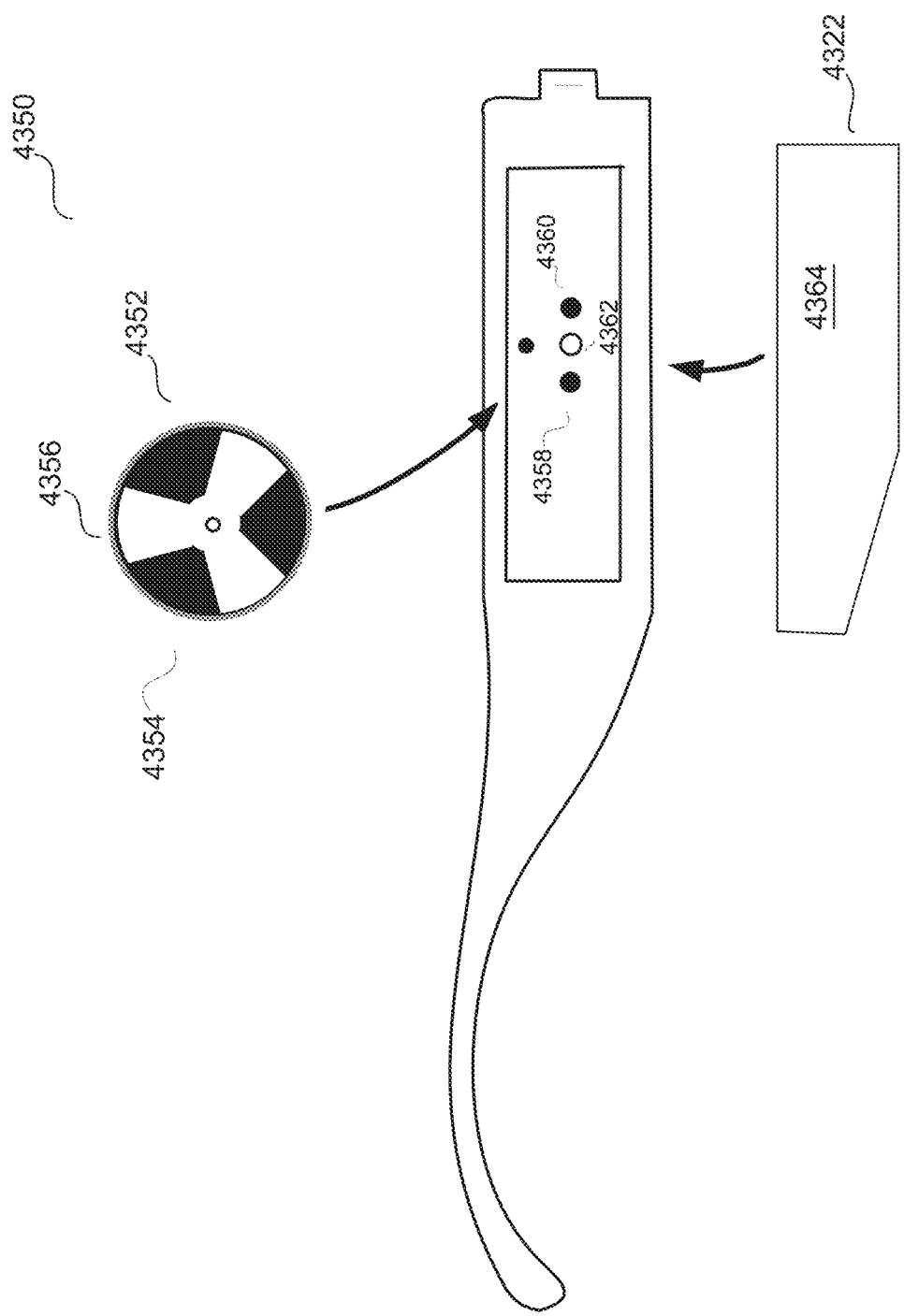
Figure 35C:
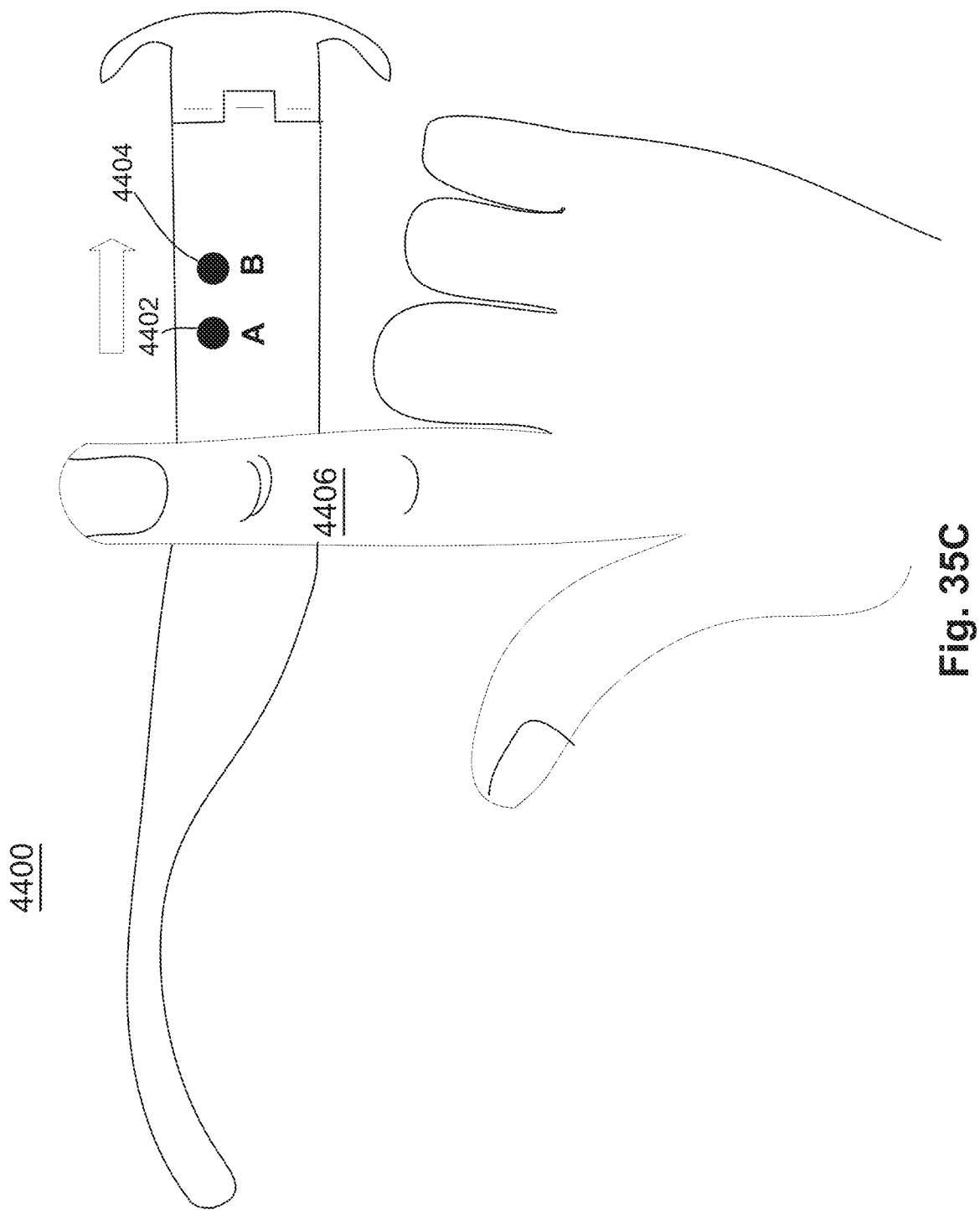

In yet another embodiment, the change from one degree to the next is gradual and not noticeably discrete. This can be achieved with 2 sensors arranged in quadrature. FIGS. 35A-35C show examples of different embodiments of such a switch based on two photodiodes or photo detectors.

FIG. 35A shows an embodiment 4300 with a wheel 4302 (roller) having clear strips, 4304, 4306 and 4308, alternating with black strips, 4310, 4312 and 4314, and two photodiodes, 4316 and 4318. Most of the wheel 4302 and the two diodes, after incorporated into the temple 4320, are covered by a piece of material 4322. The two diodes, 4316 and 4318, are exposed to ambient light through a clear window 4324. A part of the wheel 4302 is extended out of the temple 4320, allowing the wheel 4302 to be turned about its axis 4326. The wheel 4302 can have teeth for friction turning. As the wheel 4302 rotates about the axis 4326, based on the differential outputs from the diodes, the direction of movement of the wheel 4302—clockwise or counterclockwise—is determined. For example, if the wheel 4302 is rotated clockwise, the top diode 4316 senses light before the bottom 4318 senses light. On the other hand, if the wheel 4302 is rotated counterclockwise, the bottom diode 4318 senses light before the top 4316. Based on the signals from the two diodes, one would be able to tell if the wheel is being turned clockwise or counterclockwise. Clockwise can denote increase and counterclockwise can denote decrease. This embodiment can be used, for example, to change frequency. By turning the wheel 4302 clockwise, the frequency of the radio goes up. And, by turning the wheel 4302 counterclockwise, the frequency goes down. Such a wheel 4302 is also applicable for other purposes, such as controlling the volume of a speaker.

FIG. 35B shows an embodiment 4350 with a wheel 4352 having black 4354 and reflecting 4356 strips, two photodiodes, 4358 and 4360, and a LED 4362. Again, most of the wheel, the two diodes and the LED are covered by a sheet of material 4364. If a reflecting strip 4356, instead of a black strip 4354, goes over a diode, more light from the LED will be reflected back and received by the diode. If a black strip 4354 goes over a diode, output from the diode will be significantly reduced. Again based on the signals from the diodes, the direction of rotation can be determined, which, in turn, can be used to indicate incrementing or decrementing outputs.

FIG. 35C shows an embodiment 4400 again using two photodiodes, 4402 and 4404, but without a wheel. The two diodes, 4402 and 4404, are exposed to ambient light unless they are covered. In this embodiment, whether the finger 4406 or another object is moving from the first diode 4402 to the second diode 4404, or from the second diode 4404 to the first diode 4402 can be determined based on the signals from the diodes. For example, the finger 4406 sliding in a forward direction would trigger a signal from the first diode 4402 before the second diode 4404. On the other hand, sliding the finger in a backward direction would trigger a signal from the second diode before the first diode. Thus, the outputs from the two diodes can show the direction of movement of the finger. One can then, for example, assign forward movement (from the first 4402 to the second 4404) as increment, and backward movement (from the second 4402 to the first 4402) as decrement.

A switch can be placed at different location on a pair of glasses. In one embodiment, the switch is positioned on one of the side surfaces of one of the temples, such as the side that is not facing the face of the user when the glasses are worn. In another embodiment, the switch is positioned on a top surface of one of the temples. The switch shown in FIG. 1 in paragraph 321 of U.S. Provisional Patent Application No. 60/647,826 falls under this category. In yet another embodiment, the switch is positioned at one of the joints or hinges of the glasses. For example, there is a mechanical switch at a joint. If the corresponding temple is extended, as in the position when the glasses are worn, the switch will be pressed, which can indicate that the switch has been activated.

In one embodiment, the user can be using a switch when the glasses are worn. Depending on the position and the type of switch, the user may not be able to see the switch when he is manipulating it. In one embodiment, the design of the switch takes into consideration perception. To illustrate, there are two mechanical switches on the glasses. The top surfaces of the two switches have different texture. One switch has a smooth surface and the other has a rough surface. Pushing the rough surface implies incrementing one step and pushing the smooth surface implies decrementing one step. This type of perception design is based on tactile effect. In another example, the heights of the two switches are different. The taller switch is for one effect and the shorter is for another. In yet another embodiment, the lateral position of the two switches has significance. For example, the two mechanical switches are on the top surface or edge of a temple. By pushing the switch closer to the lens holder, the volume of the speaker in the glasses goes up; and by pushing the switch further away from the lens holder, the volume of the speaker goes down. In another example, the two switches are under the two ends of a piece of materials, such as a rocker-lever, which can be plastic. Rocking the plastic piece forward is an increment motion, and rocking the plastic piece backwards is a decrement motion.

The present invention provides different embodiments of glasses that can be applied to multiple functions. With a user wearing such a pair of glasses, it would be more difficult for a third party to know the specific function or reason the user is wearing the glasses for. Regarding the locations of the electrical components for the multiple functions, different embodiments range from all of the components in the glasses to the glasses primarily functioning as a headset.

Figure 36:
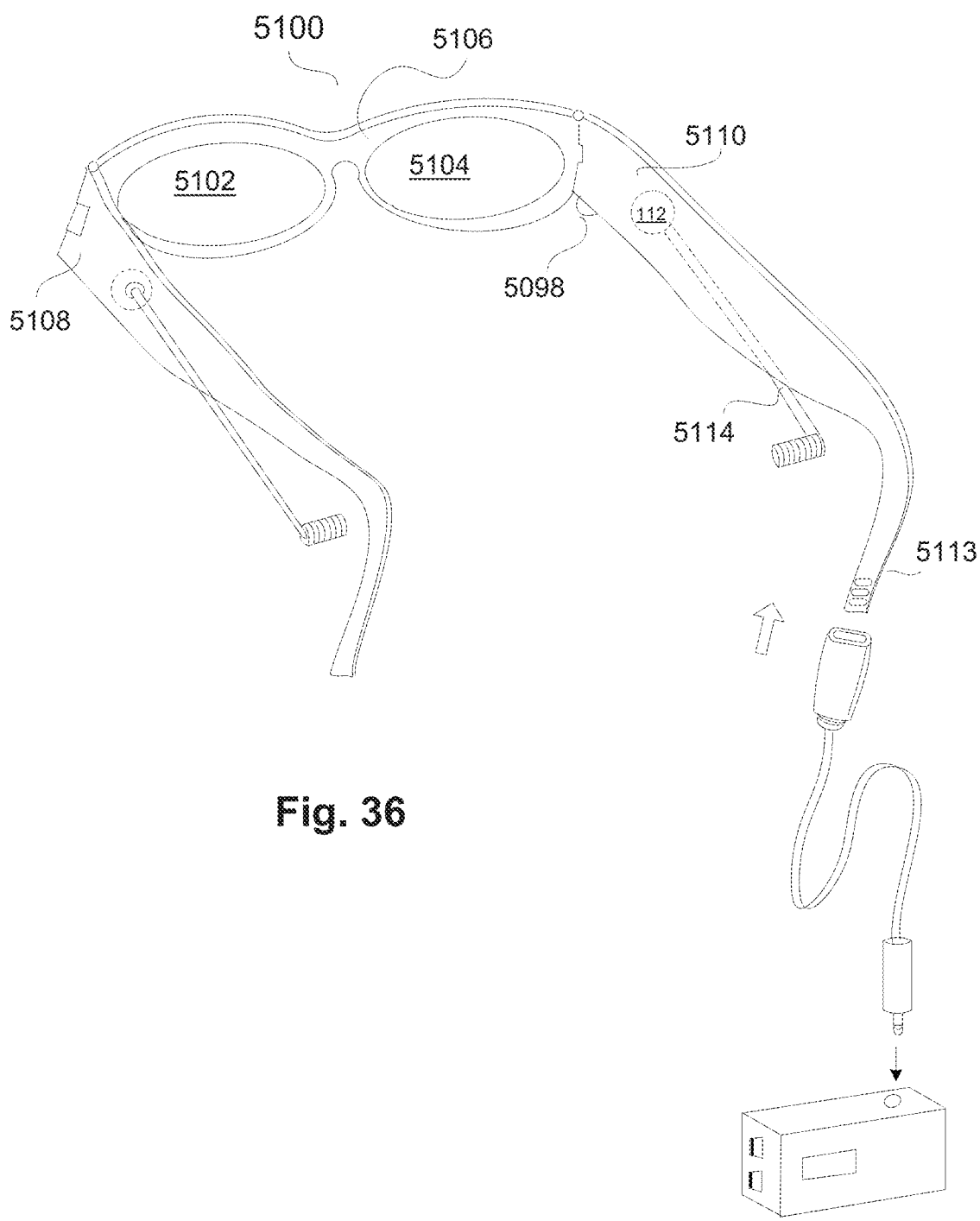
FIG. 36 shows one embodiment of the invention with a pair of glasses having speakers.

FIG. 36 shows one embodiment of the invention with a pair of glasses 5100 having speakers. The glasses 5100 include a first lens holder 5102 and a second lens holder 5104. Both lens holders are for receiving lenses. The first lens holder 5102 has a first side and a second side. The second lens holder 5104 also has a first side and a second side. The pair of glasses has a bridge element 5106. The bridge element 5106 is coupled to the first side of the first lens holder 5102 and the second side of the second lens holder 5104. In one embodiment, the lens holders and the bridge element are not separate pieces, but are an integral piece.

The pair of glasses 5100 also includes a first temple 5108 and a second temple 5110. The first temple 5108 is pivotally secured to the second side of the first lens holder 5102 through a joint. And, the second temple 5110 is pivotally secured to the first side of the second lens holder 5104 through another joint.

In a number of embodiments, the glasses include one or more electrical components partially or fully embedded in the glasses. An electrical component can be a resistor, capacitor, inductor, transistor or other electrical part, other than just a conductor or a wire allowing current to flow between or among electrical components. An electrical component can also be more complicated such as an electrical circuit or an integrated circuit.

FIG. 36 shows one embodiment of the glasses 5100 with electrical components that include two speakers, each at least partially embedded in the glasses. The speakers can be used to enhance the hearing of the user wearing the glasses. In one example, each speaker, such as speaker 5112, is in one of the temples, such as temple 5110, of the glasses 5100. Each speaker is closer to one end of the temple than the other end. In the embodiment shown in FIG. 36, each speaker is closer to the end of the temple that is in the vicinity of the lens holder or the hinge or the joint of the glasses, instead of the end that is typically not attached to a hinge. The end of a temple that is typically not attached to a hinge can be known as the free end of that temple. The speakers can be partially embedded in the glasses. For example, the mouth of each speaker, where audio signals propagate from and where sometimes there are small holes on a sheet of material, can be exposed and not totally covered up by the temple.

In the embodiment shown in FIG. 36, both speakers are embedded in the glasses, and the speakers output audio signals in the outward direction. In another embodiment, the speakers output audio signals in the inward direction. For example, the output of the speakers can be facing inwards, towards the user.

The speakers can be embedded in the glasses in a number of ways. For example, each speaker can be first assembled onto or electrically coupled to a circuit board, which includes additional electrical components for the glasses. The glasses can be made of plastic (e.g., plastic frames). With the corresponding speaker, each circuit board can be shaped to fit, for example, into a temple of the glasses. Each circuit board with a speaker is placed into a mold. Then, hot, molten plastic is injection molded around each circuit board with the speaker to form the two temple pieces of the glasses. To reduce weight, the wall of the glasses can be made relatively thin through injection molding techniques.

In another embodiment, the glasses have metallic frames. For example, the frames can be made of Titanium, which is a relatively light metal. Also, Titanium is relatively non-conductive and strong, and is quite immune to corrosion. Further, Titanium can be anodized or heat colored.

For glasses with metallic frames, to prevent circuits from being shorted or to reduce leakage current, one embodiment provides an insulating layer between a circuit board in the glasses and the corresponding metallic frame. One example of an insulting layer is a tape to encapsulate the electrical components. The tape is non-conducting so as to provide insulation and, to a certain degree, can also provide mechanical stiffness. One way to make such a temple is to have two sheets of the metal die-stamped to form the two halves, or the two faces of a temple piece. A circuit board with a speaker is made to fit into the space between the faces. Then, two die-cut pieces of tape can cover the top and the bottom surfaces of the circuit board. The board and the speaker with the tape are sandwiched between the faces to form the temple. The tape can be double-sided sticky tapes, with one side sticking to the circuit board, and the other side sticking to the temple. An adhesive can be used to glue the two faces of the temple piece together.

In yet another embodiment, the frames are made of hard rubber. The frames can be manufactured in an approach similar to injection molding techniques, with circuit boards and/or speakers inserted into the mold along with the rubber at the time of molding.

Different types of speakers can be used, such as, standard, fixed-magnet/moving coil speakers; speakers with fixed-coil and a steel diaphragm; piezoelectric speakers; and electrostatic speakers.

In one embodiment, the glasses further include a tube, such as a plastic tube, extending from each speaker, such as tube 5114 from speaker 5112. Each tube serves to guide sound generated by its corresponding speaker to one of the ears of the user. In one embodiment, each tube extends from its speaker to the opening of an ear canal of the user.

Figure 37:
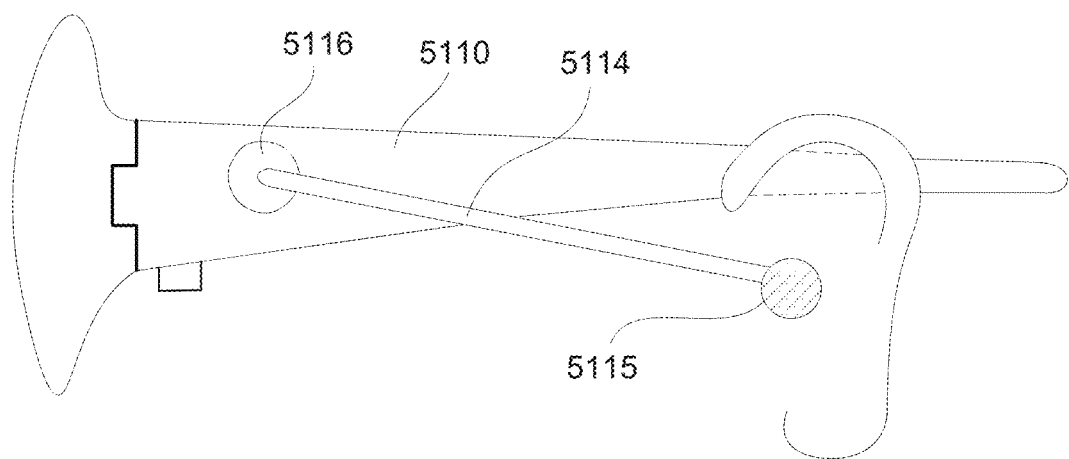
FIG. 37 shows a tube extending from a speaker at a temple of the glasses to guide sound to one of the ears of the user according to one embodiment of the invention.

FIG. 37 shows an embodiment where a tube 5114 is located on the outside of a temple 5110. In another embodiment, the tube can be on the inside of a temple.

In one embodiment, a tube can be rotated, such as from along the temple (behind a temple if the tube is on the inside of the temple) to being downward at an angle towards one of the ears of the user, such as the position shown in FIG. 37. To increase flexibility, the tube can be attached to a rotating disk 5116, which allows rotation about the corresponding speaker.

In another embodiment, the tube is malleable. This allows the tube to be placed in different positions.

Figure 38:
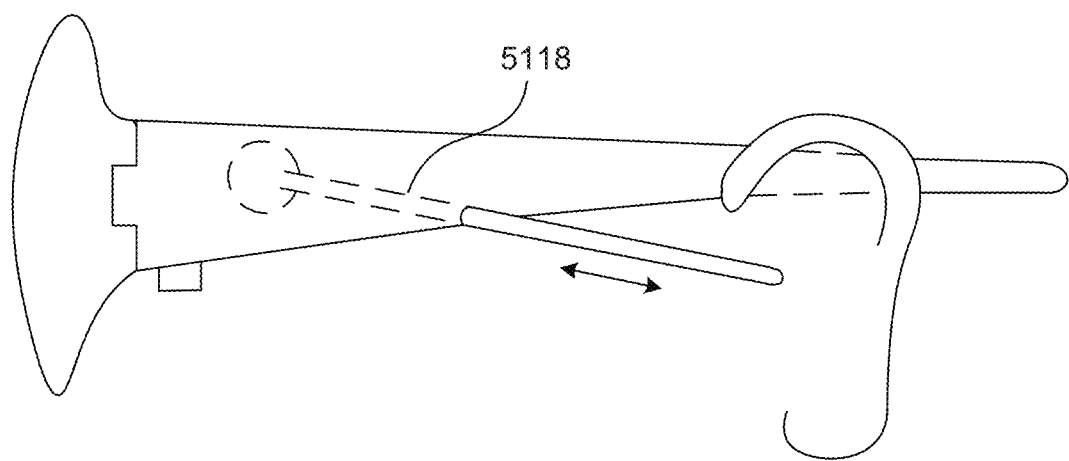
FIG. 38 shows a retractable tube extending from a speaker at one of the temples of the glasses according to one embodiment of the invention.

In one embodiment, the length of the tube is adjustable. FIG. 38 shows such an embodiment of a pair of glasses with a retractable tube 5118. In the figure, the tube is shown to be in its extended position. As an example, the retractable tube 5118 can be retracted into the corresponding temple. As another example, the retractable tube 5118 can retract on itself (e.g., telescoping).

In one approach, there also is a plug 5115 at the end of the tube 5114 for inserting into an ear of the user, as shown in FIG. 37. The plug 5115 can be an ear bud. The plug 5115 can provide a cushion of foam rubber or other materials. Such materials give comfort and/or enhance sound coupling to the ear canal.

In one embodiment, each ear bud is individually made based on an impression of the user's corresponding ear canal. In another embodiment, each ear bud is custom fitted into the corresponding ear of the user.

Figure 39:
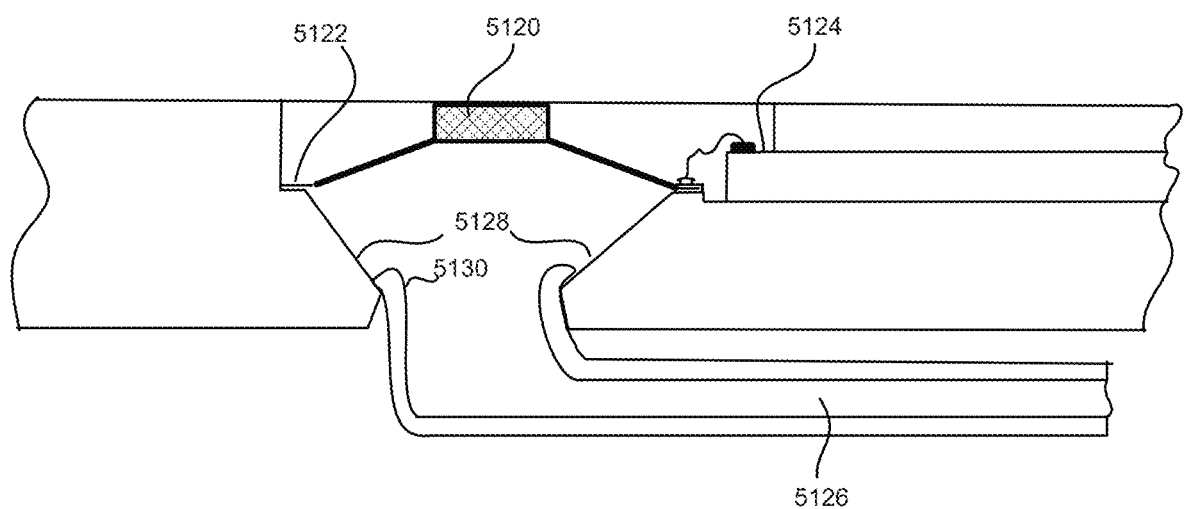
FIG. 39 shows a funnel at the output of a speaker in the glasses according to one embodiment of the invention.

In another approach, there is a funnel at the output of a speaker. FIG. 39 shows the cross section of such a funnel from a speaker 5120 at a temple region of the glasses. As shown in FIG. 39, the speaker 5120 sits on a speaker frame 5122, and the speaker 5120 is electrically connected to a circuit board 5124. As sound is generated from the speaker 5120, the sound propagates to a tube 5126 through a structure in the shape of a funnel 5128. Such a structure can help guide the sound to the tube 5126 (i.e., improved sound coupling). Also, FIG. 39 shows the tube 5126, which can be the tube 5114 shown in FIG. 37, mounted onto the temple region of the glasses with a circular lip 5130. Such a lip 5130 allows the tube 5126 to rotate relative to the glasses. In the embodiment shown in FIG. 39, the speaker 5120 is embedded in the glasses. Also, in FIG. 39, the tube 5126 is at the front side of the speaker 5120. In another embodiment, a tube can extend from the back side of the speaker to couple the sound from the speaker to an ear.

Figure 40A:
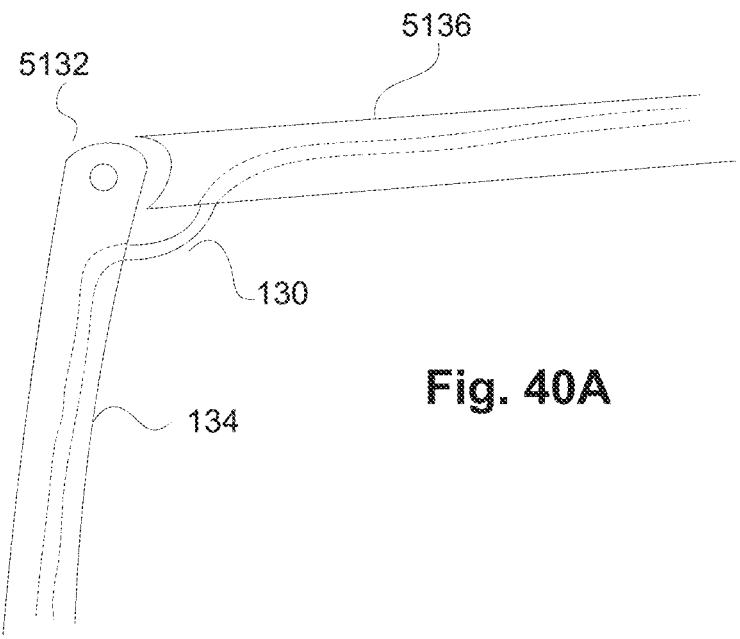
FIGS. 40A-40B show an embodiment of the invention with a wire connecting speakers in the glasses.
Figure 40B:
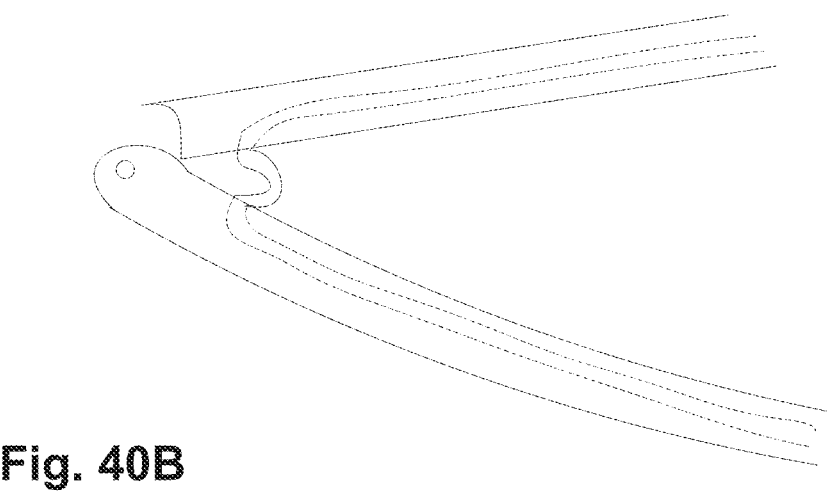

In the embodiment of the glasses with two speakers, the two speakers can also be electrically connected by a conductor or an electrical wire, with the conductor linking the speakers through the glasses, such as through the lens holders of the glasses. FIGS. 40A-40B show an embodiment of the wire 5130, with FIG. 40A illustrating a hinge 5132 of the glasses in the extended position, and FIG. 40B illustrating the hinge 5132 partially closed. As shown in the two figures, the wire 5130 is embedded in a temple 5134 to connect to the speaker in that temple. The wire 5130 extends from the temple 5134 to a lens holder 5136, and then to the other temple of the glasses to connect to the speaker in the other temple.

Referring back to FIG. 36, electrical components in the glasses can also include at least one microphone 5098, which can be located at a temple 5110, closer to the hinge than the free end of that temple 5110. The microphone 5098 receives audio signals. For glasses with hearing enhancement capabilities, the audio signals are modified or enhanced (to be further described below), and then sent to the speaker(s) in the glasses for the user to hear. In the embodiments that do not include plugs or ear buds that plug the ear canals of the user, but may still include tubes guiding sound from speakers to each ear, the user can hear both the enhanced sound based on hearing enhanced electrical components and sound directly from the ambient environment.

In another embodiment, there can be two microphones. Each microphone can, for example, be located close to one hinge of the glasses. The microphone close to the left hinge can be electrically connected to the speaker at the left temple, and the microphone close to the right hinge can be electrically connected to the speaker at the right temple. The one or more microphones can be directional, more preferential towards signals in specific directions. For example, the microphone close to the left hinge can be more preferential towards signals coming from the left, and the microphone close to the right hinge more preferential towards signals from the right.

In one embodiment, to reduce the weight of the glasses and/or to enhance the ease of aesthetic design of the glasses, some of the electrical components are not in the glasses. Instead, they are in a base or a portable device carried or worn by the user. A number of embodiments regarding a base have previously been described in U.S. patent application Ser. No. 10/964,011, entitled "TETHERED ELECTRONIC COMPONENTS FOR EYEGLASSES," and filed Oct. 12, 2004, which is hereby incorporated by reference. In embodiments with the base, the base is tethered, or connected with a wire, to the glasses. In embodiments with the portable device, the portable device is electronically coupled to the glasses or to the base (if there is a base) wirelessly or through a wired connection.

Figure 41:
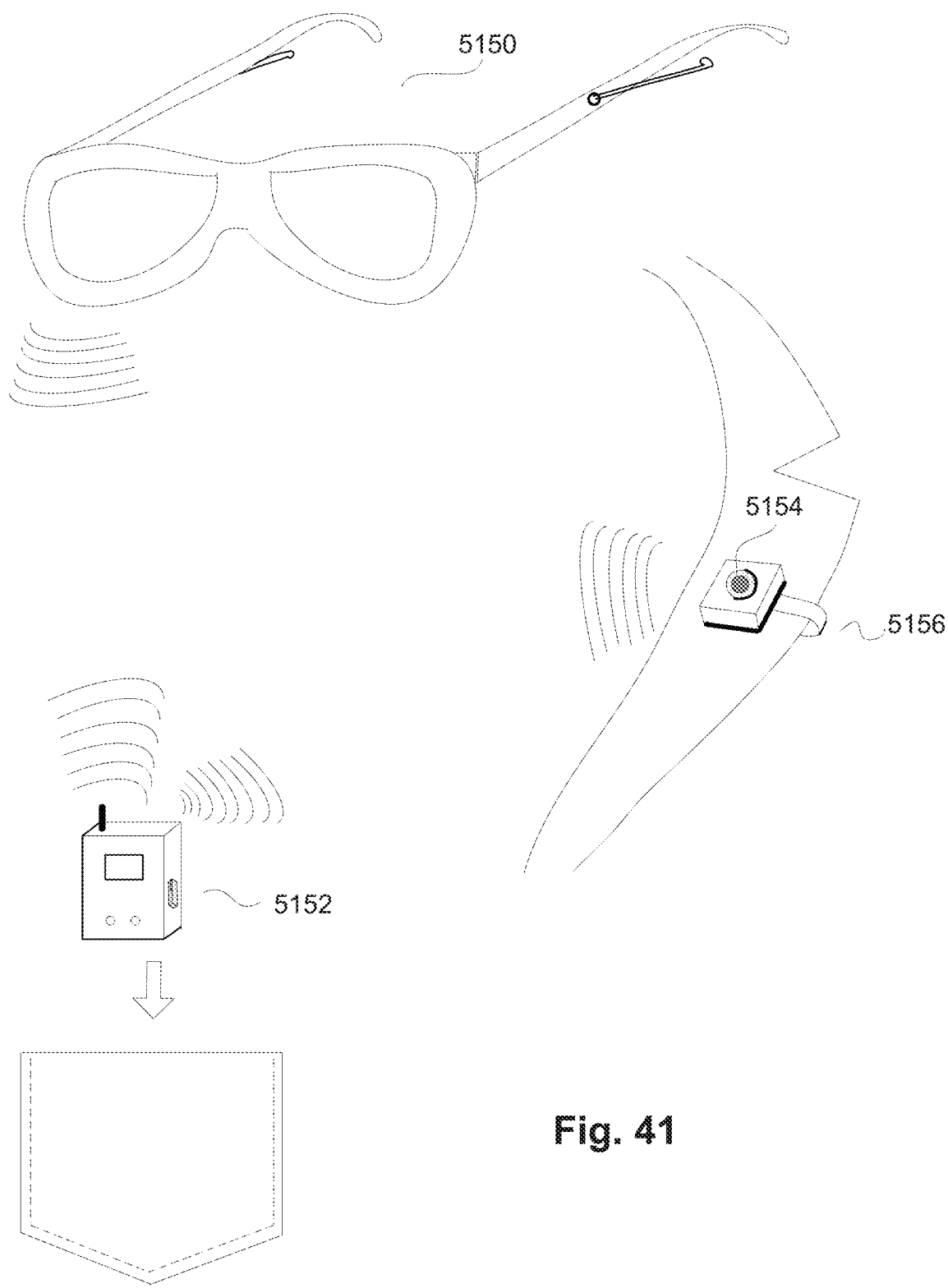
FIG. 41 shows one embodiment of the invention with a pair of glasses having speakers that are wirelessly coupled to a portable device.

FIG. 41 shows one embodiment of the invention with a pair of glasses 5150 having speakers. The glasses 5150 can be wirelessly coupled to a portable device 5152. In this embodiment, there can also be one or more microphones 5154 wirelessly coupled to the glasses. As an example, FIG. 41 shows the microphone 5154 in a package that can include a clip 5156 to attach the microphone 5154 to a piece of clothing of the user, such as to one of the lapels on a jacket of the user. In such a wireless embodiment, the glasses 5150 also include a wireless transceiver for connection to the portable device 5152 and/or the microphone 5156.

Figure 42A:
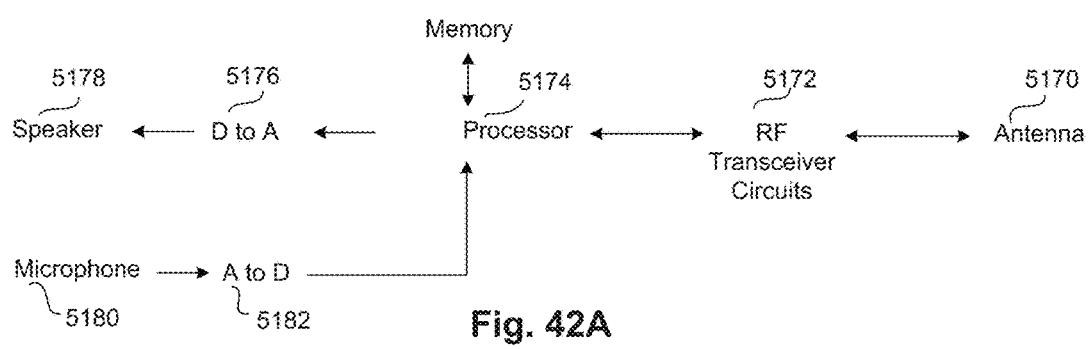
FIGS. 42A-42B show different embodiments of the present invention illustrating some of the electrical components for wireless connections to a pair of glasses.
Figure 42B:
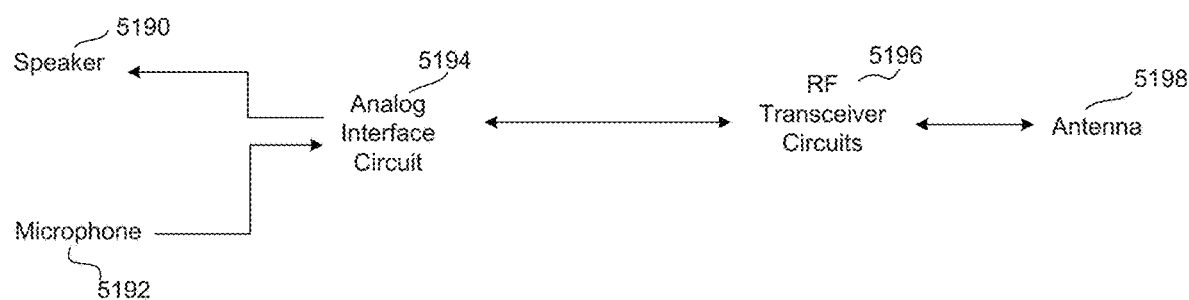

FIGS. 42A-42B show examples of different embodiments illustrating some of the electrical components for wireless connections to, or for a wireless transceiver in, a pair of glasses. In FIG. 42A, a high frequency or RF antenna 5170 wirelessly captures high frequency or RF signals for RF transceiver circuits 5172. If the transceiver circuits are for a conventional superheterodyne system, the transceiver circuits 5172 mix the RF signals down to IF signals. Then the IF signals are processed by baseband circuits to form digital outputs. Digital outputs from the baseband circuits are coupled to a processor 5174 for further processing. The baseband circuits can be incorporated in the processor, or can be separate from and coupled to the processor. Outputs from the processor 5174 are fed to a D-to-A converter 5176 to generate audio signals for a speaker 5178.

Similarly, audio analog signals from a microphone 5180 can be fed to an A-to-D converter 5182 to generate digital signals for the processor 5174 and then to the baseband circuits and the RF transceiver circuits 5172. The digital signals are then up-converted by the RF transceiver circuits 5172 and wirelessly transmitted by the antenna 5170.

In another embodiment, digital conversion is moved closer to the antenna. For example, instead of mixing RF into IF signals, the RF transceiver circuits directly perform digital conversion from the RF signals.

High frequency filters can be used at the front end of the RF transceiver circuits for the RF signals. In one embodiment, to save space, FBAR (film bulk acoustic resonator) duplexer is employed. A set of piezoelectric filters can be used to separate incoming and outgoing signals. For cell phone operation (which will be further described below), such filters can enable a user to hear and speak simultaneously.

FIG. 42B shows another example of some of the electrical components in or tethered to a pair of glasses for wireless connections. This embodiment does not depend on digitizing signals. A speaker 5190 and a microphone 5192 are connected to an analog interface circuit 5194, which is coupled to a RF transceiver circuit 5196 and an antenna 5198. For the speaker application, the transceiver circuit 5196 converts the RF signals down into IF signals, which are converted by the analog interface circuit 5194 into analog signals for the speaker 5190. Similarly, for the microphone application, its analog signals are converted into the IF signals by the analog interface circuit 5194 to be up converted by the RF transceiver circuits 5196 into RF signals for the antenna 5198. These types of wireless connection circuitry are suitable, such as, for simple radios, analog cell phones, CB radios, walkee-talkees, police radios, intercom systems, or hearing enhancement applications.

Note that in the above examples shown in FIGS. 41A-41B, signals from the microphones are transmitted by a wired connection, instead of a wireless connection.

As described above, in different embodiments, some of the electrical components are not in the glasses. Instead, they are in a base or a portable device, which can be carried by the user. The portable device can be electrically coupled to the glasses through a wired connection. In such approaches, the glasses also include at least one connector to receive an electrical wire from the base or the portable device. The connector can be at the free end of one of the temples of the glasses, or the connector can be at another location of the glasses. Different types of standard or non-standard connectors can be used and have previously been described in U.S. Provisional Application No. 60/583,169, filed on Jun. 26, 2004, which is hereby incorporated by reference.

Figure 43:
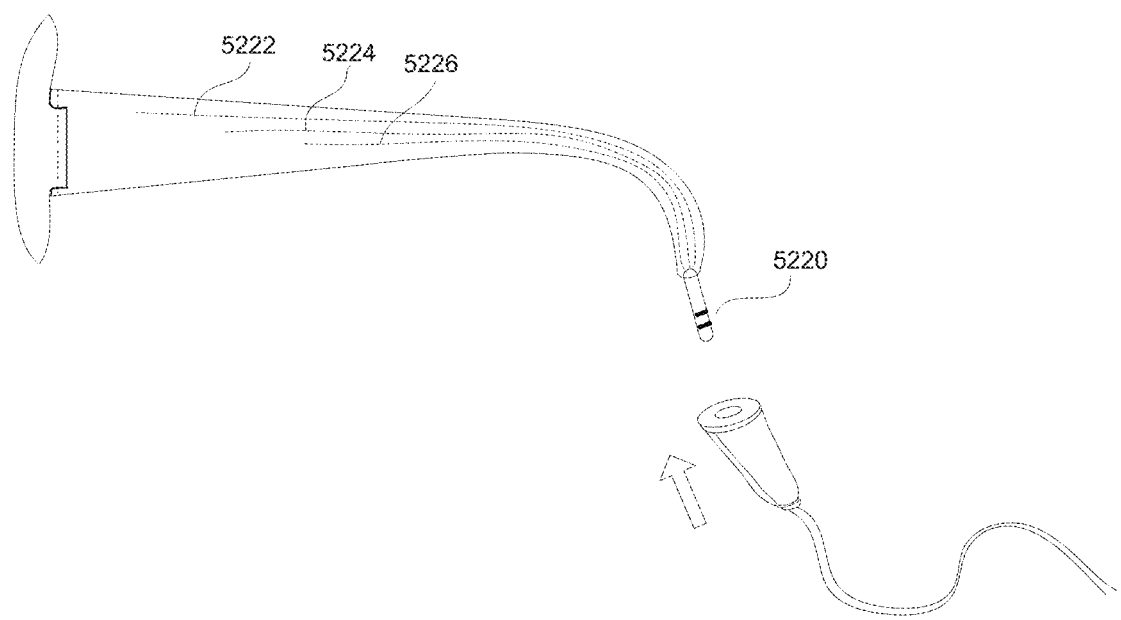
FIG. 43 shows a male stereo connector at the end of a temple according to one embodiment of the invention.

In one embodiment, a standard cylindrical plug connector is located at one end of a temple. From a different perspective, the temple molds around the end of the plug. FIG. 43 shows one such embodiment. The plug 5220 can be a standard audio connector or a 3-wire or three terminal plug, such as a 3.5 mm male stereo mini-phone plug. The 3 wires for such a plug are typically one for ground, the other two applicable for two signals, such as signals for two speakers to create stereo effects. FIG. 43 also shows the three wires 5222, 5224 and 5226, inside the temple, extended from the plug 5220. These wires are for connection to electrical components in the glasses.

In one embodiment, the cylindrical plug 5220 shown in FIG. 43 can be covered, such as with a cap or a cover, to protect, encapsulate or shroud the plug 5220. Or, at least a portion of the plug is covered. Such covering can be for esthetic reasons, or can be to prevent the plug 5220 from scratching the face of the user (if the plug has relatively sharp edges) when the user is putting on the pair of glasses.

Instead of a three terminal plug, other types of standard cylindrical plugs applicable to different embodiments of the present invention include, for example, a serial connector with 3 pins, typically one for ground, one for transmitting data (Tx) and the third for receiving data (Rx); or a 2-wire connector, one served as ground, the other for carrying signals, such as power and modulated signals.

Figure 44:
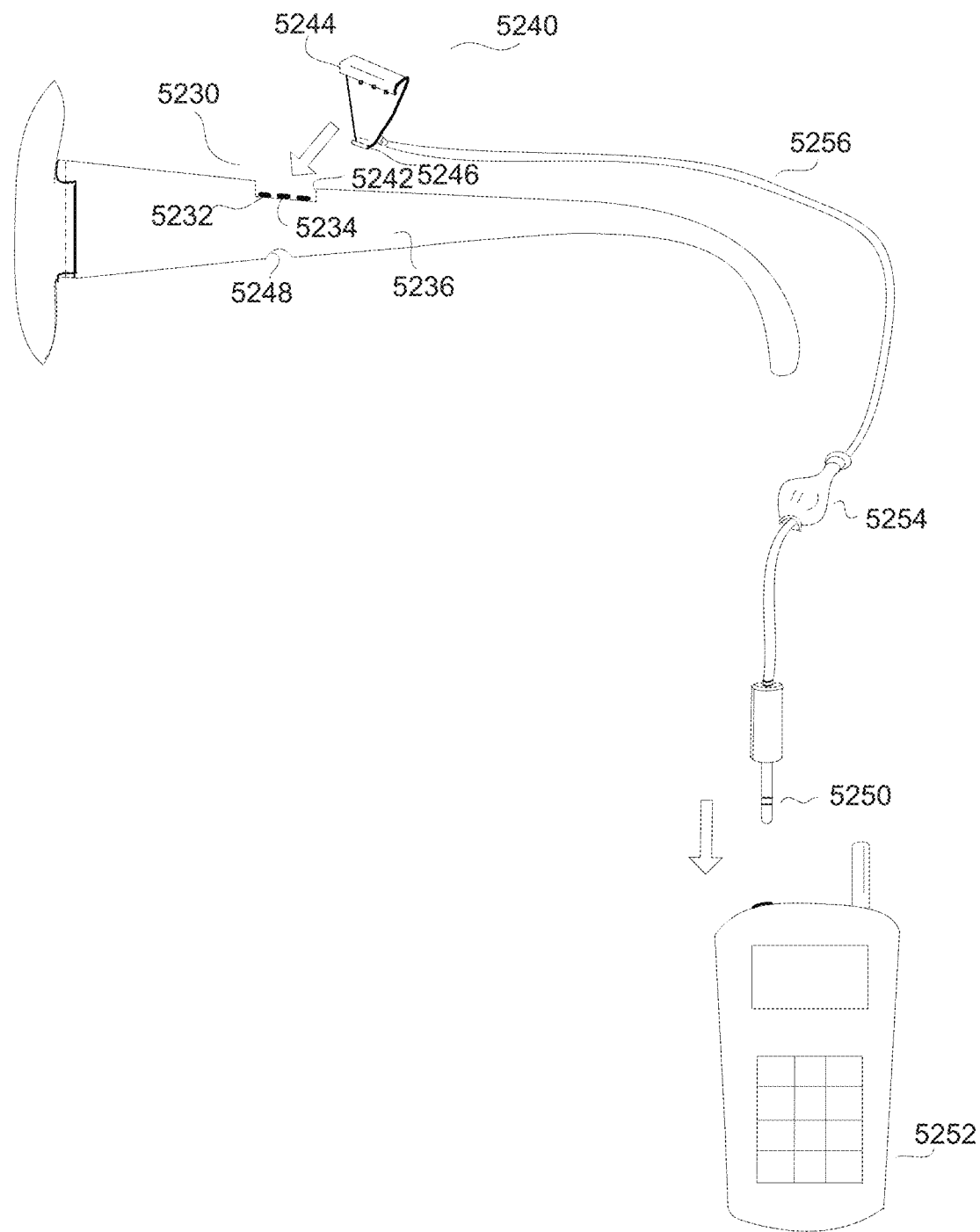
FIG. 44 illustrates a connector applicable to clamp onto a temple of a pair of glasses according to an embodiment of the invention.

Instead of a standard connector, a connector can be a non-standard connector. FIG. 36 shows a non-standard connector 5113 at the free end of one of the temples 5110. Instead of having a connector at the free end of a temple, a connector can be at another location of the glasses. FIG. 44 shows an example of a non-standard connector 5230. The connector 5230 includes one or more conductive pads, 5232 and 5234, on the top side of a temple 5236. The connector 5230 is designed to receive another connector 5240 that grabs onto or attaches around the side of the temple. There can be an indentation 5242 on the temple 5236 to receive the other connector 5240. The other connector 5240 can include a top 5244 and a bottom 5246 clip. There are a number of conductive pads or sheets inside the other connector 5240. The indentation 5242 provides alignment for connection. When attachment is at the indentation 5242, the conductive pads, 5232 and 5234, at the temple 5236 will be in contact with the conductive pads or sheets in the other connector 5240. There can also be another indentation 5248 at the temple 5236 to receive the bottom clip 5246. This can further enhance the alignment process and assist with securing the connection.

In FIG. 44, the other connector 5240 is tethered to a plug 5250, which can be inserted into a portable device 5252. The portable device 5252, for example, can be a cell phone. The portable device can include personal digital assistant (PDA) functionalities. This type of non-standard clip-type connector could be relatively easily applied to the temple with one hand, for example, while the user is driving a car.

In the wired embodiment shown in FIG. 44, a microphone does not have to be in the glasses. As shown in FIG. 44, a microphone 5254 can be attached to the wire 5256 that connects the glasses to the portable device 5252.

Figure 45:
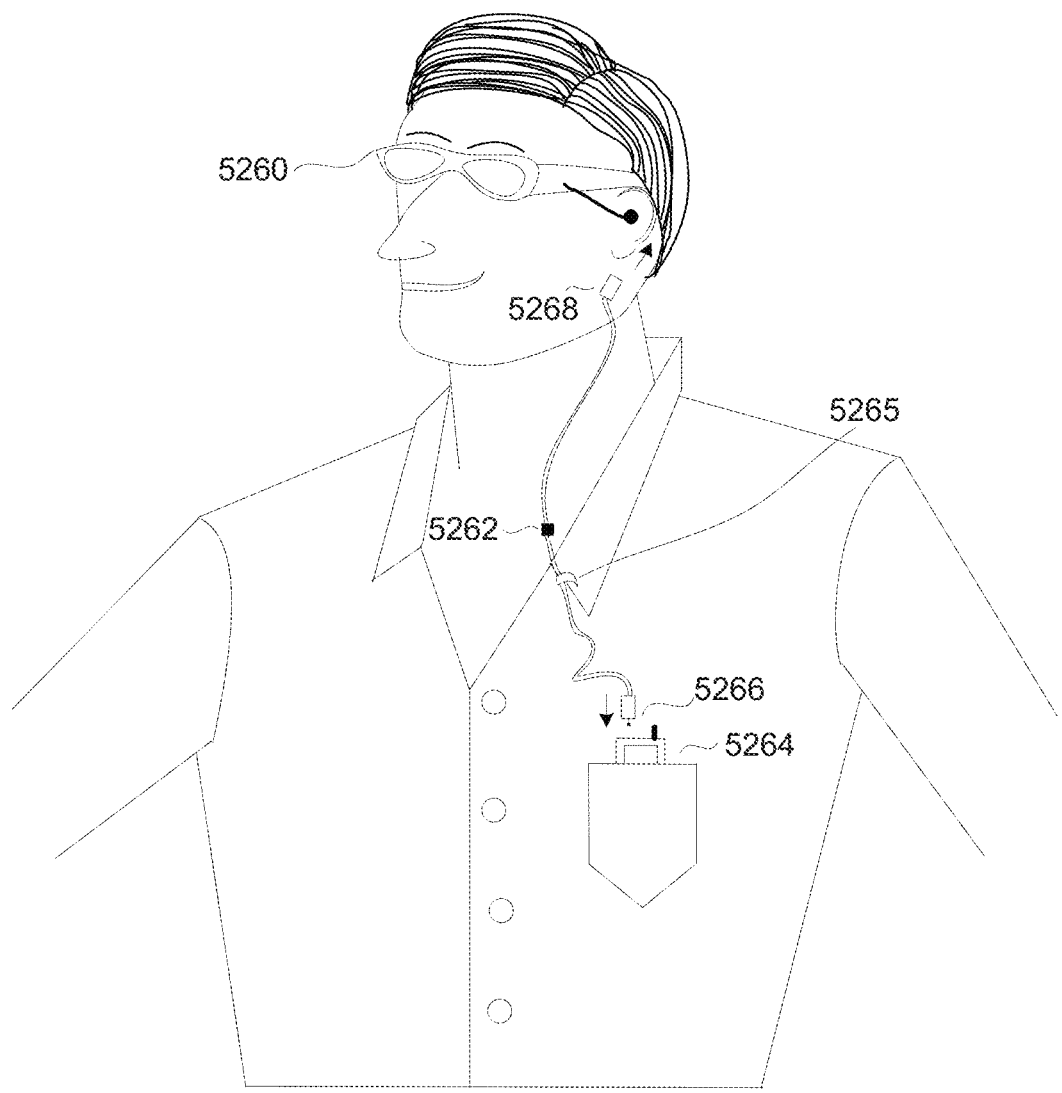
FIG. 45 shows one embodiment of the invention with a pair of glasses having a microphone coupled to the wire connected to a portable device.

FIG. 45 shows one embodiment of the invention with a pair of glasses 5260 having a microphone 5262 coupled to a wire. The wire is connected to a portable device 5264 through a plug 5266, and to the glasses 5260 through a jack 5268. The portable device 5264 can be in a shirt pocket as shown. There can also be a clip 5265 to attach the wire to an article of clothing worn by the user.

In one embodiment, the glasses include electrical components for hearing enhancement functionalities. The electrical components enhance audio signals, such as audio signals received by a microphone at the glasses. Then the enhanced signals are sent to the speakers for the user to hear. In one embodiment, the hearing-enhancing electrical components include a processor. The processor can be the processor 5174 shown in FIG. 42A. In this embodiment, the hearing-enhancing functionalities are performed through digitizing the corresponding audio signals. Then the processor, using digital signal processing techniques, operates on the digitized signals, such as boosting specific frequency bands.

In another embodiment, the hearing enhancing functionalities are provided by analog filter circuits. For example, analog filter circuits, using analog processing techniques, operate on the audio signals, such as boosting specific frequency bands.

Figure 46:
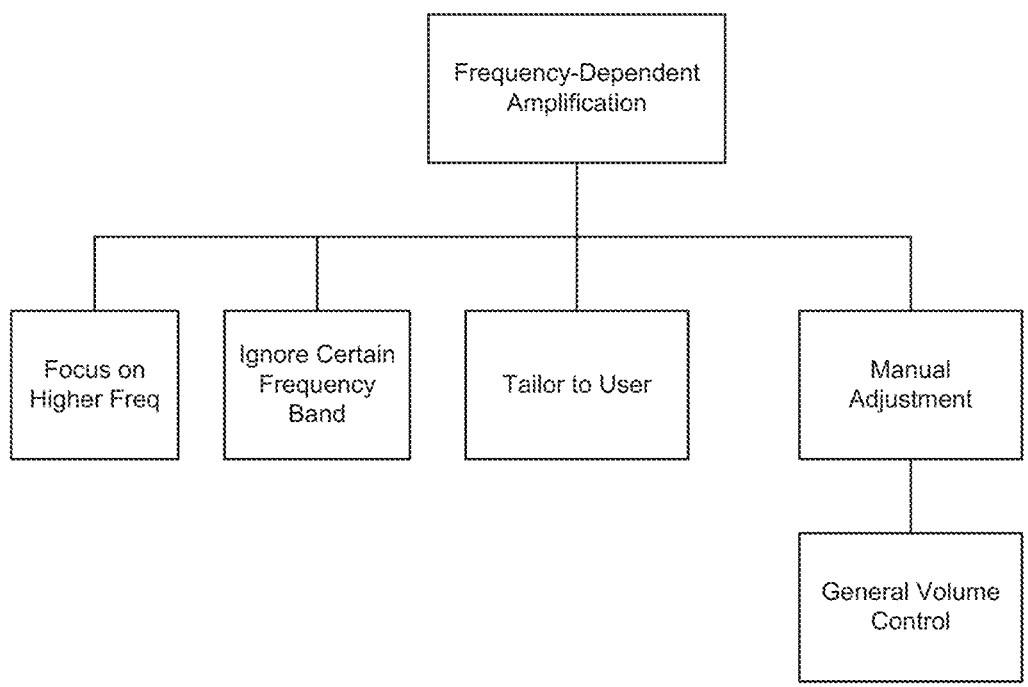
FIG. 46 shows different embodiments regarding frequency-dependent amplification of the present invention.

In one embodiment, one hearing enhancement function includes amplifying the audio signals received in a frequency range between 500 Hz to 8 kHz. Typically, a user's hearing impairment is not the same across all audio frequencies. For example, in English, the user might be able to easily pick up the sound of vowels, but not the sound of consonants, such as "S" and "P". FIG. 46 shows a number of embodiments regarding frequency-dependent amplification of the received audio signals.

One approach for frequency-dependent amplification focuses on amplifying the higher audio frequency ranges. This approach assumes that hearing degradation typically starts at the higher audio frequencies, such as above 2 to 3 kHz. Hearing may need more assistance at the higher audio frequency range. For example, the audio signals received by a microphone can be amplified by 30 dB in the frequency range from 2 kHz to 4 kHz. Or around the entrance of the ear, the audio signals in that frequency range can be amplified to reach sound pressure level ("SPL") to about 80 dB. For lower audio frequencies, such as below 2 kHz, the amplification can be lower, such as 10 dB. Or for frequencies lower than 500 Hz, the maximum SPL does not have to be higher than 55 dB.

Another frequency-dependent amplification approach focuses on amplifying an audio frequency range that typically contains most of the information in everyday communication. For example, about 70% of the information in everyday human communication can be within the frequency range of 1 to 2 kHz. The frequency range that is selected to be amplified can be such a frequency range. Other frequency ranges are not selected for amplification.

There are benefits in embodiments where the ear canal remains open, with no plug inserted into the ear. For example, the user can be hearing the audio signals directly from the sender (i.e., without assistance provided by the hearing enhancement electrical components). If the embodiments further implement frequency-dependent amplification, for frequencies not within the ranges selected for amplification, the user can hear those signals directly from the sender. Lower frequencies, such as those below 2 kHz, are typically louder. Also, frequencies in the range, such as from 2000-3000 Hz, are typically in the natural resonance of the ear canal, which is typically around 2700 Hz. As a result, the intensity of these frequencies would be increased by about 15 dB. Further, with no plug inserted into the ear, there is typically no occlusion effect due to, for example, the user's own voice.

However, in embodiments with the ear canal not plugged/blocked/covered, signal processing speed of the frequency enhancement electrical components can be important. In such embodiments, the user can be hearing the audio signals both from the sender and the glasses' speakers. To prevent echoing effect, signal processing speed for hearing enhancement cannot be too low. Typically, the user would not be able to distinguish two identical sets of audio signals if the difference in arrival times of the two signals is below a certain delay time, such as 10 milliseconds. In one embodiment, the hearing enhancement signal processing speed is faster than such a delay time.

In one embodiment, the user has the option of manually changing the amplification of the system. The system can have a general volume controller that allows the user to adjust the output power of the speaker. This adjustment can also be across certain frequency bands. For example, there can be three volume controls, each for a selected frequency band.

Figure 47:
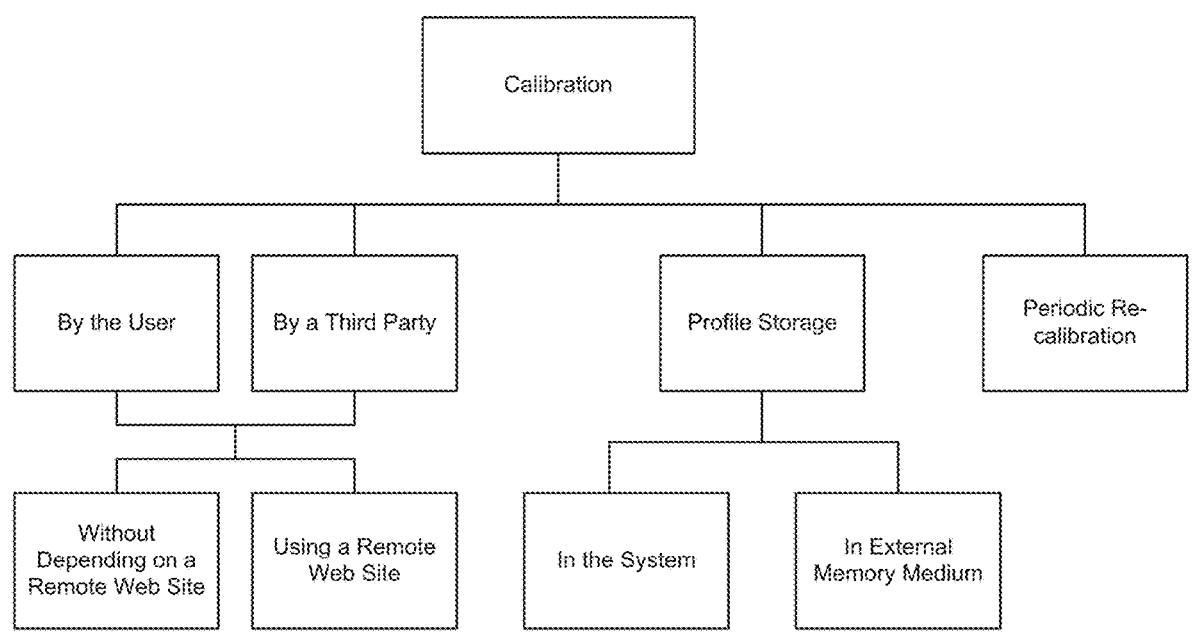
FIG. 47 shows a number of embodiments regarding hearing calibration of the present invention.

In another approach, amplification across frequencies is tailored to the hearing needs of the user. This tailoring can be performed through calibration. FIG. 47 shows a number of embodiments regarding calibration of a user's hearing, for example, across various frequencies and/or for different amount of amplification. Calibration enables the glasses to determine (e.g., estimate) the hearing sensitivity of the user. Through calibration, the user's hearing profile can be generated.

The user can perform the calibration by himself/herself. For example, the audio frequencies are separated into different bands. The glasses generate different SPL at each band. The specific power level that the user feels most comfortable would be the power level for that band. Alternatively, the glasses could generate different tones in different frequency bands. The user could compare the tones and rate the perceived loudness. In this process, the glasses can prompt the user and lead him through the process interactively. Based on the measurements, the glasses could create a calibration curve, which becomes the personal hearing profile for that user. After calibration, signals received in different bands, such as by a microphone in the glasses, will be amplified or attenuated according to the hearing profile.

In another embodiment, calibration can be done through a web site. The web site can guide the user through the calibration process. The user can be sitting in front of a computer terminal that is connected through the Internet to the web site. The terminal includes a headset that produces audio sounds. Alternatively, the user could be wearing the glasses that are connected through a cable to the sound card of the computer. The headset (or the glasses) generates different SPL at different frequency bands to test the user's hearing. The specific power level that the user feels most comfortable would be the power level at that band for the user. After testing is done for all of the bands, based on the power levels for each band, the web site creates and stores the user's personal hearing profile. Alternatively, the calibration procedure could be done off-line, with software provided on a storage device, such as a disc. The software could be installed on the user's computer. After installation, the software can guide the user through the calibration process.

Note that the different calibration processes can also be done by a third party, such as an audiologist, for the user.

The user's hearing profile, which typically is represented as digital data, can be stored in the glasses, in a base, or in a portable device. After calibration, the hearing profile can be downloaded, from, for example, the above described terminal, into the glasses wirelessly, such as through Bluetooth, infrared or other wirelessly interconnection technologies, or through a wired connection. The hearing profile can alternatively be stored in a portable media storage device, such as a memory stick. The memory stick could be inserted into the glasses, the base, the portable device, or some other audio generating device, which desires to access the hearing profile and personalizes the amplification across frequencies for the user.

The glasses (or the base, or the portable device) can also periodically alert the user for re-calibration. The period can be, for example, once a year. Also, the calibration can be done in stages so that it is less onerous and/or less obvious that the user is wearing a hearing enhancing device.

In another embodiment, there can be many pairs of glasses. Each pair amplifies the received audio signals in a preset frequency range by a preset amount. For example, two pairs amplify two respectively different preset frequency ranges by 20 dB. In another set, each pair provides different amount of amplification for the received audio signals in the same preset frequency range. For example, the different amount of amplification ranges from 20 to 40 dB at 5 dB intervals for the preset frequency range of 2500 to 4000 Hz. At a store, a consumer can try out different glasses with different preset amplifications at the same or different preset frequency ranges, before buying the one the consumer prefers.

In another embodiment, there is an assortment of standard hearing profiles, such as 20 or so. The user would just pick the one that sounds best.

If the glasses include hearing enhancement capabilities, the hearing enhancement functions might be on continuously for a long duration of time, power consumption can be an issue. In yet another embodiment, the glasses also include electrical components that are for managing power consumption of other electrical components in the glasses, such as the components to enhance hearing or other functionalities in the glasses. The electrical component can be a power controller, a microprocessor, or the processor 5174 in FIG. 42A. Such glasses can include power management software applications/processes to manage power consumption of the glasses.

Figure 48:
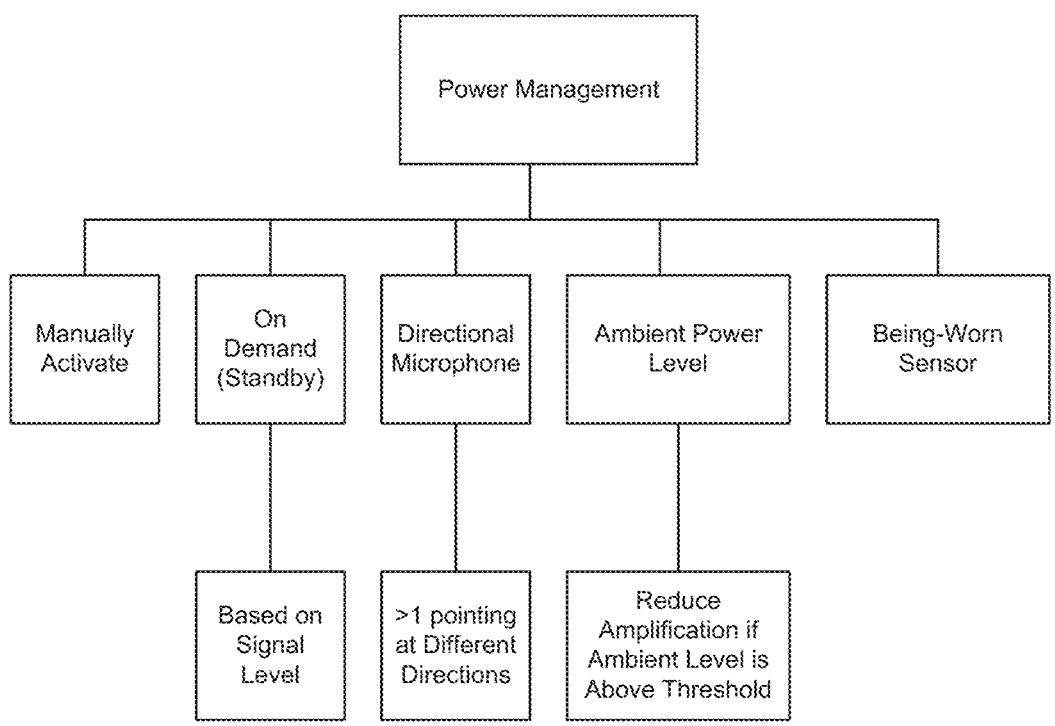
FIG. 48 shows a number of embodiments regarding power management of the present invention.

FIG. 48 shows a number of embodiments for managing power consumption of the glasses. One embodiment includes a manual on/off switch, which allows the user to manually turn off the electrical components in the glasses as he desires. The on/off switch may not have to be on the glasses. It can be on a base or a portable device tethered to the glasses.

The operation of the electrical components can be on-demand. For example, the on/off switch can be voice activated. The glasses are trained to recognize specific recitation, such as specific sentences or phrases, and/or the user's voice. To illustrate, when the user says sentences like any of the following, the hearing enhancement capabilities would be automatically turned from the sleep mode to the active mode: What did you say? Louder. You said what?

In another embodiment of on-demand power management, the glasses can identify noise (e.g., background noise), as opposed to audio signals with information. To illustrate, if the audio signals across broad audio frequency ranges are flat (not deviate more than a preset threshold amount), the glasses could assume that the received audio signals are noise. In another approach, if the average SPL of the received audio signals is below a certain level, such as 40 dB, the glasses would assume that there are no audio signals worth amplifying. In yet another embodiment, when the amplitude or the power level of the received audio signals is below a certain threshold for a duration of time, at least some of the electrical components in the glasses can be deactivated. This duration of time can be adjustable, and can be, for example, 10 seconds or 10 minutes. In another approach, only when the signal-to-noise ratio of the audio signals in the ambient is above a preset threshold, would the deactivated electrical components be activated (i.e., awakened from the sleep mode, the reduced power mode or the standby mode). In any case, to deactivate, the glasses or the hearing enhancement capabilities can be placed into a sleep mode, a reduced power mode or a standby mode.

Another approach to manage power consumption can make use of a directional microphone. This approach can improve the signal-to-noise ratio. The gain at specific directions of such a microphone can be 20 dB higher than omni-directional microphones. The direction of the directional microphone can vary with application. However, in one embodiment, the direction of the directional microphone can be pointing forward or outward away from the user. The assumption is that the user typically faces the sender of the message, and thus it is the audio signals in front of the user that should be enhanced.

In yet another embodiment of power management, the amplification of the glasses on at least a range of frequencies depends on the ambient power level, or the noise level of the environment of the glasses. One approach to measure the noise level is to measure the average SPL at gaps of the audio signals. For example, a person asks the user the following question, "Have you left your heart in San Francisco?" Typically, there are gaps between every two words or between sentences or phrases. The glasses measure, for example, the root mean square ("rms") value of the power in each of the gaps, and can calculate another average among all of the rms values to determine the noise level. In one embodiment, the glasses increase the amplification so as to ensure that the average power of the output audio signals by its speaker(s) is higher than the noise level by a certain degree. For example, the average SPL of the output audio signals from the glasses is 20 dB above the noise level.

In another embodiment, if the average power level of the environment or the ambient noise level is higher than a preset threshold value, signal amplification is reduced. This average power level can include all the audio signals received by, such as the microphone(s) of the glasses. The rationale is that if the environment is very noisy, it would be difficult for the user to hear the audio signals from the other person anyway. As a result, the glasses should not keep on amplifying the audio signals independent of the environment. To illustrate, if the average power level of the environment is more than 75 dB, hearing enhancement amplification is reduced, such as to 0 dB.

In yet another embodiment, the glasses further include automatic activation/deactivation mechanism controlled by a sensor that determines whether the user is wearing the eyeglasses. A number of such being-worn sensor embodiments have previously been described, such as in U.S. patent application Ser. No. 11/078,855, filed Mar. 11, 2005, entitled, "EYEWEAR WITH RADIATION DETECTION SYSTEM," which is hereby incorporated by reference.

Figure 49:
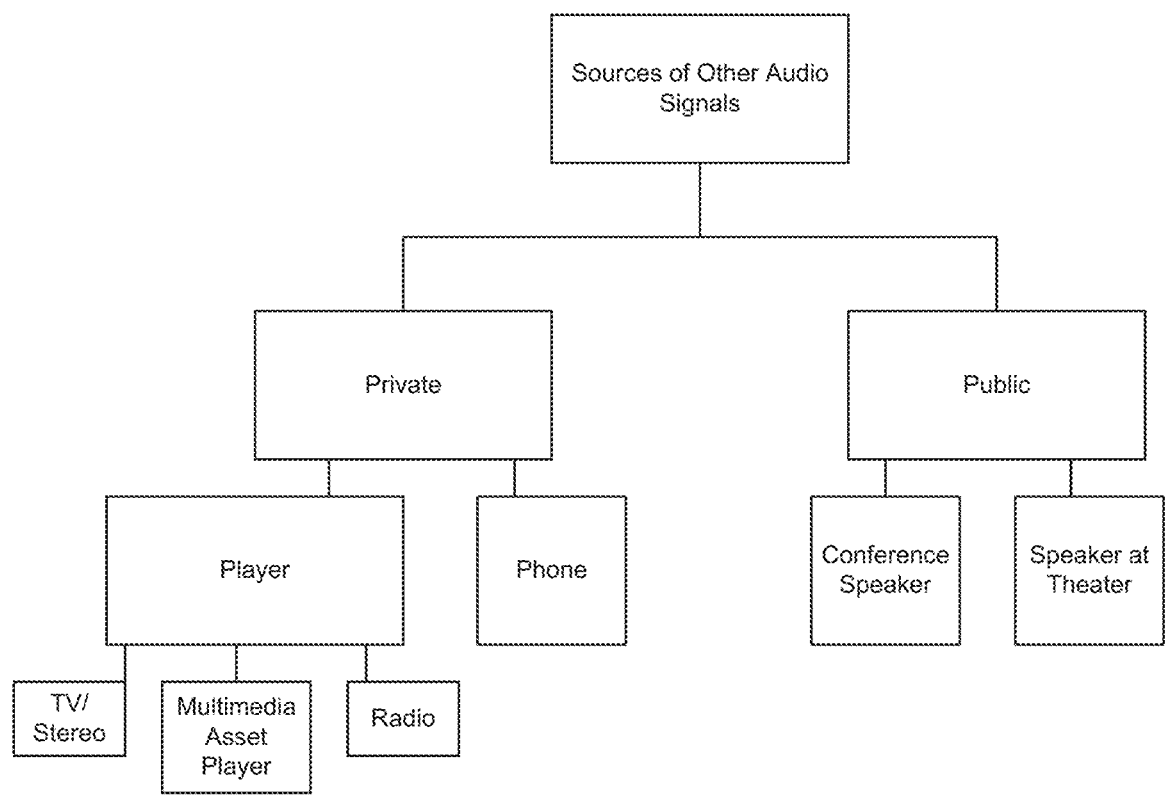
FIG. 49 shows different embodiments of sources of other audio signals generated by the glasses according to the present invention.

A number of embodiments have been described on hearing enhancement. In other embodiments, at least one electrical component in the glasses is for generating audio signals that do not originate from signals captured by the microphone(s) in the glasses. These audio signals can be known as other audio signals. FIG. 49 shows different embodiments of the sources of such other audio signals. These signals can originate from relatively private sources or public sources.

In one example of signals from private sources, the other audio signals originate from a phone call received by the glasses. Such a pair of glasses can include wireless communications electrical components of a phone. The phone can be a mobile telephone, a cordless phone, a speaker phone, a CB radio, a walkee-talkee, an intercom system or other types of phone. The wireless communications electrical components can be located in at least one of the temples of the glasses. Some of the electrical components of the phone can be in a base or in a portable device wired or wirelessly coupled to the glasses. The glasses can pick up signals from a caller, and the speaker(s) in the glasses produce the audio signals, or a representation of the audio signals, from the caller.

There can be an operation indicator on the frame of the glasses to indicate that there is an incoming call. The indicator can be based on, for example, sound, light or vibration. In one embodiment, the indication is based on light, and is located on the inside of a temple close to the hinge of that temple. Such an operation indicator can be implemented in a variety of ways, such as with a light emitting diode (LED). There can be one LED coupling to more than one optical fiber, with each optical fiber guiding the light from the LED to different areas of the frame. In the case of a LED, the operation indicator is a light source, and can produce light of the color of the LED. In another embodiment, the operation indicator could represent a small text display, such as a liquid crystal display (LCD). The indicator can also be a signal light.

In one embodiment, activation/deactivation of the phone is based on whether an incoming call is present. For example, on receiving an incoming call, the glasses can automatically activate (or wake-up) to engage in wireless communication. Activation/deactivation can also be triggered by a button provided on the frame of the glasses. The button can serve to accept or drop a call. One advantage of providing activation/deactivation is that the glasses are able to be power managed so that power consumption is reduced and the life of power sources, such as battery life, is extended.

Figure 50:
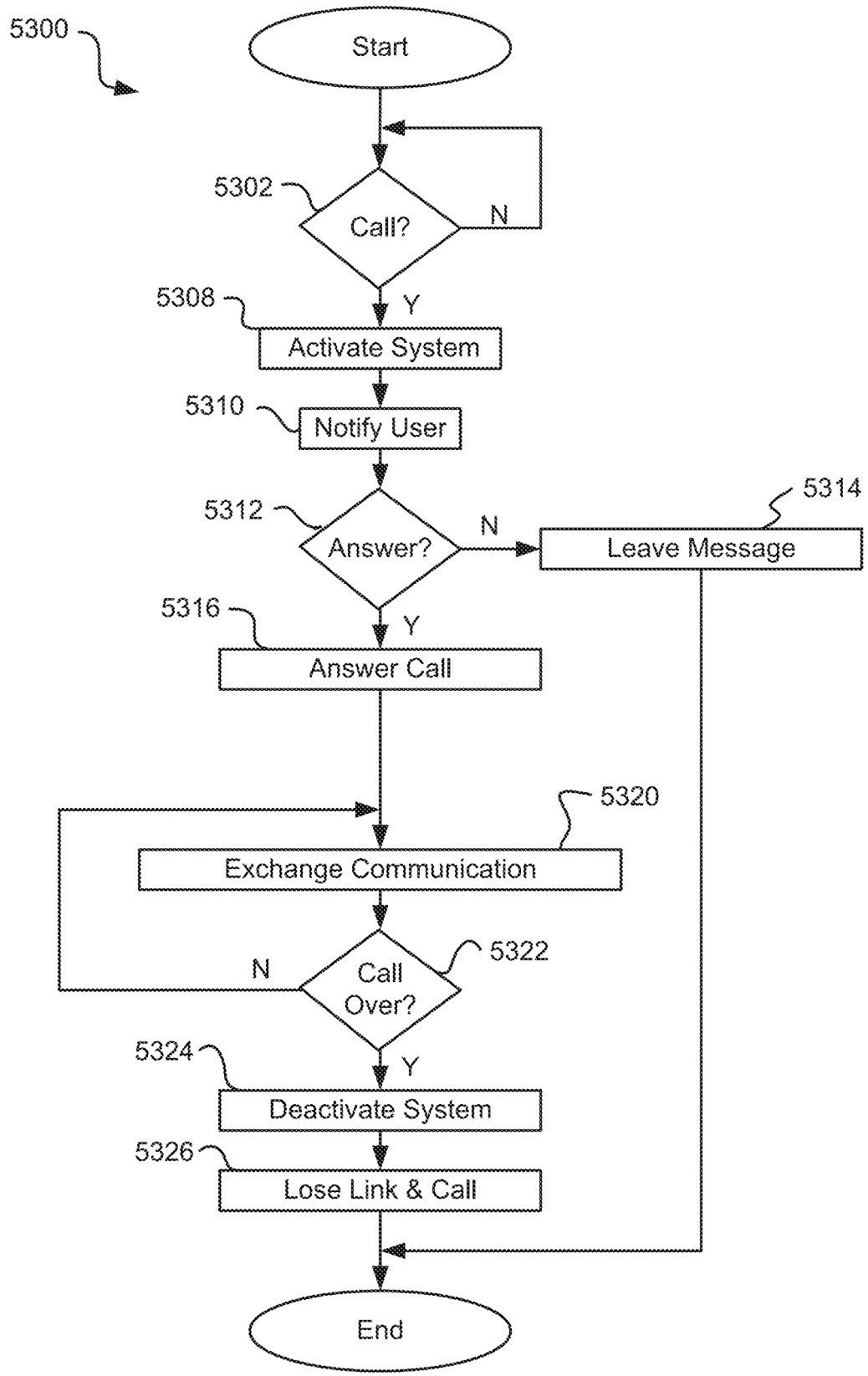
FIG. 50 is a flow diagram of call processing according to one embodiment of the invention.

FIG. 50 is a flow diagram of call processing 5300 according to one embodiment of the invention. The call processing is performed using glasses disclosed in different embodiments that have wireless communication capabilities. For example, the glasses can be based on the glasses shown in FIG. 36 or 44.

The call processing begins with a decision 5302 that determines whether a call is incoming. When the decision determines that a call is not incoming, then the call processing waits for such a call. Once the decision 5302 determines that a call is incoming, the glasses are activated 5308. Here, the wireless communications capability of the glasses is activated (e.g., powered-up, enabled, or woken-up). The user of the glasses is then notified 5310 of the incoming call. In one embodiment, the notification to the user of the incoming call can be achieved by an audio sound, such as a ringer, produced by the glasses (via a speaker). Alternatively, the user of the glasses could be notified by a vibration (such as by a base tethered to the glasses), or a visual (e.g., light) indication provided by the glasses.

A decision 5312 then determines whether the incoming call is to be answered. For example, the user can push a button to indicate that the user wants to answer the call. When the decision 5312 determines that the incoming call is not to be answered, the glasses can activate a voice message informing the caller to leave a message 5314 or instructing the caller as to the unavailability of the recipient.

On the other hand, when the decision 5312 determines that the incoming call is to be answered, the call can be answered 5316 at the glasses. The user of the glasses is accordingly able to communicate 5320 with the caller by way of the glasses and, thus, in a hands-free manner.

A decision 5322 then determines whether the call is over (completed). When the decision 5322 determines that the call is not over, the call processing returns to repeat the operation 5320 and subsequent operations so that the call can continue. On the other hand, when the decision 5322 determines that the call is over, then the glasses can be deactivated 5324, and the call is ended. The deactivation 5324 of the glasses can place the glasses in a reduced-power mode. For example, the deactivation 5324 can power-down, disable, or sleep the wireless communication capabilities (e.g., circuitry) of the glasses. Following the operations, the call processing for the particular call ends.

In an embodiment where the glasses operate as a wireless headset of a portable device (e.g. a cell phone), a wireless link can be established between the headset and the portable device if the incoming call is to be answered. The wireless link is, for example, a radio communication link such as utilized with Bluetooth or Wi-Fi networks. Thereafter, communication information associated with the call can be exchanged over the wireless link. The portable device receives the incoming call, and communicates wirelessly to the glasses such that communication information is provided to the user via the glasses. When the decision determines that the call is over and the glasses are deactivated, the wireless link is also ended 5326.

Regarding the hearing enhancing capabilities described, in one embodiment, when there is an incoming call, hearing enhanced capabilities are deactivated, and the glasses receives the incoming call. In another embodiment, when the user wants to receive the incoming call, one or more embodiments of the hearing enhanced capabilities enhance the audio signals from the incoming call.

One advantage of cell phones is that you can make calls anywhere you can get a signal. However, one disadvantage is that you might be making a call in a noisy environment. In one embodiment, the glasses also include electrical components for noise cancellation. Such noise cancellation functionalities can be activated during a phone conversation.

In one approach, noise cancellation is achieved through a first and a second directional microphones. The first one points at the user's mouth, and the second one points away. For example, the first one can be at one of the hinges as shown in FIG. 36, whose directionality favors sound arriving from the user. There can also be a tube from the first microphone to or towards the mouth of the user, to guide the sound from the mouth to the microphone. The second microphone can be in the vicinity of the other hinge, whose directionality favors sound arriving in front of or outside of the user. Signals received from the second microphone are subtracted from signals received from the first microphone before the audio signals are further processed for transmission as the message from the user.

Referring back to FIG. 49, other examples of audio signals originating from private sources include the other audio signals originating from different types of audio players, such as televisions, stereo systems, media asset players, or radios. The audio players can be in the glasses. In other embodiments, at least some of the electrical components of the audio players can be in a base tethered to the glasses, or in a portable device wired or wirelessly coupled to the glasses. For example, the other audio signals can originate from a portable device, which might produce, receive or play audio content. The audio content is then transmitted to the eyeglasses in a wired or wireless manner. The eyeglasses serve as a receiver of the audio content from the portable device and reproduce the audio signals for the user.

The glasses with the call processing ability perform two-way communications. In the embodiments of the glasses operating as audio players, the glasses perform one-way communications (or at least substantially one-way communications).

As an example of audio player being a stereo system, a pair of glasses includes electrical components of a headset for wirelessly receiving audio signals. Assume the user is working in the backyard and the stereo system is in the living room. The music from the stereo can be wirelessly transmitted to the glasses or to a portable unit carried by the user, which can re-transmit the music to the glasses wired or wirelessly. The speakers in the glasses can generate the music for the user to enjoy. Based on this technique, the user can enjoy the music without the need to crank up the volume of the stereo system.

In another example of an audio player, a pair of glasses includes a multimedia asset player, such as a MP3 player.

Figure 51:
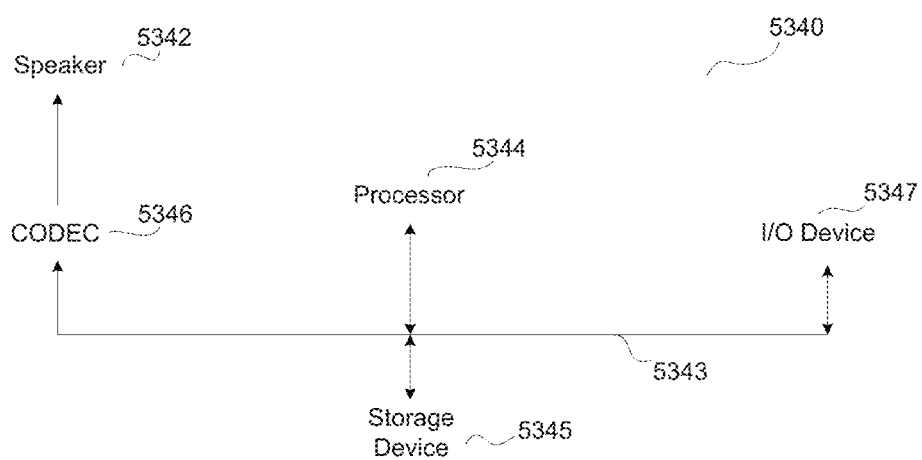
FIG. 51 shows some of the electrical components for an MP3 player according to an embodiment of the invention.

FIG. 51 shows some of the electrical components for an MP3 player 5340 according to one embodiment of the invention. The player 5340 includes a speaker 5342 and a data bus 5343, which facilitates data transfer among, for example, a processor 5344, a storage device 5345, and a coder/decoder (CODEC) 5346. The processor 5344, which can be a microprocessor or controller, controls the operation of the player 5340. The storage device 5345 stores the multimedia assets, such as MP3 files, or other types of media data that are appropriately formatted. In one example, the MP3 files are digitally encoded songs or other types of audio signals. The storage device 5345 can include a number of separate storage elements. For example, the device 5345 can be a flash memory device, or a minidisk device, and a cache, which can improve the access time and reduce power consumption of the storage device 5345. The storage device 5345 typically also includes a Read-Only Memory (ROM), which stores programs, utilities or processes to be executed in a non-volatile manner. The player 5340 can also include a RAM, such as for the cache.

Once a media asset, such as a song, is selected to be played, the processor 5344 supplies the asset to the CODEC 5346, which decompresses the asset and produces analog output signals for the speaker 5342. In one embodiment, the bus 5343 is also coupled to an input/output device 5347, which could, for example, allow a user to upload songs in the glasses to an external instrument, such as a computer; or download songs from the instrument to the glasses.

There are different approaches to select a song. In one embodiment, the media assets/songs can be categorized in the asset player. The categorization can be based on the names of artists, albums and/or songs. The categorization can be hierarchical, with multiple levels in the hierarchy. To illustrate, assume that there are three levels. The top level can be the name of a singer; the second level can be the time periods when the assets were produced, and the third level can be the names of the songs. The entries, such as the name of the singer, can be abbreviated. There can be a small display and a control knob to allow a user to scroll down entries in a level. By pushing the knob, the user selects an entry, which can lead the user to a lower level. There can be an entry for moving up a level also. In another embodiment, the display is a touch-screen display, allowing entries to be entered directly on the display. In yet another embodiment, entries can be selected based on voice recognition.

Figure 52:
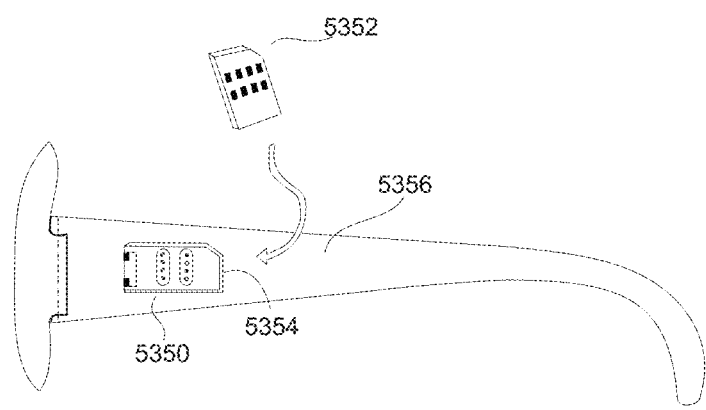
FIG. 52 shows one embodiment of the invention that has a card with electrical components coupled to a pair of glasses through a connector at a temple of the glasses.

All of the electrical components of the asset player, such as the MP3 player, do not have to be fully embedded in the glasses. In one embodiment, at least a portion of the MP3 player can be coupled to the glasses through a connector at the glasses. FIG. 52 shows a card connector 5350 to receive a card 5352, such as a removable media card (e.g., memory card). There can be a cover 5354 to secure the media card in place after it is inserted into the card connector. The cover 5354 can also protect the card once the card is in the card connector. The connector 5350 can be, for example, at a broad side of a temple 5356, as shown in the figure. The card can be for an MP3 player. It can be a memory card for a MP3 player, with the speaker of the player in the temple 5356. The speaker can play the multimedia assets accessed from the card through the connector. In another embodiment, some of the electrical components of the different types of audio players can be in a portable device, wired or wirelessly coupled to the glasses.

FIG. 36 shows two speakers, one speaker at one of the temples. In embodiments regarding generating other audio signals, the two speakers can provide stereo effects. There can also be more than one speaker at each temple. The glasses can provide four or more speakers to give a high fidelity sound or a surround sound effect. For example, each temple can include one speaker close to the hinge, and one speaker close to the tip of that temple or its temple tip. In one embodiment, a temple tip is separable from its temple. In other words, the temple tip is a replaceable part. In another embodiment, a temple tip is an integral part of its temple. The different speakers can generate different portions or sections of the sound. Further, if a base or a portable electronic device is coupled to the glasses, the base or the portable electronic device can contain another speaker, such as a base or woofer speaker. Such embodiments enable the glasses to provide a personal high-fidelity sound or a surround-sound environment.

In one embodiment, the audio player can be a radio. The glasses include the electrical components of a radio. There can also be switches on the glasses to control the operation of the radio. For example, one switch is an on/off switch, which can also change the volume of the radio. This switch can be a roller switch or can be based on two switches (one for moving up and the other moving down). Another switch can be a push button, which when pushed will reset the radio to a specific station, such as 88 MHz. A third switch is another push button, which when pushed will scan up to the next station, relative to the previous station. Different types of control knobs or switches will be further described below.

Figure 53:
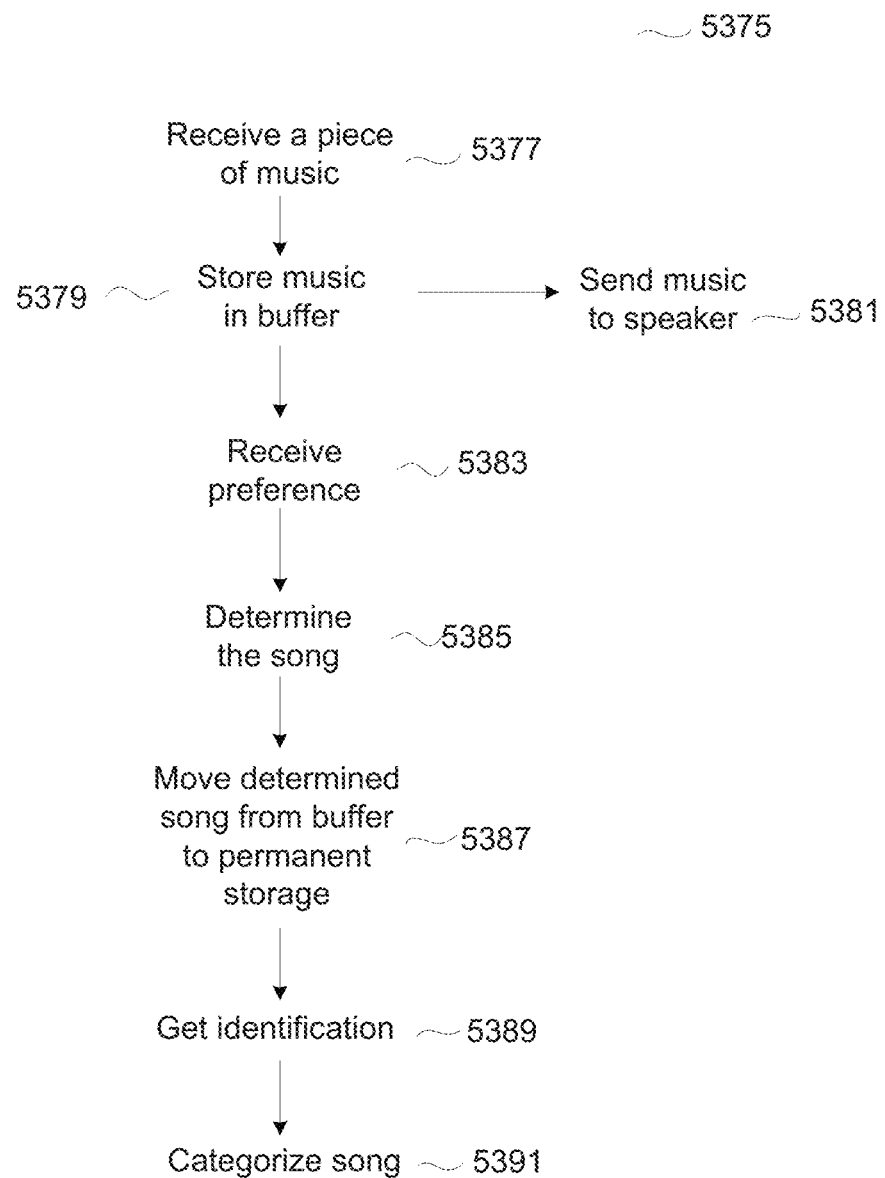
FIG. 53 shows a process for a personalized radio according to one embodiment of the present invention.

In one embodiment, the radio is a personalized radio that is personalized to the user. For example, the radio keeps track of at least one preference of the user regarding audio signals from the radio received by the user. FIG. 53 shows a process 5375 according to one embodiment for a personalized radio. Initially, a pair of glasses according to the invention receives 5377 a piece of music from a radio station. That piece of music is stored 5379 in a buffer or a temporary storage area. This temporary storage area can be in the glasses or tethered/coupled to the glasses. The piece of music is also sent 5381 to a speaker in the glasses.

Assume that the user likes the music. Based on a preference indicator, the user shows his preference. After the glasses receive 5383 an indication that the user likes the music, the glasses determine 5385 the song corresponding to the indication. That piece of music can then be moved 5387 from the buffer to a permanent storage area, such as into a flash memory. The beginning and the end of the piece of music can be identified based on additional information embedded with the piece of music. There can be meta data tied to the music keeping such additional information. With the piece of music stored in the permanent storage, the user can subsequently access it as desired.

There are different ways to determine the song or the content being played by the radio being the one preferred by the user. For example, one way/rule is that when the user pushes a specific button (a preference button) on the glasses or voices his preference, the song (or media asset or media file) that is being played at that point in time is the one the user likes. Since an operating system can be responsible to send the music to the speaker, the operating system knows what song is being played at that time. Based on the rule, the song of preference is determined when the button is pushed. Another rule is that when the user shows his preference, and there is no song being played at that instance, the song immediately preceding the break is the song of preference.

In another embodiment, the glasses can get 5389 an identification for the song the user likes. For example, the glasses can ask the user to provide an identification for the piece of music. This identification can be the type of music, the name of the singer/artist, the name of the music, the name of the album or other identification. In another embodiment, there can be meta data embedded, such as in the beginning part of the music (or media asset). Having such meta data embedded is not uncommon for music in digital format. The meta data can include identifications for the music. The glasses can get such identification. Based on the identification, the song is categorized 5391 accordingly, such as grouped with other songs having the same identification. Such categorization process would enhance the ease of accessing the song by the user at a later time.

In one embodiment, when the user activates the different types of audio players, the hearing enhancement mode is deactivated. In another embodiment, when the user activates the different types of audio players, one or more features of the hearing enhancement capabilities operate on the audio signals from the audio players. In other words, different embodiments of the hearing enhancement capabilities previously described can be activated or deactivated on the audio signals from the different types of audio players.

Referring back to FIG. 49, regarding public use, the audio signals generated by the speakers can originate from a public source. The public source can be a source that generates the audio signals for many people, or for people in a public environment. For example, the user can be at a conference or a theater. In one embodiment, the glasses can be coupled to the conference microphone or the theater speaker wirelessly, and are capable of capturing the audio signals therefrom. Again, the coupling can be through a portable device wired or wirelessly connected to the glasses. Then the glasses re-generate the corresponding audio signals for the user. Again, different embodiments of the hearing enhancement capabilities previously described can be activated or deactivated on the audio signals from the public sources.

Figure 54:
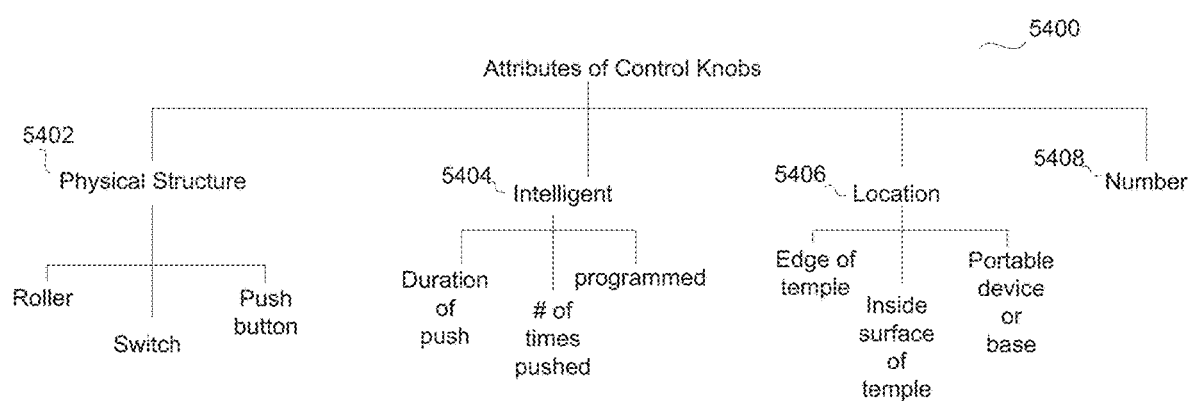
FIG. 54 shows a number of attributes of control knobs according to different embodiments of the present invention.

There can be one or more control knobs or switches at the glasses for controlling the operation(s) of the glasses. FIG. 54 shows a number of attributes 5400 regarding control knobs. The knobs can be of different physical structure 5402. For example, a control knob can be a roller, a switch or a push-button. A control knob serving as an up/down controller can use two buttons (one for up and the other for down), or a roller (rolling in one direction being up and the other direction being down).

A control knob can include additional intelligence 5404. For example, a push-button control knob can serve different purposes depending on the duration the knob is being pushed. If a user pushes it for more than three seconds, the knob serves as an on-off toggle switch for the glasses. In another example, a knob can serve multiple purposes, and the specific purpose depends on the number of times the knob is pushed non-stop.

A knob can also be programmed by a user. A user can connect the glasses to a computer and program the knob accordingly. For example, one can program a knob such that if the knob is pushed for more than three seconds, the knob would serve as an on/off switch for the glasses.

The location 5406 of a control knob can vary for different applications. A control knob can be located on the glasses. A control knob can be on the top, the side or the bottom of a temple of the glasses. A control knob can be located at the inside of a temple facing the user.

Assume that there are a number of control knobs and all of them are on the edges of a temple, except one. By being at a position substantially different from other control knobs, this knob can serve a specific purpose. For example, it can be an on/off control knob for all of the electrical components in the glasses.

In yet another embodiment, a control knob can be located in a portable device wired or wirelessly coupled to the glasses, or in a base tethered to the glasses.

The number 5408 of control knobs can vary depending on operations. For example, there is an on/off control knob and a volume up/down control knob. If the glasses are used for cell phone headset applications, in one embodiment, there is also an answer/hang-up control push-button. If the glasses serve as a radio, in one embodiment, there is also a channel selection control knob, which can be an up/down controller, like two push buttons. If the glasses serve as a CD player, in one embodiment, there is a play control knob, a stop control knob, and a skip forward/backward control knob. If the glasses serve as a multimedia asset player, such as a MP3 player, in one embodiment, there is a skip-forward/backward-song control knob and a select-song-to-play control knob.

In a number of embodiments described, a pair of glasses can serve different applications. For such embodiments, a switch on the glasses (a base or a portable device coupled to the glasses) can also serve different functions, depending on the application.

Different types of switches are applicable for different applications. Additional disclosures on switches are in U.S. Provisional Application No. 60/583,169, filed on Jun. 26, 2004, which is hereby incorporated by reference.

Figure 55A:
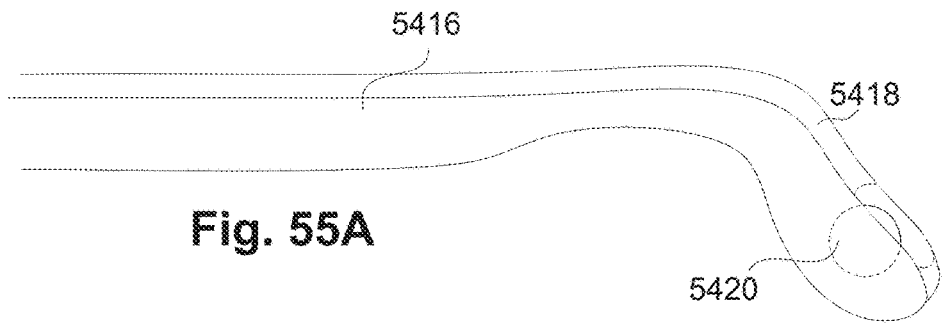
FIGS. 55A-55C illustrate different embodiments of power sources for a pair of glasses according to the invention.
Figure 55B:
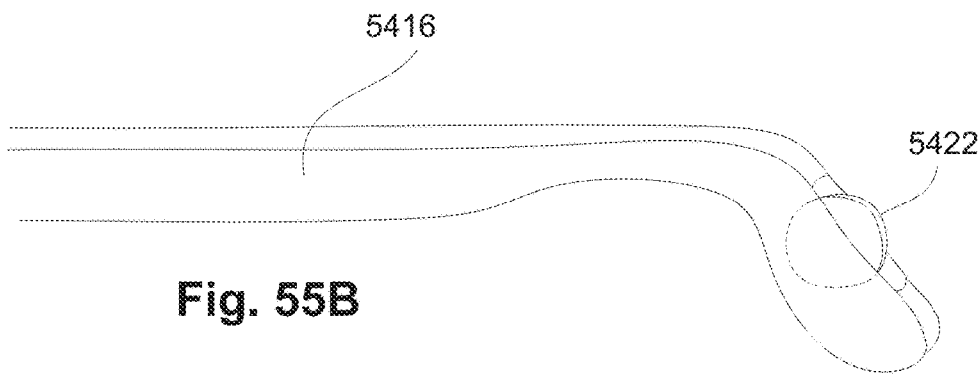
Figure 55C:
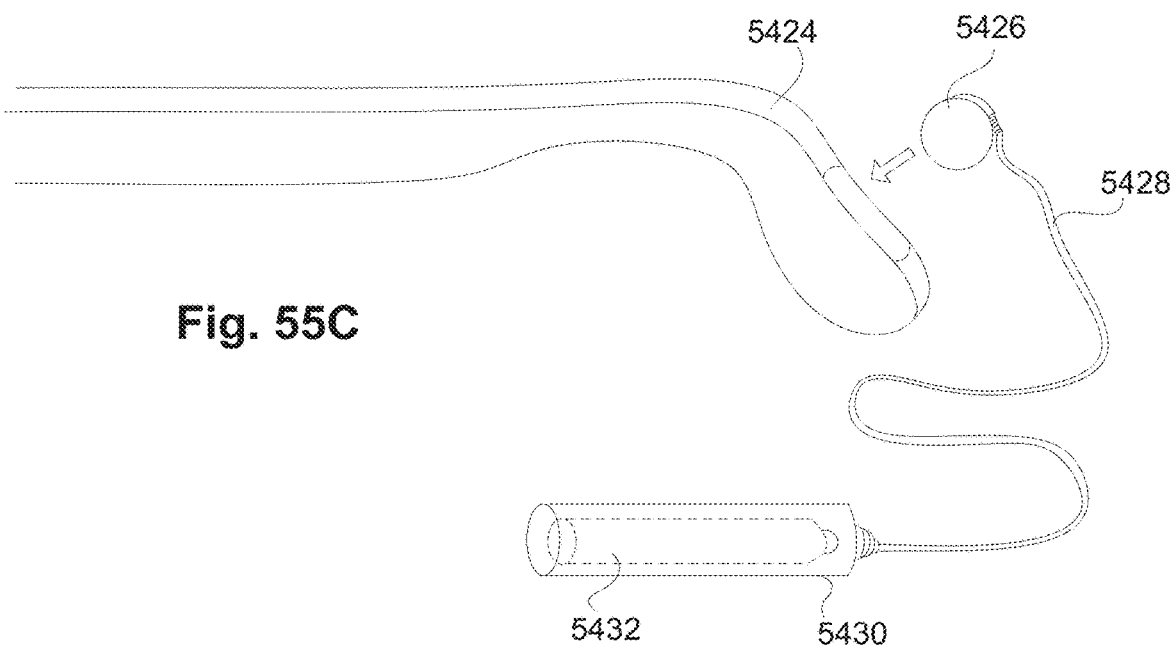

Regarding power sources for electrical components, in one embodiment, the power sources, which can be batteries and/or solar cells, are in the glasses. In another embodiment, one or more batteries can be inserted into the glasses. The batteries can be of various sizes and types. For example, as shown in FIG. 55A, a coin battery 5420 (e.g. CR1025) can be inserted into the tip section or the free end of one of the temples 5416. FIG. 55B shows the embodiment shown in FIG. 55A with a bigger coin battery 5422 (e.g. CR2032) inserted into the slot. Since the size of the battery is bigger than the size of the slot, a portion of the battery 5422 sticks out of the slot. FIG. 55C shows another embodiment of the glasses that include a slot/cavity to receive a battery adapter 5426. The slot 5418 in FIG. 55A can be the same as the slot 5424 in FIG. 55C. The adapter 5426 can be the same size and shape of the battery shown in FIG. 55A, and with two terminals, just like the battery. However, the adapter, by itself, is not an energy source. The adapter is connected to a cable 5428, with at least two wires inside, one for each terminal of the adapter. The adapter 5426 is inserted into the cavity 5424 of the glasses, and is coupled through the cable 5428 to a case or a capsule 5430 that holds a battery 5432. The two wires in the cable 5428 are for the two terminals of the battery 5432. The size and capacity of the battery held by the capsule can be bigger than the coin battery, and could be less expensive than the coin battery. In one embodiment, the capsule 5430 holds an AA battery. Note that in one approach, the temple in FIG. 55C is the same as the temple in FIG. 55A. In yet another embodiment, the power sources are in a base or a portable device connected to the glasses through a wire connection, and the power sources can be rechargeable.

In a number of embodiments, some of the electrical components for hearing enhancement and/or for generating other audio signals are in a base tethered to the glasses. In other embodiments, some of the electrical components are in a portable device, wired or wirelessly coupled to the glasses. In yet other embodiments, all of the electrical components are in the glasses.

In different embodiments, the glasses can be a pair of sunglasses, auxiliary frames, fit-over glasses, prescription glasses, reading glasses, safety glasses, swim masks, or goggles, such as ski goggles.

In a number of embodiments, the frames of the glasses have more surface area than frames with minimal structure, such as those frames with lenses connected together by wires. For example, the temples of the glasses can have a taper profile. Each of the temples can be wider or broader when it is close to its corresponding joint. In one embodiment, the temple is wider or broader by spanning across a wider or broader area longitudinally down, creating a bigger surface somewhat parallel to the face of the user. FIG. 36 shows an example of such an embodiment.

In another embodiment, there can be a shield at least at one of the edges of each of the lens holders of the glasses. These shields can wrap around, or better conform to the profile of, the face of the wearer. The shields can be opaque. There can be transparent or translucent windows on these shields. To illustrate, in fit-over sunglasses, when worn over a pair of prescription glasses, such shields can go over or cover at least a portion of the pair of prescription glasses. Note that in one embodiment, a pair of glasses does not have to include lenses.

A number of embodiments have been described with electrical components in the temples of the glasses. In yet another embodiment, at least one electrical component is in other parts of the glasses, such as in a shield, the bridge or a lens holder of the eyeglasses.

A number of embodiments of glasses have been described where the glasses include hearing enhancement capabilities and can generate one or more types of other audio signals. Note that electrical components for such functionalities can be shared. For example, different functionalities can share the same power source, or the same processor/controller.

Though a number of embodiments of glasses have been described where the glasses with hearing enhancement capabilities also generate other audio signals, different embodiments of the glasses only have hearing enhancement capabilities. In yet other embodiments, the glasses do not have hearing enhancement capabilities, but generate other audio signals.

In one embodiment, the glasses function as a headset and are adaptable for different applications, such as hearing enhancement, communication (e.g. phone operation) or listening to other audio signals (e.g. MP3 operation). The user initially can use the glasses as the headset for a phone or an MP3 player. Later, as the user's hearing degrades, the user can use the glasses as the headset for hearing enhancement or hearing boosting. In any event, when a person is using the headset, a third party may not be able to tell whether the person is having his hearing enhanced, or listening to other audio signals.

With the glasses functioning as a headset, in one embodiment, the glasses can include a connector and two speakers, one at each temple, both electrically connected through a conductor embedded in the glasses. The conductor can be a wire, similar to the embodiments shown in FIGS. 40A-40B. The connector can be located at the free end of one of the temples, such as the embodiment shown in FIG. 43. The connector can be a standard connector, such as a 3-wire or three terminal plug, or a 3.5 or 2.5 mm male stereo mini-phone plug. The three terminals can be for the two speakers and ground, with both speakers sharing the same ground. In one approach, the positive terminal of the left speaker is connected at the first terminal of the plug, the positive terminal of the right speaker is connected to the second terminal of the plug, and the ground terminals of the speakers are connected to the third terminal of the plug.

The plug at the glasses can be used to receive stereo signals for the two speakers. The stereo signals can be from a separate audio source, such as an MP3 player or a radio. There can be an audio cord that has a male stereo connector at one end and a female stereo connector at the other. The female connector of the cord is for receiving the plug at the glasses, while the male connector of the cord is for inserting into the headset jack of the player or the radio.

Figure 56A:
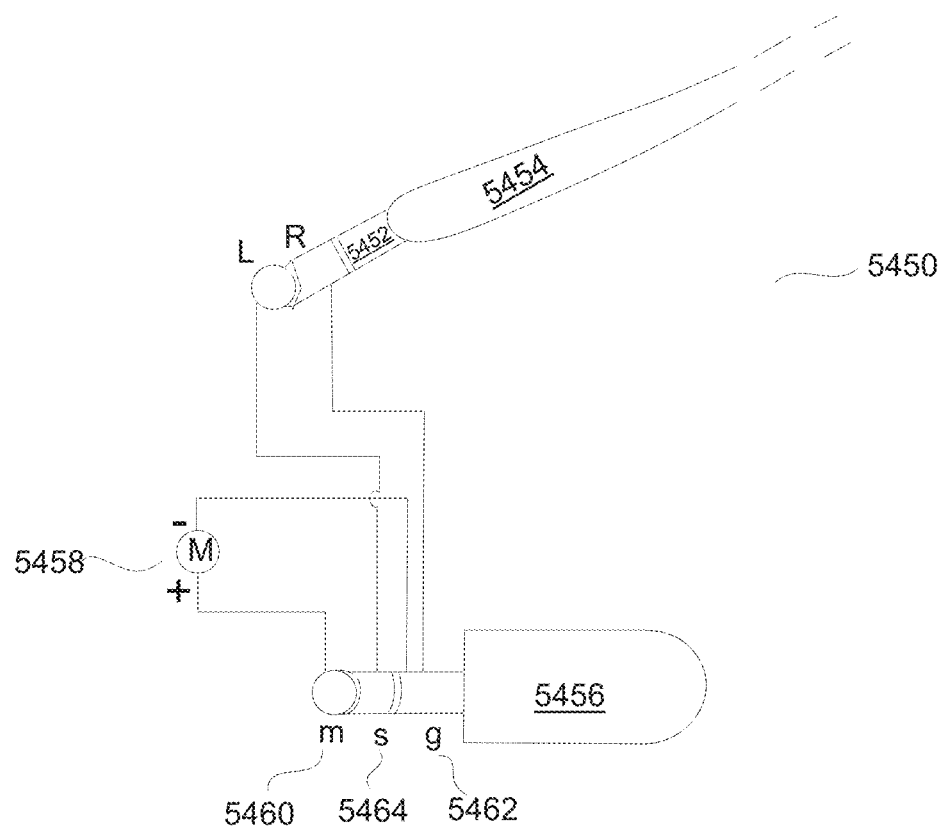
FIGS. 56A-56B show different embodiments of headset-to-phone cords according to the present invention.
Figure 56B:
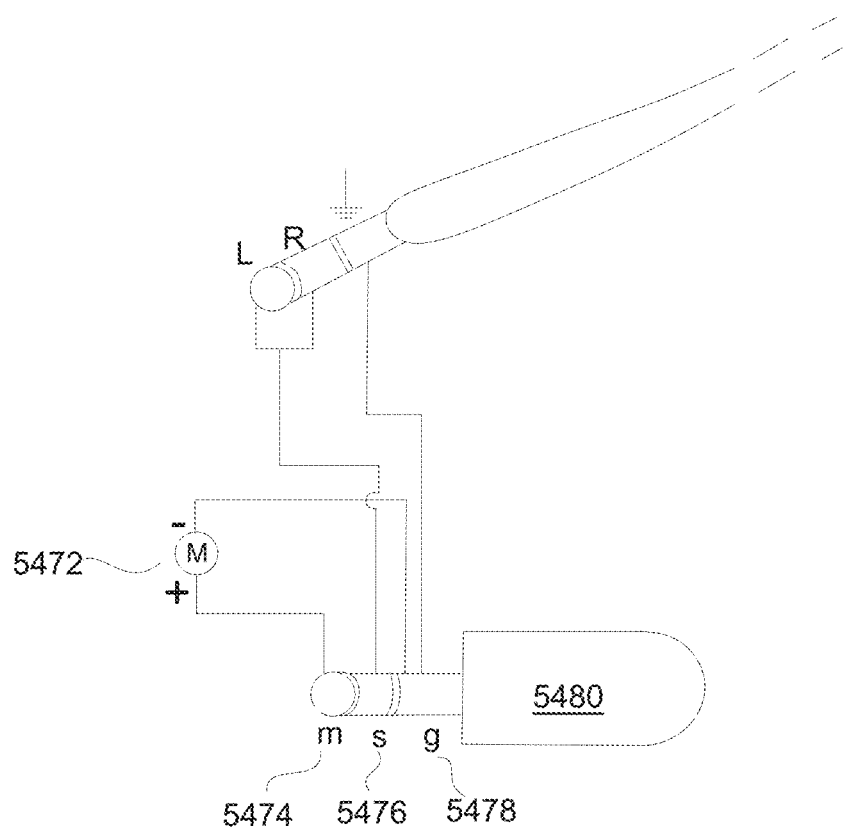

The headset can be used as the headset for a cell phone. Phone calls can be made with the headset using a headset-to-phone cord. FIGS. 56A-56B show two embodiments of such a cord. The cord includes a female stereo mini-phone jack at one end and a male stereo mini-phone plug at the other end. The three terminals at the stereo mini-phone plug can be designated as the m (microphone), s (speaker), and g (ground) terminals.

FIG. 56A shows one approach 5450 for the wiring connections in a headset-to-phone cord. One end of the cord can have a female stereo mini-phone jack for connection to the plug 5452 at a temple tip 5454 of a pair of glasses. The female jack is not shown in FIG. 56A. The other end of the cord 5450 has a stereo plug 5456, with three terminals, the m 5460, the s 5464 and the g 5462 terminals. The plug 5456 is for inserting into the headset jack of the phone. In the approach shown in FIG. 56A, the two speakers in the glasses are connected in series, and the microphone 5458 for the phone is attached to the cord, similar to the microphone 5254 shown in FIG. 44.

Regarding wiring connections in the cord 5450, the microphone 5458 is connected with wires between the m 5460 and the g 5462 terminals for the user to speak into. Note that in this embodiment, the negative terminal of the microphone 5458 is extended through a wire to connect to the ground terminal 5462 within the plug 5456. The positive terminal for one speaker is connected to the s 5464 terminal, and the positive terminal for the other speaker to the g 5462 terminal. The two negative terminals of the two speakers are connected together (such as inside the glasses) to complete the circuit. In this embodiment, both speakers are connected in series and the audio signals of the caller go through both of them.

FIG. 56B shows another approach 5470 for the wiring connections in a headset-to-phone cord. In this approach, the two speakers in the glasses are connected in parallel. A microphone 5472 is connected between the m 5474 and the g 5478 terminals. The negative terminal of the microphone 5472 is extended through a wire to connect to the g 5478 terminal at a location within the plug 5480. The positive terminals for both speakers are connected to the s 5476 terminal, and the negative terminals of both speakers to the g 5478 terminal. Again, the microphone 5472 is external to the glasses and is attached to the cord 5470.

Based on such headset-to-phone cords, the glasses can be used as the headset of a telephone, such as a cell phone. Also, based on the headset-to-phone cords, the headset can be used for hearing enhancement, with the microphone in the cord, external to the glasses.

Figure 57:
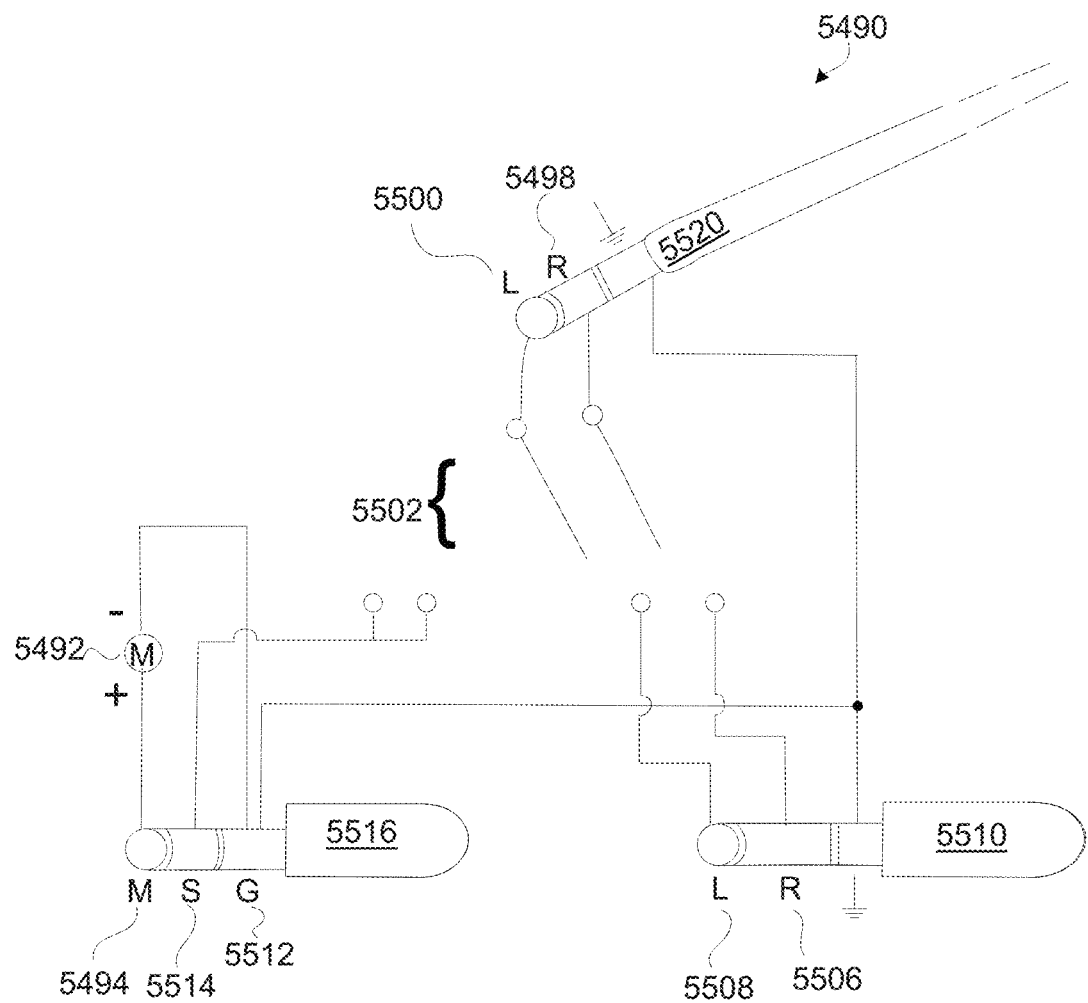
FIG. 57 shows an embodiment of the invention of a cord with a switch for both a cell phone and a player.

Note that the audio cord and the headset-to-phone cord can be combined. FIG. 57 shows a combined cord 5490 that can perform both functions. The example shown in FIG. 57 assumes the two speakers in the glasses being connected in parallel. Again the microphone is attached to the cord, external to the glasses.

As shown in FIG. 57, one end of the cord can have a female mini-phone jack to be connected to the plug 5520 at a temple tip 5522 of a pair of glasses. That female jack is not shown in FIG. 57. The combined cord 5490 includes a switch 5502. One switch position is to connect the speakers to a stereo plug 5510. This is the position where the cord 5490 functions as an audio cord. The other switch position is to connect the speakers to a stereo plug 5516. This is the position where the cord 5490 functions as a headset-to-phone cord.

With the switch 5502 in the audio cord position, the right 5498 and left 5500 speaker terminals of the plug 5520 are connected to the right 5506 and the left 5508 terminals of the male stereo connector 5510.

With the switch 5502 in the headset-to-phone cord position, the right 5498 and left 5500 speaker terminals are connected to the s 5514 terminal of the male stereo connector 5516. The microphone 5492 is connected between the m 5494 and the g 5512 terminals of the stereo plug 5516. When the plug 5516 is inserted into a phone jack, the negative terminal of the microphone 5492 is connected to the ground of the phone.

Figure 58:
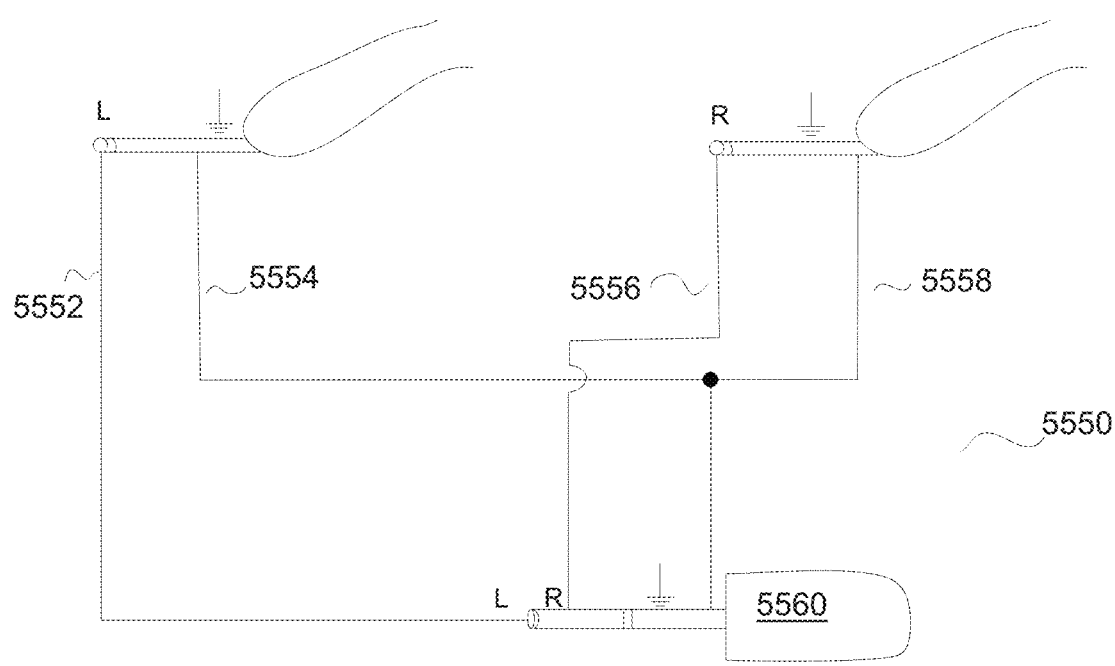
FIG. 58 shows one embodiment of a mono-plugs-to-stereo-plug adapter cord according to the invention.

Instead of having just one connector at the glasses, there can be two connectors. Each connector can be located at one of the temple tip, and each connector can be connected to the speaker at that temple through, for example, a conductor (e.g. a wire) in the temple. In one embodiment, the connectors are standard 2.5 or 3.5 mm male mono mini phone plugs. Such glasses can be used to listen to stereo music based on a mono-plugs-to-stereo-plug adapter cord. FIG. 58 shows one embodiment of the wiring connections of such an adapter cord 5550. At one end of the adapter cord, there are two female mono mini phone plugs. These plugs are not shown in the figure. Each plug connects to two wires, one signal wire and the other the ground wire. For example, a first female plug includes signal wire 5552 and ground wire 5554; and the second female plug includes the signal wire 5556 and ground wire 5558. Each pair of wires can be embedded inside a cable, with both cables forming part of a lanyard. The other side of the cord 5550 is a male stereo mini phone plug 5560. Of the 3 connections at the male stereo mini phone plug 5560, one can be connected to both of the ground wires 5554 and 5558, and for the other two, one to each signal wires 5552 and 5556. The male stereo plug 5560 can be used to receive stereo signals for the two speakers, or can be used as a plug to receive a telephone call, similar to the stereo plugs at the temples shown in FIGS. 56A-56B. In this example, the male stereo plug is not at the glasses, but is external to the glasses, such as at the lanyard.

In the above examples on cords, the microphone, such as for a phone or for hearing enhancement, is external to the glasses. In other embodiments, the microphone is in the glasses. With the microphone in the glasses, in the embodiments shown in FIGS. 56A-56B, the plugs at the temple tips are five terminal plugs, with the five terminals being the positive or the signal terminal for the left speaker, the positive or the signal terminal for the right speaker, the ground for both speakers, the microphone and the ground for the microphone. In the embodiment shown in FIG. 56A, the ground for the microphone 5458 is connected to the positive terminal of the right speaker 5462 at the g 5462 terminal of the male stereo plug 5456 within the plug 5456. In the embodiment shown in FIG. 56B, the grounds of speakers and the ground of the microphone are all connected together at the g 5478 terminal of the male stereo plug 5480.

With the microphone in the glasses, as for the embodiment shown in FIG. 58, the plugs at the temple tips are four terminal plugs, with the four terminals being the signal terminal for a speaker, the ground for the speaker, the signal terminal for a microphone and the ground for the microphone. The male stereo plug 5560 is replaced by a five terminal plug, with the five terminals being the signal terminal for the left speaker, the signal terminal for the right speaker, the ground for both speakers, the signal terminal for the microphone and the ground for the microphone.

In the above examples of the glasses functioning as a headset, one microphone is described. However, there can be more than one microphone. As described, additional microphones can provide additional benefits. For example, two microphones can be used for noise cancellation purposes. In another example, two microphones can be for stereo reception purposes with one microphone on the left side and the other on the right side of the user. For users with significant hearing loss in one of the ears, signals received from that ear can be routed to the speaker in close vicinity to the other ear. In any event, if there are two microphones, with both microphones in the glasses, and if there is just one connector at the glasses, the connector can have six terminals. The six terminals can be for the signal terminal for each of the speakers and the signal terminals for the two microphones, the ground for both speakers, and the ground for both microphones. If there are two connectors at the glasses, one at each of the temple tips, again with the microphones in the glasses, the two connectors can be four terminal connectors. Each set of the four terminals includes the signal terminal of the microphone and the signal terminal for the speaker at that temple, and their separate grounds. In these embodiments with more than one microphone, again, one can use a combined cord that has a switch so that the glasses with the combined cord are applicable as a headset for, such as, a phone, a hearing booster and an audio player.

Figure 59:
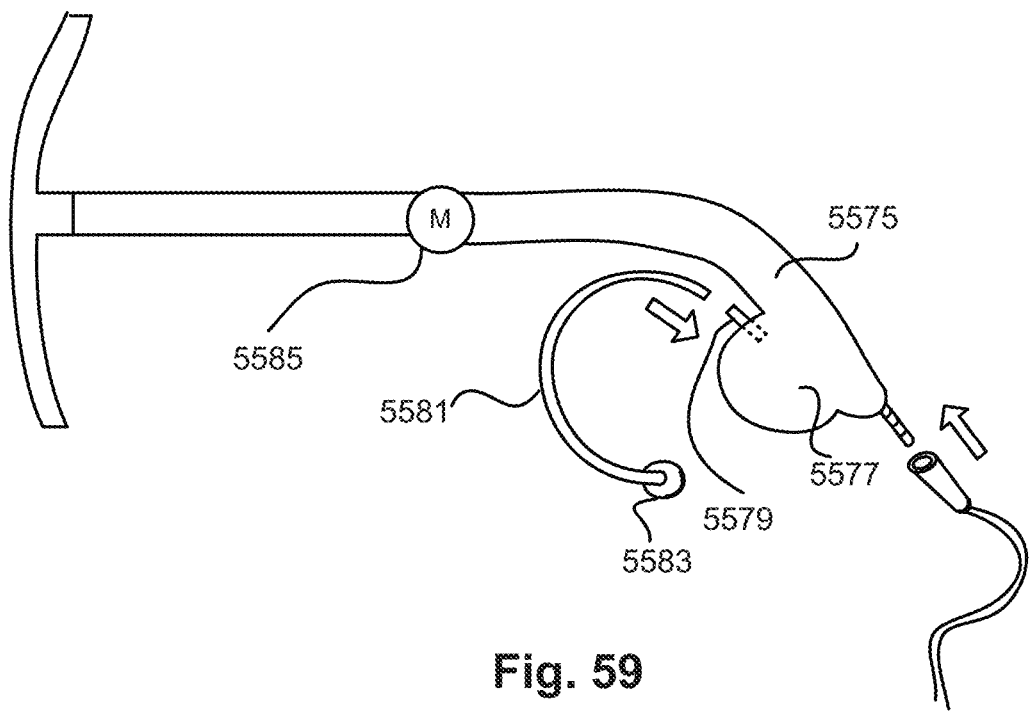
FIG. 59 shows an embodiment of the invention with a speaker at a temple tip with an extension for attachment to a tube.

Regarding the locations of the speakers, the speakers can be in the temples, similar to the embodiment shown in FIG. 36. In another embodiment, as shown in FIG. 59, a speaker 5577 can be in one 5575 of the temple tips.

In a number of embodiments, one or more speakers are embedded or partially embedded in the glasses. In one embodiment, instead of in the main body of the glasses, a speaker is, for example, at the end of a stub or an extension, extended from the main body of the glasses. The stub can extend from one of the temples of the glasses. There can be electrical wires inside the stubs to connect the speakers to other electrical component(s) in the main body of the glasses. The stubs can replace a number of the tube embodiments described by bringing the speakers closer to, or allowing the speakers to be inserted into, the ear canal of the user. In such embodiments, there may not be separate ear buds because the speakers themselves can be in structures that also serve as ear buds. Such ear buds with speakers can also be custom fitted into the ears of the user. Such ear buds can include venting structures to reduce to a certain degree the effects of occlusion.

In a number of embodiments with speakers embedded in the glasses, each speaker can have a tube extending towards an ear to guide the audio signals. The tubes can be permanently attached to the glasses. In another embodiment, the tubes are detachable from the glasses. There can be an extension 5579 with a hole at the glasses for a speaker 5577, as shown in FIG. 59. An external tube 5581 can be attached to or inserted into the extension 5579 for sound coupling into an ear. In the embodiment shown in FIG. 59, the external tube 5581 extends from the back of an ear, over the top of the ear, and curls back towards the opening of the ear. Again, there can be an ear bud 5583 at the end of the external tube 5581 to further enhance sound coupling to an ear. Also, in this embodiment, a microphone 5585 can be in the glasses at a position further away from the lens holders of the glasses.

Figure 60:
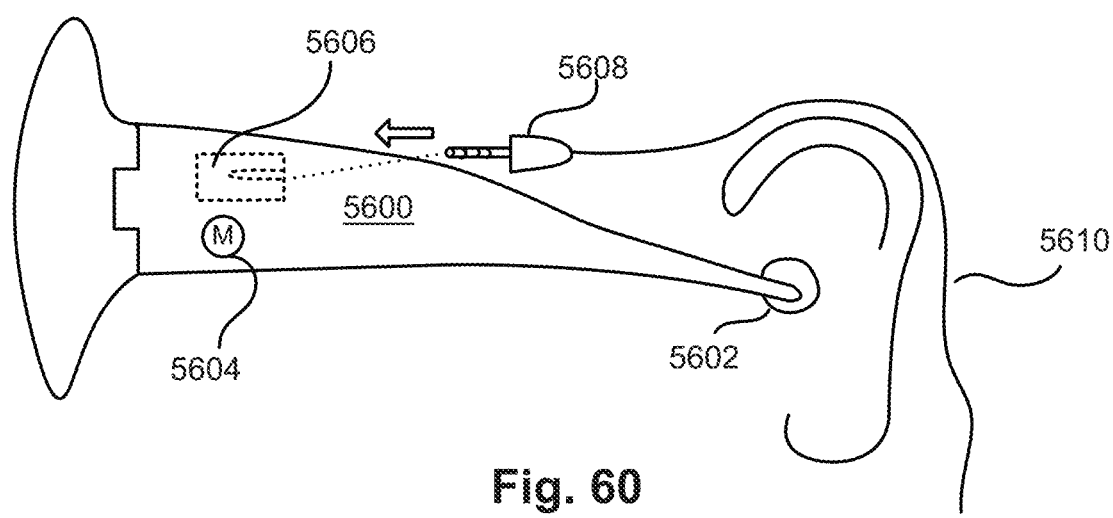
FIG. 60 shows an embodiment of the invention with the temples not extending behind the ears.

With ear buds in the ears, it may not be necessary to have temples extend behind the ears. FIG. 60 shows an embodiment with each of the free ends of the temples, such as the temple 5600, having an ear bud 5602. The speaker for the ear bud 5602 can be in the structure of the ear bud 5602. The speaker can be away from the ear bud, such as inside the temple 5600 close to the hinge of the temple 5600, but is audibly coupled to the ear bud. For example, the temple includes a tube or a tubular structure inside the temple 5600 to guide the audio signals from the speaker to the ear bud 5602 for the ear. In this embodiment, a microphone 5604 can be located in one of the temples further away from the free end of that temple. The pair of glasses can also function as a headset. If the headset is connected to a portable device through a cord 5610, the glasses include at least one connector to receive the cord 5610. In one embodiment, the connector 5606 at the glasses is a female connector. The cord 5610 for the portable device ends with a male connector 5608 to be inserted into female connector 5606 at the glasses. When the glasses are worn, both ear buds are inserted into the ears of the users. Together with the bridge (directly or indirectly through the nose pads) on the nose, and the ear buds inserted into the ears of the user, the glasses can be stably held on the head of the user. In the embodiment of a wired headset with one connector, when worn, the cord 5610 can drape behind one of the ears.

Regarding embodiments with ear buds at the free ends of the temples, in yet another embodiment, the ends of the temples are small and are made of soft materials. If the user chooses to wear such glasses, but does not want to use the speakers, the user has the option to comfortably wear the glasses with the ear buds positioned above his ears.

In one embodiment, the length of the tubes or the stubs is not fixed, but is adjustable. The tubes or the stubs are retractable and extendable, for example, similar to the embodiment shown in FIG. 38. The positions of the tubes or the stubs also can be changed, for example, similar to the embodiment shown in FIG. 36. Alternatively, the temples can be made of malleable materials to allow some adjustment to fit different users. Glasses with such flexibilities, if applied to the embodiments with ear buds at the free ends of the temples, are even easier to adjust to fit different users, for example, because one may only need to adjust the distance between the ear buds and the lens holders of the glasses.

In yet in another embodiment, a pair of glasses functioning as a headset with a speaker and a microphone further includes a camera, as shown in FIG. 61. The glasses 5650 include a temple 5652 that has a microphone 5654, a speaker 5656 and a camera 5658 with a connector 5660. The connector 5660 is for connecting, for example, to a portable device that includes at least the power source for the glasses.

The camera 5658 is preferably a digital camera with an on/off switch 5662. For example, the camera 5658 is a CCD camera with a CCD controller coupled to a CCD chip, a CCD memory device and a lens.

In one embodiment, with the connector 5660 connected to the portable device, when the switch 5662 is pushed on, the CCD chip takes a picture. The charges in the CCD chip are digitized and transmitted through the connector to the portable device, under the management of the controller. At least some of the charges can be temporarily stored in the CCD memory device, for example, to accommodate the differences in speed in taking pictures and sending the pictures to the portable device through the connector. In this embodiment, images are permanently stored at the portable device.

In one embodiment, the glasses do not offer focusing capability. The CCD chip can be located, for example, at the focal point of the lens. In another embodiment, there is an image distance control knob. For example, a mechanical lever can be pre-programmed or pre-set to move the lens to one or more different positions. There can be just two positions. One position can be for close-up shots and another for distance shots, such as close-up being about 2 ft from the lens and the distant being about 6 ft away; or close-up being about 8 inches away and distant being about 2 ft away.

FIG. 61 shows one embodiment regarding the location of the camera 5658 at the end of the temple or arm 5652 of the glasses next to the hinge of the temple. The lens of the camera faces forward. In this situation, what the user sees is substantially what the captured image would be. In other words, in a general sense, what the user sees through the glasses is what the user gets, without the need for an additional view finder. With such an embodiment, it is relatively easy for a user to take pictures, hands-free, without the need for an additional strap for holding the camera.

The connector 5660 at the end of the glasses 5650 can be, for example, a 4-terminal connector, one for ground, one for power and the other two for transmit and receive signals. In another embodiment, the connector 5660 can be a 3-terminal connector, with the power line and one of the signal lines sharing one terminal.

Regarding the embodiment shown in FIG. 61, the speaker 5656 can be in the glasses, with a tube 5666 and an ear bud 5668, to help bring audio signals to the user. In one embodiment, the tube 5666 can be rotated at its end where it connects to the glasses.

In one embodiment, the CCD with the CCD memory device and the CCD controller are on the same integrated circuit.

The embodiment shown in FIG. 61 also includes a microphone 5654. In one embodiment, the CCD memory device also stores audio signals from the microphone. For example, the memory device stores the last 15 seconds of audio signals. When the user takes a picture, the previous 15 seconds of audio signals can be coupled to the picture. The next 10 seconds of audio signals can also be coupled to the picture. The audio signals or the digitized version of the audio signals can also be transmitted to the portable device with the corresponding picture. In the future, if the user wants to view the picture, the audio signals can be played with the picture at the same time.

The electrical components in the portable device for the glasses with a camera can be incorporated in the glasses. For example, the power sources can also be in the glasses and the glasses do not have to include a connector. In one embodiment, the glasses include non-volatile memory to store at least a number of pictures. In another embodiment, the glasses further include a connector to receive a memory card, such as a flash memory device. One embodiment of such a removable card on a pair of glasses is shown in FIG. 52, where the card 5352 can be a removable memory card. The card can be a standard memory card with a USB connector. Pictures taken can be stored in the removable memory card.

In yet another embodiment for the glasses with a camera, the glasses do not include a speaker or a microphone. The glasses include a temple that has a CCD controller coupled to a CCD chip, a CCD memory device and a lens. The temple also includes an on/off switch with a connector. The connector is for connecting, for example, to a portable device that includes at least the power source for the camera.

Additional disclosure on camera in glasses can be found in U.S. Provisional Application No. 60/583,169, filed on Jun. 26, 2004, which is hereby incorporated by reference.

A number of electrical components have been described. They can be on circuit boards, which can be made of flexible materials. They can be on a substrate. They can also be integrated into one or more integrated circuits.

Although a number of embodiments have been described of glasses with hearing enhanced and/or other audio signal generation capabilities, in one embodiment, the hearing enhanced and/or other audio signal generation capabilities are in another apparatus. When a person is using that apparatus, a third party again would not be able to tell whether the person is having his hearing enhanced, or listening to other audio signals. This again may be able to remove the stigma of wearing a hearing aid.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

A number of embodiments in the invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A wireless headset at least for helping a user hear audio outputs, the wireless headset comprising:
   a printed circuit board in the wireless headset, the printed circuit board with at least a controller attached thereon;
   a speaker in the wireless headset;
   a microphone in the wireless headset; and
   wireless communication circuitry,
   wherein the wireless headset is configured to facilitate output of the audio outputs after modifying power of the audio outputs, at least within a range of frequencies, to help the user hear the audio outputs presented to the user via at least the speaker,
   wherein the wireless communication circuitry is configured to receive at least a message,
   wherein if the message is a text message, the at least a controller is configured to have at least a notification regarding the text message presented to the user, and
   wherein if the message is an audio message, the at least a controller is configured to have at least a notification regarding the audio message presented to the user.

2. A wireless headset as recited in claim 1, wherein at least the microphone is configured to receive an audio response for the message from the user.

3. A wireless headset as recited in claim 2, wherein the at least a controller is configured to facilitate converting the audio response into text to be wirelessly transmitted.

4. A wireless headset as recited in claim 1 comprising a force sensor in the wireless headset, the force sensor configured to sense force exerted onto an area of the headset.

5. A wireless headset as recited in claim 1 comprising a storage medium in the wireless headset, the storage medium configured to store at least computer program codes for facilitating voice recognition to recognize at least a word received by at least the microphone.

6. A wireless headset as recited in claim 1 comprising another microphone in the wireless headset, the another microphone configured to capture at least sound in vicinity of the headset at least for noise cancellation, with one of the microphones closer to mouth of user than the another one of the microphones when the wireless headset is worn by the user.

7. A wireless headset as recited in claim 6, wherein the noise cancellation is at least by cancelling a portion of the sound captured by the another microphone to produce the audio outputs.

8. A wireless headset as recited in claim 6, wherein at least the microphone and the another microphone are configured to receive audio inputs from the user, with at least some noise in the audio inputs configured to be cancelled based on using at least the microphone and the another microphone.

9. A wireless headset as recited in claim 8, wherein the audio outputs depend on noise cancellation using at least a portion of the sound captured by the another microphone.

10. A wireless headset as recited in claim 1 comprising an accelerometer in the wireless headset, the accelerometer configured to enable identifying a movement of the user.

11. A wireless headset as recited in claim 1 comprising a flexible printed circuit board in the wireless headset.

12. A wireless headset as recited in claim 1, wherein the wireless headset is configured to assist in determining at least a hearing characteristic of the user.

13. A wireless headset as recited in claim 12, wherein the wireless headset is configured to be worn in an ear of the user, and to assist in determining at least the hearing characteristic of the user based on at least generating a signal for the user and keeping track of at least a reaction from the user regarding the signal.

14. A wireless headset as recited in claim 1 comprising a sensor in the wireless headset, the sensor configured to provide at least an indication regarding whether the wireless headset is being worn.

15. A wireless headset as recited in claim 14 comprising another microphone in the wireless headset, the another microphone configured to capture at least sound in vicinity of the headset at least for noise cancellation, with one of the microphones closer to mouth of user than the another one of the microphones when the wireless headset is worn by the user.

16. A wireless headset as recited in claim 15, wherein at least the microphone and the another microphone are configured to receive audio inputs from the user, with at least some noise in the audio inputs configured to be cancelled based on using at least the microphone and the another microphone.

17. A wireless headset as recited in claim 16, wherein the audio outputs depend on noise cancellation using at least a portion of the sound captured by the another microphone.

18. A wireless headset as recited in claim 17 comprising a motion sensor in the wireless headset, the motion sensor configured to enable identifying a movement of the user.

19. A wireless headset as recited in claim 18 comprising a storage medium in the wireless headset, the storage medium configured to store at least computer program codes for facilitating voice recognition to recognize at least a word received by at least the microphone.

20. A wireless headset at least for helping a user hear audio outputs, the wireless headset comprising:
 a printed circuit board in the wireless headset, the printed circuit board with at least a controller attached thereon;
 a speaker in the wireless headset;
 a microphone in the wireless headset;
 another microphone in the wireless headset, the another microphone configured to capture at least sound in vicinity of the headset at least for noise cancellation, with one of the microphones closer to mouth of user than the another one of the microphones when the wireless headset is worn by the user;
 a sensor in the wireless headset, the sensor configured to provide at least an indication regarding whether the wireless headset is being worn;
 wireless communication circuitry in the wireless headset; and
 a storage medium in the wireless headset, the storage medium configured to store at least computer program codes for facilitating voice recognition to recognize at least a word received by at least the microphone,
 wherein the wireless headset is configured to facilitate output of the audio outputs after modifying power of the audio outputs, at least within a range of frequencies, to help the user hear the audio outputs presented to the user via at least the speaker,
 wherein at least the microphone and the another microphone are configured to receive audio inputs from the user, with at least some noise in the audio inputs configured to be cancelled based on using at least the microphone and the another microphone,
 wherein the wireless communication circuitry is configured to receive at least a message,
 wherein if the message is a text message, the at least a controller is configured to have at least a notification regarding the text message presented to the user, and
 wherein if the message is an audio message, the at least a controller is configured to have at least a notification regarding the audio message presented to the user.

21. A wireless headset as recited in claim 20, wherein the wireless headset is configured to assist in determining at least a hearing characteristic of the user based on at least generating a signal for the user and keeping track of at least a reaction from the user regarding the signal.

22. A wireless headset as recited in claim 21, wherein the wireless headset is configured to be wirelessly coupled to another apparatus, with at least a portion of the hearing characteristic stored in the another apparatus.

* * * * *